United States Patent
Tamayo et al.

(10) Patent No.: US 12,441,736 B2
(45) Date of Patent: Oct. 14, 2025

(54) KIF18A INHIBITORS

(71) Applicant: AMGEN INC., Thousand Oaks, CA (US)

(72) Inventors: Nuria A Tamayo, Newbury Park, CA (US); Abhisek Banerjee, Karnataka (IN); Michael J Frohn, Thousand Oaks, CA (US); Jian Jeffrey Chen, San Diego, CA (US); Kexue Li, Newbury Park, CA (US); Matthew Paul Bourbeau, Woodland Hills, CA (US); Lei Jia, San Diego, CA (US); Matthew Richard Kaller, Ventura, CA (US); Thomas T Nguyen, Newbury Park, CA (US); Nobuko Nishimura, West Hills, CA (US); Qiufen May Xue, Thousand Oaks, CA (US); John Gordon Allen, Newbury Park, CA (US)

(73) Assignee: AMGEN INC., Thousand Oaks, CA (US)

( * ) Notice: Subject to any disclaimer, the term of this patent is extended or adjusted under 35 U.S.C. 154(b) by 855 days.

(21) Appl. No.: 17/416,410

(22) PCT Filed: Dec. 20, 2019

(86) PCT No.: PCT/US2019/068174
§ 371 (c)(1),
(2) Date: Jun. 18, 2021

(87) PCT Pub. No.: WO2020/132653
PCT Pub. Date: Jun. 25, 2020

(65) Prior Publication Data
US 2022/0002311 A1  Jan. 6, 2022

Related U.S. Application Data

(60) Provisional application No. 62/783,053, filed on Dec. 20, 2018.

(51) Int. Cl.
| | | |
|---|---|---|
| *C07D 491/107* | (2006.01) | |
| *C07D 401/14* | (2006.01) | |
| *C07D 405/14* | (2006.01) | |
| *C07D 413/14* | (2006.01) | |
| *C07D 491/08* | (2006.01) | |

(52) U.S. Cl.
CPC ....... *C07D 491/107* (2013.01); *C07D 401/14* (2013.01); *C07D 405/14* (2013.01); *C07D 413/14* (2013.01); *C07D 491/08* (2013.01)

(58) Field of Classification Search
None
See application file for complete search history.

(56) References Cited

U.S. PATENT DOCUMENTS

| | | |
|---|---|---|
| 5,100,883 A | 3/1992 | Schiehser |
| 5,118,677 A | 6/1992 | Caufield |
| 5,118,678 A | 6/1992 | Kao |
| 5,120,842 A | 6/1992 | Failli |
| 5,151,413 A | 9/1992 | Caufield |
| 5,256,790 A | 10/1993 | Nelson |
| 5,258,389 A | 11/1993 | Goulet |
| 5,521,184 A | 5/1996 | Zimmermann |
| 5,650,415 A | 7/1997 | Tang |
| 5,656,643 A | 8/1997 | Spada |
| 5,728,813 A | 3/1998 | Lyman |
| 5,747,498 A | 5/1998 | Schnur |
| 5,770,599 A | 6/1998 | Gibson |
| 5,789,427 A | 8/1998 | Chen |
| 5,861,510 A | 1/1999 | Piscopio |

(Continued)

FOREIGN PATENT DOCUMENTS

| | | |
|---|---|---|
| DE | 19629652 A1 | 1/1998 |
| EP | 039051 A | 11/1981 |
| EP | 0090505 A | 10/1983 |
| EP | 520722 A | 12/1992 |
| EP | 566226 A | 10/1993 |
| EP | 606046 A | 7/1994 |
| EP | 0682027 A | 11/1995 |
| EP | 0787772 A2 | 8/1997 |
| EP | 0818442 A2 | 1/1998 |

(Continued)

OTHER PUBLICATIONS

"3-Pyridinecarboxamide, 2-(4,4-difluoro-1-piperidinyl)-N-(1,2-dihydro-4-methyl-2-oxo-6-quinolinyl)-(ACI)," SciFinder, CAS Registry No. 1870849-76-5, 1 page. (2025) Entered Feb. 19, 2016.

(Continued)

*Primary Examiner* — Jeffrey S Lundgren
*Assistant Examiner* — Anthony Joseph Seitz
(74) *Attorney, Agent, or Firm* — Elsa D. Lemoine

(57) ABSTRACT

The present invention relates to chemical compounds having a general formula (I), as defined herein, and synthetic intermediates thereof, which are capable of modulating KIF18A protein thereby influencing the process of cell cycle and cell proliferation to treat cancer and cancer-related diseases. The invention also includes pharmaceutical compositions, including the compounds, and methods of treating disease states related to the activity of KIF18A.

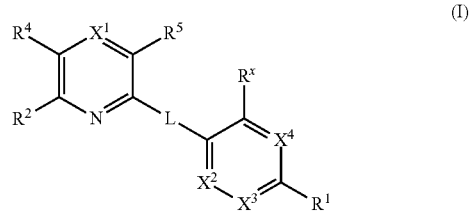

31 Claims, No Drawings

(56) References Cited

U.S. PATENT DOCUMENTS

| | | | |
|---|---|---|---|
| 5,863,949 | A | 1/1999 | Robinson |
| 5,969,110 | A | 10/1999 | Beckmann |
| 5,981,245 | A | 11/1999 | Fox |
| 5,990,141 | A | 11/1999 | Hirth |
| 6,057,124 | A | 5/2000 | Bartley |
| 6,111,090 | A | 8/2000 | Gorman |
| 6,232,447 | B1 | 5/2001 | Cerretti |
| 6,235,764 | B1 | 5/2001 | Larson |
| 6,258,812 | B1 | 7/2001 | Bold |
| 6,413,932 | B1 | 7/2002 | Cerretti |
| 6,515,004 | B1 | 2/2003 | Misra |
| 6,596,852 | B2 | 7/2003 | Cerretti |
| 6,630,500 | B2 | 10/2003 | Gingrich |
| 6,656,963 | B2 | 12/2003 | Firestone |
| 6,713,485 | B2 | 3/2004 | Carter |
| 6,727,225 | B2 | 4/2004 | Wiley |
| 7,025,962 | B1 | 4/2006 | Gorman |
| 7,618,632 | B2 | 11/2009 | Collins |
| 7,776,869 | B2 | 8/2010 | Chaffee |
| 7,812,135 | B2 | 10/2010 | Smith |
| 8,388,967 | B2 | 3/2013 | Smith |
| 8,586,023 | B2 | 11/2013 | Shiku |
| 8,591,886 | B2 | 11/2013 | Ponath |
| 9,630,976 | B2 * | 4/2017 | Ishida .................. C07D 471/10 |
| 9,815,846 | B2 | 11/2017 | Mitchell |
| 10,590,121 | B2 * | 3/2020 | Taylor .................. C07D 401/04 |
| 10,752,609 | B2 | 8/2020 | Hartz |
| 11,377,438 | B2 | 7/2022 | Arasappan |
| 2002/0042368 | A1 | 4/2002 | William, III |
| 2003/0105091 | A1 | 6/2003 | Riedl |
| 2003/0162712 | A1 | 8/2003 | Cerretti |
| 2009/0012085 | A1 | 1/2009 | Baum |
| 2010/0168084 | A1 | 7/2010 | Huber |
| 2020/0239441 | A1 | 7/2020 | Tamayo |
| 2022/0073504 | A1 * | 3/2022 | Tamayo ............... C07D 401/12 |
| 2022/0119363 | A1 | 4/2022 | Breslin |
| 2023/0151432 | A1 | 5/2023 | Payton |

FOREIGN PATENT DOCUMENTS

| | | | |
|---|---|---|---|
| EP | 0837063 | A | 4/1998 |
| EP | 931788 | A | 7/1999 |
| EP | 0780386 | B1 | 10/2002 |
| EP | 1181017 | B1 | 4/2003 |
| EP | 1004578 | B1 | 2/2004 |
| EP | 1786785 | B9 | 5/2013 |
| EP | 1947183 | B1 | 7/2013 |
| EP | 1866339 | B2 | 9/2021 |
| JP | 2000256358 | A | 9/2000 |
| JP | 2016535755 | A | 11/2016 |
| MX | 2020008656 | A | 12/2020 |
| WO | 9005719 | W | 5/1990 |
| WO | 9205179 | W | 4/1992 |
| WO | 9220642 | W | 11/1992 |
| WO | 9311130 | W | 6/1993 |
| WO | 9402136 | W | 2/1994 |
| WO | 9402485 | W | 2/1994 |
| WO | 9409010 | W | 4/1994 |
| WO | 9509847 | W | 4/1995 |
| WO | 9514023 | W | 5/1995 |
| WO | 9516691 | W | 6/1995 |
| WO | 9519774 | W | 7/1995 |
| WO | 9519970 | W | 7/1995 |
| WO | 9627583 | W | 9/1996 |
| WO | 9630347 | W | 10/1996 |
| WO | 9631510 | W | 10/1996 |
| WO | 9633172 | W | 10/1996 |
| WO | 9633980 | W | 10/1996 |
| WO | 9641807 | W | 12/1996 |
| WO | 9702266 | W | 1/1997 |
| WO | 9713771 | W | 4/1997 |
| WO | 9719065 | W | 5/1997 |
| WO | 9727199 | W | 7/1997 |
| WO | 9730034 | W | 8/1997 |
| WO | 9730044 | W | 8/1997 |
| WO | 9732880 | W | 9/1997 |
| WO | 9732881 | W | 9/1997 |
| WO | 9734895 | W | 9/1997 |
| WO | 9738983 | W | 10/1997 |
| WO | 9738994 | W | 10/1997 |
| WO | 9749688 | W | 12/1997 |
| WO | 9802434 | W | 1/1998 |
| WO | 9802437 | W | 1/1998 |
| WO | 9802438 | W | 1/1998 |
| WO | 9802441 | W | 1/1998 |
| WO | 9803516 | W | 1/1998 |
| WO | 9807697 | W | 2/1998 |
| WO | 9807726 | W | 2/1998 |
| WO | 9814449 | W | 4/1998 |
| WO | 9814450 | W | 4/1998 |
| WO | 9814451 | W | 4/1998 |
| WO | 9817662 | W | 4/1998 |
| WO | 9830566 | W | 7/1998 |
| WO | 9833768 | W | 8/1998 |
| WO | 9833798 | W | 8/1998 |
| WO | 9834915 | W | 8/1998 |
| WO | 9834918 | W | 8/1998 |
| WO | 9907701 | W | 2/1999 |
| WO | 1999007675 | A1 | 2/1999 |
| WO | 9920758 | W | 4/1999 |
| WO | 9929667 | W | 6/1999 |
| WO | 9935132 | W | 7/1999 |
| WO | 9935146 | W | 7/1999 |
| WO | 9940196 | W | 8/1999 |
| WO | 9945009 | W | 9/1999 |
| WO | 9952889 | W | 10/1999 |
| WO | 9952910 | W | 10/1999 |
| WO | 9961422 | W | 12/1999 |
| WO | 0002871 | W | 1/2000 |
| WO | 0012089 | W | 3/2000 |
| WO | 0059509 | W | 10/2000 |
| WO | 200103720 | W | 1/2001 |
| WO | 0114387 | W | 3/2001 |
| WO | 0132651 | W | 5/2001 |
| WO | 0137820 | W | 5/2001 |
| WO | 0255501 | W | 7/2002 |
| WO | 0259110 | W | 8/2002 |
| WO | 0266470 | W | 8/2002 |
| WO | 0268406 | W | 9/2002 |
| WO | 0405279 | W | 1/2004 |
| WO | 0407458 | W | 1/2004 |
| WO | 0407481 | W | 1/2004 |
| WO | 0409784 | W | 1/2004 |
| WO | 2004005281 | A1 | 1/2004 |
| WO | 2004039795 | A2 | 5/2004 |
| WO | 2005007190 | A1 | 1/2005 |
| WO | 05011700 | W | 2/2005 |
| WO | 2005055808 | A2 | 6/2005 |
| WO | 2005115451 | A2 | 12/2005 |
| WO | 06044453 | W | 4/2006 |
| WO | 2006083289 | A2 | 8/2006 |
| WO | 06122806 | W | 11/2006 |
| WO | 2006121168 | A1 | 11/2006 |
| WO | 2007133822 | A1 | 11/2007 |
| WO | 2008070740 | A1 | 6/2008 |
| WO | WO-2008106692 | A1 * | 9/2008 ............ A61K 31/44 |
| WO | 2008133274 | A1 | 11/2008 |
| WO | 09036082 | W | 3/2009 |
| WO | 09055730 | W | 4/2009 |
| WO | 2010003118 | A1 | 1/2010 |
| WO | 2011028683 | A1 | 3/2011 |
| WO | 2011051726 | A2 | 5/2011 |
| WO | 2011084985 | A1 | 7/2011 |
| WO | 2011085261 | A1 | 7/2011 |
| WO | 2011090754 | A1 | 7/2011 |
| WO | 2013039954 | A1 | 3/2013 |
| WO | 2015021936 | A1 | 2/2015 |
| WO | 2015069594 | A1 | 5/2015 |
| WO | 2016016316 | A1 | 2/2016 |
| WO | 2018098412 | A1 | 5/2018 |
| WO | WO-2019006126 | A1 * | 1/2019 ............ A61P 29/00 |
| WO | 2019123378 | A1 | 6/2019 |
| WO | 2019164846 | A1 | 8/2019 |
| WO | 2020006075 | A1 | 1/2020 |

(56) References Cited

FOREIGN PATENT DOCUMENTS

| WO | 2020092187 A1 | 5/2020 |
| WO | 2020092667 A1 | 5/2020 |
| WO | 2020132649 A1 | 6/2020 |
| WO | 2020132653 A1 | 6/2020 |

OTHER PUBLICATIONS

"3-Pyridinecarboxamide, N-(phenyl-t)-(9CI)," SciFinder, CAS Registry No. 74804-46-9, 1 page. (2025) Entered Nov. 16, 1984.
"4-Pyridinecarboxamide, 2-ethoxy-N-[2-(1-pyrrolidinyl)-3-pyridinyl]-(ACI)," SciFinder, CAS Registry No. 1385383-83-4, 1 page. (2025) Entered Aug. 12, 2012.
"4-Pyridinecarboxamide, N-[4-(1-piperidinyl)-3-pyridinyl]-2-(1H-1,2,4-triazol-1-yl)-(ACI)," SciFinder, CAS Registry No. 1385284-78-5, 1 page. (2025) Entered Aug. 2, 2012.
"4-Pyrimidinecarboxamide, 2,6-dimethyl-N-[2-(1-piperidinyl)phenyl]-(ACI)," SciFinder, CAS Registry No. 2178899-05-01, p. 2178899-05-1 (2025) Entered Feb. 22, 2018.
"4-Pyrimidinecarboxamide, 5-chloro-2-(1-methylethyl)-N-[2-(1-piperidinyl)phenyl]-(ACI)," SciFinder, CAS Registry No. 2192384-26-0, 1 page. (2025) Entered Mar. 16, 2018.
"4-Pyrimidinecarboxamide, N-[2-fluoro-6-(1-pyrrolidinyl)phenyl]-2,6-dimethyl-(ACI)," SciFinder, CAS Registry No. 2210084-28-7, 1 page. (2025) Entered Apr. 11, 2018.
"Benzamide, 5-chloro-2-methyl-N-[3-(1-methylethyl)-2-pyrazinyl]-(ACI)," SciFinder, CAS Registry No. 2320884-81-7, 1 page. (2025) Entered May 30, 2019.
Anand et al., "Palladium-Silver Cooperativity in an Aryl Amination Reaction through C-H Functionalization," ACS Catalysis, vol. 6(2), pp. 696-708 (2016).
Barillari et al., "Classical Bioisosteres," Bioisosteres in Medicinal Chemistry, pp. 15-29 (2012).
Barnett et al., "Identification and characterization of pleckstrin-homology-domain-dependent and isoenzyme-specific Akt inhibitors," Biochem. J., vol. 385 (Pt. 2), pp. 399-408 (2005).
Berge et al., "Pharmaceutical Salts", Journal of Pharmaceutical Sciences, vol. 66 (1), pp. 1-19 (Jan. 1977).
Braun et al., "Synthesis and Biological Evaluation of Optimized Inhibitors of the Mitotic Kinesin Kif18A", ACS Chemical Biology, vol. 10, pp. 554-560 (2014).
Bundgaard et al., "A novel solution-stable, water-soluble prodrug type for drugs containing a hydroxyl or an NH-acidic group", J Med Chem., vol. 32 (12), pp. 2503-2507 (1989).
Bundgaard, "Design of prodrugs", Elsevier Science Publishers B.V., Netherlands, 2 pages (1985) (Table of Contents Only).
Dasmahapatra et al. "In vitro combination treatment with perifosine and UCN-01 demonstrates synergism against prostate (PC-3) and lung (A549) epithelial adenocarcinoma cell lines," Clin. Cancer Res., vol. 10(15), pp. 5242-5252 (2004).
Gangarapu et al., "Design, Synthesis, and Biological Evaluation of 3,5-Disubstituted 2-Pyrazineamide Derivatives as Antitubercular Agents," Journal of Heterocyclic Chemistry, vol. 56(3), pp. 1115-1126 (2019).
Gangarapu et al., "NMI/MsCI-Mediated Amide Bond Formation of Aminopyrazines and Aryl/Heteroaryl Carboxylic Acids: Synthesis of Biologically Relevant Pyrazine Carboxamides," ChemistrySelect, vol. 2(25), pp. 7706-7710 (2017).
Gennaro et al., "Pharmaceutical Sciences", Remington's, 18th Edition, 13 pages (1990) (Table of Contents Only).
Gills et al., "The development of phosphatidylinositol ether lipid analogues as inhibitors of the serine/threonine kinase, Akt," Expert. Opin. Investig. Drugs, vol. 13, pp. 787-797 (2004).
Girgis et al., "Novel synthesis of nicotinamide derivatives of cytotoxic properties," Bioorg. Med. Chem., vol. 14, pp. 4466-4476 (2006).

Goldberg et al., "Role of PD-1 and its ligand, B7-H1, in early fate decisions of CD8 T cells," Blood, vol. 110(1), pp. 186-192 (2007).
Goldstein et al., "Biological efficacy of a chimeric antibody to the epidermal growth factor receptor in a human tumor xenograft model," Clin Cancer Res, vol. 1(11), pp. 1311-1318 (1995).
Huang et al., "Epidermal growth factor receptor blockade with C225 modulates proliferation, apoptosis, and radiosensitivity in squamous cell carcinomas of the head and neck," Cancer Res., vol. 59(8), pp. 1935-1940 (1999).
Jin et al., "Inhibition of AKT survival pathway by a small molecule inhibitor in human endometrial cancer cells," Br. J. Cancer, vol. 91, pp. 1808-1812 (2004).
Mayr et al., "The Human Kinesin Kif18A Is a Motile Microtubule Depolymerase Essential for Chromosome Congression," Current Biology, vol. 17, pp. 488-498 (2007).
Modjtahedi et al., "Immunotherapy of human tumor xenografts overexpressing the EGF receptor with rat antibodies that block growth factor-receptor interaction," Br. J. Cancer, vol. 67(2), pp. 254-261 (1993).
Nagahara et al., "Kinesin 18A expression: Clinical relevance to colorectal cancer progression," International Journal of Cancer, vol. 129, pp. 2543-2552 (2011).
Paez et al., "EGFR Mutations In Lung Cancer Correlation With Clinical Response To Gefitinib Therapy," Science, vol. 304(5676), pp. 1497-1500 (2004).
Rath et al., "Kinesins and cancer," Cancer, vol. 12, pp. 527-539 (2012).
Sarkar et al., "Indole-3-carbinol and prostate cancer," J Nutr., vol. 134(12 Suppl), p. 3493S-3498S (2004).
Siqueira et al., "Trifluoromethyl arylamides with antileukemia effect and intracellular inhibitory activity over serine/ arginine-rich protein kinases (SRPKs)," European Journal of Medicinal Chemistry, vol. 134, pp. 97-109 (2017).
Svensson et al., "The Design And Bioactivation of Presystemically Stable Prodrugs", Drug Metab Rev., vol. 19 (2), pp. 165-194 (1988).
Teramoto et al., "Inhibitory Effect of Anti-Epidermal Growth Factor Receptor Antibody on a Human Gastric Cancer," Cancer, vol. 77(8), pp. 1639-1645 (1996).
The Human Protein Atlas, "Expression of KIF18A in cancer," Retrieved from Internet at <https://www.proteinatlas.org/ENSG00000121621-KIF18A/cancer>, (2025).
Thompson et al., "PD-1 is expressed by tumor-infiltrating immune cells and is associated with poor outcome for patients with renal cell carcinoma," Clin. Cancer Res., vol. 13(6), pp. 1757-1761 (2007).
Traxler, "Tyrosine kinase inhibitors in cancer treatment (Part II)," Exp. Opin. Ther. Patents, vol. 8(12), pp. 1599-1625 (1998).
Wang et al., "Ligand-Promoted Rhodium(III)-Catalyzed ortho-C-H Amination with Free Amines," Angewandte Chemie International Edition, vol. 56(26), pp. 7449-7453 (2017).
Yan et al., "Pharmacogenics and pharmacogenomics in oncology therapeutic antibody development," BioTechniques, vol. 39, pp. 565-568 (2005).
Yang et al., "Akt/Protein Kinase B Signaling Inhibitor-2, a Selective Small Molecule Inhibitor of Akt Signaling with Antitumor Activity in Cancer Cells Overexpressing Akt", Cancer Res., vol. 64 (13), pp. 4394-4399 (2004).
Yang et al., "Eradication of established tumors by a fully human monoclonal antibody to the epidermal growth factor receptor without concomitant chemotherapy," Cancer Res., vol. 59, pp. 1236-1243 (1999).
Yu et al., "The role of kinesin family proteins in tumorigenesis and progression," Cancer, vol. 116(22), pp. 5150-5160 (2010).
Zhang et al., "Kif18A is involved in human breast carcinogenesis," Carcinogenesis, vol. 31(9), pp. 1676-1684 (2010).
Zhao et al., "Discovery of 2-(pyridin-2-yl)aniline as a directing group for the sp2 C-H bond amination mediated by cupric acetate," Org. Biomol. Chem, vol. 15, pp. 6622-6631 (2017).

* cited by examiner

KIF18A INHIBITORS

CROSS REFERENCES TO RELATED APPLICATIONS

This application is a National Stage Application under 35 U.S.C. § 371 of International Application No. PCT/US2019/068174, having an international filing date of Dec. 20, 2019, which is published on Jun. 25, 2020, as WO 2020/132653, which is claiming priority from U.S. Provisional Application No. 62/783,053, having a filing date of Dec. 20, 2018.

The invention relates to the field of pharmaceutical agents and, more specifically, is directed to compounds and compositions useful for modulating KIF18A, and to uses and methods for managing cell proliferation and for treating cancer.

BACKGROUND OF THE INVENTION

Cancer is one of the most widespread diseases afflicting mankind and a major cause of death worldwide. In an effort to find an effective treatment or a cure for one or more of the many different cancers, over the last couple of decades, numerous groups have invested a tremendous amount of time, effort and financial resources. However, to date, of the available cancer treatments and therapies, only a few offer any considerable degree of success.

Cancer is often characterized by unregulated cell proliferation. Damage to one or more genes, responsible for the cellular pathways, which control progress of proliferation through the cell cycle and centrosome cycle, can cause the loss of normal regulation of cell proliferation. These deregulated genes can code for various tumor suppressor or oncogene proteins, which participate in a cascade of events, leading to unchecked cell-cycling progression and cell proliferation. Various kinase and kinesin proteins have been identified, which play key roles in cell cycle and mitotic regulation and progression of normal dividing cells and cancer cells.

Kinesins are molecular motors that play important roles in cell division and intracellular vesicle and organelle transport. Mitotic kinesin plays roles in several aspects of spindle assembly, chromosome segregation, centrosome separation and dynamics (reviewed in O. Rath and F. Kozielski, *Nature Review Cancer*, 12:527-39, 2012). Human kinesins are categorized into 14 subfamilies based on sequence homology within the socalled "motor domain", this domains ATPase activity drives unidirectional movement along microtubules (MTs). The non-motor domain of these proteins is responsible for cargo attachment; a "cargo" can include any one of a variety of different membranous organelles, signal transduction scaffolding systems, and chromosomes. Kinesins use the energy of ATP hydrolysis to move cargo along polarized microtubules. Thus, kinesins are often called "plus-end" or "minus-end" directed motors.

KLF18A gene belongs to Kinesin-8 subfamily and is a plus-end-directed motor. KIF18A is believed to influence dynamics at the plus end of kinetochore microtubules to control correct chromosome positioning and spindle tension. Depletion of human KIF18A leads to longer spindles, increased chromosome oscillation at metaphase, and activation of the mitotic spindle assembly checkpoint in HeLa cervical cancer cells (MI Mayr et al, *Current Biology* 17, 488-98, 2007). KIF18A appears to be viable target for the treatment of cancer. KIF18A is overexpressed in various types of cancers, including but not limited to colon, breast, lung, pancreas, prostate, bladder, head, neck, cervix, and ovarian cancers. Further, genetic deletion or knockdown, or inhibition of KIF18A effects mitotic spindle apparatus in cancer cell lines. Particularly, inhibition of KIF18A has been found to induce mitotic cell arrest, a known vulnerability that can promote cell death in mitosis via apoptosis, mitotic catastrophe, or multipolarity driven lethality or death after mitotic slippage in interphase. Accordingly, there has been a strong interest in finding inhibitors of KIF18A proteins.

Thus, the inhibition of KIF18A ATPase activity is a promising approach for the development of novel anti-cancer agents.

SUMMARY OF THE INVENTION

The present invention provides a new class of compounds useful for modulating KIF18A protein alone or in a bound complex with microtubules for treating KIF18A-mediated conditions and/or diseases, including cancer, inflammation, or ciliopathologies.

The compounds provided by the invention have MT-based KIF18A modulatory activity and, in particular, KIF18A inhibitory activity. To this end, the invention also provides the use of these compounds, as well as pharmaceutically acceptable salts thereof, in the preparation and manufacture of a pharmaceutical composition or medicament for therapeutic, prophylactic, acute or chronic treatment of KIF18A mediated diseases and disorders, including without limitation, cancer. Thus, the compounds of the invention are useful in the manufacture of anti-cancer medicaments. The invention also provides processes for making compounds of Formula I, as well as intermediates useful in such processes.

In embodiment 1, the present invention provides a compound of Formula (I), A compound of formula I:

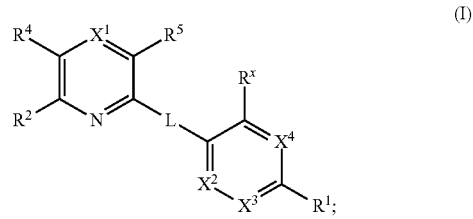

or any pharmaceutically-acceptable salt thereof, wherein:
$X^1$ is N or $CR^6$;
$X^2$ is N or $CR^7$;
$X^3$ is N or $CR^8$;
$X^4$ is N or $CR^9$;
wherein no more than 3 of $X^1$, $X^2$, $X^3$ and $X^4$ are N;
when any of $X^2$, $X^3$ and $X^4$ is N; then L is —(C=O)—NR$^3$— or —NR$^3$—(C=O)—;
when all of $X^2$, $X^3$ and $X^4$ are not N; then L is —(C=O)—NR$^3$—;
$R^1$ is a group —Z—R$^{12}$;
wherein Z is —$C_{0-4}$alk-, —NR$^{11}$—, —NR$^{11}$SO$_2$—$C_{0-4}$alk-, —SO$_2$NR$^{11}$—$C_{0-4}$alk-, —NR$^{11}$SO$_2$NR$^{11}$—, —NR$^{11}$SO$_2$NR$^{11}$—C(=O)—O—, —$C_{0-4}$alk-S(=O)(=NH)—, $C_{0-4}$alk-NR$^{11}$—S(=O)(=NH), —$C_{0-4}$alk-S—, —$C_{0-4}$alk-S(=O)—, —$C_{0-4}$alk-SO$_2$—, —O—, —P—, —P(=O), —P(=O)$_2$, —(C=O)—, —(C=O)NR$^{11}$-, or —NR$^{11}$(C=O); or
the group —Z—R$^{12}$ is —N=S(=O)—(R$^{12}$)$_2$, wherein the two R$^{12}$ pair can alternatively combine with the sulfur atom attached to each of them to form a saturated or partially-saturated 3-, 4-, 5-, or 6-membered monocyclic ring containing 0, 1, 2 or 3 N atoms and 0, 1, or 2 atoms selected from O and S;

$R^2$ is halo or a group —Y—$R^{13}$, wherein Y is —$C_{0-4}$alk-, —N($C_{0-1}$alk)-$C_{0-4}$alk-C(=O)N$R^aR^a$($C_{1-4}$alk)-, —O—$C_{0-4}$alk-, —S—, —S=O, —S(=O)$_2$—, —SO$_2$N($C_{0-1}$alk)-$C_{0-4}$alk-, —N($C_{0-1}$alk)-SO$_2$—$C_{0-4}$alk-, —$C_{0-4}$alk-S(=O)(=NH)—, —(C=O)—, —$C_{0-4}$alk-(C=O)—O—; or the group —Y—$R^{13}$ is —N=S(=O)—($R^{13}$)$_2$, wherein the two $R^{13}$ pair can alternatively combine with the sulfur atom attached to each of them to form a saturated or partially-saturated 3-, 4-, 5-, or 6-membered monocyclic ring containing 0, 1, 2 or 3 N atoms and 0, 1, or 2 atoms selected from O and S;

$R^3$ is H, methyl, or ethyl;
$R^4$ is H, halo, $C_{1-4}$alk, or $C_{1-4}$haloalk;
$R^5$ is H, halo, $C_{1-8}$alk, or $C_{1-4}$haloalk;
$R^6$ is H, halo, CN, —O—$C_{0-6}$alk-, $R^{6a}$ or $R^{6b}$;
$R^7$ is H, halo, $C_{1-4}$alk, or $C_{1-4}$haloalk;
$R^8$ is H, halo, $C_{1-8}$alk, or $C_{1-4}$haloalk;
$R^9$ is H, halo, $C_{1-4}$alk, or $C_{1-4}$haloalk;
$R^x$ is selected from the group consisting of

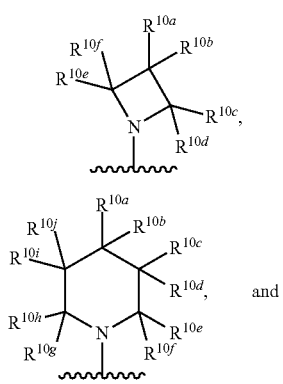
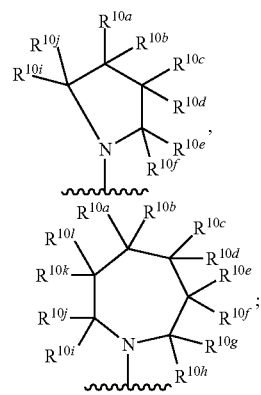

Each of $R^{10a}$, $R^{10b}$, $R^{10c}$, $R^{10d}$, $R^{10e}$, $R^{10f}$, $R^{10g}$, $R^{10h}$, $R^{10i}$, and $R^{10j}$ is H, halo, $R^{10k}$, or $R^{10l}$;

or alternatively, each of $R^{10a}$ and $R^{10b}$ pair, $R^{10c}$ and $R^{10d}$ pair, $R^{10e}$ and $R^{10f}$ pair, $R^{10g}$ and $R^{10h}$ pair, or $R^{10i}$ and $R^{10j}$ pair, independently, can combine with the carbon atom attached to each of them to form a saturated or partially-saturated 3-, 4-, 5-, 6-membered monocyclic ring spiro to the $R^x$ ring; wherein said 3-, 4-, 5-, 6-membered monocyclic ring contains 0, 1, 2 or 3 N atoms and 0, 1, or 2 atoms selected from O and S, and further wherein said 3-, 4-, 5-, 6-membered monocyclic ring is substituted by 0, 1, 2 or 3 group(s) selected from F, Cl, Br, $C_{1-6}$alk, $C_{1-4}$haloalk, —O$R^a$, —O$C_{1-4}$haloalk, CN, —N$R^aR^a$, or oxo;

$R^{11}$ is H or $C_{1-8}$alk;
$R^{12}$ is H, halo, $R^{12a}$, or $R^{12b}$;
$R^{13}$ is $R^{13a}$ or $R^{13b}$;

$R^{6a}$, $R^{10k}$, $R^{12a}$, and $R^{13a}$ is independently, at each instance, selected from the group consisting of a saturated, partially-saturated or unsaturated 3-, 4-, 5-, 6-, or 7-membered monocyclic or 4-, 5-, 6-, 7-, 8-, 9-, 10-, 11-, or 12-membered bicyclic ring containing 0, 1, 2 or 3 N atoms and 0, 1, or 2 atoms selected from O and S, which is substituted by 0, 1, 2 or 3 group(s) selected from F, Cl, Br, $C_{1-6}$alk, $C_{1-4}$haloalk, —O$R^a$, —O$C_{1-4}$haloalk, CN, —C(=O)$R^b$, —C(=O)O$R^a$, —C(=O)N$R^aR^a$, —C(=N$R^a$)N$R^aR^a$, —OC(=O)$R^b$, —OC(=O)N$R^aR^a$, —O$C_{2-6}$alkN$R^aR^a$, —O$C_{2-6}$alkO$R^a$, —S$R^a$, —S(=O)$R^b$, —S(=O)$_2R^b$, —S(=O)$_2$N$R^aR^a$, —N$R^aR^a$, —N($R^a$)C(=O)$R^b$, —N($R^a$)C(=O)O$R^b$, —N($R^a$)C(=O)N$R^aR^a$, —N($R^a$)C(=N$R^a$)N$R^aR^a$, —N($R^a$)S(=O)$_2R^b$, —N($R^a$)S(=O)$_2$N$R^aR^a$, —N$R^aC_{2-6}$alkN$R^aR^a$, —N$R^aC_{2-6}$alkO$R^a$, —$C_{1-6}$alkN$R^aR^a$, —$C_{1-6}$alkO$R^a$, —$C_{1-6}$alkN($R^a$)C(=O)$R^b$, —$C_{1-6}$alkOC(=O)$R^b$, —$C_{1-6}$alkC(=O)N$R^aR^a$, —$C_{1-6}$alkC(=O)O$R^a$, $R^{14}$, and oxo;

$R^{6b}$, $R^{10l}$, $R^{12b}$, and $R^{13b}$ is independently, at each instance, selected from the group consisting of $C_{1-6}$alk substituted by 0, 1, 2, 3, 4, or 5 group(s) selected from F, Cl, Br, —C(=O)O$R^a$, —O$R^a$, —$C_{1-2}$haloalk, —O$C_{1-4}$haloalk, CN, NH$_2$, NH(CH$_3$), or N(CH$_3$)$_2$;

$R^{14}$ is selected from the group consisting of a saturated, partially-saturated or unsaturated 3-, 4-, 5-, 6-, or 7-membered monocyclic or 4-, 5-, 6-, 7-, 8-, 9-, 10-, 11-, or 12-membered bicyclic ring containing 0, 1, 2 or 3 N atoms and 0, 1, or 2 atoms selected from O and S, which is substituted by 0, 1, 2 or 3 group(s) selected from F, Cl, Br, $C_{1-6}$alk, $C_{1-4}$haloalk, —O$R^a$, —O$C_{1-4}$haloalk, CN, —C(=O)$R^b$, —C(=O)O$R^a$, —C(=O)N$R^aR^a$, —C(=N$R^a$)N$R^aR^a$, —OC(=O)$R^b$, —OC(=O)N$R^aR^a$, —O$C_{2-6}$alkN$R^aR^a$, —O$C_{2-6}$alkO$R^a$, —S$R^a$, —S(=O)$R^b$, —S(=O)$_2R^b$, —S(=O)$_2$N$R^aR^a$, —N$R^aR^a$, —N($R^a$)C(=O)$R^b$, —N($R^a$)C(=O)O$R^b$, —N($R^a$)C(=O)N$R^aR^a$, —N($R^a$)C(=N$R^a$)N$R^aR^a$, —N($R^a$)S(=O)$_2R^b$, —N($R^a$)S(=O)$_2$N$R^aR^a$, —N$R^aC_{2-6}$alkN$R^aR^a$, —N$R^aC_{2-6}$alkO$R^a$, —$C_{1-6}$alkN$R^aR^a$, —$C_{1-6}$alkO$R^a$, —$C_{1-6}$alkN($R^a$)C(=O)$R^b$, —$C_{1-6}$alkOC(=O)$R^b$, —$C_{1-6}$alkC(=O)N$R^aR^a$, —$C_{1-6}$alkC(=O)O$R^a$, and oxo;

$R^a$ is independently, at each instance, H or $R^b$; and $R^b$ is independently, at each instance, $C_{1-6}$alk, phenyl, or benzyl, wherein the $C_{1-6}$alk is being substituted by 0, 1, 2 or 3 substituents selected from halo, —OH, —O$C_{1-4}$alk, —NH$_2$, —NH$C_{1-4}$alk, —OC(=O)$C_{1-4}$alk, or —N($C_{1-4}$alk)$C_{1-4}$alk; and the phenyl or benzyl is being substituted by 0, 1, 2 or 3 substituents selected from halo, $C_{1-4}$alk, $C_{1-3}$haloalk, —OH, —O$C_{1-4}$alk, —NH$_2$, —NH$C_{1-4}$alk, —OC(=O)$C_{1-4}$alk, or —N($C_{1-4}$alk)$C_{1-4}$alk.

In embodiment 2, the present invention provides compounds wherein L is —N$R^3$—(C=O); and $X^1$ is C$R^6$, $X^2$ is C$R^7$, $X^3$ is N; and $X^4$ is C$R^9$; having the formula (Ia):

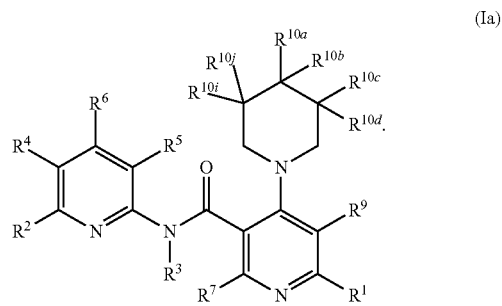

(Ia)

In embodiment 3, the present invention provides compounds wherein L is —N$R^3$—(C=O)—; and $X^1$ is C$R^6$, $X^2$ is C$R^7$, $X^3$ is C$R^8$; and $X^4$ is N; having the formula (Ib):

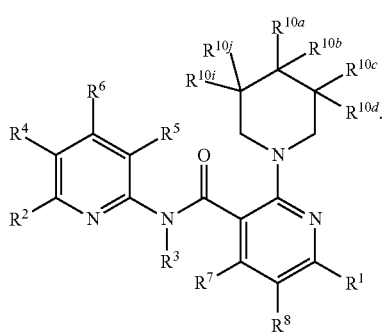

(Ib)

In embodiment 4, the present invention provides compounds wherein L is —(C=O)—NR$^3$—; and X$^1$ is CR$^6$, X$^2$ is CR$^7$, X$^3$ is CR$^8$; and X$^4$ is CR$^9$; having the formula (Ic):

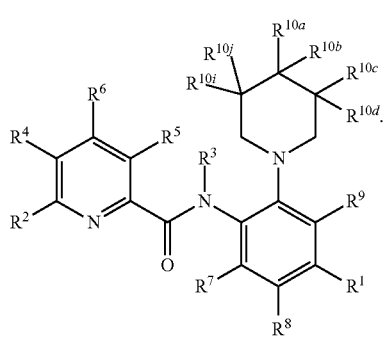

(Ic)

In embodiment 5, the present invention provides compounds wherein L is —(C=O)—NR$^3$—; and X$^1$ is N, X$^2$ is CR$^7$, X$^3$ is CR$^8$; and X$^4$ is CR$^9$; having the formula (Id):

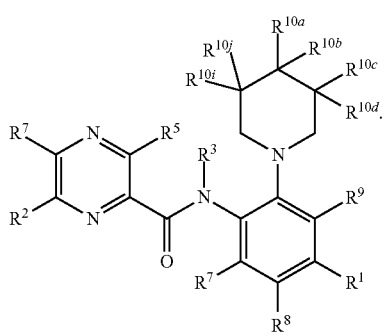

(Id)

In embodiment 6, the present invention provides compounds wherein L is —(C=O)—NR$^3$—; and X$^1$ is CR$^6$, X$^2$ is N, X$^3$ is CR$^8$; and X$^4$ is N; having the formula (Ie):

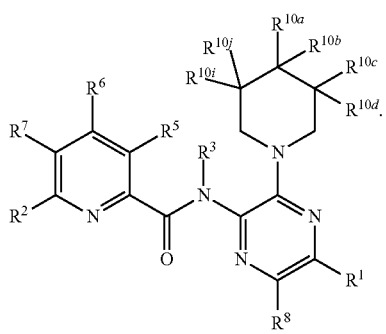

(Ie)

In embodiment 7, the present invention provides compounds wherein L is —(C=O)—NR$^3$—; and X$^1$ is CR$^6$, X$^2$ is CR$^7$, X$^3$ is CR$^8$; and X$^4$ is N; having the formula (If):

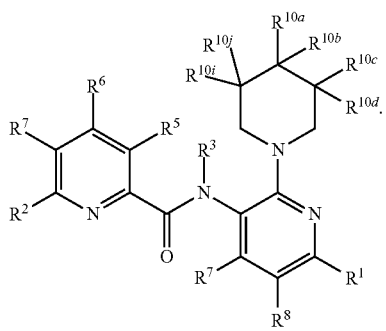

(If)

In embodiment 8, the present invention provides compounds in accordance with any of the above embodiments, or pharmaceutically acceptable salts thereof, wherein R$^3$ is H or methyl.

In embodiment 9, the present invention provides compounds in accordance with any of the above embodiments, or pharmaceutically acceptable salts thereof, wherein each of R$^{10c}$, R$^{10d}$, R$^{10e}$, R$^{10f}$, R$^{10g}$, R$^{10h}$, R$^{10i}$, and R$^{10j}$ is H, halo, C$_{1-6}$alk, or C$_{1-4}$haloalk; and each of R$^{10a}$ and R$^{10b}$ pair combine with the carbon atom attached to each of them form a saturated 3-, 4-, or 5-membered monocyclic ring spiro to the R$^x$ ring; wherein said ring contains 0, 1, 2 or 3 N atoms and 0 or 1 atoms selected from O and S.

In embodiment 10, the present invention provides compounds in accordance with any of the above embodiments, or pharmaceutically acceptable salts thereof, wherein each of R$^{10c}$, R$^{10d}$, R$^{10e}$, R$^{10f}$, R$^{10g}$, R$^{10h}$, R$^{10i}$, and R$^{10j}$ is H, methyl, or ethyl; and each of R$^{10a}$ and R$^{10b}$ pair combine with the carbon atom attached to each of them form a cyclopropyl, cyclobutyl, or cyclopentyl ring spiro to the R$^x$ ring.

In embodiment 11, the present invention provides compounds in accordance with any of the above embodiments, or pharmaceutically acceptable salts thereof, wherein R$^x$ is

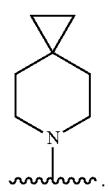 [SMILES: *N1CCC2(CC1)CC2 ; "."]

In embodiment 12, the present invention provides compounds in accordance with any of the above embodiments, or pharmaceutically acceptable salts thereof, wherein Z is absent, —NH—, —NHSO$_2$—, —O—, —SO$_2$NH—, —S(=O)(=NH)—, —CH$_2$—S(=O)(=NH)—, —SO$_2$—, —CH$_2$—SO$_2$, or CH$_3$(CH)—SO$_2$.

In embodiment 13, the present invention provides compounds in accordance with any of the above embodiments, or pharmaceutically acceptable salts thereof, wherein $R^{12}$ is selected from: a) H; (b) F; (c) $C_{1-6}$alk substituted by 0, 1, 2 or 3 group(s) selected from F, Cl, Br, —CF$_3$, —C(=O)CH$_3$, —OH, —OCH$_3$, —NH$_2$, cyclopropyl, cyclopropylmethanol, or 3-(trifluoromethyl)-3H-diazirinyl; or (d) a saturated, partially-saturated or unsaturated 3-, 4-, 5-, 6-, or 7-membered monocyclic ring containing 0, 1, 2 or 3 N atoms and 0 or 1 atoms selected from O and S, which is substituted by 0, 1, 2 or 3 group(s) selected from F, Cl, Br, methyl, ethyl, —CF$_3$, —C$_{1-6}$alkOH. —OH, —OCH$_3$, —NH$_2$, or oxo.

In embodiment 14, the present invention provides compounds in accordance with any of the above embodiments, or pharmaceutically acceptable salts thereof, wherein $R^{12}$ is selected from cyclopropyl, cyclobutyl, cyclopentyl, oxetanyl, azetidinyl, oxazolidinyl, 1,3-dioxolanyl, or pyrrolidinyl.

In embodiment 15, the present invention provides compounds in accordance with any of the above embodiments, or pharmaceutically acceptable salts thereof, wherein the group —Z—$R^{12}$ is —N=S(=O)—($R^{12}$)$_2$, wherein the two $R^{12}$ pair can alternatively combine with the sulfur atom attached to each of them to form a saturated or partially-saturated 3-, 4-, 5-, or 6-membered monocyclic ring containing 0, 1, 2 or 3 N atoms and 0, 1, or 2 atoms selected from O and S; which is selected from:

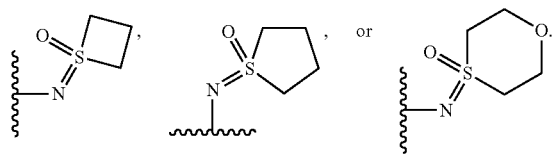 [SMILES: *N=S1(=O)CCC1 ; "," ; *N=S1(=O)CCCC1 ; "," ; *N=S1(=O)CCOCC1]

In embodiment 16, the present invention provides compounds in accordance with any of the above embodiments, or pharmaceutically acceptable salts thereof, wherein $R^1$ is a group —Z—$R^{12}$, wherein Z is —NHSO$_2$— or —SO$_2$NH—; and $R^{12}$ is cyclopropyl, or $R^{12}$ is $C_{1-6}$alk substituted by 0, 1, 2 or 3 OH group(s).

In embodiment 17, the present invention provides compounds in accordance with any of the above embodiments, or pharmaceutically acceptable salts thereof, wherein $R^1$ is a group —Z—$R^{12}$, wherein Z is —NHSO$_2$— and $R^{12}$ is —CH$_2$—CH$_2$—OH.

In embodiment 18, the present invention provides compounds in accordance with any of the above embodiments, or pharmaceutically acceptable salts thereof, wherein $R^2$ is a group —Y—$R^{13}$, wherein Y is absent, —NH—, or —NHSO$_2$—; and $R^{13}$ is a saturated, partially-saturated or unsaturated 3-, 4-, 5-, 6-, or 7-membered monocyclic or 8-, 9-, 10-, 11-, or 12-membered bicyclic ring containing 0, 1, 2 or 3 N atoms and 0 or 1 atoms selected from O and S, which is substituted by 0, 1, 2 or 3 group(s) selected from F, Cl, Br, methyl, ethyl, CF$_3$, CH$_2$OH, —OH, —OCH$_3$, —NH$_2$, —NH(CH$_3$), and oxo; or;

$R^{13}$ is $C_{1-6}$alk substituted by 0, 1, 2, 3, 4, or 5 group(s) selected from F, Cl, Br, —OH, —OC$_{1-4}$haloalk, or CN.

In embodiment 19, the present invention provides compounds in accordance with any of the above embodiments, or pharmaceutically acceptable salts thereof, wherein $R^2$ is a saturated 5- or 6-membered monocyclic ring wherein each said ring contains 1, or 2 N atoms and 0 or 1 O atom, and wherein each said ring is substituted by 0, 1, 2 or 3 group(s) selected from F, Cl, Br, $C_{1-6}$alk, $C_{1-4}$haloalk, —OH, —OC$_{1-4}$haloalk, CN, $R^{14}$, and oxo.

In embodiment 20, the present invention provides compounds in accordance with any of the above embodiments, or pharmaceutically acceptable salts thereof, wherein $R^2$ is:
(a) F, Br;
(b) a group —Y—$R^{13}$, wherein Y is absent or SO$_2$; and $R^{13}$ is morpholinyl, oxazolidinyl, oxazolyl, pyrrolidinyl, piperidinyl, azetidinyl, dihydropyranyl, dihydropyridinyl, piperazinyl, tetrahydropyranyl,

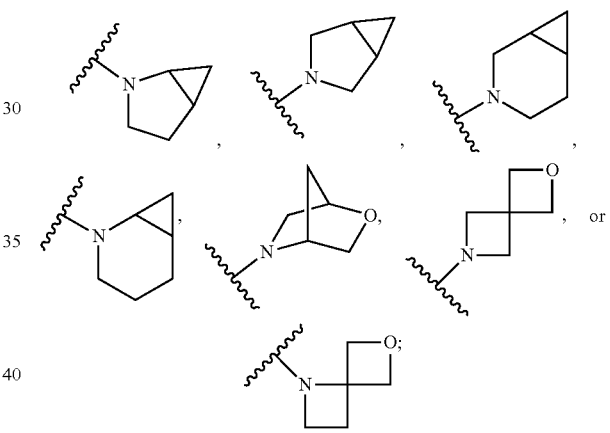

wherein each said ring is substituted by 0, 1, 2 or 3 group(s) selected from F, Cl, Br, methyl, ethyl, —OH, —OCH$_3$, CH$_2$OH, NH$_2$, NH(CH$_3$), or oxo; or
(c) a group —Y—$R^{13}$, wherein Y is NH or —SO$_2$NH—; and wherein $R^{13}$ is $C_{1-6}$alk substituted by 0, 1, 2, 3, 4, or 5 group(s) selected from F, Cl, Br, methyl, CF$_3$, or —OH.

In embodiment 21, the present invention provides compounds in accordance with any of the above embodiments, or pharmaceutically acceptable salts thereof, wherein $R^2$ is a group —Y—$R^{13}$, wherein Y is absent; and $R^{13}$ is morpholinyl, piperidinyl, azetidinyl, pyrrolidinyl, cyclopropyl, cyclobutyl, cyclopentyl, cyclohexyl, piperazinyl, tetrahydrofuranyl,

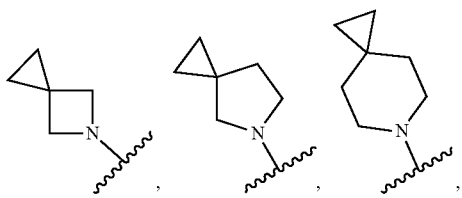

-continued

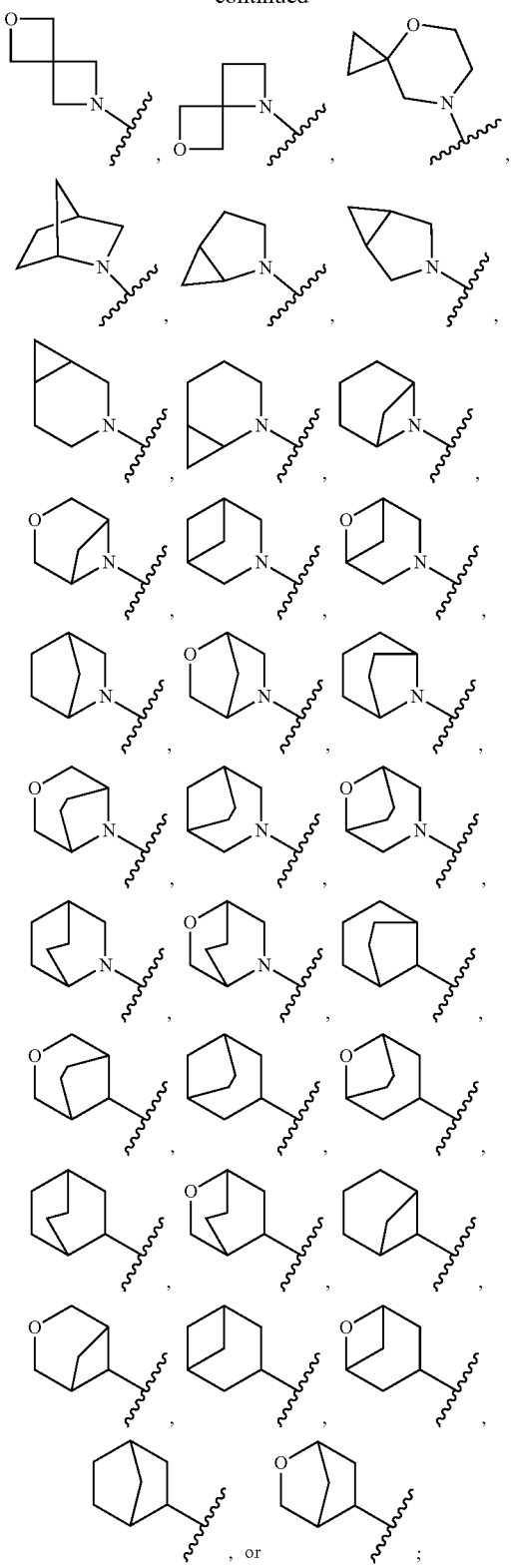

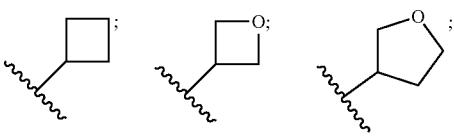 [SMILES: *C1CCC1 ; ";" ; *C1COC1 ; *C1CCOC1 ; ";"]

wherein each said ring is substituted by 0, 1, 2 or 3 group(s) selected from F, Cl, Br, methyl, CF$_3$, —OH, —OCHF$_2$, CN, and oxo; or (c) a group —Y—R$^{13}$, wherein Y is NH, —O—, —O—(CH$_2$)—, —O—(CH$_2$)—(CH$_2$)—, or —O—(CH$_2$)—(CH$_2$)—(CH$_2$)—, and wherein R$^{13}$ is or R$^{13}$ is C$_{1-6}$alk substituted by 0, 1, 2, 3, 4, or 5 group(s) selected from F, Cl, Br, methyl, CF$_3$, —OH, or CN.

In embodiment 22, the present invention provides compounds in accordance with any of the above embodiments, wherein R$^2$ is

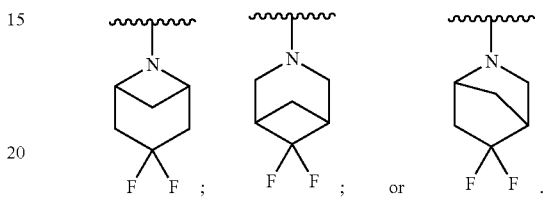

In embodiment 23, the present invention provides compounds in accordance with any of the above embodiments, or pharmaceutically acceptable salts thereof, wherein R$^2$ is morpholinyl or piperidinyl substituted by 0, 1, 2 or 3 group(s) selected from F, Cl, Br, methyl, CF$_3$, —OH, —OCHF$_2$, CN, or oxo.

In embodiment 24, the present invention provides compounds in accordance with any of the above embodiments, or pharmaceutically acceptable salts thereof, wherein R$^2$ is morpholinyl substituted by 1, 2 or 3 methyl group(s).

In embodiment 25, the present invention provides compounds in accordance with any of the above embodiments, or pharmaceutically acceptable salts thereof, wherein R$^2$ is piperidinyl substituted by 1, 2 or 3 fluoro group(s).

In embodiment 26, the present invention provides compounds in accordance with any of the above embodiments, or pharmaceutically acceptable salts thereof, wherein R$^4$ is H or halo.

In embodiment 27, the present invention provides compounds in accordance with any of the above embodiments, or pharmaceutically acceptable salts thereof, wherein R$^5$ is H.

In embodiment 28, the present invention provides compounds in accordance with any of the above embodiments, or pharmaceutically acceptable salts thereof, wherein R$^6$ is H or F.

In embodiment 29, the present invention provides compounds in accordance with any of the above embodiments, or pharmaceutically acceptable salts thereof, wherein R$^7$ is selected from (a) H; (b) C$_{1-6}$alk substituted by 0, 1, 2 or 3 group(s) selected from F, Cl, Br, —OH, —OCH$_3$, or cyclopropyl; or (c) a saturated, partially-saturated or unsaturated 3-, 4-, 5-, 6-, or 7-membered monocyclic ring containing 0, 1, 2 or 3 N atoms and 0 or 1 atoms selected from O and S, which is substituted by 0, 1,2 or 3 group(s) selected from F, Cl, Br, C$_{1-6}$alk, C$_{1-4}$haloalk, —C$_{1-6}$alkOH, —OH, —OCH$_3$, —NH$_2$, or oxo.

In embodiment 30, the present invention provides compounds in accordance with any of the above embodiments, or pharmaceutically acceptable salts thereof, wherein R$^6$ is H.

In embodiment 31, the present invention provides compounds in accordance with any of the above embodiments, or pharmaceutically acceptable salts thereof, wherein R$^7$ is H.

In embodiment 32, the present invention provides compounds in accordance with any of the above embodiments, or pharmaceutically acceptable salts thereof, wherein $R^8$ is H.

In embodiment 33, the present invention provides compounds in accordance with any of the above embodiments, or pharmaceutically acceptable salts thereof, wherein $R^9$ is H.

In embodiment 34, the present invention provides a compound, or pharmaceutically acceptable salts thereof, selected from:

| Ex. # | Chemical Structure | Name |
|---|---|---|
| 100 | | 5-((1-hydroxy-2-methylpropan-2-yl)amino)-N-(6-(piperidin-1-ylsulfonyl)pyridin-2-yl)-3-(6-azaspiro[2.5]octan-6-yl)pyrazine-2-carboxamide |
| 102 | | N-(6-(N-(tert-butyl)sulfamoyl)pyridin-2-yl)-5-((1-hydroxy-2-methylpropan-2-yl)amino)-3-(6-azaspiro[2.5]octan-6-yl)pyrazine-2-carboxamide |
| 104 | | (R)-5-((1-hydroxy-2-methylpropan-2-yl)amino)-N-(6-(2-methylmorpholino)pyridin-2-yl)-3-(6-azaspiro[2.5]octan-6-yl)pyrazine-2-carboxamide |
| 108 | | N-(6-(N-(tert-butyl)sulfamoyl)pyridin-2-yl)-5-((1,3-dihydroxy-2-methylpropan-2-yl)amino)-3-(6-azaspiro[2.5]octan-6-yl)pyrazine-2-carboxamide |

-continued

| Ex. # | Chemical Structure | Name |
|---|---|---|
| 147 | | (R)-6-((1,3-dihydroxy-2-methylpropan-2-yl)amino)-N-(6-(2-methylmorpholino)pyridin-2-yl)-2-(6-azaspiro[2.5]octan-6-yl)nicotinamide |
| 154 | | (S)-N-(6-(N-(tert-butyl)sulfamoyl)pyridin-2-yl)-2-(6-azaspiro[2.5]octan-6-yl)-6-(1,1,1-trifluoro-2-hydroxypropan-2-yl)nicotinamide |
| 176 | | (S)-N-(6-(N-(tert-butyl)sulfamoyl)pyridin-2-yl)-2-(6-azaspiro[2.5]octan-6-yl)-6-(1,1,1-trifluoro-2,3-dihydroxypropan-2-yl)nicotinamide |
| 178 | | (R)-N-(6-(N-(tert-butyl)sulfamoyl)pyridin-2-yl)-6-(1,2-dihydroxypropan-2-yl)-2-(6-azaspiro[2.5]octan-6-yl)nicotinamide |
| 223 | | (R)-N-(6-(2-methylmorpholino)pyridin-2-yl)-6-(N-methylsulfamoyl)-2-(6-azaspiro[2.5]octan-6-yl)nicotinamide |

| Ex. # | Chemical Structure | Name |
|---|---|---|
| 237 | | ((R)-6-((2-hydroxyethyl)sulfonamido)-N-(6-(2-methylmorpholino)pyridin-2-yl)-4-(6-azaspiro[2.5]octan-6-yl)nicotinamide |
| 238 | | (R)-N-(6-(2-methylmorpholino)pyridin-2-yl)-6-(methylsulfonyl)-2-(6-azaspiro[2.5]octan-6-yl)nicotinamide |
| 248 | | 6-(4,4-difluoropiperidin-1-yl)-N-(4-((2-hydroxyethyl)sulfonamido)-2-(6-azaspiro[2.5]octan-6-yl)phenyl)picolinamide | or any pharmaceutically-acceptable salt thereof.

In embodiment 35, the present invention provides pharmaceutical compositions comprising a compound, or pharmaceutically acceptable salts thereof, in accordance with any one of embodiments 1-31, and a pharmaceutically acceptable diluent or carrier.

In embodiment 36, the present invention provides a method of treating a condition that may be treated with KIF18a inhibitors, the method comprising administering to a patient in need thereof a therapeutically effective amount of the compound in accordance with embodiments 1-34, or the composition according to embodiment 35.

In embodiment 37, the present invention provides the method of embodiment 36, wherein said condition is cancer selected from the group consisting of (a) a solid or hematologically derived tumor selected from cancer of the cancer of the bladder, endometrial, lung squamous cell, breast, colon, kidney, liver, lung, small cell lung cancer, esophagus, gall-bladder, brain, head and neck, ovary, pancreas, stomach, cervix, thyroid, prostate and skin, (b) a hematopoietic tumor of lymphoid lineage selected from leukemia, acute lymphocitic leukemia, acute lymphoblastic leukemia, B-cell lymphoma, T-cell-lymphoma, Hodgkin's lymphoma, non-Hodgkin's lymphoma, hairy cell lymphoma and Burkett's lymphoma, (c) a hematopoietic tumor of myeloid lineage selected from acute and chronic myelogenous leukemias, myelodysplastic syndrome and promyelocytic leukemia (d) a tumor of mesenchymal origin selected from fibrosarcoma and rhabdomyosarcoma, (e) a tumor of the central and peripheral nervous system selected from astrocytoma, neuroblastoma, glioma and schwannoma, or (f) a melanoma, seminoma, teratocarcinoma, osteosarcoma, xenoderoma pigmentosum, keratoctanthoma, thyroid follicular cancer or Kaposi's sarcoma.

In a sub-embodiment 37a, the present invention provides the method of embodiment 36, wherein said condition is cancer selected from the group consisting of melanoma, prostate cancer, cervical cancer, breast cancer, colon cancer, sarcoma, or leukemia. See: Zhang C. et. al., "KIF18A is involved in human breast carcinogenesis", Carcinogenesis, 2010 September; 31(9): 1676-84. doi: 10.1093/carcin/bgq134. Epub 2010 Jul. 1. See also: (1) https://www.proteinatlas.org/ENSG00000121621-KIF18A/pathology; (2) Nagahara, M. et. al., "Kinesin 18A expression: clinical relevance to colorectal cancer progression", Int. J. Cancer: 129, 2543-2552 (2011) VC 2011 UIC; and (3) Yu, Y. et. al., "The Role of Kinesin Family Proteins in Tumorigenesis and Progression—Potential Biomarkers and Molecular Targets for Cancer Therapy", Cancer 2010; 116:5150-60. VC 2010 American Cancer Society.

In embodiment 38, the present invention provides a method of reducing the size of a solid tumor in a subject, the method comprising administering to the subject in need thereof a therapeutically effective amount of the compound in accordance with embodiments 1-34, or the composition according to embodiment 35.

In embodiment 39, the present invention provides a method of treating a cell proliferation disorder in a subject, the method comprising administering to the subject in need thereof a therapeutically effective amount of the compound in accordance with embodiments 1-34, or the composition according to embodiment 35.

In embodiment 40, the present invention provides a method of inhibiting KIF18A in a cell, comprising contacting the cell with a compound, or pharmaceutically acceptable salts thereof, in accordance with embodiments 1-34, or the composition according to embodiment 35.

In embodiment 41, the invention provides a method of preparing a compound of Formula (I) as described herein.

In embodiment 42, the invention provides an intermediate compound used in the method of preparing a compound of Formula (I) as described herein.

DETAILED DESCRIPTION OF THE INVENTION

The present invention includes all pharmaceutically acceptable isotopically-labelled compounds of the present invention wherein one or more atoms are replaced by atoms having the same atomic number, but an atomic mass or mass number different from the atomic mass or mass number which predominates in nature.

Examples of isotopes suitable for inclusion in the compounds of the invention include, but are not limited to, isotopes of hydrogen, such as $^2$H and $^3$H, carbon, such as $^{11}$C, $^{13}$C and $^{14}$C, chlorine, such as $^{38}$Cl, fluorine, such as $^{18}$F, iodine, such as $^{123}$I and $^{125}$I, nitrogen, such as $^{13}$N and $^{15}$N, oxygen, such as $^{15}$O, $^{17}$O and $^{18}$O, phosphorus, such as $^{32}$P, and sulphur, such as $^{35}$S.

Certain isotopically-labelled compounds of the present invention, for example, those incorporating a radioactive isotope, are useful in drug and/or substrate tissue distribution studies. The radioactive isotopes tritium, i.e. $^3$H, and carbon-14, i.e. $^{14}$C, are particularly useful for this purpose in view of their ease of incorporation and ready means of detection.

Substitution with heavier isotopes such as deuterium, i.e. $^2$H, may afford certain therapeutic advantages resulting from greater metabolic stability, for example, increased in vivo half-life or reduced dosage requirements, and hence may be preferred in some circumstances.

Substitution with positron emitting isotopes, such as $^{11}$C, $^{18}$F, $^{15}$O and $^{13}$N, can be useful in Positron Emission Topography (PET) studies for examining substrate receptor occupancy.

Isotopically-labeled compounds of the present invention can generally be prepared by conventional techniques known to those skilled in the art or by processes analogous to those described in the accompanying Examples and Preparations using an appropriate isotopically-labeled reagent in place of the non-labeled reagent previously employed.

Pharmaceutically acceptable solvates in accordance with the invention include those wherein the solvent of crystallization may be isotopically substituted, e.g. D$_2$O, d$_6$-acetone, d$_6$-DMSO.

Specific embodiments of the present invention include the compounds exemplified in the Examples below and their pharmaceutically acceptable salts, complexes, solvates, polymorphs, stereoisomers, metabolites, prodrugs, and other derivatives thereof.

Unless otherwise specified, the following definitions apply to terms found in the specification and claims:

"C$_{\alpha-\beta}$alk" means an alkyl group comprising a minimum of $\alpha$ and a maximum of $\beta$ carbon atoms in a branched or linear relationship or any combination of the three, wherein $\alpha$ and $\beta$ represent integers. The alkyl groups described in this section may also contain one or two double or triple bonds. A designation of C$_0$alk indicates a direct bond. Examples of C$_{1-6}$alkyl include, but are not limited to the following:

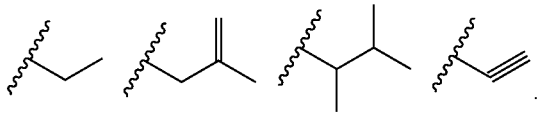

"Benzo group", alone or in combination, means the divalent radical C$_4$H$_4$=, one representation of which is —CH=CH—CH=CH—, that when vicinally attached to another ring forms a benzene-like ring—for example tetrahydronaphthylene, indole and the like.

The terms "oxo" and "thioxo" represent the groups =O (as in carbonyl) and =S (as in thiocarbonyl), respectively.

"Halo" or "halogen" means a halogen atom selected from F, Cl, Br and I.

"C$_{\alpha-\beta}$haloalk" means an alk group, as described above, wherein any number—at least one—of the hydrogen atoms attached to the alk chain are replaced by F, Cl, Br or F The group N(R$^a$)R$^a$ and the like include substituents where the two R$^a$ groups together form a ring, optionally including a N, O or S atom, and include groups such as:

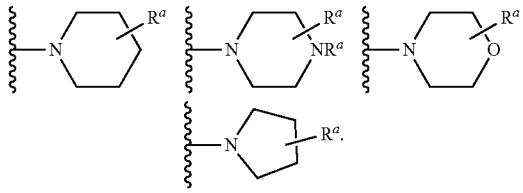

The group N(C$_{\alpha-\beta}$alk) C$_{\alpha-\beta}$alk, wherein $\alpha$ and $\beta$ are as defined above, include substituents where the two C$_{\alpha-\beta}$alk groups together form a ring, optionally including a N, O or S atom, and include groups such as:

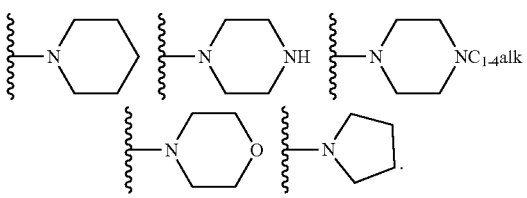

"Bicyclic ring" means a group that features two joined rings. A bicyclic ring can be carbocyclic (all of the ring atoms are carbons), or heterocyclic (the rings atoms consist, for example, 1, 2 or 3 heteroatoms, such as N, O, or S, in addition to carbon atoms). The two rings can both be aliphatic (e.g. decalin and norbornane), or can be aromatic (e.g. naphthalene), or a combination of aliphatic and aromatic (e.g. tetralin). Bicyclic rings include (a) spirocyclic compounds, wherein the two rings share only one single atom, the spiro atom, which is usually a quaternary carbon. Examples of spirocyclic compound include, but are not limited to:

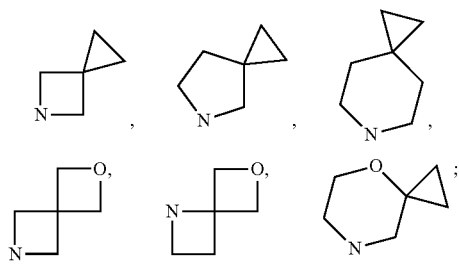

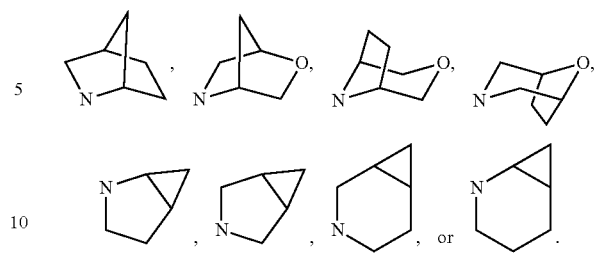

(b) fused bicyclic compounds, wherein two rings share two adjacent atoms. In other words, the rings share one covalent bond, i.e. the bridgehead atoms are directly connected (e.g. α-thujene and decalin). Examples of fused bicyclic rings include, but are not limited to:

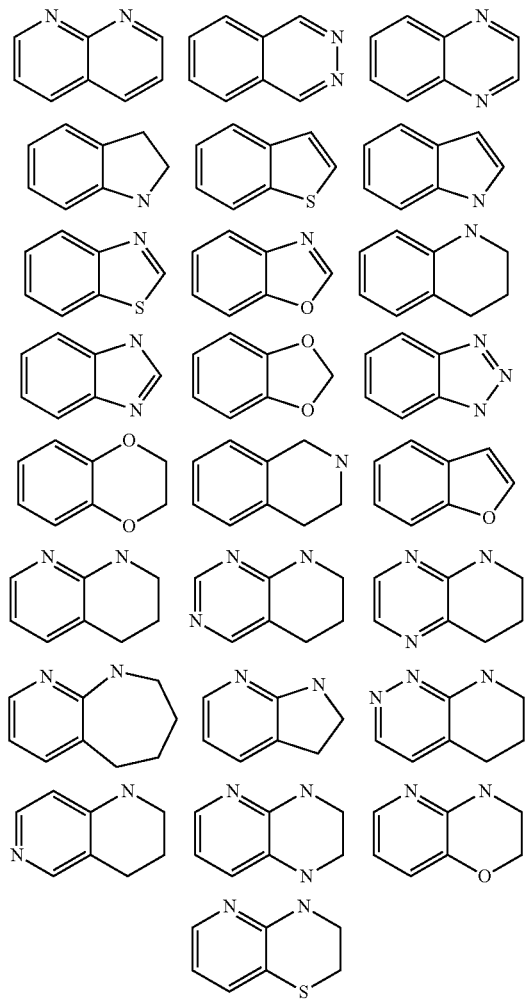

and (c) budged bicyclic compounds, wherein the two rings share three or more atoms, separating the two bridgehead atoms by a bridge containing at least one atom. For example, norbornane, also known as bicyclo[2.2.1]heptane, can be thought of as a pair of cyclopentane rings each sharing three of their five carbon atoms. Examples of bridged bicyclic rings include, but are not limited to:

"Carbocycle" or "Carbocyclic" means a ring comprising by itself or in combination with other terms, represents, unless otherwise stated, cyclic version of "$C_{\alpha-\beta}alk$". Examples of carbocycle include cyclopentyl, cyclohexyl, 1-cyclohexenyl, 3-cyclohexenyl, cycloheptyl, cyclobutylene, cyclohexylene and the like.

"Heterocycle" or "Heterocyclic" means a ring comprising at least one carbon atom and at least one other atom selected from N, O and S. Examples of heterocycles that may be found in the claims include, but are not limited to, the following:

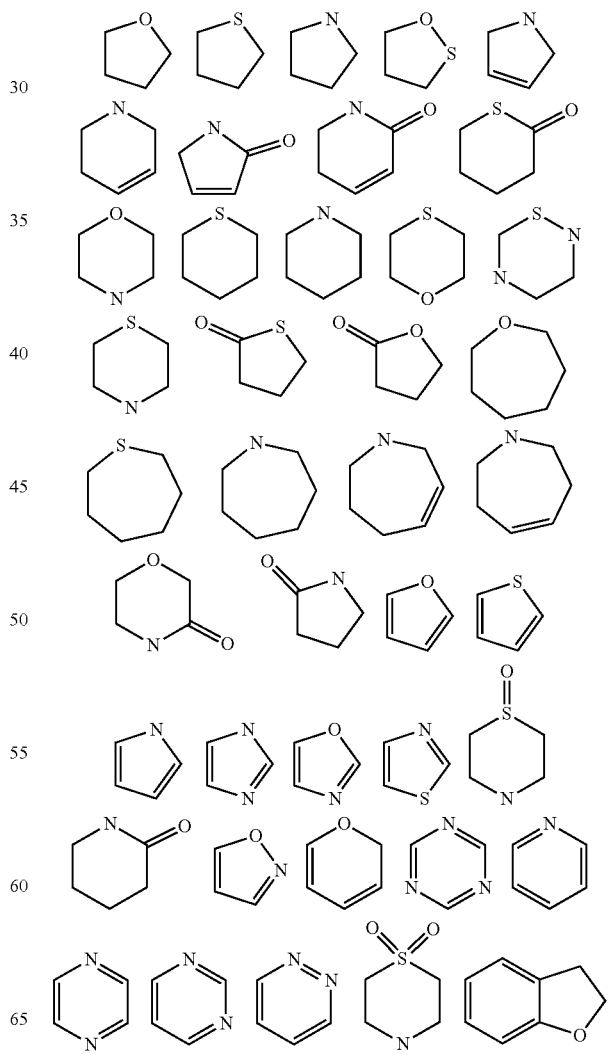

-continued

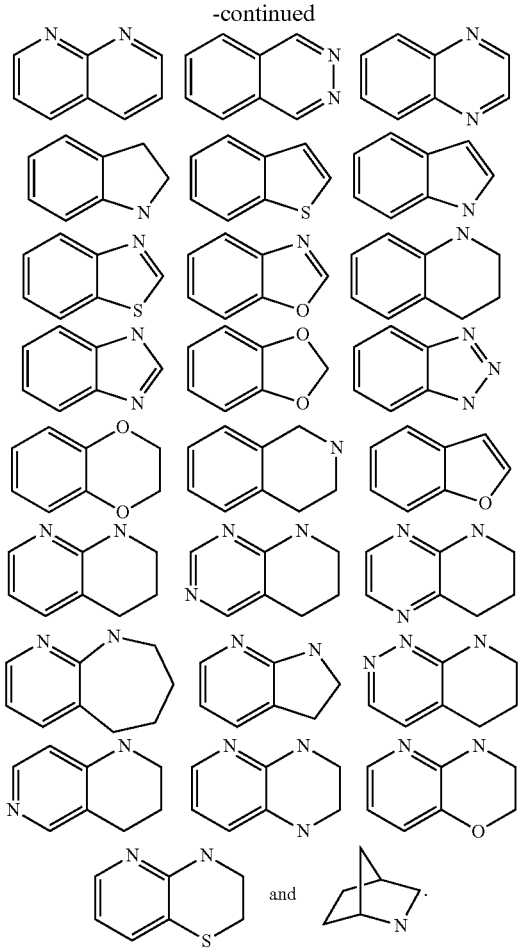

and

"Pharmaceutically-acceptable salt" means a salt prepared by conventional means, and are well known by those skilled in the art. The "pharmacologically acceptable salts" include basic salts of inorganic and organic acids, including but not limited to hydrochloric acid, hydrobromic acid, sulfuric acid, phosphoric acid, methanesulfonic acid, ethane sulfonic acid, malic acid, acetic acid, oxalic acid, tartaric acid, citric acid, lactic acid, fumaric acid, succinic acid, maleic acid, salicylic acid, benzoic acid, phenylacetic acid, mandelic acid and the like. When compounds of the invention include an acidic function such as a carboxy group, then suitable pharmaceutically acceptable cation pairs for the carboxy group are well known to those skilled in the art and include alkaline, alkaline earth, ammonium, quaternary ammonium cations and the like. For additional examples of "pharmacologically acceptable salts," see infra and Berge et al., J. Pharm. Sci. 66:1 (1977).

"Saturated, partially-saturated or unsaturated" includes substituents saturated with hydrogens, substituents completely unsaturated with hydrogens and substituents partially saturated with hydrogens.

"Leaving group" generally refers to groups readily displaceable by a nucleophile, such as an amine, a thiol or an alcohol nucleophile. Such leaving groups are well known in the art. Examples of such leaving groups include, but are not limited to, N-hydroxysuccinimide, N-hydroxybenzotriazole, halides, triflates, tosylates and the like. Preferred leaving groups are indicated herein where appropriate.

"Protecting group" generally refers to groups well known in the art which are used to prevent selected reactive groups, such as carboxy, amino, hydroxy, mercapto and the like, from undergoing undesired reactions, such as nucleophilic, electrophilic, oxidation, reduction and the like. Preferred protecting groups are indicated herein where appropriate. Examples of amino protecting groups include, but are not limited to, aralkyl, substituted aralkyl, cycloalkenylalkyl and substituted cycloalkenyl alkyl, allyl, substituted allyl, acyl, alkoxycarbonyl, aralkoxycarbonyl, silyl and the like. Examples of aralkyl include, but are not limited to, benzyl, ortho-methylbenzyl, trityl and benzhydryl, which can be optionally substituted with halogen, alkyl, alkoxy, hydroxy, nitro, acylamino, acyl and the like, and salts, such as phosphonium and ammonium salts. Examples of aryl groups include phenyl, naphthyl, indanyl, anthracenyl, 9-(9-phenylfluorenyl), phenanthrenyl, durenyl and the like. Examples of cycloalkenylalkyl or substituted cycloalkylenylalkyl radicals, preferably have 6-10 carbon atoms, include, but are not limited to, cyclohexenyl methyl and the like. Suitable acyl, alkoxy carbonyl and aralkoxycarbonyl groups include benzyloxycarbonyl, t-butoxycarbonyl, isobutoxycarbonyl, benzoyl, substituted benzoyl, butyryl, acetyl, trifluoroacetyl, trichloro acetyl, phthaloyl and the like. A mixture of protecting groups can be used to protect the same amino group, such as a primary amino group can be protected by both an aralkyl group and an aralkoxycarbonyl group. Amino protecting groups can also form a heterocyclic ring with the nitrogen to which they are attached, for example, 1,2-bis(methylene)benzene, phthalimidyl, succinimidyl, maleimidyl and the like and where these heterocyclic groups can further include adjoining aryl and cycloalkyl rings. In addition, the heterocyclic groups can be mono-, di- or tri-substituted, such as nitrophthalimidyl. Amino groups may also be protected against undesired reactions, such as oxidation, through the formation of an addition salt, such as hydrochloride, toluene sulfonic acid, trifluoroacetic acid and the like. Many of the amino protecting groups are also suitable for protecting carboxy, hydroxy and mercapto groups. For example, aralkyl groups. Alkyl groups are also suitable groups for protecting hydroxy and mercapto groups, such as tert-butyl.

Silyl protecting groups are silicon atoms optionally substituted by one or more alkyl, aryl and aralkyl groups. Suitable silyl protecting groups include, but are not limited to, trimethylsilyl, triethylsilyl, triisopropylsilyl, tert-butyldimethylsilyl, dimethylphenylsilyl, 1,2-bis(dimethylsilyl)benzene, 1,2-bis(dimethylsilyl)ethane and diphenylmethylsilyl. Silylation of an amino groups provide mono- or di-silylamino groups. Silylation of aminoalcohol compounds can lead to a N,N,O-trisilyl derivative. Removal of the silyl function from a silyl ether function is readily accomplished by treatment with, for example, a metal hydroxide or ammonium fluoride reagent, either as a discrete reaction step or in situ during a reaction with the alcohol group. Suitable silylating agents are, for example, trimethylsilyl chloride, tert-butyl-dimethylsilyl chloride, phenyldimethylsilyl chloride, diphenylmethyl silyl chloride or their combination products with imidazole or DMF. Methods for silylation of amines and removal of silyl protecting groups are well known to those skilled in the art. Methods of preparation of these amine derivatives from corresponding amino acids, amino acid amides or amino acid esters are also well known to those skilled in the art of organic chemistry including amino acid/amino acid ester or aminoalcohol chemistry.

Protecting groups are removed under conditions which will not affect the remaining portion of the molecule. These methods are well known in the art and include acid hydrolysis, hydrogenolysis and the like. A preferred method involves removal of a protecting group, such as removal of a benzyloxycarbonyl group by hydrogenolysis utilizing palladium on carbon in a suitable solvent system such as an alcohol, acetic acid, and the like or mixtures thereof. A t-butoxycarbonyl protecting group can be removed utilizing an inorganic or organic acid, such as HCl or trifluoroacetic acid, in a suitable solvent system, such as dioxane or methylene chloride. The resulting amino salt can readily be neutralized to yield the free amine. Carboxy protecting group, such as methyl, ethyl, benzyl, tert-butyl, 4-methoxyphenylmethyl and the like, can be removed under hydrolysis and hydrogenolysis conditions well known to those skilled in the art.

It should be noted that compounds of the invention may contain groups that may exist in tautomeric forms, such as cyclic and acyclic amidine and guanidine groups, heteroatom substituted heteroaryl groups (Y'=O, S, NR), and the like, which are illustrated in the following examples:

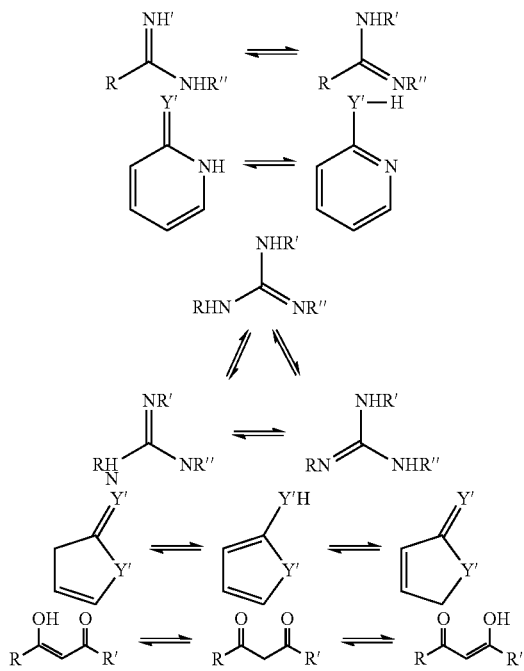

and though one form is named, described, displayed and/or claimed herein, all the tautomeric forms are intended to be inherently included in such name, description, display and/or claim.

Prodrugs of the compounds of this invention are also contemplated by this invention. A prodrug is an active or inactive compound that is modified chemically through in vivo physiological action, such as hydrolysis, metabolism and the like, into a compound of this invention following administration of the prodrug to a patient. The suitability and techniques involved in making and using prodrugs are well known by those skilled in the art. For a general discussion of prodrugs involving esters see Svensson and Tunek Drug Metabolism Reviews 165 (1988) and Bundgaard Design of Prodrugs, Elsevier (1985). Examples of a masked carboxylate anion include a variety of esters, such as alkyl (for example, methyl, ethyl), cycloalkyl (for example, cyclohexyl), aralkyl (for example, benzyl, p-methoxybenzyl), and alkylcarbonyloxyalkyl (for example, pivaloyloxymethyl). Amines have been masked as arylcarbonyloxymethyl substituted derivatives which are cleaved by esterases in vivo releasing the free drug and formaldehyde (Bungaard J. Med. Chem. 2503 (1989)). Also, drugs containing an acidic NH group, such as imidazole, imide, indole and the like, have been masked with N-acyloxymethyl groups (Bundgaard Design of Prodrugs, Elsevier (1985)). Hydroxy groups have been masked as esters and ethers. EP 039,051 (Sloan and Little, 4/11/81) discloses Mannich-base hydroxamic acid prodrugs, their preparation and use.

The specification and claims contain listing of species using the language "selected from . . . and . . . " and "is . . . or . . . " (sometimes referred to as Markush groups). When this language is used in this application, unless otherwise stated it is meant to include the group as a whole, or any single members thereof, or any subgroups thereof. The use of this language is merely for shorthand purposes and is not meant in any way to limit the removal of individual elements or subgroups as needed.

Pharmaceutical Compositions. Dosing. And Routes of Administration

Also provided herein are pharmaceutical compositions that includes a compound as disclosed herein, together with a pharmaceutically acceptable excipient, such as, for example, a diluent or carrier. Compounds and pharmaceutical compositions suitable for use in the present invention include those wherein the compound can be administered in an effective amount to achieve its intended purpose. Administration of the compound described in more detail below.

Suitable pharmaceutical formulations can be determined by the skilled artisan depending on the route of administration and the desired dosage. See, e.g., Remington's Pharmaceutical Sciences, 1435-712 (18th ed., Mack Publishing Co, Easton, Pennsylvania, 1990). Formulations may influence the physical state, stability, rate of in vivo release and rate of in vivo clearance of the administered agents. Depending on the route of administration, a suitable dose may be calculated according to body weight, body surface areas or organ size. Further refinement of the calculations necessary to determine the appropriate treatment dose is routinely made by those of ordinary skill in the art without undue experimentation, especially in light of the dosage information and assays disclosed herein as well as the pharmacokinetic data obtainable through animal or human clinical trials.

The phrases "pharmaceutically acceptable" or "pharmacologically acceptable" refer to molecular entities and compositions that do not produce adverse, allergic, or other untoward reactions when administered to an animal or a human. As used herein, "pharmaceutically acceptable e" includes any and all solvents, dispersion media, coatings, antibacterial and antifungal agents, isotonic and absorption delaying agents and the like. The use of such excipients for pharmaceutically active substances is well known in the art. Except insofar as any conventional media or agent is incompatible with the therapeutic compositions, its use in therapeutic compositions is contemplated. Supplementary active ingredients also can be incorporated into the compositions. In exemplary embodiments, the formulation may comprise corn syrup solids, high-oleic safflower oil, coconut oil, soy oil, L-leucine, calcium phosphate tribasic, L-tyrosine, L-proline, L-lysine acetate, DATEM (an emulsifier), L-glutamine, L-valine, potassium phosphate dibasic, L-isoleucine, L-arginine, L-alanine, glycine, L-asparagine monohydrate, L-serine, potassium citrate, L-threonine, sodium citrate, magnesium chloride, L-histidine, L-methionine, ascorbic acid, calcium carbonate, L-glutamic acid, L-cystine dihydrochloride, L-tryptophan, L-aspartic acid, choline chloride, taurine, m-inositol, ferrous sulfate, ascorbyl palmitate, zinc sulfate, L-carnitine, alpha-tocopheryl acetate, sodium chloride, niacinamide, mixed tocopherols, calcium pantothenate, cupric sulfate, thiamine chloride hydrochloride, vitamin A palmitate, manganese sulfate, riboflavin, pyridoxine hydrochloride, folic acid, beta-carotene, potassium iodide, phylloquinone, biotin, sodium selenate, chromium chloride, sodium molybdate, vitamin D3 and cyanocobalamin.

The compound can be present in a pharmaceutical composition as a pharmaceutically acceptable salt. As used herein, "pharmaceutically acceptable salts" include, for example base addition salts and acid addition salts.

Pharmaceutically acceptable base addition salts may be formed with metals or amines, such as alkali and alkaline earth metals or organic amines. Pharmaceutically acceptable salts of compounds may also be prepared with a pharmaceutically acceptable cation. Suitable pharmaceutically acceptable cations are well known to those skilled in the art and include alkaline, alkaline earth, ammonium and quaternary ammonium cations. Carbonates or hydrogen carbonates are also possible. Examples of metals used as cations are sodium, potassium, magnesium, ammonium, calcium, or ferric, and the like. Examples of suitable amines include isopropylamine, trimethylamine, histidine, N,N'-dibenzylethylenediamine, chloroprocaine, choline, diethanolamine, dicyclohexylamine, ethylenediamine, N-methylglucamine, and procaine.

Pharmaceutically acceptable acid addition salts include inorganic or organic acid salts. Examples of suitable acid salts include the hydrochlorides, formates, acetates, citrates, salicylates, nitrates, phosphates. Other suitable pharmaceutically acceptable salts are well known to those skilled in the art and include, for example, formic, acetic, citric, oxalic, tartaric, or mandelic acids, hydrochloric acid, hydrobromic acid, sulfuric acid or phosphoric acid; with organic carboxylic, sulfonic, sulfo or phospho acids or N-substituted sulfamic acids, for example acetic acid, trifluoroacetic acid (TFA), propionic acid, glycolic acid, succinic acid, maleic acid, hydroxymaleic acid, methylmaleic acid, fumaric acid, malic acid, tartaric acid, lactic acid, oxalic acid, gluconic acid, glucaric acid, glucuronic acid, citric acid, benzoic acid, cinnamic acid, mandelic acid, salicylic acid, 4-aminosalicylic acid, 2-phenoxybenzoic acid, 2-acetoxybenzoic acid, embonic acid, nicotinic acid or isonicotinic acid; and with amino acids, such as the 20 alpha amino acids involved in the synthesis of proteins in nature, for example glutamic acid or aspartic acid, and also with phenylacetic acid, methane sulfonic acid, ethane sulfonic acid, 2-hydroxyethanesulfonic acid, ethane 1,2-disulfonic acid, benzenesulfonic acid, 4-methylbenzenesulfonic acid, naphthalene 2-sulfonic acid, naphthalene 1,5-disulfonic acid, 2- or 3-phosphoglycerate, glucose 6-phosphate, N-cyclohexylsulfamic acid (with the formation of cyclamates), or with other acid organic compounds, such as ascorbic acid.

Pharmaceutical compositions containing the compounds disclosed herein can be manufactured in a conventional manner, e.g., by conventional mixing, dissolving, granulating, dragee-making, levigating, emulsifying, encapsulating, entrapping, or lyophilizing processes. Proper formulation is dependent upon the route of administration chosen.

For oral administration, suitable compositions can be formulated readily by combining a compound disclosed herein with pharmaceutically acceptable excipients such as carriers well known in the art. Such excipients and carriers enable the present compounds to be formulated as tablets, pills, dragees, capsules, liquids, gels, syrups, slurries, suspensions and the like, for oral ingestion by a patient to be treated. Pharmaceutical preparations for oral use can be obtained by adding a compound as disclosed herein with a solid excipient, optionally grinding a resulting mixture, and processing the mixture of granules, after adding suitable auxiliaries, if desired, to obtain tablets or dragee cores. Suitable excipients include, for example, fillers and cellulose preparations. If desired, disintegrating agents can be added. Pharmaceutically acceptable ingredients are well known for the various types of formulation and may be for example binders (e.g., natural or synthetic polymers), lubricants, surfactants, sweetening and flavoring agents, coating materials, preservatives, dyes, thickeners, adjuvants, antimicrobial agents, antioxidants and carriers for the various formulation types.

When a therapeutically effective amount of a compound disclosed herein is administered orally, the composition typically is in the form of a solid (e.g., tablet, capsule, pill, powder, or troche) or a liquid formulation (e.g., aqueous suspension, solution, elixir, or syrup).

When administered in tablet form, the composition can additionally contain a functional solid and/or solid carrier, such as a gelatin or an adjuvant. The tablet, capsule, and powder can contain about 1 to about 95% compound, and preferably from about 15 to about 90% compound.

When administered in liquid or suspension form, a functional liquid and/or a liquid carrier such as water, petroleum, or oils of animal or plant origin can be added. The liquid form of the composition can further contain physiological saline solution, sugar alcohol solutions, dextrose or other saccharide solutions, or glycols. When administered in liquid or suspension form, the composition can contain about 0.5 to about 90% by weight of a compound disclosed herein, and preferably about 1 to about 50% of a compound disclosed herein. In one embodiment contemplated, the liquid carrier is non-aqueous or substantially non-aqueous. For administration in liquid form, the composition may be supplied as a rapidly-dissolving solid formulation for dissolution or suspension immediately prior to administration.

When a therapeutically effective amount of a compound disclosed herein is administered by intravenous, cutaneous, or subcutaneous injection, the composition is in the form of a pyrogen-free, parenterally acceptable aqueous solution. The preparation of such parenterally acceptable solutions, having due regard to pH, isotonicity, stability, and the like, is within the skill in the art. A preferred composition for intravenous, cutaneous, or subcutaneous injection typically contains, in addition to a compound disclosed herein, an isotonic vehicle. Such compositions may be prepared for administration as solutions of free base or pharmacologically acceptable salts in water suitably mixed with a surfactant, such as hydroxypropylcellulose. Dispersions also can be prepared in glycerol, liquid polyethylene glycols, and mixtures thereof and in oils. Under ordinary conditions of storage and use, these preparations can optionally contain a preservative to prevent the growth of microorganisms.

Injectable compositions can include sterile aqueous solutions, suspensions, or dispersions and sterile powders for the extemporaneous preparation of sterile injectable solutions, suspensions, or dispersions. In all embodiments the form must be sterile and must be fluid to the extent that easy syringability exists. It must be stable under the conditions of manufacture and storage and must resist the contaminating action of microorganisms, such as bacteria and fungi, by optional inclusion of a preservative. The carrier can be a solvent or dispersion medium containing, for example, water, ethanol, polyol (e.g., glycerol, propylene glycol, and liquid polyethylene glycol, and the like), suitable mixtures thereof, and vegetable oils. In one embodiment contemplated, the carrier is non-aqueous or substantially non-aqueous. The proper fluidity can be maintained, for example, by the use of a coating, such as lecithin, by the maintenance of the required particle size of the compound in the embodiment of dispersion and by the use of surfactants. The prevention of the action of microorganisms can be brought about by various antibacterial and antifungal agents, for example, parabens, chlorobutanol, phenol, sorbic acid, thimerosal, and the like. In many embodiments, it will be preferable to include isotonic agents, for example, sugars or sodium chloride. Prolonged absorption of the injectable compositions can be brought about by the use in the compositions of agents delaying absorption, for example, aluminum monostearate and gelatin.

Sterile injectable solutions are prepared by incorporating the active compounds in the required amount in the appropriate solvent with various of the other ingredients enumerated above, as required, followed by filtered sterilization. Generally, dispersions are prepared by incorporating the various sterilized active ingredients into a sterile vehicle which contains the basic dispersion medium and the required other ingredients from those enumerated above. In the embodiment of sterile powders for the preparation of sterile injectable solutions, the preferred methods of preparation are vacuum-drying and freeze-drying techniques which yield a powder of the active ingredient plus any additional desired ingredient from a previously sterile-filtered solution thereof.

Slow release or sustained release formulations may also be prepared in order to achieve a controlled release of the active compound in contact with the body fluids in the GI tract, and to provide a substantially constant and effective level of the active compound in the blood plasma. For example, release can be controlled by one or more of dissolution, diffusion, and ion-exchange. In addition, the slow release approach may enhance absorption via saturable or limiting pathways within the GI tract. For example, the compound may be embedded for this purpose in a polymer matrix of a biological degradable polymer, a water-soluble polymer or a mixture of both, and optionally suitable surfactants. Embedding can mean in this context the incorporation of micro-particles in a matrix of polymers. Controlled release formulations are also obtained through encapsulation of dispersed micro-particles or emulsified micro-droplets via known dispersion or emulsion coating technologies.

For administration by inhalation, compounds of the present invention are conveniently delivered in the form of an aerosol spray presentation from pressurized packs or a nebulizer, with the use of a suitable propellant. In the embodiment of a pressurized aerosol, the dosage unit can be determined by providing a valve to deliver a metered amount. Capsules and cartridges of, e.g., gelatin, for use in an inhaler or insufflator can be formulated containing a powder mix of the compound and a suitable powder base such as lactose or starch.

The compounds disclosed herein can be formulated for parenteral administration by injection (e.g., by bolus injection or continuous infusion). Formulations for injection can be presented in unit dosage form (e.g., in ampules or in multidose containers), with an added preservative. The compositions can take such forms as suspensions, solutions, or emulsions in oily or aqueous vehicles, and can contain formulatory agents such as suspending, stabilizing, and/or dispersing agents.

Pharmaceutical formulations for parenteral administration include aqueous solutions of the compounds in water-soluble form. Additionally, suspensions of the compounds can be prepared as appropriate oily injection suspensions. Suitable lipophilic solvents or vehicles include fatty oils or synthetic fatty acid esters. Aqueous injection suspensions can contain substances which increase the viscosity of the suspension. Optionally, the suspension also can contain suitable stabilizers or agents that increase the solubility of the compounds and allow for the preparation of highly concentrated solutions. Alternatively, a present composition can be in powder form for constitution with a suitable vehicle (e.g., sterile pyrogen-free water) before use.

Compounds disclosed herein also can be formulated in rectal compositions, such as suppositories or retention enemas (e.g., containing conventional suppository bases). In addition to the formulations described previously, the compounds also can be formulated as a depot preparation. Such long-acting formulations can be administered by implantation (e.g., subcutaneously or intramuscularly) or by intramuscular injection. Thus, for example, the compounds can be formulated with suitable polymeric or hydrophobic materials (for example, as an emulsion in an acceptable oil) or ion exchange resins, or as sparingly soluble derivatives, for example, as a sparingly soluble salt.

In particular, a compound disclosed herein can be administered orally, buccally, or sublingually in the form of tablets containing excipients, such as starch or lactose, or in capsules or ovules, either alone or in admixture with excipients, or in the form of elixirs or suspensions containing flavoring or coloring agents. Such liquid preparations can be prepared with pharmaceutically acceptable additives, such as suspending agents. A compound also can be injected parenterally, for example, intravenously, intramuscularly, subcutaneously, or intracoronarily. For parenteral administration, the compound is best used in the form of a sterile aqueous solution which can contain other substances, for example, salts, or sugar alcohols, such as mannitol, or glucose, to make the solution isotonic with blood.

For veterinary use, a compound disclosed herein is administered as a suitably acceptable formulation in accordance with normal veterinary practice. The veterinarian can readily determine the dosing regimen and route of administration that is most appropriate for a particular animal.

In some embodiments, all the necessary components for the treatment of KIF18A-related disorder using a compound as disclosed herein either alone or in combination with another agent or intervention traditionally used for the treatment of such disease may be packaged into a kit. Specifically, the present invention provides a kit for use in the therapeutic intervention of the disease comprising a packaged set of medicaments that include the compound disclosed herein as well as buffers and other components for preparing deliverable forms of said medicaments, and/or devices for delivering such medicaments, and/or any agents that are used in combination therapy with the compound disclosed herein, and/or instructions for the treatment of the disease packaged with the medicaments. The instructions may be fixed in any tangible medium, such as printed paper, or a computer readable magnetic or optical medium, or instructions to reference a remote computer data source such as a world wide web page accessible via the internet.

A "therapeutically effective amount" means an amount effective to treat or to prevent development of, or to alleviate the existing symptoms of, the subject being treated. Determination of the effective amounts is well within the capability of those skilled in the art, especially in light of the detailed disclosure provided herein. Generally, a "therapeutically effective dose" refers to that amount of the compound that results in achieving the desired effect. For example, in one preferred embodiment, a therapeutically effective amount of a compound disclosed herein decreases KIF18A activity by at least 5%, compared to control, at least 10%, at least 15%, at least 20%, at least 25%, at least 30%, at least 35%, at least 40%, at least 45%, at least 50%, at least 55%, at least 60%, at least 65%, at least 70%, at least 75%, at least 80%, at least 85%, or at least 90%.

The amount of compound administered can be dependent on the subject being treated, on the subject's age, health, sex, and weight, the kind of concurrent treatment (if any), severity of the affliction, the nature of the effect desired, the manner and frequency of treatment, and the judgment of the prescribing physician. The frequency of dosing also can be dependent on pharmacodynamic effects on arterial oxygen pressures. While individual needs vary, determination of optimal ranges of effective amounts of the compound is within the skill of the art. Such doses may be administered in a single dose or it may be divided into multiple doses.

The terms "cancer" and "cancerous" when used herein refer to or describe the physiological condition in mammals that is typically characterized by unregulated cell growth. Examples of cancer include, without limitation, carcinoma, lymphoma, sarcoma, blastoma and leukemia. More particular examples of such cancers include squamous cell carcinoma, lung cancer, pancreatic cancer, cervical cancer, bladder cancer, hepatoma, breast cancer, colon carcinoma, and head and neck cancer, ovarian cancer, and endometrial cancer. While the term "cancer" as used herein is not limited to any one specific form of the disease, it is believed that the methods of the invention will be particularly effective for cancers which are found to be accompanied by unregulated levels of KIF18A or dependent on KIF18A for proper chromosome segregation and survival in the mammal.

The terms "treat", "treating" and "treatment" as used herein refer to therapy, including without limitation, curative therapy, prophylactic therapy, and preventative therapy. Prophylactic treatment generally constitutes either preventing the onset of disorders altogether or delaying the onset of a pre-clinically evident stage of disorders in individuals.

The term "patient", "subject", or "mammal" as used herein refers to any "patient", "subject", or "mammal" including humans, cows, horses, dogs and cats. In one embodiment of the invention, the mammal is a human.

The term "comprising" is meant to be open ended, including the indicated component(s) but not excluding other elements.

The terms "Formula I" include any sub formulas.

Methods of Using KIF18A Inhibitors

The present disclosure provides compounds having MT-based KIF18A modulatory activity in general, and inhibitory activity in particular. In one embodiment of the invention, there is provided a method of modulating KIF18A protein in a subject, the method comprising administering to the subject an effective dosage amount of a compound of Formulas I. As such, the compounds of the invention may be used to treat cellular proliferation disorders, including uncontrolled cell growth, aberrant cell cycle regulation, centrosome abnormalities (structural and or numeric, fragmentation). Other diseases or disorders associated with the accumulation of extra centrosomes (>2) include human papillomavirus (HPV) infection, including HPV-associated neoplasias. The compounds are also useful for cilia-related diseases as well as ablating haploid germ cell population which could be used as a male contraceptive.

In addition, compounds of the invention are useful for, but not limited to, the prevention or treatment of cancer and other KIF18A-mediated diseases or disorders. For example, compounds of the invention would be useful for the treatment of various solid and hematologically derived tumors, such as carcinomas, including, without limitation, cancer of the bladder, breast, colon, kidney, liver, lung (including squamous cell and small cell lung cancer), esophagus, gall-bladder, ovary, pancreas, stomach, cervix, thyroid, prostate, and skin (including squamous cell carcinoma); hematopoietic tumors of lymphoid lineage (including leukemia, acute lymphocitic leukemia, acute lymphoblastic leukemia, B-cell lymphoma, T-cell-lymphoma, Hodgkin's lymphoma, non-Hodgkin's lymphoma, hairy cell lymphoma and Burkett's lymphoma); hematopoietic tumors of myeloid lineage (including acute and chronic myelogenous leukemias, myelodysplastic syndrome and promyelocytic leukemia); tumors of mesenchymal origin (including fibrosarcoma and rhabdomyosarcoma, and other sarcomas, e.g. soft tissue and bone); tumors of the central and peripheral nervous system (including astrocytoma, neuroblastoma, glioma and schwannomas); and other tumors (including melanoma, seminoma, teratocarcinoma, osteosarcoma, xenoderoma pigmentosum, keratoctanthoma, thyroid follicular cancer and Kaposi's sarcoma).

The compounds of the invention are also useful in the treatment of cancer related indications such as solid tumors, sarcomas (especially Ewing's sarcoma and osteosarcoma), retinoblastoma, rhabdomyosarcomas, neuroblastoma, hematopoietic malignancies, including leukemia and lymphoma, tumor-induced pleural or pericardial effusions, and malignant ascites.

Based on the ability to modulate kinesin impacting angiogenesis, the compounds of the invention are also useful in treatment and therapy of proliferative diseases. Particularly, these compounds can be used for the treatment of an inflammatory disease, especially of manifestations at the locomotor apparatus, such as various inflammatory rheumatoid diseases, especially chronic polyarthritis including rheumatoid arthritis, juvenile arthritis or psoriasis arthropathy; paraneoplastic syndrome or tumor-induced inflammatory diseases, turbid effusions, collagenosis, such as systemic Lupus erythematosus, poly-myositis, dermatomyositis, systemic sclerodermia or mixed collagenosis; postinfectious arthritis (where no living pathogenic organism can be found at or in the affected part of the body), seronegative spondylarthritis, such as spondylitis ankylosans; vasculitis, sarcoidosis, or arthrosis; or further any combinations thereof.

The compounds of the invention can also be used as active agents against such disease states as arthritis, atherosclerosis, psoriasis, hemangiomas, myocardial angiogenesis, coronary and cerebral collaterals, ischemic limb angiogenesis, wound healing, peptic ulcer *Helicobacter* related diseases, fractures, cat scratch fever, rubeosis, neovascular glaucoma and retinopathies such as those associated with diabetic retinopathy or macular degeneration. In addition, some of these compounds can be used as active agents against solid tumors, malignant ascites, hematopoietic cancers and hyperproliferative disorders such as thyroid hyperplasia (especially Grave's disease), and cysts (such as hypervascularity of ovarian stroma, characteristic of polycystic ovarian syndrome (Stein-Leventhal syndrome)) since such diseases require a proliferation of blood vessel cells for growth and/or metastasis.

Besides being useful for human treatment, these compounds are useful for veterinary treatment of companion animals, exotic animals and farm animals, including mammals, rodents, and the like. For example, animals including horses, dogs, and cats may be treated with compounds provided by the invention.

Combinations

While the compounds of the invention can be dosed or administered as the sole active pharmaceutical agent, they can also be used in combination with one or more compounds of the invention or in conjunction with other agents. When administered as a combination, the therapeutic agents can be formulated as separate compositions that are administered simultaneously or sequentially at different times, or the therapeutic agents can be given as a single composition.

The phrase "co-therapy" (or "combination-therapy"), in defining use of a compound of the present invention and another pharmaceutical agent, is intended to embrace administration of each agent in a sequential manner in a regimen that will provide beneficial effects of the drug combination, and is intended as well to embrace co-administration of these agents in a substantially simultaneous manner, such as in a single capsule having a fixed ratio of these active agents or in multiple, separate capsules for each agent.

Specifically, the administration of compounds of the present invention may be in conjunction with additional therapies known to those skilled in the art in the prevention or treatment of cancer, such as with radiation therapy, small molecule targeted agents (e.g. PARP inhibitors, kinase inhibitors), therapeutic antibodies (e.g. naked and drug-conjugate) immunotherapy antibodies (checkpoint inhibitors, bi-specific T-cell engagers) with neoplastic or cytotoxic agents.

If formulated as a fixed dose, such combination products employ the compounds of this invention within the accepted dosage ranges. Compounds of Formula I may also be administered sequentially with known anticancer or cytotoxic agents when a combination formulation is inappropriate. The invention is not limited in the sequence of administration; compounds of the invention may be administered either prior to, simultaneous with or after administration of the known anticancer or cytotoxic agent.

There are large numbers of anticancer agents available in commercial use, in clinical evaluation and in pre-clinical development, which would be selected for treatment of neoplasia by combination drug chemotherapy. Such agents fall into several major categories such as antibiotic-type agents, alkylating and alkylating-like agents, antimitotic agents, targeted small molecule agents, antimetabolite agents, hormonal agents, immunological agents, anti-angiogenic agents, interferon-type agents and a category of miscellaneous agents.

The present disclosure also provides methods for combination therapies in which an agent known to modulate other pathways, or other components of the same pathway, or even overlapping sets of target enzymes are used in combination with a compound of the present disclosure, or a pharmaceutically acceptable salt thereof. In one aspect, such therapy includes but is not limited to the combination of one or more compounds of the disclosure with chemotherapeutic agents, therapeutic antibodies, targeted small molecule agents, and radiation treatment, to provide a synergistic or additive therapeutic effect.

Many chemotherapeutics are presently known in the art and can be used in combination with the compounds of the disclosure. In some embodiments, the chemotherapeutic is selected from the group consisting of antimitotic agents, alkylating agents, anti-metabolites, intercalating antibiotics, growth factor inhibitors, cell cycle inhibitors, enzymes, topoisomerase inhibitors, biological response modifiers, anti-hormones, angiogenesis inhibitors, and anti-androgens. Non-limiting examples are chemotherapeutic agents, cytotoxic agents, and non-peptide small molecules such as Gleevec® (Imatinib Mesylate), Kyprolis® (carfilzomib), Velcade® (bortezomib), Casodex (bicalutamide), Iressa® (gefitinib), and Adriamycin as well as a host of chemotherapeutic agents. Non-limiting examples of chemotherapeutic agents include alkylating agents such as thiotepa and cyclosphosphamide (CYTOXAN™); alkyl sulfonates such as busulfan, improsulfan and piposulfan; aziridines such as benzodopa, carboquone, meturedopa, and uredopa; ethylenimines and methylamelamines including altretamine, triethylenemelamine, trietylenephosphoramide, triethylenethiophosphaoramide and trimethylolomelamine; nitrogen mustards such as chlorambucil, chlomaphazine, cholophosphamide, estramustine, ifosfamide, mechlorethamine, mechlorethamine oxide hydrochloride, melphalan, novembichin, phenesterine, prednimustine, trofosfamide, uracil mustard; nitrosureas such as carmustine, chlorozotocin, fotemustine, lomustine, nimustine, ranimustine; antibiotics such as aclacinomysins, actinomycin, authramycin, azaserine, bleomycins, cactinomycin, calicheamicin, carabicin, carminomycin, carzinophilin, Casodex™, chromomycins, dactinomycin, daunorubicin, detorubicin, 6-diazo-5-oxo-L-norleucine, doxorubicin, epirubicin, esorubicin, idarubicin, marcellomycin, mitomycins, mycophenolic acid, nogalamycin, olivomycins, peplomycin, potfiromycin, puromycin, quelamycin, rodorubicin, streptonigrin, streptozocin, tubercidin, ubenimex, zinostatin, zorubicin; anti-metabolites such as methotrexate and 5-fluorouracil (5-FU); folic acid analogues such as denopterin, methotrexate, pteropterin, trimetrexate; purine analogs such as fludarabine, 6-mercaptopurine, thiamiprine, thioguanine; pyrimidine analogs such as ancitabine, azacitidine, 6-azauridine, carmofur, cytarabine, dideoxyuridine, doxifluridine, enocitabine, floxuridine, androgens such as calusterone, dromostanolone propionate, epitiostanol, mepitiostane, testolactone; anti-adrenals such as aminoglutethimide, mitotane, trilostane; folic acid replenisher such as frolinic acid; aceglatone; aldophosphamide glycoside; aminolevulinic acid; amsacrine; bestrabucil; bisantrene; edatraxate; defofamine; demecolcine; diaziquone; elfornithine; elliptinium acetate; etoglucid; gallium nitrate; hydroxyurea; lentinan; lonidamine; mitoguazone; mitoxantrone; mopidamol; nitracrine; pentostatin; phenamet; pirarubicin; podophyllinic acid; 2-ethylhydrazide; procarbazine; PSK; razoxane; sizofiran; spirogermanium; tenuazonic acid; triaziquone; 2,2',2"-trichlorotriethylamine; urethan; vindesine; dacarbazine; mannomustine; mitobronitol; mitolactol; pipobroman; gacytosine; arabinoside ("Ara-C"); cyclophosphamide; thiotepa; taxanes, e.g. paclitaxel and docetaxel, Nab-paclitaxel; retinoic acid; esperamicins; capecitabine; and pharmaceutically acceptable salts, acids or derivatives of any of the above.

Also included as suitable chemotherapeutic cell conditioners are anti-hormonal agents that act to regulate or inhibit hormone action on tumors such as anti-estrogens including for example tamoxifen, (Nolvadex™), raloxifene, aromatase inhibiting 4(5)-imidazoles, 4-hydroxytamoxifen, trioxifene, keoxifene, LY 117018, onapristone, and toremifene (Fareston); and anti-androgens such as flutamide, nilutamide, bicalutamide, leuprolide, and goserelin; chlorambucil; gemcitabine; 6-thioguanine; mercaptopurine; methotrexate; platinum analogs such as cisplatin, oxaliplatin, carboplatin, etoposide (VP-16); ifosfamide; mitomycin C; mitoxantrone; vinblastine vincristine; vinorelbine; navelbine; novantrone; teniposide; daunomycin; aminopterin; xeloda; ibandronate; topotecan; camptothecin-11 (CPT-11); topoisomerase inhibitor RFS 2000; difhroromethylomithine (DMFO), Where desired, the compounds or pharmaceutical composition of the present disclosure can be used in combination with commonly prescribed anti-cancer drugs such as Herceptin®, Avastin®, Erbitux®, Rituxan®, Taxol®, Abraxane, Arimidex®, Taxotere®, ABVD, AVICINE, Abagovomab, Acridine carboxamide, Adecatumumab, 17-N-Allylamino-17-demethoxygeldanamycin, Alpharadin, Alvocidib, 3-Aminopyridine-2-carboxaldehyde thiosemicarbazone, Amonafide, Anthracenedione, Anti-CD22 immunotoxins, Antineoplastic, Antitumorigenic herbs, Apaziquone, Atiprimod, Azathioprine, Belotecan, Bendamustine, BIBW 2992, Biricodar, Brostallicin, Bryostatin, Buthionine sulfoximine, CBV (chemotherapy), Calyculin, cell-cycle nonspecific antineoplastic agents, Dichloroacetic acid, Discodermolide, Elsamitrucin, Enocitabine, Epothilone, Eribulin, Everolimus, Exatecan, Exisulind, Ferruginol, Forodesine, Fosfestrol, ICE chemotherapy regimen, IT-101, Imexon, Imiquimod, Indolocarbazole, Irofulven, Laniquidar, Larotaxel, Lenalidomide, Lucanthone, Lurtotecan, Mafosfamide, Mitozolomide, Nafoxidine, Nedaplatin, Olaparib, Talazoparib, Niraparib, Ortataxel, PAC-1, Pawpaw, Pixantrone, Proteasome inhibitor, Rebeccamycin, Resiquimod, Rubitecan, SN-38, Salinosporamide A, Sapacitabine, Stanford V, Swainsonine, Talaporfin, Tariquidar, Tegafur-uracil, Temodar, Tesetaxel, Triplatin tetranitrate, Tris(2-chloroethyl) amine, Troxacitabine, Uramustine, Vadimezan, Vinflunine, ZD6126 or Zosuquidar, CDK4/6 inhibitors (Palbociclib, Ibrance; Ribociclib, Kisqali; Abemaciclib, Verzenio).

This disclosure further relates to a method for using the compounds or pharmaceutical compositions provided herein, in combination with radiation therapy for inhibiting abnormal cell growth or treating the hyperproliferative disorder in the mammal. Techniques for administering radiation therapy are known in the art, and these techniques can be used in the combination therapy described herein. The administration of the compound of the disclosure in this combination therapy can be determined as described herein.

Radiation therapy can be administered through one of several methods, or a combination of methods, including without limitation external-beam therapy, internal radiation therapy, implant radiation, stereotactic radiosurgery, systemic radiation therapy, radiotherapy and permanent or temporary interstitial brachytherapy. The term "brachytherapy," as used herein, refers to radiation therapy delivered by a spatially confined radioactive material inserted into the body at or near a tumor or other proliferative tissue disease site. The term is intended without limitation to include exposure to radioactive isotopes (e.g. At-211, 1-131, 1-125, Y-90, Re-186, Re-188, Sm-153, Bi-212, P-32, and radioactive isotopes of Lu). Suitable radiation sources for use as a cell conditioner of the present disclosure include both solids and liquids. By way of non-limiting example, the radiation source can be a radionuclide, such as I-125, I-131, Yb-169, Ir-192 as a solid source, 1-125 as a solid source, or other radionuclides that emit photons, beta particles, gamma radiation, or other therapeutic rays. The radioactive material can also be a fluid made from any solution of radionuclide(s), e.g., a solution of I-125 or 1-131, or a radioactive fluid can be produced using a slurry of a suitable fluid containing small particles of solid radionuclides, such as Au-198, Y-90. Moreover, the radionuclide(s) can be embodied in a gel or radioactive micro spheres.

The compounds or pharmaceutical compositions of the disclosure can be used in combination with an amount of one or more substances selected from anti-angiogenesis agents, signal transduction inhibitors, antiproliferative agents, glycolysis inhibitors, or autophagy inhibitors.

Anti-angiogenesis agents, such as MMP-2 (matrix-metalloproteinase 2) inhibitors, MMP-9 (matrix-metalloproteinase 9) inhibitors, and COX-11 (cyclooxygenase 11) inhibitors, can be used in conjunction with a compound of the disclosure and pharmaceutical compositions described herein. Anti-angiogenesis agents include, for example, rapamycin, temsirolimus (CCI-779), everolimus (RAD001), sorafenib, sunitinib, and bevacizumab. Examples of useful COX-II inhibitors include alecoxib, valdecoxib, and rofecoxib. Examples of useful matrix metalloproteinase inhibitors are described in WO 96/33172 WO 96/27583 European Patent Publication EP0818442, European Patent Publication EP1004578, WO 98/07697, WO 98/03516, WO 98/34918, WO 98/34915, WO 98/33768, WO 98/30566, European Patent Publication 606046, European Patent Publication 931 788, WO 90/05719, WO 99/52910, WO 99/52889, WO 99/29667, WO1999007675, European Patent Publication EP1786785, European Patent Publication No. EP1181017, United States Publication No. US20090012085, United States Publication U.S. Pat. No. 5,863,949, United States Publication U.S. Pat. No. 5,861,510, and European Patent Publication EP0780386, all of which are incorporated herein in their entireties by reference. Preferred MMP-2 and MMP-9 inhibitors are those that have little or no activity inhibiting MMP-1. More preferred, are those that selectively inhibit MMP-2 and/or AMP-9 relative to the other matrix-metalloproteinases (i. e., MAP-1, MMP-3, MMP-4, MMP-5, MMP-6, MMP-7, MMP-8, MMP-10, MMP-11, MMP-12, and MMP-13). Some specific examples of MMP inhibitors useful in the disclosure are AG-3340, RO 32-3555, and RS 13-0830.

The present compounds may also be used in co-therapies with other anti-neoplastic agents, such as acemannan, aclarubicin, aldesleukin, alemtuzumab, alitretinoin, altretamine, amifostine, aminolevulinic acid, amrubicin, amsacrine, anagrelide, anastrozole, ANCER, ancestim, ARGLABIN, arsenic trioxide, BAM 002 (Novelos), bexarotene, bicalutamide, broxuridine, capecitabine, celmoleukin, cetrorelix, cladribine, clotrimazole, cytarabine ocfosfate, DA 3030 (Dong-A), daclizumab, denileukin diftitox, deslorelin, dexrazoxane, dilazep, docetaxel, docosanol, doxercalciferol, doxifluridine, doxorubicin, bromocriptine, carmustine, cytarabine, fluorouracil, HIT diclofenac, interferon alfa, daunorubicin, doxorubicin, tretinoin, edelfosine, edrecolomab, eflomithine, emitefur, epirubicin, epoetin beta, etoposide phosphate, exemestane, exisulind, fadrozole, filgrastim, finasteride, fludarabine phosphate, formestane, fotemustine, gallium nitrate, gemcitabine, gemtuzumab zogamicin, gimeracil/oteracil/tegafur combination, glycopine, goserelin, heptaplatin, human chorionic gonadotropin, human fetal alpha fetoprotein, ibandronic acid, idarubicin, (imiquimod, interferon alfa, interferon alfa, natural, interferon alfa-2, interferon alfa-2a, interferon alfa-2b, interferon alfa-N1, interferon alfa-n3, interferon alfacon-1, interferon alpha, natural, interferon beta, interferon beta-1a, interferon beta-1b, interferon gamma, natural interferon gamma-1a, interferon gamma-1b, interleukin-1 beta, iobenguane, irinotecan, irsogladine, lanreotide, LC 9018 (Yakult), leflunomide, lenograstim, lentinan sulfate, letrozole, leukocyte alpha interferon, leuprorelin, levamisole+fluorouracil, barozole, lobaplatin, lonidamine, lovastatin, masoprocol, melarsoprol, metoclopramide, mifepristone, miltefosine, mirimostim, mismatched double stranded RNA, mitoguazone, mitolactol, mitoxantrone, molgramostim, nafarelin, naloxone+pentazocine, nartograstim, nedaplatin, nilutamide, noscapine, novel erythropoiesis stimulating protein, NSC 631570 octreotide, oprelvekin, osaterone, oxaliplatin, paclitaxel, pamidronic acid, pegaspargase, peginterferon alfa-2b, pentosan polysulfate sodium, pentostatin, picibanil, pirarubicin, rabbit antithymocyte polyclonal antibody, polyethylene glycol interferon alfa-2a, porfimer sodium, raloxifene, raltitrexed, rasburiembodiment, rhenium Re 186 etidronate, RII retinamide, rituximab, romurtide, samarium (153 Sm) lexidronam, sargramostim, sizofiran, sobuzoxane, sonermin, strontium-89 chloride, suramin, tasonermin, tazarotene, tegafiir, temoporfin, temozolomide, teniposide, tetrachlorodecaoxide, thalidomide, thymalfasin, thyrotropin alfa, topotecan, toremifene, tositumomab-iodine 131, trastuzumab, treosulfan, tretinoin, trilostane, trimetrexate, triptorelin, tumor necrosis factor alpha, natural, ubenimex, bladder cancer vaccine, Maruyama vaccine, melanoma lysate vaccine, valrubicin, verteporfin, vinorelbine, VIRULIZIN, zinostatin stimalamer, or zoledronic acid; abarelix; AE 941 (Aetema), ambamustine, antisense oligonucleotide, bcl-2 (Genta), APC 8015 (Dendreon), cetuximab, decitabine, dexaminoglutethimide, diaziquone, EL 532 (Elan), EM 800 (Endorecherche), eniluracil, etanidazole, fenretinide, filgrastim SD01 (Amgen), fulvestrant, galocitabine, gastrin 17 immunogen, HLA-B7 gene therapy (Vical), granulocyte macrophage colony stimulating factor, histamine dihydrochloride, ibritumomab tiuxetan, ilomastat, IM 862 (Cytran), interleukin-2, iproxifene, LDI 200 (Milkhaus), leridistim, lintuzumab, CA 125 MAb (Biomira), cancer MAb (Japan Pharmaceutical Development), HER-2 and Fc MAb (Medarex), idiotypic 105AD7 MAb (CRC Technology), idiotypic CEA MAb (Trilex), LYM-1-iodine 131 MAb (Techniclone), polymorphic epithelial mucin-yttrium 90 MAb (Antisoma), marimastat, menogaril, mitumomab, motexafin gadolinium, MX 6 (Galderma), nelarabine, nolatrexed, P 30 protein, pegvisomant, pemetrexed, porfiromycin, prinomastat, RL 0903 (Shire), rubitecan, satraplatin, sodium phenylacetate, sparfosic acid, SRL 172 (SR Pharma), SU 5416 (SUGEN), TA 077 (Tanabe), tetrathiomolybdate, thaliblastine, thrombopoietin, tin ethyl etiopurpurin, tirapazamine, cancer vaccine (Biomira), melanoma vaccine (New York University), melanoma vaccine (Sloan Kettering Institute), melanoma oncolysate vaccine (New York Medical College), viral melanoma cell lysates vaccine (Royal Newcastle Hospital), or valspodar.

The compounds of the invention may further be used with VEGFR inhibitors. Other compounds described in the following patents and patent applications can be used in combination therapy: U.S. Pat. No. 6,258,812, US 2003/0105091, WO 01/37820, U.S. Pat. No. 6,235,764, WO 01/32651, U.S. Pat. Nos. 6,630,500, 6,515,004, 6,713,485, 5,521,184, 5,770,599, 5,747,498, WO 02/68406, WO 02/66470, WO 02/55501, WO 04/05279, WO 04/07481, WO 04/07458, WO 04/09784, WO 02/59110, WO 99/45009, WO 00/59509, WO 99/61422, U.S. Pat. No. 5,990,141, WO 00/12089, and WO 00/02871.

In some embodiments, the combination comprises a composition of the present invention in combination with at least one anti-angiogenic agent. Agents are inclusive of, but not limited to, in vitro synthetically prepared chemical compositions, antibodies, antigen binding regions, radionuclides, and combinations and conjugates thereof. An agent can be an agonist, antagonist, allosteric modulator, toxin or, more generally, may act to inhibit or stimulate its target (e.g., receptor or enzyme activation or inhibition), and thereby promote cell death or arrest cell growth.

Exemplary anti-angiogenic agents include ERBITUX™ (IMC-C225), KDR (kinase domain receptor) inhibitory agents (e.g., antibodies and antigen binding regions that specifically bind to the kinase domain receptor), anti-VEGF agents (e.g., antibodies or antigen binding regions that specifically bind VEGF, or soluble VEGF receptors or a ligand binding region thereof) such as AVASTIN™ or VEGF-TRAP™, and anti-VEGF receptor agents (e.g., antibodies or antigen binding regions that specifically bind thereto), EGFR inhibitory agents (e.g., antibodies or antigen binding regions that specifically bind thereto) such as Vectibix (panitumumab), IRESSA™ (gefitinib), TARCEVA™ (erlotinib), anti-Ang1 and anti-Ang2 agents (e.g., antibodies or antigen binding regions specifically binding thereto or to their receptors, e.g., Tie2/Tek), and anti-Tie2 kinase inhibitory agents (e.g., antibodies or antigen binding regions that specifically bind thereto). The pharmaceutical compositions of the present invention can also include one or more agents (e.g., antibodies, antigen binding regions, or soluble receptors) that specifically bind and inhibit the activity of growth factors, such as antagonists of hepatocyte growth factor (HGF, also known as Scatter Factor), and antibodies or antigen binding regions that specifically bind its receptor "c-met".

Other anti-angiogenic agents include Campath, IL-8, B-FGF, Tek antagonists (Ceretti et al., U.S. Publication No. 2003/0162712; U.S. Pat. No. 6,413,932), anti-TWEAK agents (e.g., specifically binding antibodies or antigen binding regions, or soluble TWEAK receptor antagonists; see, Wiley, U.S. Pat. No. 6,727,225), ADAM distintegrin domain to antagonize the binding of integrin to its ligands (Fanslow et al., U.S. Publication No. 2002/0042368), specifically binding anti-eph receptor and/or anti-ephrin antibodies or antigen binding regions (U.S. Pat. Nos. 5,981,245; 5,728,813; 5,969,110; 6,596,852; 6,232,447; 6,057,124 and patent family members thereof), and anti-PDGF-BB antagonists (e.g., specifically binding antibodies or antigen binding regions) as well as antibodies or antigen binding regions specifically binding to PDGF-BB ligands, and PDGFR kinase inhibitory agents (e.g., antibodies or antigen binding regions that specifically bind thereto).

Additional anti-angiogenic/anti-tumor agents include: SD-7784 (Pfizer, USA); cilengitide.(Merck KGaA, Germany, EPO 770622); pegaptanib octasodium, (Gilead Sciences, USA); Alphastatin, (BioActa, UK); M-PGA, (Celgene, USA, U.S. Pat. No. 5,712,291); ilomastat, (Arriva, USA, U.S. Pat. No. 5,892,112); emaxanib, (Pfizer, USA, U.S. Pat. No. 5,792,783); vatalanib, (Novartis, Switzerland); 2-methoxyestradiol, (EntreMed, USA); TLC ELL-12, (Elan, Ireland); anecortave acetate, (Alcon, USA); alpha-D148 Mab, (Amgen, USA); CEP-7055, (Cephalon, USA); anti-Vn Mab, (Crucell, Netherlands) DAC:antiangiogenic, (ConjuChem, Canada); Angiocidin, (InKine Pharmaceutical, USA); KM-2550, (Kyowa Hakko, Japan); SU-0879, (Pfizer, USA); CGP-79787, (Novartis, Switzerland, EP 970070); ARGENT technology, (Ariad, USA); YIGSR-Stealth, (Johnson & Johnson, USA); fibrinogen-E fragment, (BioActa, UK); angiogenesis inhibitor, (Trigen, UK); TBC-1635, (Encysive Pharmaceuticals, USA); SC-236, (Pfizer, USA); ABT-567, (Abbott, USA); Metastatin, (EntreMed, USA); angiogenesis inhibitor, (Tripep, Sweden); maspin, (Sosei, Japan); 2-methoxyestradiol, (Oncology Sciences Corporation, USA); ER-68203-00, (IVAX, USA); Benefin, (Uane Uabs, USA); Tz-93, (Tsumura, Japan); TAN-1120, (Takeda, Japan); FR-111142, (Fujisawa, Japan, JP 02233610); platelet factor 4, (RepliGen, USA, EP 407122); vascular endothelial growth factor antagonist, (Borean, Denmark); bevacizumab (pINN), (Genentech, USA); angiogenesis inhibitors, (SUGEN, USA); XL 784, (Exelixis, USA); XL 647, (Exelixis, USA); MAb, alpha5beta3 integrin, second generation, (Applied Molecular Evolution, USA and MedImmune, USA); gene therapy, retinopathy, (Oxford BioMedica, UK); enzastaurin hydrochloride (USAN), (Lilly, USA); CEP 7055, (Cephalon, USA and Sanofi-Synthelabo, France); BC 1, (Genoa Institute of Cancer Research, Italy); angiogenesis inhibitor, (Alchemia, Australia); VEGF antagonist, (Regeneron, USA); rBPI 21 and BPI-derived antiangiogenic, (XOMA, USA); PI 88, (Progen, Australia); cilengitide (pINN), (Merck KGaA, German; Munich Technical University, Germany, Scripps Clinic and Research Foundation, USA); cetuximab (INN), (Aventis, France); AVE 8062, (Ajinomoto, Japan); AS 1404, (Cancer Research Laboratory, New Zealand); SG 292, (Telios, USA); Endostatin, (Boston Childrens Hospital, USA); ATN 161, (Attenuon, USA); ANGIOSTATIN, (Boston Childrens Hospital, USA); 2-methoxyestradiol, (Boston Childrens Hospital, USA); ZD 6474, (AstraZeneca, UK); ZD 6126, (Angiogene Pharmaceuticals, UK); PPI 2458, (Praecis, USA); AZD 9935, (AstraZeneca, UK); AZD 2171, (AstraZeneca, UK); vatalanib (pINN), (Novartis, Switzerland and Schering AG, Germany); tissue factor pathway inhibitors, (EntreMed, USA); pegaptanib (Pinn), (Gilead Sciences, USA); xanthorrhizol, (Yonsei University, South Korea); vaccine, gene-based, VEGF-2, (Scripps Clinic and Research Foundation, USA); SPV5.2, (Supratek, Canada); SDX 103, (University of California at San Diego, USA); PX 478, (ProlX, USA); METASTATIN, (EntreMed, USA); troponin I, (Harvard University, USA); SU 6668, (SUGEN, USA); OXI 4503, (OXiGENE, USA); o-guanidines, (Dimensional Pharmaceuticals, USA); motuporamine C, (British Columbia University, Canada); CDP 791, (Celltech Group, UK); atiprimod (pINN), (GlaxoSmithKline, UK); E 7820, (Eisai, Japan); CYC 381, (Harvard University, USA); AE 941, (Aetema, Canada); vaccine, angiogenesis, (EntreMed, USA); urokinase plasminogen activator inhibitor, (Dendreon, USA); oglufanide (pINN), (Melmotte, USA); HIF-1alfa inhibitors, (Xenova, UK); CEP 5214, (Cephalon, USA); BAY RES 2622, (Bayer, Germany); Angiocidin, (InKine, USA); A6, (Angstrom, USA); KR 31372, (Korea Research Institute of Chemical Technology, South Korea); GW 2286, (GlaxoSmithKline, UK); EHT 0101, (ExonHit, France); CP 868596, (Pfizer, USA); CP 564959, (OSI, USA); CP 547632, (Pfizer, USA); 786034, (GlaxoSmithKline, UK); KRN 633, (Kirin Brewery, Japan); drug delivery system, intraocular, 2-methoxyestradiol, (EntreMed, USA); anginex, (Maastricht University, Netherlands, and Minnesota University, USA); ABT 510, (Abbott, USA); AAL 993, (Novartis, Switzerland); VEGI, (ProteomTech, USA); tumor necrosis factor-alpha inhibitors, (National Institute on Aging, USA); SU 11248, (Pfizer, USA and SUGEN USA); ABT 518, (Abbott, USA); YH16, (Yantai Rongchang, China); S-3APG, (Boston Childrens Hospital, USA and EntreMed, USA); MAb, KDR, (ImClone Systems, USA); MAb, alpha5 beta1, (Protein Design, USA); KDR kinase inhibitor, (Celltech Group, UK, and Johnson & Johnson, USA); GFB 116, (South Florida University, USA and Yale University, USA); CS 706, (Sankyo, Japan); combretastatin A4 prodrug, (Arizona State University, USA); chondroitinase AC, (IBEX, Canada); BAY RES 2690, (Bayer, Germany); AGM 1470, (Harvard University, USA, Takeda, Japan, and TAP, USA); AG 13925, (Agouron, USA); Tetrathiomolybdate, (University of Michigan, USA); GCS 100, (Wayne State University, USA) CV 247, (Ivy Medical, UK); CKD 732, (Chong Kun Dang, South Korea); MAb, vascular endothelium growth factor, (Xenova, UK); irsogladine (INN), (Nippon Shinyaku, Japan); RG 13577, (Aventis, France); WX 360, (Wilex, Germany); squalamine (pINN), (Genaera, USA); RPI 4610, (Sima, USA); cancer therapy, (Marinova, Australia); heparanase inhibitors, (InSight, Israel); KL 3106, (Kolon, South Korea); Honokiol, (Emory University, USA); ZK CDK, (Schering AG, Germany); ZK Angio, (Schering AG, Germany); ZK 229561, (Novartis, Switzerland, and Schering AG, Germany); XMP 300, (XOMA, USA); VGA 1102, (Taisho, Japan); VEGF receptor modulators, (Pharmacopeia, USA); VE-cadherin-2 antagonists, (ImClone Systems, USA); Vasostatin, (National Institutes of Health, USA); vaccine, Flk-1, (ImClone Systems, USA); TZ 93, (Tsumura, Japan); TumStatin, (Beth Israel Hospital, USA); truncated soluble FLT 1 (vascular endothelial growth factor receptor 1), (Merck & Co, USA); Tie-2 ligands, (Regeneron, USA); and, thrombospondin 1 inhibitor, (Allegheny Health, Education and Research Foundation, USA).

Autophagy inhibitors include, but are not limited to chloroquine, 3-methyladenine, hydroxychloroquine (Plaquenil™), bafdomycin A1, 5-amino-4-imidazole carboxamide riboside (AICAR), okadaic acid, autophagy-suppressive algal toxins which inhibit protein phosphatases of type 2A or type 1, analogues of cAMP, and drugs which elevate cAMP levels such as adenosine, LY204002, N6-mercaptopurine riboside, and vinblastine. In addition, antisense or siRNA that inhibits expression of proteins including but not limited to ATG5 (which are implicated in autophagy), may also be used.

Additional pharmaceutically active compounds/agents that can be used in the treatment of cancers and that can be used in combination with one or more compound of the present invention include: epoetin alfa; darbepoetin alfa; panitumumab; pegfdgrastim; palifermin; filgrastim; denosumab; ancestim; AMG 102; AMG 386; AMG 479; AMG 655; AMG 745; AMG 951; and AMG 706, or a pharmaceutically acceptable salt thereof.

In certain embodiments, a composition provided herein is conjointly administered with a chemotherapeutic agent. Suitable chemotherapeutic agents may include, natural products such as *vinca* alkaloids (e.g., vinblastine, vincristine, and vinorelbine), paclitaxel, epidipodophyllotoxins (e.g., etoposide and teniposide), antibiotics (e.g., dactinomycin (actinomycin D), daunorubicin, doxorubicin, and idarubicin), anthracyclines, mitoxantrone, bleomycins, plicamycin (mithramycin), mitomycin, enzymes (e.g., L-asparaginase which systemically metabolizes L-asparagine and deprives cells which do not have the capacity to synthesize their own asparagine), antiplatelet agents, antiproliferative/antimitotic alkylating agents such as nitrogen mustards (e.g., mechlorethamine, cyclophosphamide and analogs, melphalan, and chlorambucil), ethylenimines and methylmelamines (e.g., hexaamethylmelaamine and thiotepa), CDK inhibitors (e.g., seliciclib, UCN-01, P1446A-05, PD-0332991, dinaciclib, P27-00, AT-7519, RGB286638, and SCH727965), alkyl sulfonates (e.g., busulfan), nitrosoureas (e.g., carmustine (BCNU) and analogs, and streptozocin), trazenes-dacarbazinine (DTIC), antiproliferative/antimitotic antimetabobtes such as folic acid analogs (e.g., methotrexate), pyrimidine analogs (e.g., fluorouracil, floxuridine, and cytarabine), purine analogs and related inhibitors (e.g., mercaptopurine, thioguanine, pentostatin and 2-chlorodeoxyadenosine), aromatase inhibitors (e.g., anastrozole, exemestane, and letrozole), and platinum coordination complexes (e.g., cisplatin and carboplatin), procarbazine, hydroxyurea, mitotane, aminoglutethimide, histone deacetylase (HDAC) inhibitors (e.g., trichostatin, sodium butyrate, apicidan, suberoyl anilide hydroamic acid, vorinostat, LBH 589, romidepsin, ACY-1215, and panobinostat), mTor inhibitors (e.g., temsirolimus, everolimus, ridaforolimus, and sirolimus), KSP (Eg5) inhibitors (e.g., Array 520), DNA binding agents (e.g., Zalypsis), PI3K delta inhibitor (e.g., GS-1101 and TGR-1202), PI3K delta and gamma inhibitor (e.g., CAL-130), multi-kinase inhibitor (e.g., TG02 and sorafenib), hormones (e.g., estrogen) and hormone agonists such as leutinizing hormone releasing hormone (LHRH) agonists (e.g., goserelin, leuprolide and triptorelin), BAFF-neutralizing antibody (e.g., LY2127399), IKK inhibitors, p38MAPK inhibitors, anti-IL-6 (e.g., CNT0328), telomerase inhibitors (e.g., GRN 163L), aurora kinase inhibitors (e.g., MLN8237, AMG 900, AZD-1152), cell surface monoclonal antibodies (e.g., anti-CD38 (HUMAX-CD38), anti-CS1 (e.g., elotuzumab), HSP90 inhibitors (e.g., 17 AAG and KOS 953), PI3K/Akt inhibitors (e.g., perifosine), Akt inhibitor (e.g., GSK-2141795), PKC inhibitors (e.g., enzastaurin), FTIs (e.g., Zamestra™), anti-CD138 (e.g., BT062), Torc1/2 specific kinase inhibitor (e.g., INK128), kinase inhibitor (e.g., GS-1101), ER/UPR targeting agent (e.g., MKC-3946), cFMS inhibitor (e.g., ARRY-382), JAK1/2 inhibitor (e.g., CYT387), PARP inhibitor (e.g., olaparib, Talazoparib, Niraparib veliparib (ABT-888)), BCL-2 antagonist. Other chemotherapeutic agents may include mechlorethamine, camptothecin, ifosfamide, tamoxifen, raloxifene, gemcitabine, navelbine, sorafenib, or any analog or derivative variant of the foregoing.

The compounds of the present invention may also be used in combination with radiation therapy, hormone therapy, surgery and immunotherapy, which therapies are well known to those skilled in the art.

In certain embodiments, a pharmaceutical composition provided herein is conjointly administered with a steroid. Suitable steroids may include, but are not limited to, 21-acetoxypregnenolone, alclometasone, algestone, amcinonide, beclomethasone, betamethasone, budesonide, chloroprednisone, clobetasol, clocortolone, cloprednol, corticosterone, cortisone, cortivazol, deflazacort, desonide, desoximetasone, dexamethasone, diflorasone, diflucortolone, difupred- nate, enoxolone, fluazacort, flucloronide, flumethasone, flunisolide, fluocinolone acetonide, fluocinonide, fluocortin butyl, fluocortolone, fluorometholone, fluperolone acetate, fluprednidene acetate, fluprednisolone, flurandrenolide, fluticasone propionate, formocortal, halcinonide, halobetasol propionate, halometasone, hydrocortisone, loteprednol etabonate, mazipredone, medrysone, meprednisone, methylprednisolone, mometasone furoate, paramethasone, prednicarbate, prednisolone, prednisolone 25-diethylaminoacetate, prednisolone sodium phosphate, prednisone, prednival, prednylidene, rimexolone, tixocortol, triamcinolone, triamcinolone acetonide, triamcinolone benetonide, triamcinolone hexacetonide, and salts and/or derivatives thereof. In a particular embodiment, the compounds of the present invention can also be used in combination with additional pharmaceutically active agents that treat nausea. Examples of agents that can be used to treat nausea include: dronabinol; granisetron; metoclopramide; ondansetron; and prochlorperazine; or a pharmaceutically acceptable salt thereof.

The compounds or pharmaceutical compositions of the disclosure can also be used in combination with an amount of one or more substances selected from EGFR inhibitors, MEK inhibitors, PI3K inhibitors, AKT inhibitors, TOR inhibitors, and immune therapies, including anti-PD-1, anti-PDL-1, anti-CTLA4, anti-LAG1, and anti-OX40 agents, GITR agonists, CAR-T cells, and BiTEs.

EGFR inhibitors include, but are not limited to, small molecule antagonists, antibody inhibitors, or specific antisense nucleotide or siRNA. Useful antibody inhibitors of EGFR include cetuximab (Erbitux), panitumumab (Vectibix), zalutumumab, nimotuzumab, and matuzumab. Small molecule antagonists of EGFR include gefitinib, erlotinib (Tarceva), and most recently, lapatinib (TykerB). See e.g., Yan L, et. al., Pharmacogenetics and Pharmacogenomics In Oncology Therapeutic Antibody Development, BioTechniques 2005; 39(4): 565-8, and Paez J G, et. al., EGFR Mutations In Lung Cancer Correlation With Clinical Response To Gefitinib Therapy, Science 2004; 304(5676): 1497-500.

Non-limiting examples of small molecule EGFR inhibitors include any of the EGFR inhibitors described in the following patent publications, and all pharmaceutically acceptable salts and solvates of said EGFR inhibitors: European Patent Application EP 520722, published Dec. 30, 1992; European Patent Application EP 566226, published Oct. 20, 1993; PCT International Publication WO 96/33980, published Oct. 31, 1996; U.S. Pat. No. 5,747,498, issued May 5, 1998; PCT International Publication WO 96/30347, published Oct. 3, 1996; European Patent Application EP 787772, published Aug. 6, 1997; PCT International Publication WO 97/30034, published Aug. 21, 1997; PCT International Publication WO 97/30044, published Aug. 21, 1997; PCT International Publication WO 97/38994, published Oct. 23, 1997; PCT International Publication WO 97/49688, published Dec. 31, 1997; European Patent Application EP 837063, published Apr. 22, 1998; PCT International Publication WO 98/02434, published Jan. 22, 1998; PCT International Publication WO 97/38983, published Oct. 23, 1997; PCT International Publication WO 95/19774, published Jul. 27, 1995; PCT International Publication WO 95/19970, published Jul. 27, 1995; PCT International Publication WO 97/13771, published Apr. 17, 1997; PCT International Publication WO 98/02437, published Jan. 22, 1998; PCT International Publication WO 98/02438, published Jan. 22, 1998; PCT International Publication WO 97/32881, published Sep. 12, 1997; German Application DE 19629652, published Jan. 29, 1998; PCT International Publication WO 98/33798, published Aug. 6, 1998; PCT International Publication WO 97/32880, published Sep. 12, 1997; PCT International Publication WO 97/32880 published Sep. 12, 1997; European Patent Application EP 682027, published Nov. 15, 1995; PCT International Publication WO 97/02266, published Jan. 23, 1997; PCT International Publication WO 97/27199, published Jul. 31, 1997; PCT International Publication WO 98/07726, published Feb. 26, 1998; PCT International Publication WO 97/34895, published Sep. 25, 1997; PCT International Publication WO 96/31510', published Oct. 10, 1996; PCT International Publication WO 98/14449, published Apr. 9, 1998; PCT International Publication WO 98/14450, published Apr. 9, 1998; PCT International Publication WO 98/14451, published Apr. 9, 1998; PCT International Publication WO 95/09847, published Apr. 13, 1995; PCT International Publication WO 97/19065, published May 29, 1997; PCT International Publication WO 98/17662, published Apr. 30, 1998; U.S. Pat. No. 5,789,427, issued Aug. 4, 1998; U.S. Pat. No. 5,650,415, issued Jul. 22, 1997; U.S. Pat. No. 5,656,643, issued Aug. 12, 1997; PCT International Publication WO 99/35146, published Jul. 15, 1999; PCT International Publication WO 99/35132, published Jul. 15, 1999; PCT International Publication WO 99/07701, published Feb. 18, 1999; and PCT International Publication WO 92/20642 published Nov. 26, 1992. Additional non-limiting examples of small molecule EGFR inhibitors include any of the EGFR inhibitors described in Traxler, P., 1998, Exp. Opin. Ther. Patents 8(12): 1599-1625.

Antibody-based EGFR inhibitors include any anti-EGFR antibody or antibody fragment that can partially or completely block EGFR activation by its natural ligand. Non-limiting examples of antibody-based EGFR inhibitors include those described in Modjtahedi, H., et al., 1993, Br. J. Cancer 67:247-253; Teramoto, T., et al., 1996, Cancer 77:639-645; Goldstein et al., 1995, Clin. Cancer Res. 1:1311-1318; Huang, S. M., et al., 1999, Cancer Res. 15:59(8): 1935-40; and Yang, X., et al., 1999, Cancer Res. 59:1236-1243. Thus, the EGFR inhibitor can be monoclonal antibody Mab E7.6.3 (Yang, 1999 supra), or Mab C225 (ATCC Accession No. HB-8508), or an antibody or antibody fragment having the binding specificity thereof.

MEK inhibitors include, but are not limited to, CI-1040, AZD6244, PD318088, PD98059, PD334581, RDEA119, ARRY-142886, ARRY-438162, and PD-325901.

PI3K inhibitors include, but are not limited to, wortmannin, 17-hydroxywortmannin analogs described in WO 06/044453, 4-[2-(1H-Indazol-4-yl)-6-[[4-(methylsulfonyl)piperazin-1-yl]methyl]thieno[3,2-d]pyrimidin-4-yl]morpholine (also known as GDC 0941 and described in PCT Publication Nos. WO 09/036,082 and WO 09/055,730), 2-Methyl-2-[4-[3-methyl-2-oxo-8-(quinolin-3-yl)-2,3-dihydroimidazo[4,5-c]quinolin-1-yl]phenyl]propionitrile (also known as BEZ 235 or NVP-BEZ 235, and described in PCT Publication No. WO 06/122806), (S)-1-(4-((2-(2-aminopyrimidin-5-yl)-7-methyl-4-morpholinothieno[3,2-d]pyrimidin-6-yl)methyl)piperazin-1-yl)-2-hydroxypropan-1-one (described in PCT Publication No. WO 2008/070740), LY294002 (2-(4-Morpholinyl)-8-phenyl-4H-1-benzopyran-4-one available from Axon Medchem), PI 103 hydrochloride (3-[4-(4-morpholinylpyrido-[3',2':4,5]furo[3,2-d]pyrimidin-2-yl]phenol hydrochloride available from Axon Medchem), PIK 75 (N'-[(1E)-(6-bromoimidazo[1,2-a]pyridin-3-yl)methylene]-N,2-dimethyl-5-nitrobenzenesulfono-hydrazide hydrochloride available from Axon Medchem), PIK 90 (N-(7,8-dimethoxy-2,3-dihydroimidazo[1,2-c]quinazolin-5-yl)-nicotinamide available from Axon Medchem), GDC-0941 bismesylate (2-(1H-Indazol-4-yl)-6-(4-methanesulfonyl-piperazin-1-ylmethyl)-4-morpholin-4-yl-thieno[3,2-d] pyrimidine bismesylate available from Axon Medchem), AS-252424 (5-[1-[5-(4-Fluoro-2-hydroxy-phenyl)-furan-2-yl]-meth-(Z)-ylidene]-thiazolidine-2,4-dione available from Axon Medchem), and TGX-221 (7-Methyl-2-(4-morpholinyl)-9-[1-(phenylamino)ethyl]-4H-pyrido-[1,2-a]pyrimidin-4-one available from Axon Medchem), XL-765, and XL-147. Other PI3K inhibitors include demethoxyviridin, perifosine, CAL101, PX-866, BEZ235, SF1126, INK1117, IPI-145, BKM120, XL147, XL765, Palomid 529, GSK1059615, ZSTK474, PWT33597, IC87114, TG100-115, CAL263, PI-103, GNE-477, CUDC-907, and AEZS-136.

AKT inhibitors include, but are not limited to, Akt-1-1 (inhibits Akt1) (Barnett et al. (2005) Biochem. J., 385 (Pt. 2), 399-408); Akt-1-1,2 (inhibits Ak1 and 2) (Barnett et al. (2005) Biochem. J. 385 (Pt. 2), 399-408); API-59CJ-Ome (e.g., Jin et al. (2004) Br. J. Cancer 91, 1808-12); 1-H-imidazo[4,5-c]pyridinyl compounds (e.g., WO05011700); indole-3-carbinol and derivatives thereof (e.g., U.S. Pat. No. 6,656,963; Sarkar and Li (2004) J Nutr. 134(12 Suppl), 3493S-3498S); perifosine (e.g., interferes with Akt membrane localization; Dasmahapatra et al. (2004) Clin. Cancer Res. 10(15), 5242-52, 2004); phosphatidylinositol ether lipid analogues (e.g., Gills and Dennis (2004) Expert. Opin. Investig. Drugs 13, 787-97); and triciribine (TCN or API-2 or NCI identifier: NSC 154020; Yang et al. (2004) Cancer Res. 64, 4394-9).

TOR inhibitors include, but are not limited to, inhibitors include AP-23573, CCI-779, everolimus, RAD-001, rapamycin, temsirolimus, ATP-competitive TORC1/TORC2 inhibitors, including PI-103, PP242, PP30 and Torin 1. Other TOR inhibitors in FKBP12 enhancer; rapamycins and derivatives thereof, including: CCI-779 (temsirolimus), RAD001 (Everolimus; WO 9409010) and AP23573; rapalogs, e.g. as disclosed in WO 98/02441 and WO 01/14387, e.g. AP23573, AP23464, or AP23 841; 40-(2-hydroxyethyl) rapamycin, 40-[3-hydroxy(hydroxymethyl)methylpropanoate]-rapamycin (also called CC1779), 40-epi-(tetrazolyt)-rapamycin (also called ABT578), 32-deoxorapamycin, 16-pentynyloxy-32(S)-dihydrorapanycin, and other derivatives disclosed in WO 05005434; derivatives disclosed in U.S. Pat. No. 5,258,389, WO 94/090101, WO 92/05179, U.S. Pat. Nos. 5,118,677, 5,118,678, 5,100,883, 5,151,413, 5,120,842, WO 93/111130, WO 94/02136, WO 94/02485, WO 95/14023, WO 94/02136, WO 95/16691, WO 96/41807, WO 96/41807 and U.S. Pat. No. 5,256,790; phosphorus-containing rapamycin derivatives (e.g., WO 05016252); 4H-1-benzopyran-4-one derivatives (e.g., U.S. Provisional Application No. 60/528,340).

Immune therapies include, but are not limited to, anti-PD-1 agents, anti-PDL-1 agents, anti-CTLA-4 agents, anti-LAG1 agents, and anti-OX40 agents. Exemplary anti-PD-1 antibodies and methods for their use are described by Goldberg et al., Blood 110(1): 186-192 (2007), Thompson et al., Clin. Cancer Res. 13(6): 1757-1761 (2007), and Korman et al., International Application No. PCT/JP2006/309606 (publication no. WO 2006/121168 A1), each of which are expressly incorporated by reference herein, include: Yervoy™ (ipilimumab) or Tremelimumab (to CTLA-4), galiximab (to B7.1), BMS-936558 (to PD-1), MK-3475 (to PD-1), AMP224 (to B7DC), BMS-936559 (to B7-H1), MPDL3280A (to B7-H1), MEDI-570 (to ICOS), AMG557 (to B7H2), MGA271 (to B7H3), IMP321 (to LAG-3), BMS-663513 (to CD137), PF-05082566 (to CD137), CDX-1127 (to CD27), anti-OX40 (Providence Health Services), huMAbOX40L (to OX40L), Atacicept (to TACI), CP-870893 (to CD40), Lucatumumab (to CD40), Dacetuzumab (to CD40), Muromonab-CD3 (to CD3), Ipilumumab (to CTLA-4). Immune therapies also include genetically engineered T-cells (e.g., CAR-T cells) and bispecific antibodies (e.g., BiTEs).

GITR agonists include, but are not limited to, GITR fusion proteins and anti-GITR antibodies (e.g., bivalent anti-GITR antibodies), such as, a GITR fusion protein described in U.S. Pat. No. 6,111,090box.c, European Patent No.: 090505B1, U.S. Pat. No. 8,586,023, PCT Publication Nos.: WO 2010/003118 and 2011/090754, or an anti-GITR antibody described, e.g., in U.S. Pat. No. 7,025,962, European Patent No.: 1947183B1, U.S. Pat. Nos. 7,812,135, 8,388,967, 8,591,886, European Patent No.: EP 1866339, PCT Publication No.: WO 2011/028683, PCT Publication No.: WO 2013/039954, PCT Publication No.: WO2005/007190, PCT Publication No.: WO 2007/133822, PCT Publication No.: WO2005/055808, PCT Publication No.: WO 99/40196, PCT Publication No.: WO 2001/03720, PCT Publication No.: WO99/20758, PCT Publication No.:

WO2006/083289, PCT Publication No.: WO 2005/115451, U.S. Pat. No. 7,618,632, and PCT Publication No.: WO 2011/051726.

The compounds described herein can be used in combination with the agents disclosed herein or other suitable agents, depending on the condition being treated. Hence, in some embodiments the one or more compounds of the disclosure will be co-administered with other agents as described above. When used in combination therapy, the compounds described herein are administered with the second agent simultaneously or separately. This administration in combination can include simultaneous administration of the two agents in the same dosage form, simultaneous administration in separate dosage forms, and separate administration. That is, a compound described herein and any of the agents described above can be formulated together in the same dosage form and administered simultaneously. Alternatively, a compound of the disclosure and any of the agents described above can be simultaneously administered, wherein both the agents are present in separate formulations. In another alternative, a compound of the present disclosure can be administered just followed by and any of the agents described above, or vice versa. In some embodiments of the separate administration protocol, a compound of the disclosure and any of the agents described above are administered a few minutes apart, or a few hours apart, or a few days apart.

As one aspect of the present invention contemplates the treatment of the disease/conditions with a combination of pharmaceutically active compounds that may be administered separately, the invention further relates to combining separate pharmaceutical compositions in kit form. The kit comprises two separate pharmaceutical compositions: a compound of the present invention, and a second pharmaceutical compound. The kit comprises a container for containing the separate compositions such as a divided bottle or a divided foil packet. Additional examples of containers include syringes, boxes, and bags. In some embodiments, the kit comprises directions for the use of the separate components. The kit form is particularly advantageous when the separate components are preferably administered in different dosage forms (e.g., oral and parenteral), are administered at different dosage intervals, or when titration of the individual components of the combination is desired by the prescribing health care professional.

EXPERIMENTAL

Abbreviations: The following abbreviations may be used herein:

| | |
|---|---|
| AcOH | acetic acid |
| aq or aq. | Aqueous |
| BOC or Boc | tert-butyloxycarbonyl |
| DCE | 1,2-dichloroethane |
| DCM | Dichloromethane |
| DMAP | 4-dimethylaminopyridine |
| DMF | N,N-dimethylformamide |
| DMSO | dimethyl sulfoxide |
| Dppf, DPPF or dppf | 1,1'-bis(diphenylphosphino)ferrocene |
| eq or eq. or equiv. | Equivalent |
| ESI or ES | electrospray ionization |
| Et | Ethyl |
| Et$_2$O | diethyl ether |
| EtOH | Ethyl alcohol |
| EtOAc | ethyl acetate |
| g | Grams |
| h | Hour |
| HPLC | high pressure liquid chromatography |
| HATU | 1-[Bis(dimethylamino)methylene]-1H-1,2,3-triazolo[4,5-b]pyridinium 3-oxid hexafluorophosphate |
| iPr | Isopropyl |
| iPr$_2$NEt or DIPEA | N-ethyl diisopropylamine (Hünig's base) |
| KOAc | potassium acetate |
| LDA | Lithium diisopropylamide |
| LC MS, LCMS, LC-MS or LC/MS | liquid chromatography mass spectroscopy |
| LG | Leaving group (e.g., halogen, mesylate, triflate) |
| m/z | mass divided by charge |
| Me | Methyl |
| MeCN | Acetonitrile |
| MeOH | Methanol |
| Met | Metal species for cross-coupling (e.g., MgX, ZnX, SnR$_3$, SiR$_3$, B(OR)$_2$) |
| mg | Milligrams |
| min | Minutes |
| mL | Milliliters |
| MS | mass spectra |
| MsCl | Methanesulfonyl chloride |
| MTBE | Tert-butyl methyl ether |
| NMP | 1-methyl-2-pyrrolidine |
| n-BuLi | n-butyllithium |
| NMR | nuclear magnetic resonance |
| Pd$_2$(dba)$_3$ | tris(dibenzylideneacetone)dipalladium(0) |
| Pd(dppf)Cl$_2$•DCM | [1,1'-Bis(diphenylphosphino)ferrocene]dichloropalladium(II), complex with dichloromethane |
| Pd(PPh$_3$)$_4$ | tetrakis(triphenylphosphine)palladium(0) |
| Ph | Phenyl |
| Phen | 1,10-phenanthroline |
| PR or PG or Prot. group | protecting group |
| rbf | round-bottom flask |

-continued

| | |
|---|---|
| RP-HPLC | reverse phase high pressure liquid chromatography |
| RT or rt | room temperature |
| sat. or sat'd | saturated |
| SFC | supercritical fluid chromatography |
| SPhos Pd G3 or SPhos G3 | (2-Dicyclohexylphosphino-2',6'-dimethoxybiphenyl) [2-(2'-amino-1,1'-biphenyl)]palladium(II) methanesulfonate |
| TATU | O-(7-Azabenzotriazole-1-yl)-N,N,N',N'-tetramethyluronium tetrafluoroborate |
| TBAF | tetra-n-butylammonium fluoride |
| t-BuOH | tert-butanol |
| TEA or $Et_3N$ | Trimethylamine |
| TFA | trifluoroacetic acid |
| THF | Tetrahydrofuran |
| TLC | thin layer chromatography |
| $T_3P$ | 2,4,6-Tripropyl-1,3,5,2,4,6-trioxatriphosphinane 2,4,6-trioxide |
| UV | Ultraviolet |
| Xantphos | 4,5-bis(diphenylphosphino)-9,9-dimethylxanthene |
| XtalFluor-M | difluoro(morpholino)sulfonium tetrafluoroborate |

Unless otherwise noted, all materials were obtained from commercial suppliers and used without further purification. All parts are by weight and temperatures are in degrees centigrade unless otherwise indicated. All microwave assisted reactions were conducted with a Smith Synthesizer™ from Biotage™. All compounds showed NMR spectra consistent with their assigned structures. Melting points were determined on a Buchi apparatus and are uncorrected. Mass spectral data was determined by electrospray ionization technique. All examples were purified to >90% purity as determined by high-performance liquid chromatography. Unless otherwise stated, reactions were run at room temperature.

In synthesizing compounds of the present invention, it may be desirable to use certain leaving groups. The term "leaving groups" ("LG") generally refer to groups that are displaceable by a nucleophile. Such leaving groups are known in the art. Examples of leaving groups include, but are not limited to, halides (e.g., I, Br, F, Cl), sulfonates (e.g., mesylate, tosylate), sulfides (e.g., $SCH_3$), N-hydroxysuccinimide, N-hydroxybenzotriazole, and the like. Examples of nucleophiles include, but are not limited to, amines, thiols, alcohols, Grignard reagents, anionic species (e.g., alkoxides, amides, carbanions) and the like.

The examples presented below illustrate specific embodiments of the present invention. These examples are meant to be representative and are not intended to limit the scope of the claims in any manner.

It is noted that when a percent (%) is used with regard to a liquid, it is a percent by volume with respect to the solution. When used with a solid, it is the percent with regard to the solid composition. Materials obtained from commercial suppliers were typically used without further purification. Reactions involving air or moisture sensitive reagents were typically performed under a nitrogen or argon atmosphere. Purity was measured using high performance liquid chromatography (HPLC) system with UV detection at 254 nm and 215 nm (System A: Agilent Zorbax Eclipse XDB-C8 4.6×150 mm, 5 µm, 5 to 100% $CH_3CN$ in $H_2O$ with 0.1% TFA for 15 min at 1.5 mL/min; System B: Zorbax SB-C8, 4.6×75 mm, 10 to 90% $CH_3CN$ in $H_2O$ with 0.1% formic acid for 12 min at 1.0 mL/min) (Agilent Technologies, Santa Clara, CA). Silica gel chromatography was generally performed with prepacked silica gel cartridges (Biotage, Uppsala, Sweden or Teledyne-Isco, Lincoln, NE). $^1H$ NMR spectra were recorded on a Bruker AV-400 (400 MHz) spectrometer (Bruker Corporation, Madison, WI) or a Varian (Agilent Technologies, Santa Clara, Calif) 400 MHz spectrometer at ambient temperature. All observed protons are reported as parts per million (ppm) downfield from tetramethylsilane (TMS) or other internal reference in the appropriate solvent indicated. Data are reported as follows: chemical shift, multiplicity (s=singlet, d=doublet, t=triplet, q=quartet, br=broad, m=multiplet), coupling constants, and number of protons. Low-resolution mass spectral (MS) data were determined on an Agilent 1100 Series (Agilent Technologies, Santa Clara, CA) LC/MS with UV detection at 254 nm and 215 nm and a low resonance electrospray mode (ESI).

General Synthetic Scheme

Unless otherwise stated, starting materials and reagents used in preparing these compounds are either available from commercial suppliers such as Aldrich Chemical Co., (Milwaukee, WI), Bachem (Torrance, Calif.), or Sigma (St. Louis, Mo.) or are prepared by methods known to those skilled in the art following procedures set forth in references such as Fieser and Fieser's Reagents for Organic Synthesis, Volumes 1-17 (John Wiley and Sons, 1991); Rodd's Chemistry of Carbon Compounds, Volumes 1-5 and Supplementals (Elsevier Science Publishers, 1989); Organic Reactions, Volumes 1-40 (John Wiley and Sons, 1991), March's Advanced Organic Chemistry, (John Wiley and Sons, 4th Edition) and Larock's Comprehensive Organic Transformations (VCH Publishers Inc., 1989). These schemes are merely illustrative of some methods by which the compounds of this invention can be synthesized, and various modifications to these schemes can be made and will be suggested to one skilled in the art having referred to this disclosure. The starting materials and the intermediates, and the final products of the reaction may be isolated and purified if desired using conventional techniques, including but not limited to filtration, distillation, crystallization, chromatography and the like. Such materials may be characterized using conventional means, including physical constants and spectral data.

Unless specified to the contrary, the reactions described herein take place at atmospheric pressure over a temperature range from about −78° C. to about 150° C., more preferably from about 0° C. to about 125° C. and most preferably at about room (or ambient) temperature, e.g., about 20° C.

For the purpose of clarity in this general synthesis section, Compounds of Formula (I) can be schematically drawn to contain Ring $Ar^1$ and Ring $Ar^2$ as follows:

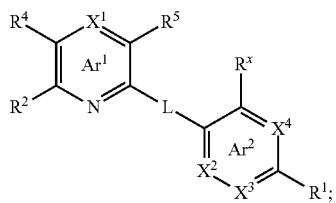

R[1] wherein the group L is a linker as defined in the summary of the inventions, i.e., —NR[3]—(C═O)— or —(C═O)—NR[3]; ring Ar[1] is located to the left of the linker, and ring Ar[2] is located to the right of the linker.

Generally, compounds of Formula (I), can be synthesized via three general steps as follows:

Step 1: Preparation of Ring Ar[1] compound.

Step 2: Preparation of Ring Ar[2] compound.

Step 3: Coupling of Ring Ar[1] compound to Ring Ar[2] compound.

The generic schemes below are meant to provide guidance to the ordinarily skilled synthetic chemist, who will readily appreciate that the solvent, concentration, reagent, protecting group, order of synthetic steps, time, temperature, and the like can be modified as necessary, well within the skill and judgment of the ordinarily skilled artisan.

Scheme A

In one embodiment, a compound of Formula (I) having the following formula (Ia):

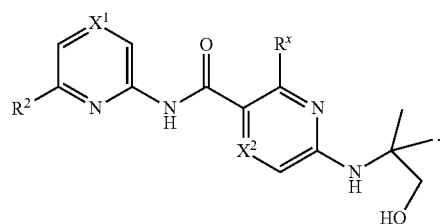

An example of a compound of formula (Ia) includes, but is not limited to:

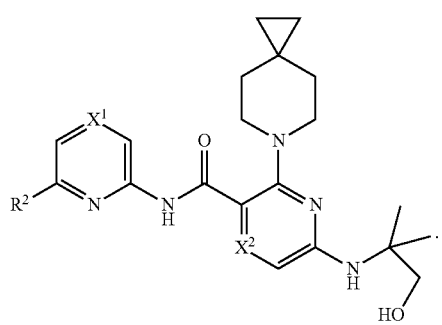

(Ia-1)

Step 1a: Preparation of Ring Ar[1] compound: one embodiment of Ring Ar[1] compounds include compound A-1, having the formula:

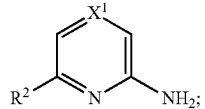

A-1 wherein the groups R[4] and R[5] are independently H; which is commercially available or can be prepared according to known methods and reagents by those skilled in the art. For example, compounds of formula A-1 wherein R[2] is Z—R[12], wherein Z is —C$_{0-4}$alk-, —NR[11]—, or —NR[11]SO$_2$—C$_{0-4}$alk- and R[12] is as defined in the summary of the invention can be prepared from appropriate starting materials as follows:

(1)

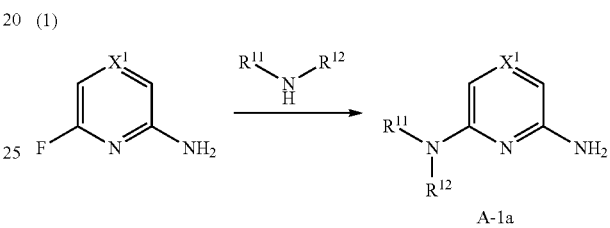

A-1a (2)

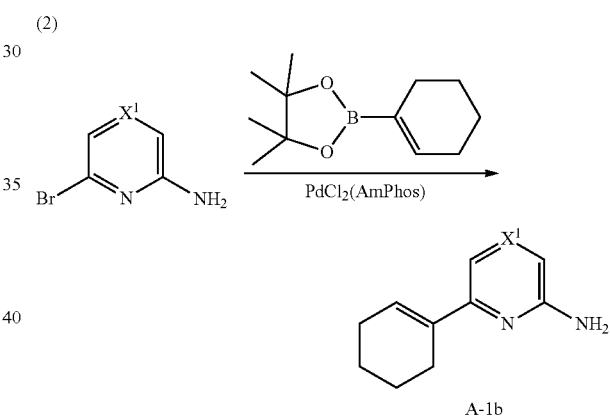

A-1b (3)

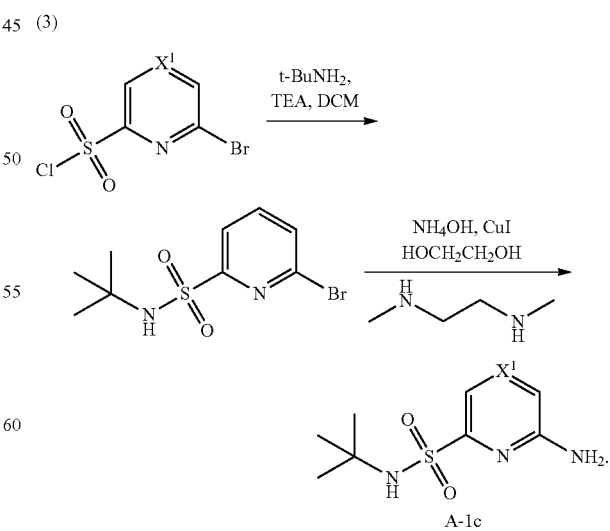

A-1c

Step 2a: Preparation of Ring Ar² Compound:

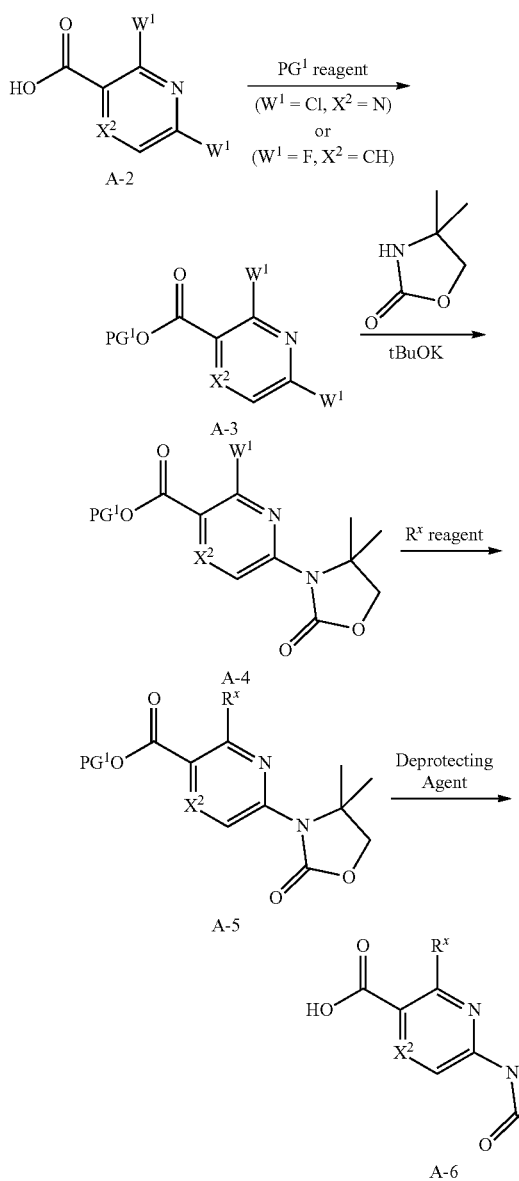

Step 3a: Coupling of Ring Ar¹ Compound to Ring Ar² Compound.

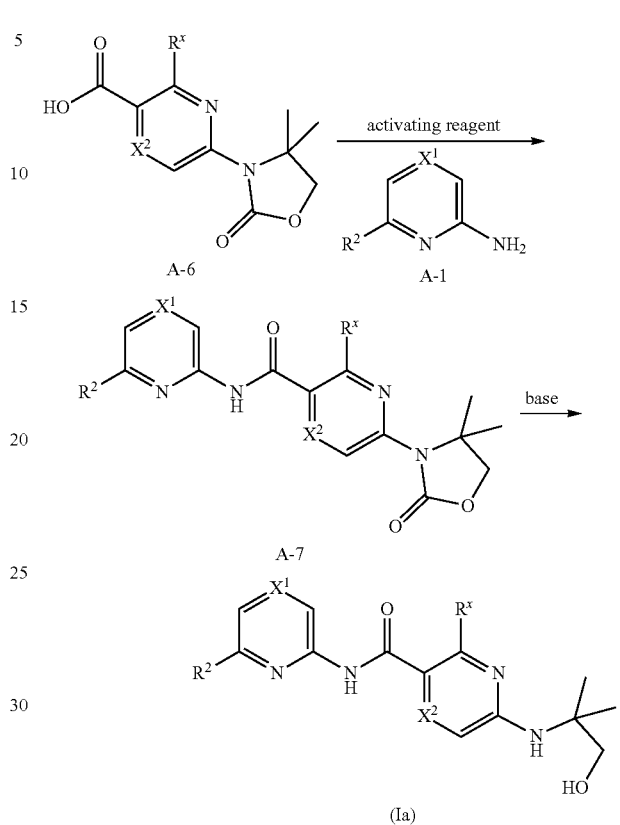

Compound A-2, wherein each $W^1$ is a halogen, for example fluoro or chloro, can be converted to acid chloride (via $SOCl_2$) then reacted with an alcohol $PG^1OH$ to form a methyl ester or benzyl ester, in a suitable organic solvent such as acetonitrile, tetrahydrofuran, methylene chloride, and the like, to form compound A-3. Compound A-3 can then be reacted with 4,4-dimethyloxazolidin-2-one, in the presence of a base, such as tBuOK, in a suitable organic solvent such as tetrahydrofuran, DMF, dioxane, and the like, to form compound A-4, wherein $W^1$ is as defined in compound A-2. Compound A-4 can then be reacted with an $R^x$ reagent, such as (1) 6-azaspiro[2.5]octane, (2) 4,4-dimethylpiperidine, (3) 3,4,4-trimethylpiperidine hydrochloride, (4) 4-methyl-6-azaspiro[2.5]octane, or (5) 7-azaspiro[3.5]nonane, in a suitable organic solvent such as NMP, acetonitrile, tetrahydrofuran, DMF, methylene chloride, and the like, to form compound A-5, which then can be reacted with a suitable deprotecting agent, such as Pd/C in the presence of hydrogen gas, to form compound A-6.

Compound A-6 can then be reacted with an activating agent such as acid chloride $(COCl)_2$ or $SOCl_2$, in a suitable organic solvent such as tetrahydrofuran, methylene chloride, and the like, to form an acid chloride derivative, which can then react with compound A-1 to form compound A-7. Alternatively, compound A-6 can be directly coupled with compound A-1 in the presence of T3P or HATU or TATU to provide compound A-7. Compound A-7 can then be treated with a base, such as NaOH, to afford compound (Ia).

Scheme B

According to Scheme B, in another embodiment of the invention, a compound of Formula (I) as disclosed herein, having the following structures (1b) and (1c):

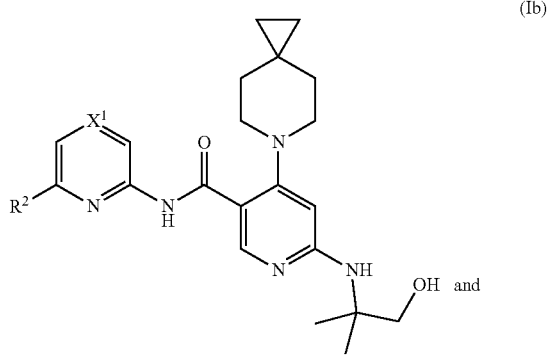

(Ib)

and

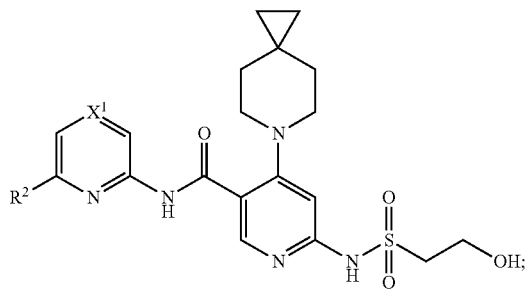

(Ic)

can be synthesized as follows

In another embodiment, a compound of Formula (I) having the following formulae (Ib) or (Ic)

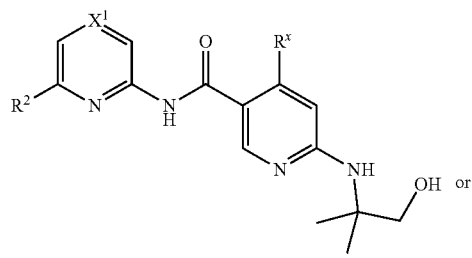

(Ib)

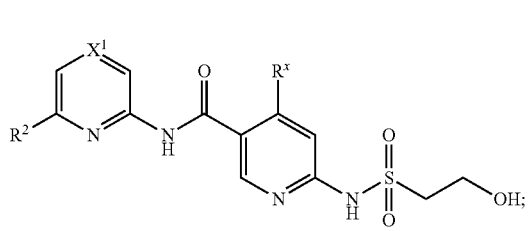

(Ic)

as defined herein can be synthesized according to Scheme B. An example of a compound of formulae (Ib) or (Ic) includes, but is not limited to:

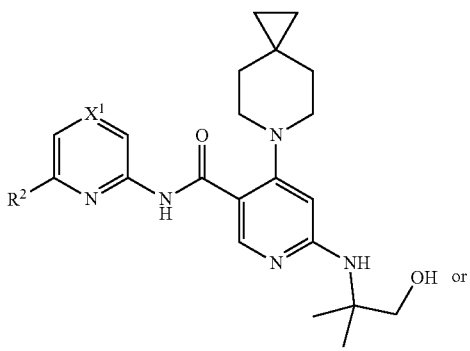

(Ib-1)

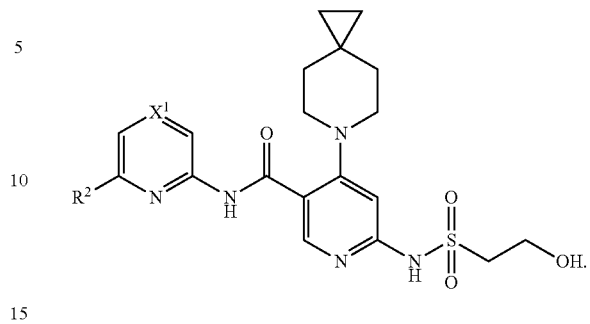

(Ic-1)

Step 1a: Preparation of Ring $Ar^1$ compound: as in Scheme A, compound 1, which is commercially available or can be prepared according to known methods and reagents by those skilled in the art, can be used as an example of Ring $Ar^1$ compound.

Step 2b: Preparation of Ring $Ar^2$ Compound:

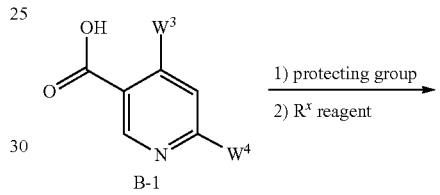

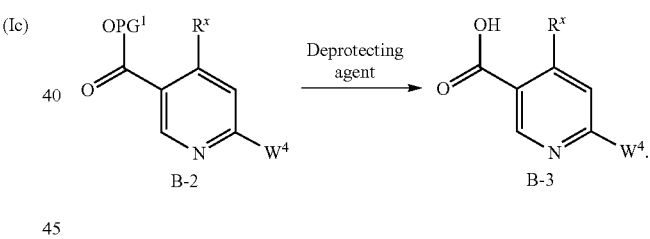

In step 2b, compound B-1, wherein each of $W^3$ and $W^4$, is independently a halogen, for example fluoro, chloro, bromo, or iodo, can be reacted with an appropriate carboxylic acid protecting group ($PG^1$ reagent), such as methyl iodide in the presence of a base such as potassium carbonate, to form a methyl ester, or other appropriate protecting group to form other ester such as benzyl ester, in a suitable organic solvent such as NMP, acetonitrile, tetrahydrofuran, DMF, methylene chloride, and the like, followed by reaction with an $R^x$ reagent, such as (1) 6-azaspiro[2.5]octane, (2) 4,4-dimethylpiperidine, (3) 3,4,4-trimethylpiperidine, (4) 4-methyl-6-azaspiro[2.5]octane, or (5) 7-azaspiro[3.5]nonane, in a suitable organic solvent such as NMP, acetonitrile, tetrahydrofuran, DMF, methylene chloride, and the like, to form compound B-2, wherein $W^4$ is as defined in compound B-1. Examples of compound B-1 includes 4,6-dichloronicotinic acid or 4,6-difluoronicotinic acid. Compound B-2 can then be reacted with a deprotecting agent, which can be a base, such as lithium hydroxide, followed by work up with an acid such as HCl, to form compound B-3, wherein $W^4$ is as defined in compound B-2.

Step 3b: Coupling of Ring Ar¹ Compound to Ring Ar² Compound.

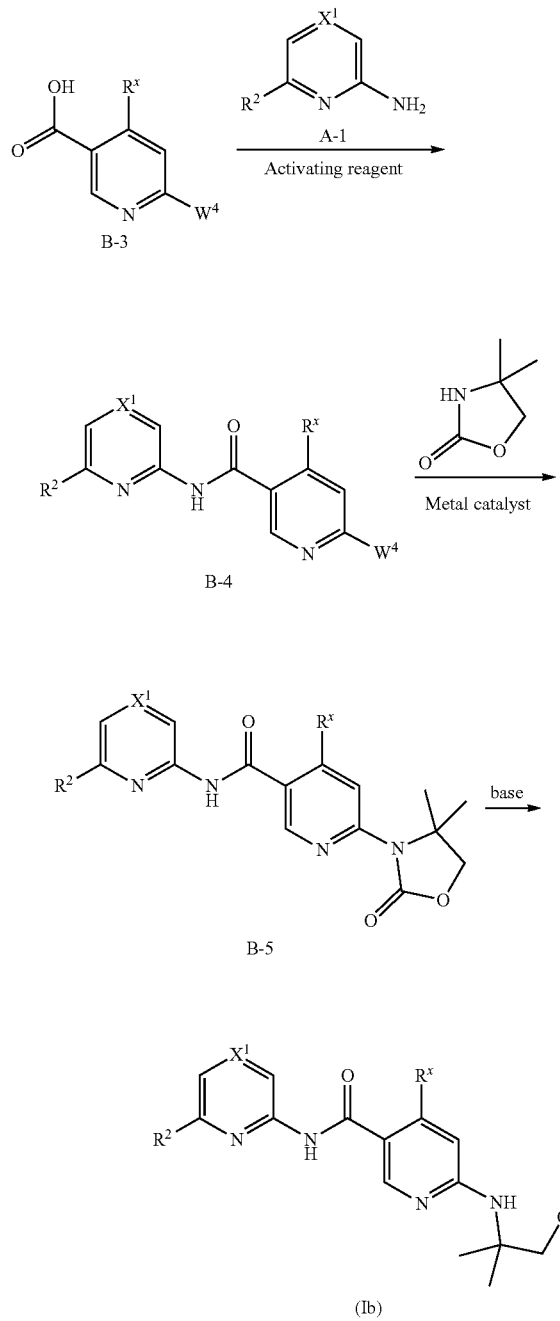

Step 3b-1: Coupling of Ring Ar¹ Compound to Ring Ar² Compound.

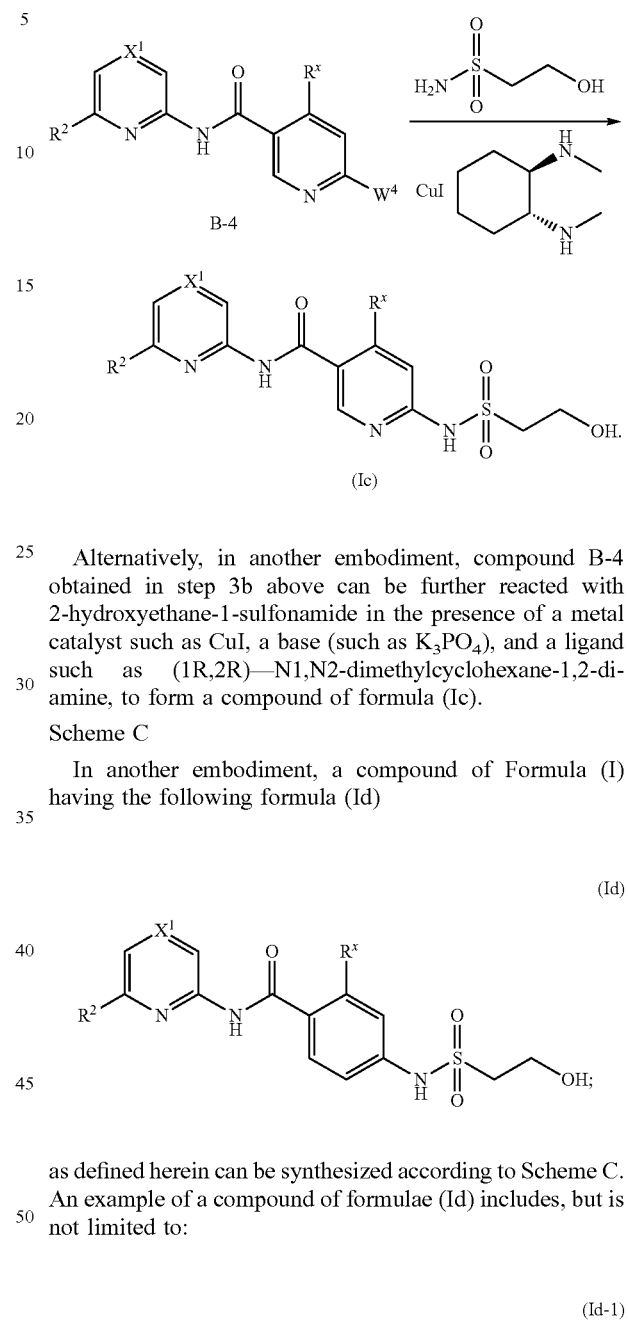

Alternatively, in another embodiment, compound B-4 obtained in step 3b above can be further reacted with 2-hydroxyethane-1-sulfonamide in the presence of a metal catalyst such as CuI, a base (such as $K_3PO_4$), and a ligand such as (1R,2R)—N1,N2-dimethylcyclohexane-1,2-diamine, to form a compound of formula (Ic).

Scheme C

In another embodiment, a compound of Formula (I) having the following formula (Id)

as defined herein can be synthesized according to Scheme C. An example of a compound of formulae (Id) includes, but is not limited to:

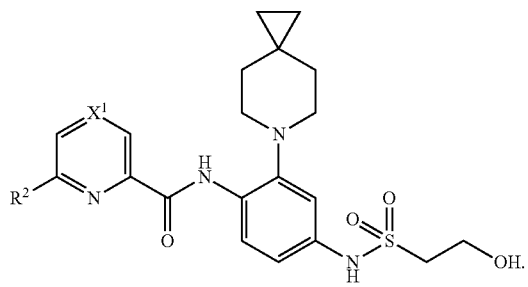

In Step 3b, compound B-3 can then be reacted with compound A-1, in the presence of an activating agent such as 1-propanephosphonic anhydride (T3P) or HATU or TATU, and in the presence of DIPEA, in a suitable organic solvent such as EtOAc, DMF, methylene chloride, DCE, and the like, to form compound B-4, wherein $W^4$ is as defined in compound B-3. Compound B-4 can then be reacted with 4,4-dimethyloxazolidin-2-one, in the presence of a catalyst, such as Xantphos and $Pd_2(dba)_3$, in a suitable organic solvent such as tetrahydrofuran, DMF, dioxane, and the like, to form compound B-5, which can be reacted with a base, such as sodium hydroxide, to form compound (1b).

Step 1c: Preparation of Ring $Ar^1$ compound: one embodiment of Ring $Ar^1$ compounds include compound C-1, having the formula:

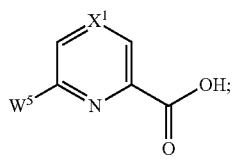

C-1 wherein the groups $R^4$ and $R^5$ are independently H, and $W^5$ is a halogen, for example fluoro, chloro, bromo, or iodo, preferably fluoro, which is commercially available or can be prepared according to known methods and reagents by those skilled in the art.

Step 2b: Preparation of Ring $Ar^2$ Compound:

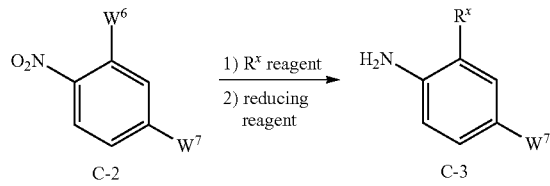

In Step 2b, Compound C-2, wherein each of $W^6$ and $W^7$ is independently a halogen, for example fluoro, chloro, bromo, or iodo, can be reacted with an $R^x$ reagent, such as (1) 6-azaspiro[2.5]octane, (2) 4,4-dimethylpiperidine, (3) 3,4,4-trimethylpiperidine, (4) 4-methyl-6-azaspiro[2.5]octane, or (5) 7-azaspiro[3.5]nonane, in a suitable organic solvent such as NMP, acetonitrile, tetrahydrofuran, DMF, methylene chloride, and the like, followed by nitro reduction, to form compound C-3, wherein $W^7$ is as defined in compound C-2. Example of compound C-2 includes, but is not limited to, 4-bromo-2-fluoro-1-nitrobenzene.

Step 3b: Coupling of Ring $Ar^1$ Compound to Ring $Ar^2$ Compound.

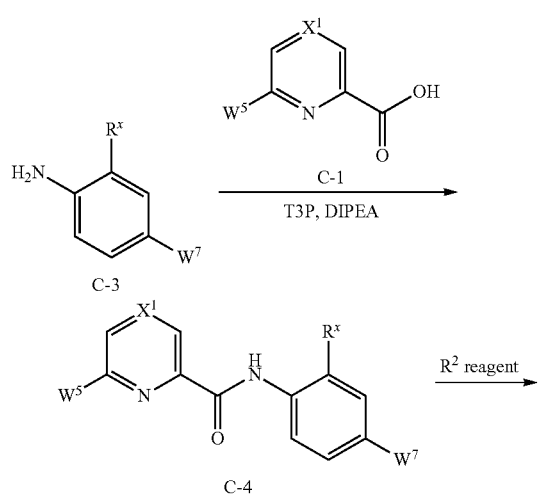

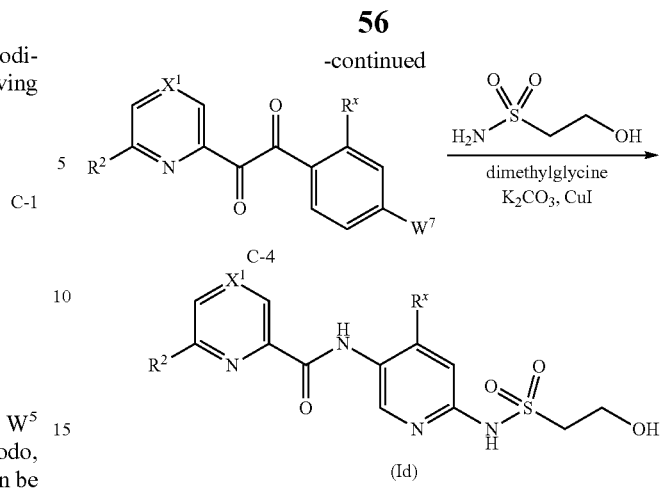

In Step 3b, compound C-3 can then be reacted with compound C-1, in the presence of an activating agent such as T3P or HATU or TATU, and in the presence of DIPEA, in a suitable organic solvent such as, acetonitrile, tetrahydrofuran, DMF, methylene chloride, and the like, to form compound C-4, wherein $W^7$ is as defined in compound C-3. Compound C-4 can then be reacted with an $R^2$ reagent in an elevated temperature, in the presence of a suitable base, in a suitable organic solvent such as NMP, dioxane, acetonitrile, DMSO, DMF, and the like, to form compound C-4, which can then be reacted with 2-hydroxyethane-1-sulfonamide in the presence of a catalyst such as CuI, a ligand such as dimethylglycine, and a base such as potassium phosphate, to form a compound of formula (Id).

EXAMPLES

Preparation of Ring $Ar^1$ Intermediates

Intermediate 1:
(S)-6-(2-methylmorpholino)pyridin-2-amine

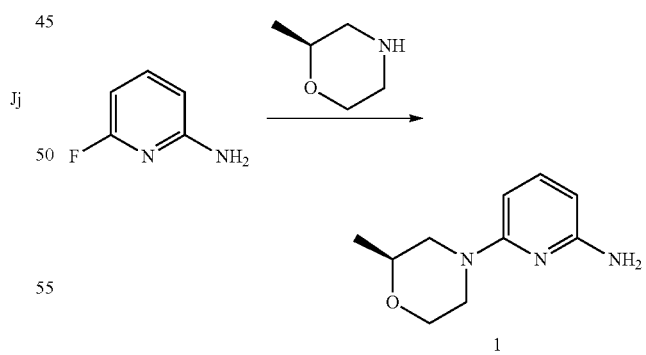

To a microwave vial was charged with 2-amino-6-fluoropyridine (0.20 g, 1.78 mmol), (S)-2-methyl-morpholine (0.50 mL, 4.40 mmol) and water (0.5 mL). The vial was sealed and microwaved at 205° C. for 30 min. The reaction mixture was partitioned between EtOAc and water. The separated organic layer was washed with brine, dried over $Na_2SO_4$ and filtered. The filtrate was concentrated and then purified by silica gel chromatography (0% to 40% EtOAc in heptane) to afford (S)-6-(2-methylmorpholino)pyridin-2-amine (1, 0.26 g, 1.32 mmol, 74% yield) as an off-white solid. $^1$H NMR (400 MHz, CHLOROFORM-d) δ ppm 1.25 (d, J=6.26 Hz, 3H), 2.51 (dd, J=12.52, 10.37 Hz, 1H), 2.87 (td, J=12.28, 3.42 Hz, 1H), 3.61-3.76 (m, 2H), 3.88-4.08 (m, 3H), 4.20 (br s, 2H), 5.91 (d, J=7.63 Hz, 1H), 5.99 (d, J=8.22 Hz, 1H), 7.27-7.33 (m, 1H). m/z (ESI): 194.0 (M+H)$^+$.

Table 1: Intermediates 2-30, 70-72 were prepared in a fashion similar to Intermediate 1.

| Int. # | Chemical Structure | Name | LRMS: (ESI + ve ion) m/z |
|---|---|---|---|
| 2 | | 6-morpholinopyridin-2-amine | 180.0 |
| 3 | | 6-(pyrrolidin-1-yl)pyridin-2-amine | 164.0 |
| 4 | | 6-trans-2,6-dimethylmorpholino)pyridin-2-amine | 208.0 |
| 5 | | 6-(2-oxa-5-azabicyclo[2.2.1]heptan-5-yl)pyridin-2-amine | 192.0 |
| 6 | | (S)-(4-(6-aminopyridin-2-yl)morpholin-2-yl)methanol | 210.0 |
| 7 | | (R)-6-(3-methoxypyrrolidin-1-yl)pyridin-2-amine | 194.0 |
| 8 | | 6-(3,3-dimethylpyrrolidin-1-yl)pyridin-2-amine | 192.0 |

-continued

| Int. # | Chemical Structure | Name | LRMS: (ESI + ve ion) m/z |
|---|---|---|---|
| 9 | | 6-(3,3-difluoropyrrolidin-1-yl)pyridin-2-amine | 200.0 |
| 10 | | 6-(2,2-dimethylmorpholino)pyridin-2-amine | 208.0 |
| 11 | | (R)-1-(6-aminopyridin-2-yl)pyrrolidin-3-ol | 180.0 |
| 12 | | (R)-6-(2-methylmorpholino)pyridin-2-amine | 194.0 |
| 13 | | 6-(4-methylpiperazin-1-yl)pyridin-2-amine | 193.0 |
| 14 | | 6-((1R,5S)-3-azabicyclo[3.1.0]hexan-3-yl)pyridin-2-amine | 176.0 |
| 15 | | (S)-6-(3-methylpyrrolidin-1-yl)pyridin-2-amine | 178.0 |
| 16 | | 6-(3-fluoroazetidin-1-yl)pyridin-2-amine | 168.0 |

-continued

| Int. # | Chemical Structure | Name | LRMS: (ESI + ve ion) m/z |
|---|---|---|---|
| 17 | | 6-(3-methoxyazetidin-1-yl)pyridin-2-amine | 180.0 |
| 18 | | 6-(2-oxa-6-azaspiro[3.3]heptan-6-yl)pyridin-2-amine | 192.0 |
| 19 | | (R)-6-(3-methylmorpholino)pyridin-2-amine | 194.0 |
| 20 | | (S)-6-(3-methylmorpholino)pyridin-2-amine | 194.0 |
| 21 | | tert-butyl 4-(6-aminopyridin-2-yl)piperazine-1-carboxylate | 279.1 |
| 22 | | 2-(4-(6-aminopyridin-2-yl)morpholin-2-yl)propan-2-ol | 238.0 |
| 23 | | 6-(4-isopropylpiperazin-1-yl)pyridin-2-amine | 221.0 |
| 24 | | 6-(4-cyclopropylpiperazin-1-yl)pyridin-2-amine | 219.0 |

-continued

| Int. # | Chemical Structure | Name | LRMS: (ESI + ve ion) m/z |
|---|---|---|---|
| 25 | | 6-(4-cyclobutylpiperazin-1-yl)pyridin-2-amine | 233.0 |
| 26 | | (S)-1-(6-aminopyridin-2-yl)piperidin-3-ol | 194.0 |
| 27 | | (S)-1-(6-aminopyridin-2-yl)-3-methylpiperidin-3-ol | 208.0 |
| 28 | | 1-(6-aminopyridin-2-yl)-3-(hydroxymethyl)piperidin-3-ol | 224.0 |
| 29 | | (1-(6-aminopyridin-2-yl)-2-methylpyrrolidin-2-yl)methanol | 208.0 |
| 30 | | (R)-1-(6-aminopyridin-2-yl)piperidin-3-ol | 194.0 |
| 70 | | 1-(6-aminopyridin-2-yl)-5,5-dimethylpyrrolidin-3-ol | 208.0 |
| 71 | | 1-(6-aminopyridin-2-yl)-2,2-dimethylpyrrolidin-3-ol | 208.0 |
| 72 | | 2-((6-aminopyridin-2-yl)amino)ethan-1-ol | 153.8 |

Intermediate 31: 6-amino-N-(tert-butyl)pyridine-2-sulfonamide

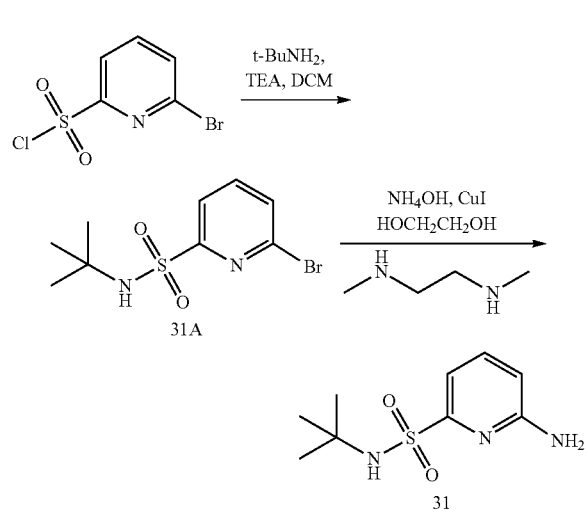

Step 1. To an ice cold solution of 6-bromopyridine-2-sulfonyl chloride (0.50 g, 1.95 mmol, Suzhou Sibian, P. R. China) in DCM (10 mL) was added triethylamine (0.54 mL, 3.90 mmol) followed by tert-butylamine (0.31 mL, 2.92 mmol). The reaction mixture was stirred at RT for 1.5 h and then treated with water (10 mL). It was extract with dichloromethane (3×15 mL). The combined organic extracts were washed with brine (15 mL) and dried over anhydrous $Na_2SO_4$. The solution was filtered and concentrated at reduced pressure to give the crude material as a light-yellow oil. The crude material was purified by silica gel chromatography (17% to 22% ethyl acetate in petroleum ether) to provide 6-bromo-N-(tert-butyl)pyridine-2-sulfonamide (31A, 0.35 g, 1.19 mmol, 61% yield) as an off-white solid. $^1$H NMR (400 MHz, Chloroform-d) δ 7.98 (dd, J=7.6, 0.9 Hz, 1H), 7.75 (t, J=7.8 Hz, 1H), 7.65 (dd, J=8.0, 0.9 Hz, 1H), 4.96 (s, 1H), and 1.27 (s, 9H).

Step 2. A mixture of 6-bromo-N-(tert-butyl)pyridine-2-sulfonamide (31A, 14.50 g, 49.50 mmol), N1,N2-dimethylethane-1,2-diamine (0.44 g, 4.95 mmol), $K_2CO_3$ (1.36 g, 9.89 mmol), copper(I) iodide (0.47 g, 2.473 mmol), aqueous ammonia (100 mL of 21% wt. solution, 970 mmol), and ethylene glycol (100 mL) in a 500 mL sealed tube was stirred at 60° C. for 18 h. The reaction mixture was cooled to RT, diluted with water (150 mL) and extracted with EtOAc (3×100 mL). The combined organic extracts were washed with brine (50 mL), dried over $Na_2SO_4$, and concentrated at reduced pressure to give the crude material as a light-yellow oil. The crude material was purified by silica gel chromatography (5% to 6% methanol in chloroform) to provide 6-amino-N-(tert-butyl)pyridine-2-sulfonamide (31, 6.94 g, 30.3 mmol, 61% yield) as an off white solid. $^1$H NMR (400 MHz, DMSO-$d_6$) δ 7.54 (ddd, J=8.4, 7.2, 1.3 Hz, 1H), 7.21 (s, 1H), 7.03 (dt, J=7.3, 0.9 Hz, 1H), 6.59 (dt, J=8.4, 1.0 Hz, 1H), 6.33 (s, 2H), and 1.12 (d, J=1.3 Hz, 9H). m/z (ESI): 230.1 (M+H)+.

Intermediate 32: 4-methyl-6-morpholinopyridin-2-amine

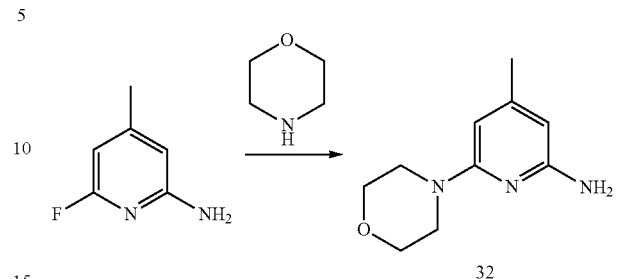

To a 250-mL pressure tube was added 6-fluoro-4-methylpyridin-2-amine (10.0 g, 79 mmol, Suzhou Sibian chemicals, PR China), morpholine (8.3 g, 95 mmol) and DIPEA (41.5 mL, 238 mmol). The tube was sealed and heated at 150° C. for 18 h. The reaction mixture was quenched with water (100 mL) and extracted with EtOAc (2×250 mL). The organic layer was washed with brine (200 mL), dried over $Na_2SO_4$, and concentrated under reduced pressure. The crude residue was purified by silica gel chromatography (1% to 15% EtOAc in hexanes) to give the title compound (32, 8.5 g, 44 mmol, 56% yield) as a brown amorphous solid. $^1$H NMR (400 MHz, DMSO-$d_6$) δ 5.75 (s, 1H), 5.67 (s, 1H), 5.44 (s, 2H), 3.65 (t, J=8.4 Hz, 4H), 3.30 (t, J=8.4 Hz, 4H), 2.06 (s, 3H). m/z (ESI): 194.2 (M+H)+.

Intermediate 33: (R)-1-(6-amino-4-methylpyridin-2-yl)piperidin-3-ol

This compound was prepared in a fashion similar to that described above for Intermediate 32. $^1$H NMR (400 MHz, CHLOROFORM-d) δ ppm 1.50-1.70 (m, 3H), 1.81-1.88 (m, 2H), 2.15 (s, 3H), 3.34-3.56 (m, 3H), 3.61-3.67 (m, 1H), 3.87 (dt, J=6.48, 3.29 Hz, 1H), 4.04-4.21 (m, 2H), 5.72 (s, 1H), 5.90 (s, 1H). m/z (ESI): 208.0 (M+H)+.

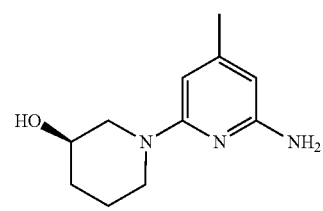

Intermediate 34: (R)-5-fluoro-6-(2-methylmorpholino)pyridin-2-amine

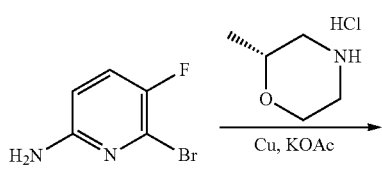

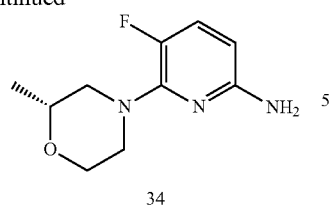

A mixture of 6-bromo-5-fluoropyridin-2-amine (0.90 g, 4.71 mmol), (R)-2-methylmorpholine (0.48 g, 4.71 mmol), potassium acetate (0.92 g, 9.42 mmol) and copper powder (30 mg, 0.471 mmol) in dimethyl sulfoxide (8.10 mL) was heated at 110° C. for 16 h. The reaction mixture was cooled to RT, diluted with water (mL), and extracted with EtOAc (2×10 mL). The organic extracts were washed with brine (10 mL), dried over $Na_2SO_4$, and concentrated in vacuo to give the crude material as a yellow solid. The crude material was purified by silica gel chromatography (0% to 10% EtOAc in hexane) to provide (R)-5-fluoro-6-(2-methylmorpholino)pyridin-2-amine (34, 0.510 g, 2.41 mmol, 51% yield) as a yellow oil. m/z (ESI): 212.0 (M+H)+.

Intermediate 35:
6-(3,6-dihydro-2H-pyran-4-yl)pyridin-2-amine

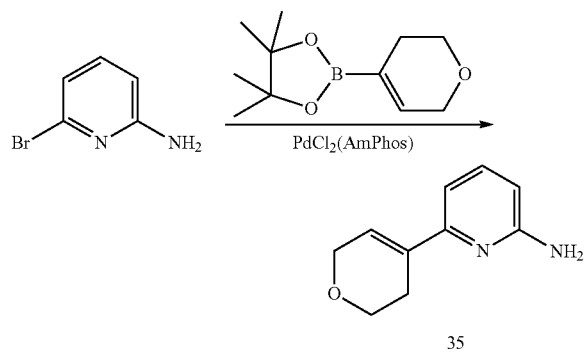

To a pressure vial was charged 6-bromopyridin-2-amine (0.30 g, 1.73 mmol, Aldrich), 2-(3,6-dihydro-2H-pyran-4-yl)-4,4,5,5-tetramethyl-1,3,2-dioxaborolane (0.73 g, 3.47 mmol, Pharma Core), 1,1-bis[(di-t-butyl-p-methylaminophenyl]palladium(II) chloride (0.12 g, 0.17 mmol, Aldrich) and potassium phosphate (1.10 g, 5.20 mmol). The vial was purged with $N_2$ for 3 min. 1,4-Dioxane (3.0 mL) and water (0.9 mL) were added. The vial was sealed and heated in an oil bath at 90° C. for 1 h. The mixture was partitioned between EtOAc and water. The separated organic layer was washed with brine, dried over $Na_2SO_4$ and filtered. The filtrate was concentrated, and the residue was purified by silica gel chromatography (0% to 50% EtOAc in heptane) to afford 6-(3,6-dihydro-2H-pyran-4-yl)pyridin-2-amine (35, 0.13 g, 0.73 mmol, 42% yield) as a light yellow solid. $^1$H NMR (400 MHz, CHLOROFORM-d) δ ppm 2.52-2.60 (m, 2H) 3.91 (t, J=5.48 Hz, 2H) 4.32-4.43 (m, 4H) 6.39 (d, J=8.02 Hz, 1H) 6.66 (tt, J=2.89, 1.52 Hz, 1H) 6.71 (d, J=7.43 Hz, 1H) 7.41 (t, J=7.83 Hz, 1H). m/z (ESI): 177.0 (M+H)+.

Intermediate 36:
1-(6-aminopyridin-2-yl)pyrrolidin-2-one

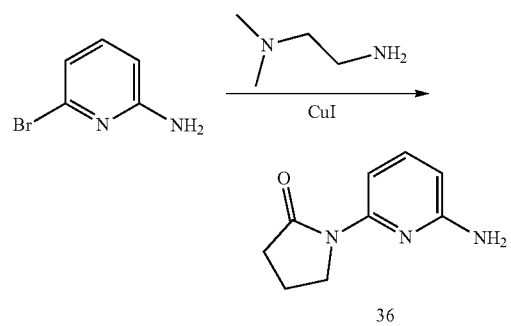

A mixture of 2-amino-6-bromopyridine (402 mg, 2.32 mmol), copper(I) iodide (22 mg, 0.116 mmol), cesium carbonate (1514 mg, 4.65 mmol), N,N-dimethylethylenediamine (0.025 mL, 0.232 mmol), and 2-pyrrolidinone (0.265 mL, 3.49 mmol) in 1,4-dioxane (4 mL) was heated in an oil bath at 110° C. for 18 h. The reaction mixture was cooled to RT, filtered through a pad of celite, and concentrated. The residue was purified by silica gel chromatography (0% to 40% EtOAc in heptane) to provide 1-(6-aminopyridin-2-yl)pyrrolidin-2-one (36, 49 mg, 0.28 mmol, 12% yield) as a white solid. m/z (ESI): 178.0 (M+H)+.

Intermediate 37: 1-(6-aminopyridin-2-yl)-4,4-dimethylpyrrolidin-2-one

This compound was prepared in a fashion similar to that described above for Intermediate 36. m/z (ESI): 206.0 (M+H)+.

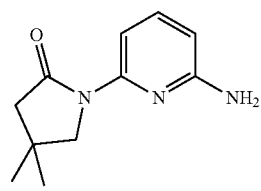

Intermediate 38:
6-(piperidin-1-ylsulfonyl)pyridin-2-amine

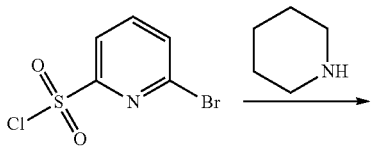

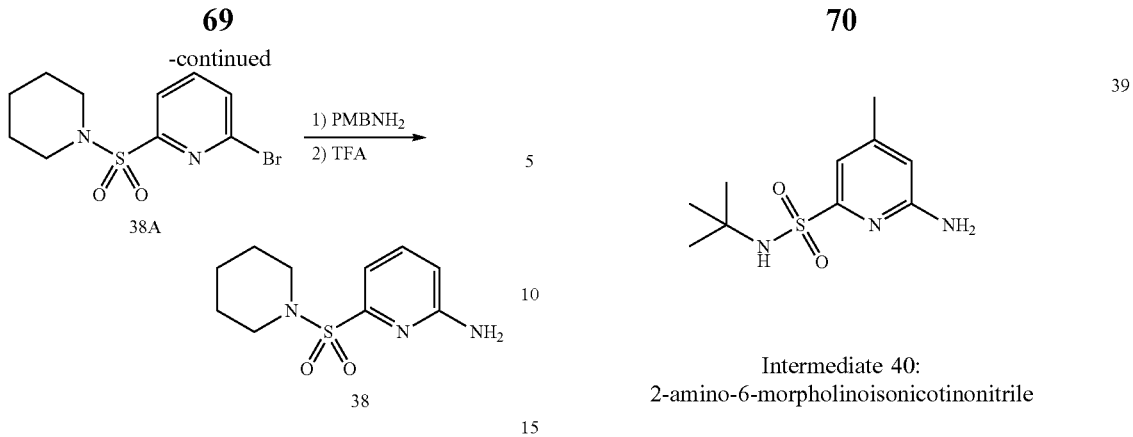

Step 1. To a solution of 6-bromo-pyridine-2-sulfonyl chloride (519 mg, 2.023 mmol, J & W PharmLab, LLC) and DCM (20 mL) was added N,N-diisopropylethylamine (0.70 mL, 4.05 mmol) and piperidine (0.20 mL, 2.02 mmol, Aldrich). The solution was stirred at RT for 15 h then loaded on a silica gel column and eluted with 0% to 50% EtOAc in heptane to provide 2-bromo-6-(piperidin-1-ylsulfonyl)pyridine (37A, 585 mg, 1.92 mmol, 95% yield) as a white solid. m/z (ESI): 305.0, 307.0 (M+H)+.

Step 2. To a solution of 2-bromo-6-(piperidin-1-ylsulfonyl)pyridine (37A, 580 mg, 1.90 mmol) and 1,4-dioxane (20 mL) was added 4-methoxybenzylamine (0.248 mL, 1.900 mmol, Aldrich) and N,N-diisopropylethylamine (0.36 mL, 2.09 mmol). The solution was heated in an oil bath at 100° C. for 4 d. It was cooled to RT and loaded on a silica gel column (0% to 50% EtOAc in heptane) to provide N-(4-methoxybenzyl)-6-(piperidin-1-ylsulfonyl)pyridin-2-amine (486 mg, 1.34 mmol, 70% yield) as a white solid. $^1$H NMR (400 MHz, DMSO-$d_6$) δ ppm 7.67 (t, J=5.9 Hz, 1H), 7.57 (dd, J=8.4, 7.2 Hz, 1H), 7.22 (m, J=8.6 Hz, 2H), 6.94 (d, J=7.0 Hz, 1H), 6.85-6.89 (m, 2H), 6.75 (d, J=8.4 Hz, 1H), 4.41 (d, J=5.9 Hz, 2H), 3.71 (s, 3H), 2.88-2.96 (m, 4H), 1.35-1.46 (m, 4H), 1.22-1.31 (m, 2H). m/z (ESI): 362.1 (M+H)+.

Step 3. To a RBF charged with N-(4-methoxybenzyl)-6-(piperidin-1-ylsulfonyl)pyridin-2-amine (486 mg, 1.34 mmol) was added TFA (1 mL, 12.98 mmol). The solution was stirred at 80° C. After 1.5 h, the reaction mixture was cooled to RT and concentrated in vacuo. The mixture was azeotroped with toluene (20 mL) once, then taken up in EtOAc and washed with sat'd NaHCO$_3$. The EtOAc layer was concentrated in vacuo and adsorbed onto a plug of silica gel and chromatographed through a Redi-Sep® pre-packed silica gel column (Gold, 4 g), eluting with 0% to 50% EtOAc in heptane, to provide 6-(piperidin-1-ylsulfonyl)pyridin-2-amine (38, 315 mg, 1.31 mmol, 97% yield) as a light yellow solid. $^1$H NMR (400 MHz, DMSO-$d_6$) δ ppm 7.57 (dd, J=8.2, 7.4 Hz, 1H), 6.94 (d, J=7.0 Hz, 1H), 6.63 (d, J=8.2 Hz, 1H), 6.52 (s, 2H), 3.07-3.15 (m, 4H), 1.47-1.55 (m, 4H), 1.43 (br d, J=4.5 Hz, 2H). m/z (ESI): 242.0 (M+H)+.

Intermediate 39: 6-amino-N-(tert-butyl)-4-methylpyridine-2-sulfonamide

This compound was prepared in a fashion similar to that described for 6-amino-N-(tert-butyl)pyridine-2-sulfonamide (Intermediate 31).

m/z (ESI): 244.0 (M+H)+.

Intermediate 40: 2-amino-6-morpholinoisonicotinonitrile

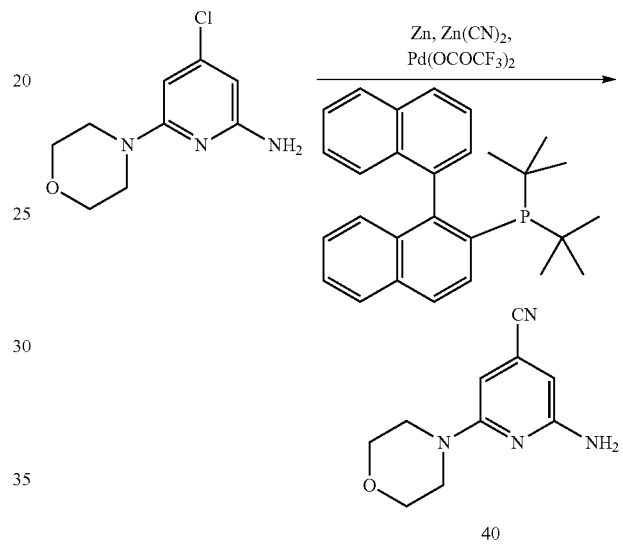

4-Chloro-6-morpholinopyridin-2-amine (0.5 g, 2.34 mmol, Aldrich), zinc dust (0.061 g, 0.936 mmol, Aldrich), racemic 2-(di-t-butylphosphino)-1,1'-binaphthyl (0.187 g, 0.468 mmol, Strem), zinc cyanide (0.330 g, 2.81 mmol, Aldrich), palladium(II) trifluoroacetate (78 mg, 0.234 mmol, Aldrich) and DMF (4.68 mL) were added to a 20 mL vial. The vial was evacuated and refilled with nitrogen 3× with stirring. The mixture was heated at 120° C. for 15 h. The mixture was purified by chromatography on silica gel (40 g, 0-100% EA in heptane) to provide 2-amino-6-morpholinoisonicotinonitrile (Intermediate 40, 0.24 g, 1.17 mmol, 50% yield). m/z ESI 205.1 (M+H)+.

Intermediate 73: 4-cyclopropyl-6-morpholinopyridin-2-amine

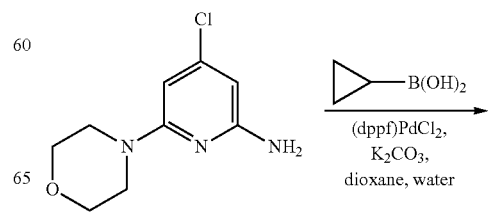

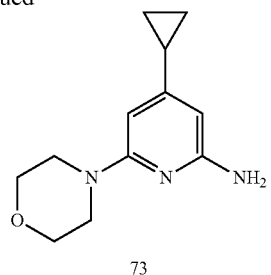

73

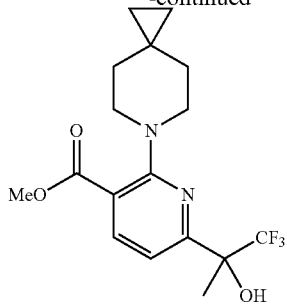

41C

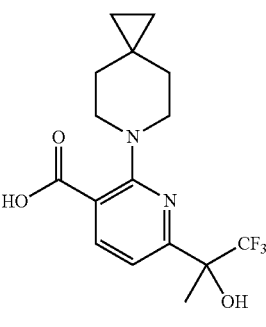

41

4-Chloro-6-morpholinopyridin-2-amine (0.52 g, 2.43 mmol), {1,1'-bis(diphenylphosphino)ferrocene} dichloropalladium(II) (0.356 g, 0.487 mmol), cyclopropyl boronic acid (0.042 g, 0.489 mmol) and potassium carbonate (0.673 g, 4.87 mmol) were dissolved in dioxane-water 8:1 (4.87 mL) in a 20 mL vial. The solution was degassed with vacuum/$N_2$ purges 3×, the vial was sealed and heated at 80° C. for 24 h to achieve ~50% conversion. The reaction mixture was purified by chromatography on silica gel (40 g, 0% to 100% EA in heptane) to provide 4-cyclopropyl-6-morpholinopyridin-2-amine (0.30 g, 1.36 mmol, 56% yield). m/z ESI 220.1 (M+H)$^+$.

Preparation of Ring $Ar^2$ Intermediates

Intermediate 41: 2-(6-azaspiro[2.5]octan-6-yl)-6-(1,1,1-trifluoro-2-hydroxypropan-2-yl)nicotinic acid

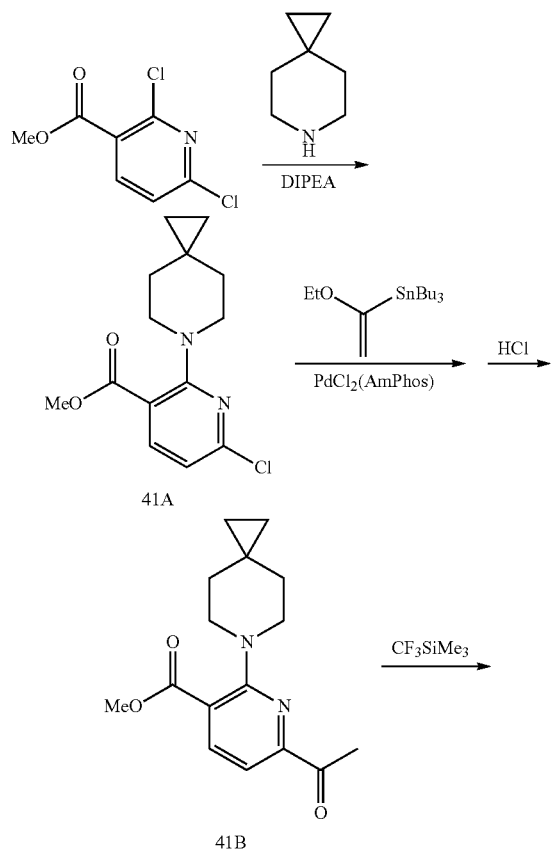

Step 1. A mixture of methyl 2,6-dichloronicotinate (5.0 g, 24.3 mmol, Combi-Blocks), N,N-diisopropylethylamine (4.7 mL, 26.7 mmol), and 6-azaspiro[2.5]octane (2.70 g, 24.27 mmol, AstaTech, Inc.) in acetonitrile (50 mL) was stirred at RT for 24 h. The mixture was concentrated, and the residue was purified via silica gel chromatography (0% to 30% EtOAc in Heptane) to give methyl 6-chloro-2-(6-azaspiro[2.5]octan-6-yl)nicotinate (41A, 4.34 g, 15.46 mmol, 64% yield). m/z (ESI): 281.0 (M+H)$^+$.

Step 2. A mixture of methyl 6-chloro-2-(6-azaspiro[2.5]octan-6-yl)nicotinate (41A, 4.10 g, 14.60 mmol), tributyl(1-ethoxyvinyl)tin (5.80 g, 16.06 mmol, Aldrich), and bis-(di-tert-butyl(4-dimethylaminophenyl)phosphine) dichloropalladium (II) (0.41 g, 0.58 mmol, Aldrich) in toluene (30 mL) was stirred at 90° C. for 16 h. The reaction mixture was cooled to RT and treated with HCl (4 M in dioxane, 18.25 mL, 73.00 mmol) and stirred for 2 h. The reaction mixture was then filtered through a pad of Celite and washed with EtOAc. The filtrate was washed with sat'd aqueous $NaHCO_3$, dried, filtered, and concentrated. The residue was purified by ISCO (0% to 30% EtOAc in Heptane) to give methyl 6-acetyl-2-(6-azaspiro[2.5]octan-6-yl)nicotinate (41B, 2.75 g, 9.54 mmol, 65% yield). $^1$H NMR (400 MHz, DMSO-$d_6$) δ ppm 8.02 (d, J=7.8 Hz, 1H), 7.28 (d, J=7.6 Hz, 1H), 3.84 (s, 3H), 3.38-3.51 (m, 4H), 2.57 (s, 3H), 1.33-1.53 (m, 4H), 0.35 (s, 4H).

Step 3. To a stirred solution of methyl 6-acetyl-2-(6-azaspiro[2.5]octan-6-yl)nicotinate (41B, 2.50 g, 8.67 mmol) in tetrahydrofuran (1 mL) was added (trifluoromethyl)trimethylsilane (1.54 mL, 10.40 mmol, Aldrich) at 0° C. After the addition, the mixture was stirred for 2 h. The solid was filtered off and washed with EtOAc. The filtrate was concentrated and adsorbed onto a plug of silica gel and chromatographed through a Redi-Sep® pre-packed silica gel column (Gold, 12 g), eluting with 0% to 30% EtOAc in heptane, to provide methyl 2-(6-azaspiro[2.5]octan-6-yl)-6-(1,1,1-trifluoro-2-hydroxypropan-2-yl)nicotinate (41C, 2.87 g, 8.01 mmol, 92% yield). $^1$H NMR (400 MHz, CHLOROFORM-d) δ ppm 8.05 (d, J=7.8 Hz, 1H), 6.85 (d, J=7.8 Hz, 1H), 6.01 (s, 1H), 3.91 (s, 3H), 3.39-3.56 (m, 4H), 1.69 (s, 3H), 1.45-1.53 (m, 4H), 0.38 (s, 4H). m/z (ESI): 359.0 (M+H)+.

Step 4. To a stirred solution of methyl 2-(6-azaspiro[2.5] octan-6-yl)-6-(1,1,1-trifluoro-2-hydroxypropan-2-yl)nicotinate (41C, 2.87 g, 8.01 mmol) in MeOH (20 mL) at RT was added aqueous NaOH (8.0 mL of 5 M solution, 40.0 mmol). After the addition, the reaction mixture was stirred for 3 d. The reaction mixture was concentrated, diluted with H₂O, acidified with 5 N aqueous HCl (to pH ~4). The precipitated solid was collected, washed with H₂O, and dried to give 2-(6-azaspiro[2.5]octan-6-yl)-6-(1,1,1-trifluoro-2-hydroxy-propan-2-yl)nicotinic acid (41, 2.70 g, 98% yield). ¹H NMR (400 MHz, DMSO-d₆) δ ppm 13.23 (br s, 1H), 7.97 (d, J=7.8 Hz, 1H), 7.15 (d, J=7.8 Hz, 1H), 6.62 (s, 1H), 3.36-3.43 (m, 4H), 1.65 (s, 3H), 1.33-1.44 (m, 4H), 0.33 (s, 4H). m/z (ESI): 345.0 (M+H)+.

Intermediate 42: 3-chloro-5-((1-hydroxy-2-methyl-propan-2-yl)amino)pyrazine-2-carboxylic acid

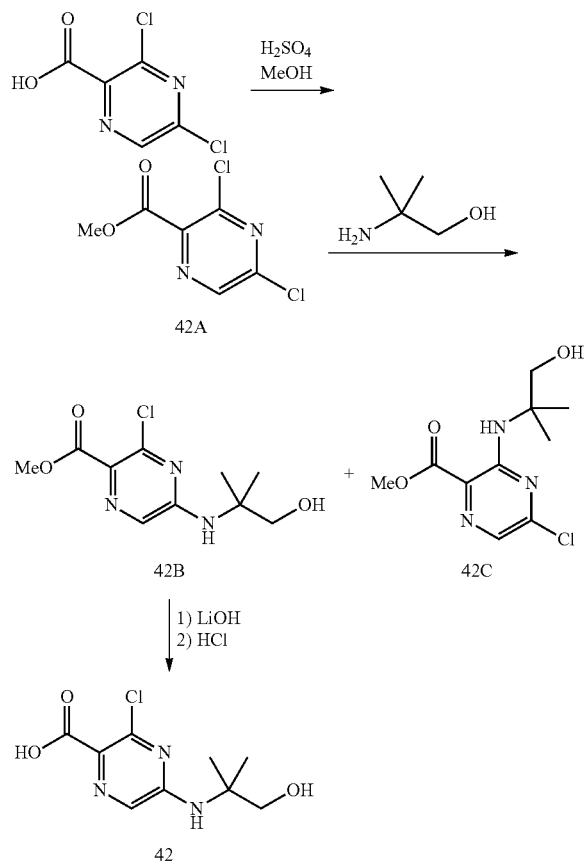

Step 1. To a solution of 3,5-dichloropyrazine-2-carboxylic acid (3.25 g, 16.84 mmol, Frontier Scientific, Inc.) and MeOH (20 mL) was added 10 drops of conc. sulfuric acid. The reaction was stirred at reflux. After 16 h, LC-MS suggest complete conversion. The reaction was cooled to RT and concentrated in vacuo. The material was taken up in EtOAc (25 mL) and washed with sat'd NaHCO₃ (20 mL). The aqueous layer was back extracted with EtOAc (2×20 mL). The combined EtOAc layers were dried over MgSO₄ and concentrated in vacuo to give crude methyl 3,5-dichloropyrazine-2-carboxylate (42A, 3.15 g, 15.22 mmol, 90% yield) as a brown solid. The material was carried forward without any further purification. ¹H NMR (400 MHz, CHLOROFORM-d) δ ppm 8.58 (s, 1H), 4.04 (s, 3H).

Step 2. To a solution of methyl 3,5-dichloropyrazine-2-carboxylate (42A, 2.02 g, 9.78 mmol) and DSMO (40 mL) was added N,N-diisopropylethylamine (3.41 mL, 19.56 mmol) and 2-amino-2-methyl-1-propanol (0.934 mL, 9.78 mmol, Aldrich). The solution was stirred at RT for 4 d then treated with water (150 mL) and extracted with EtOAc (5×20 mL). The combined EtOAc layers were concentrated in vacuo and adsorbed onto a plug of silica gel and chromatographed through a Redi-Sep® pre-packed silica gel column (Gold, 40 g), eluting with 0% to 75% EtOAc in heptane, to provide methyl 3-chloro-5-((1-hydroxy-2-methylpropan-2-yl)amino)pyrazine-2-carboxylate (42B, 1.463 g, 5.63 mmol, 57.6% yield) as an orange solid. ¹H NMR (400 MHz, DMSO-d₆) δ ppm 7.94 (s, 1H), 7.80 (s, 1H), 4.84 (t, J=5.9 Hz, 1H), 3.78 (s, 3H), 3.55 (d, J=5.9 Hz, 2H), 1.31 (s, 6H). m/z (ESI): 260.0 (M+H)+. Methyl 5-chloro-3-((1-hydroxy-2-methylpropan-2-yl)amino)pyrazine-2-carboxylate (42C, 0.563 g, 2.168 mmol, 22.16% yield) was also isolated as an orange solid. ¹H NMR (400 MHz, DMSO-d₆) δ ppm 8.42 (s, 1H), 7.88 (s, 1H), 5.09 (t, J=5.5 Hz, 1H), 3.84 (s, 3H), 3.49 (d, J=5.5 Hz, 2H), 1.36 (s, 6H). m/z (ESI): 260.0 (M+H)+.

Step 3. To a solution of methyl 3-chloro-5-((1-hydroxy-2-methylpropan-2-yl)amino)pyrazine-2-carboxylate (42B, 1.46 g, 5.62 mmol) in THF (40 mL) and MeOH (13 mL) was added LiOH (20 mL of 1 M aqueous solution, 20.00 mmol). The resulting dark brown solution was stirred at RT for 16 h then concentrated in vacuo to removed organic solvents. The aqueous solution was neutralized with 2 N HCl to ~pH 7 then extracted with EtOAc until no significant product (m/z (ESI): 246.0 (M+H)+) was seen by LCMS. The combined organic layers were concentrated in vacuo to give 3-chloro-5-((1-hydroxy-2-methylpropan-2-yl)amino)pyrazine-2-carboxylic acid (42, 1.15 g, 4.68 mmol, 83% yield) as a yellow solid. m/z (ESI): 246.1 (M+H).

Intermediate 43: 3-chloro-5-((1-(hydroxymethyl)cyclopropyl)amino)pyrazine-2-carboxylic acid m/z (ESI): 244.1 (M+H)+. This compound was prepared in a fashion similar to that described above for Intermediate 42.

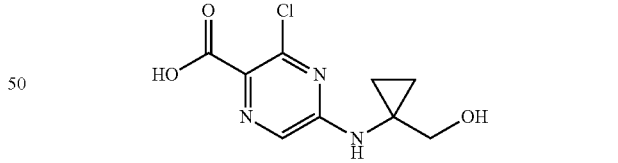

Intermediate 44: 5-(4,4-dimethyl-2-oxooxazolidin-3-yl)-3-(6-azaspiro[2.5]octan-6-yl)pyrazine-2-carboxylic acid

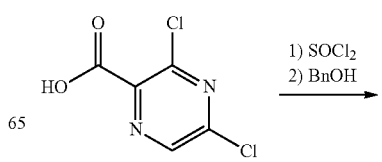

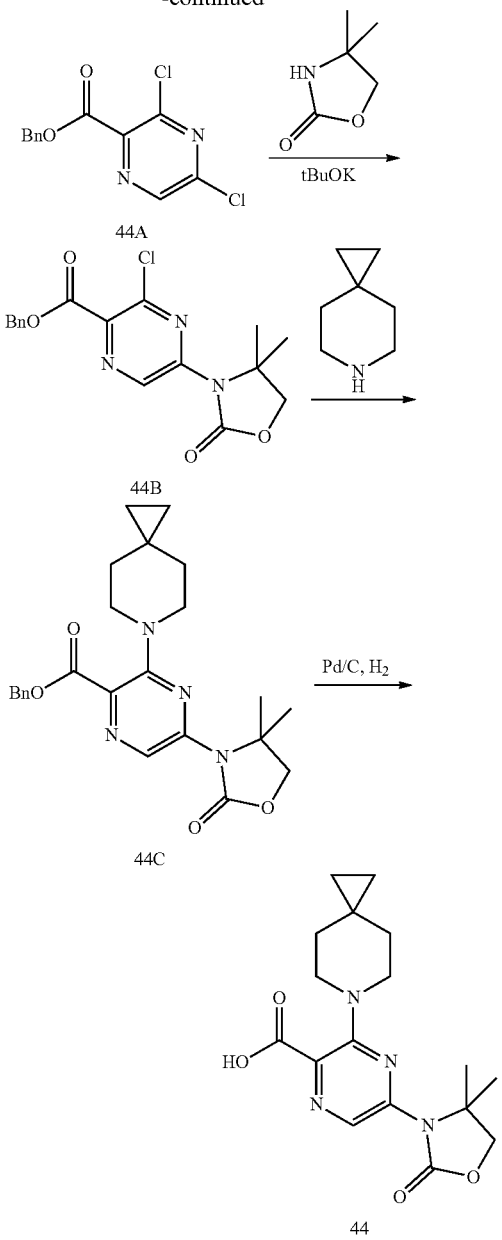

Step 1. A mixture of 3,5-dichloropyrazine-2-carboxylic acid (17.0 g, 88 mmol) in thionyl chloride (50 mL, 820 mmol) was heated in an oil bath at 90° C. for 16 h. The dark solution was evaporated to dryness under reduced pressure. The crude oil was dissolved in toluene (120 mL) and evaporated to dryness once more before placing the crude acid chloride under house vac. Benzyl alcohol (10 ml, 96 mmol) and triethylamine (25 mL, 178 mmol) were dissolved in dry tetrahydrofuran (100 mL) and cooled in an ice bath. The crude acid chloride was added slowly keeping the internal temperature <35° C. Once the addition was complete the mixture was removed from the cold bath and stirred for another 10 min. Sat'd ammonium chloride (75 mL), water (100 mL), and ethyl acetate (200 mL) were added and the phases mixed and separated. The organic layer was evaporated to dryness under reduced pressure and purified on a silica gel column (10% to 40% ethyl acetate in heptane) to give benzyl 3,5-dichloropyrazine-2-carboxylate (44A, 22.4 g, 79 mmol, 90% yield). m/z (ESI): 304.8 (M+Na)$^+$.

Step 2. 4,4-Dimethyloxazolidin-2-one (4.1 g, 35.6 mmol) was dissolved in dimethylformamide (80 mL) in a jacketed reactor. The temperature was set to 15° C. Potassium tert-butoxide solution (1.0 M in THF, 35.5 mL, 35.5 mmol) was added and the mixture became a thick gel. A solution of benzyl 3,5-dichloropyrazine-2-carboxylate (44A, 10.0 g, 35.3 mmol) in dimethylformamide (50 mL) was added in one portion. The reaction mixture turned reddish brown. The stirring rate was increased to 400 rpm to help homogenize the mixture. The gel was slowly incorporated into the reaction. Water (100 mL), sat'd ammonium chloride (50 mL) and ethyl acetate (100 mL) were added and the mixture stirred for 5 min. The aqueous was allowed to settle then drained. The organic was washed with water (100 mL) then dried over Na$_2$SO$_4$ and evaporated to dryness under reduced pressure. Purification on a silica gel column (0% to 100% ethyl acetate in heptane) gave benzyl 3-chloro-5-(4,4-dimethyl-2-oxooxazolidin-3-yl)pyrazine-2-carboxylate (44B, 10.7 g, 29.6 mmol, 84% yield) as an off-white solid. m/z (ESI): 362.3 (M+H)$^+$.

Step 3. Benzyl 3-chloro-5-(4,4-dimethyl-2-oxooxazolidin-3-yl)pyrazine-2-carboxylate (10.7 g, 29.6 mmol), 6-azaspiro[2.5]octane (44B, 3.5 g, 31.5 mmol), and cesium carbonate (12 g, 36.8 mmol) were combined in DMF (75 mL) under nitrogen. The mixture was stirred at RT for 16 h. Water (200 mL) and ethyl acetate (200 mL) were added and the phases mixed and separated. The organic was washed with water (200 mL) then evaporated to dryness under reduce pressure. The crude material was suspended in methyl tert-butyl ether (50 mL) and stirred for 10 min. Heptane (50 mL) was added slowly and the mixture stirred for another 10 min. It was filtered through a sintered glass frit and the solid washed with 2:1 heptane:methyl tert-butyl ether (10 mL). The solid was dried under house vac to give benzyl 5-(4,4-dimethyl-2-oxooxazolidin-3-yl)-3-(6-azaspiro[2.5]octan-6-yl)pyrazine-2-carboxylate (44C, 12.2 g, 27.9 mmol, 95% yield) as a light yellow solid. The filtrate was evaporated to dryness under reduced pressure to give a yellow oil (0.7 g). Purification using the ISCO (heptane to ethyl acetate gradient) gave another 0.5 g of Intermediate 44C. m/z (ESI): 437.2 (M+H)$^+$.

Step 4. Benzyl 5-(4,4-dimethyl-2-oxooxazolidin-3-yl)-3-(6-azaspiro[2.5]octan-6-yl)pyrazine-2-carboxylate (44C, 12.2 g, 27.9 mmol) was dissolved in a 1:1 mixture of dichloromethane:ethanol (120 mL). palladium on carbon (50 wt % water, 5 wt % (dry basis) Pd (0.350 g, 0.082 mmol) was added and the suspension hydrogenated under 40 psi. After 1 h hydrogen uptake seemed to have ceased and LC/MS found the starting material had been consumed. The suspension was filtered through a pad of celite and the solid was washed with dichloromethane (10 mL). The filtrate was evaporated to dryness under reduced pressure to give 5-(4,4-dimethyl-2-oxooxazolidin-3-yl)-3-(6-azaspiro[2.5]octan-6-yl)pyrazine-2-carboxylic acid (44, 9.17 g, 26.5 mmol, 95% yield) as a light yellow solid. $^1$H NMR (400 MHz, CHLOROFORM-d) δ ppm 10.1 (br., 1H) 8.60-8.78 (m, 1H) 4.06-4.26 (m, 2H) 3.49-3.63 (m, 4H) 1.65-1.81 (m, 6H) 1.49-1.61 (m, 4H) 0.34-0.50 (m, 4H). m/z (ESI): 347.1 (M+H)$^+$.

Intermediate 45: 5-(5-oxo-6-oxa-4-azaspiro[2.4]heptan-4-yl)-3-(6-azaspiro[2.5]octan-6-yl)pyrazine-2-carboxylic acid m/z (ESI): 345.2 (M+H)$^+$. This compound was prepared in a fashion similar to that described above for Intermediate 44.

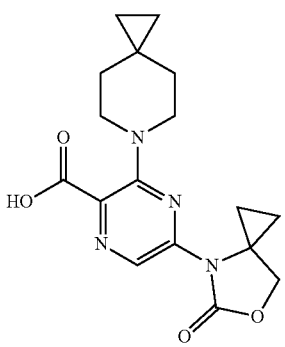

Intermediate 46: 3-(6-azaspiro[2.5]octan-6-yl)-5-(1,1,1-trifluoro-2-hydroxypropan-2-yl)pyrazine-2-carboxylic acid Step 1. A mixture of benzyl 3,5-dichloropyrazine-2-carboxylate (44A, 3.03 g, 10.70 mmol), tributyl(1-ethoxyvinyl)tin (4.25 g, 11.77 mmol, Aldrich), and bis-(di-tert-butyl(4-dimethylaminophenyl)phosphine)dichloropalladium(ii) (0.30 g, 0.42 mmol) in toluene (1 mL) was heated at 80° C. in 2 h. The reaction mixture was cooled to RT and treated with 15 mL of 1 M KF solution and stirred for 30 min. The mixture was diluted with t-butyl methyl ether; the precipitated solid was filtered off and washed with heptane. The filtrate was separated. The organic layer was dried over MgSO$_4$, filtered, and concentrated. The residue was purified on a silica gel column (10% EtOAc/Heptane) to give 46A (3.03 g) which contained a mixture of benzyl 3-chloro-5-(1-ethoxyvinyl)pyrazine-2-carboxylate and benzyl 5-chloro-3-(1-ethoxyvinyl)pyrazine-2-carboxylate. m/z (ESI): 319.5 (M+H)$^+$.

Step 2. A mixture of 46A (2.81 g, 8.82 mmol), DIPEA (4.62 mL, 26.4 mmol), and 6-azaspiro[2.5]octane (1.176 g, 10.58 mmol, Wuxi) in DMSO (10 mL) was heated at 70° C. in 3 h. The reaction mixture was cooled to RT, diluted with

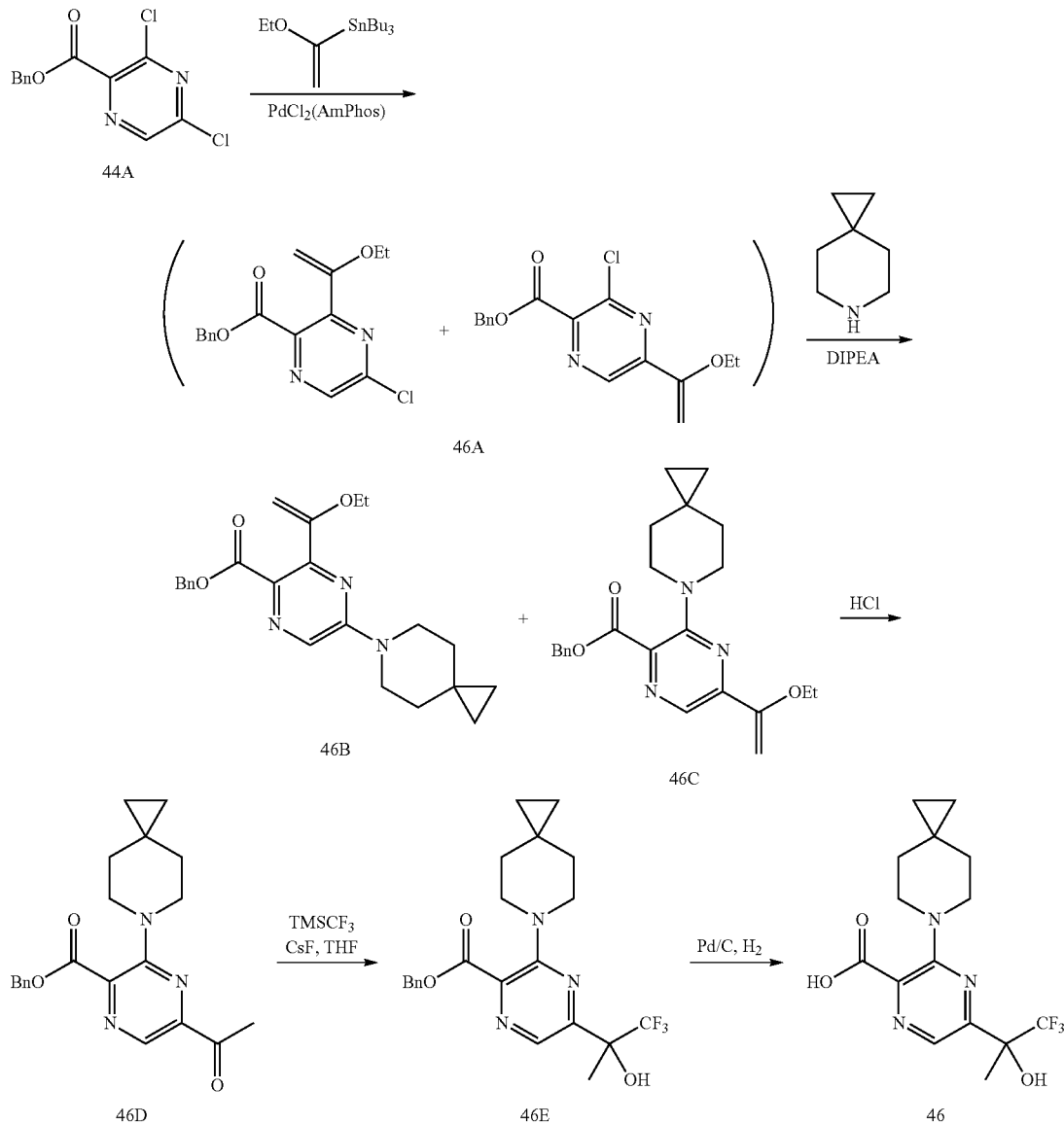

water (10 mL), and extracted with EtOAc (3×20 mL). The organic extracts were concentrated, and the residue was purified on ISCO column (0% to 20% EtOAc/Heptane) to give 2 compounds with m/z (ESI): 394.1 (M+H)$^+$. The 1$^{st}$ eluent was benzyl 3-(1-ethoxyvinyl)-5-(6-azaspiro[2.5]octan-6-yl)pyrazine-2-carboxylate (46B, 1.428 g, 3.63 mmol, 41% yield): $^1$H NMR (CHLOROFORM-d) δ: 8.06 (s, 1H), 7.44 (d, J=7.2 Hz, 2H), 7.29-7.39 (m, 3H), 5.36 (s, 2H), 4.81 (d, J=2.3 Hz, 1H), 4.35 (d, J=2.2 Hz, 1H), 3.72-3.82 (m, 6H), 1.46 (dd, J=6.5, 4.7 Hz, 4H), 1.21 (t, J=7.0 Hz, 3H), 0.40 (s, 4H). The 2$^{nd}$ eluent was benzyl 5-(1-ethoxyvinyl)-3-(6-azaspiro[2.5]octan-6-yl)pyrazine-2-carboxylate (46C, 1.33 g, 3.40 mmol, 38% yield): $^1$H NMR (CHLOROFORM-d) δ: 8.30 (s, 1H), 7.45-7.51 (m, 2H), 7.31-7.40 (m, 3H), 5.42 (s, 2H), 5.40 (d, J=1.8 Hz, 1H), 4.41 (d, J=2.0 Hz, 1H), 3.96 (q, J=7.0 Hz, 2H), 3.41-3.47 (m, 4H), 1.43 (t, J=6.9 Hz, 3H), 1.38 (dd, J=6.5, 4.7 Hz, 4H), 0.33 (s, 4H).

Step 3. To a stirred solution of benzyl 5-(1-ethoxyvinyl)-3-(6-azaspiro[2.5]octan-6-yl)pyrazine-2-carboxylate (46C, 1.33 g, 3.38 mmol) in THF (15 mL) was added 5 N HCl (3.38 mL, 16.90 mmol). After the addition, the mixture was stirred at RT for 3 h. The mixture was diluted with EtOAc, and slowly neutralized with sat'd aqueous NaHCO$_3$. The organic layer was separated, dried over MgSO$_4$, and concentrated to provide 46D. $^1$H NMR (CHLOROFORM-d) δ: 8.51 (s, 1H), 7.46-7.50 (m, 2H), 7.31-7.41 (m, 3H), 5.44 (s, 2H), 3.42-3.52 (m, 4H), 2.62 (s, 3H), 1.33-1.41 (m, 4H), 0.36 (s, 4H). m/z (ESI): 366.1 (M+H)$^+$.

Step 4. To a stirred mixture of benzyl 5-acetyl-3-(6-azaspiro[2.5]octan-6-yl)pyrazine-2-carboxylate (46D, 1.21 g, 3.31 mmol) and cesium fluoride (2.01 g, 13.23 mmol) in THF (2 mL) was added trimethyl(trifluoromethyl)silane (0.59 mL, 3.97 mmol, Aldrich). After the addition, the reaction mixture was stirred for 16 h. The reaction mixture was partitioned between EtOAc and water. The organic layer was concentrated and the residue was purified on a silica gel column (0% to 30% EtOAc/Heptane) to give benzyl 3-(6-azaspiro[2.5]octan-6-yl)-5-(1,1,1-trifluoro-2-hydroxypropan-2-yl)pyrazine-2-carboxylate (46E, 1.21 g, 2.78 mmol, 84% yield) $^1$H NMR (CHLOROFORM-d) δ: 8.10 (s, 1H), 7.49 (dd, J=7.8, 1.4 Hz, 2H), 7.37 (dd, J=7.5, 1.9 Hz, 3H), 5.44 (s, 2H), 5.21 (s, 1H), 3.40-3.47 (m, 4H), 1.74 (s, 3H), 1.39 (dd, J=6.5, 4.7 Hz, 4H), 0.36 (s, 4H). m/z (ESI): 436.3 (M+H)$^+$.

Step 5. A solution of benzyl 3-(6-azaspiro[2.5]octan-6-yl)-5-(1,1,1-trifluoro-2-hydroxypropan-2-yl)pyrazine-2-carboxylate (46E, 1.2 g, 2.76 mmol) in ethanol (15 mL) was hydrogenated at 50 PSI in the presence of Pd/C (0.293 g of 10% wt., 0.276 mmol) for 2 h. The catalyst was filtered off through a pad of Celite and the solid was rinsed with EtOH. The filtrate was concentrated to afford 3-(6-azaspiro[2.5]octan-6-yl)-5-(1,1,1-trifluoro-2-hydroxypropan-2-yl)pyrazine-2-carboxylic acid (46, 904 mg, 95% yield) as a yellow solid. m/z (ESI): 346.3 (M+H)$^+$.

Intermediate 47. 5-(N-(methylsulfonyl)methylsulfonamido)-3-(6-azaspiro[2.5]octan-6-yl)pyrazine-2-carboxylic acid

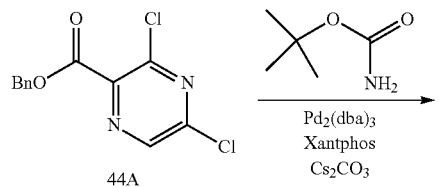

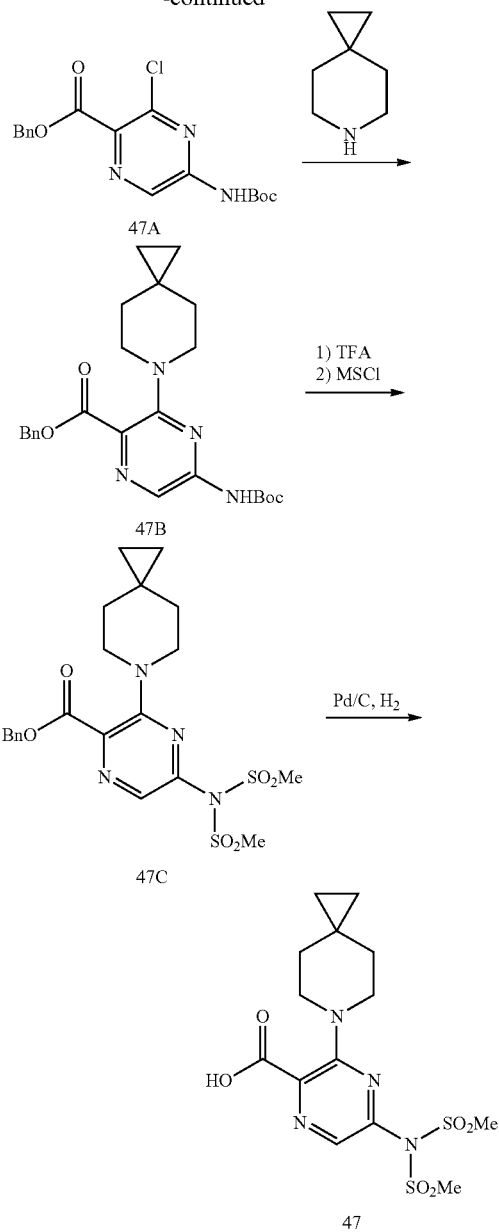

Step 1. A 20 mL scintillation vial was charged with benzyl 3,5-dichloropyrazine-2-carboxylate (44A, 0.209 g, 0.738 mmol), 1,1-dimethylethyl carbamate (0.107 g, 0.917 mmol), Xantphos (0.044 g, 0.077 mmol), Pd$_2$(dba)$_3$ (0.035 g, 0.038 mmol), cesium carbonate (0.482 g, 1.479 mmol) and 1,4-dioxane (2 mL). The mixture was degassed by bubbling Argon through the reaction mixture for 5 min. The vial was capped and the mixture was stirred at 80° C. for 1 h. The reaction mixture was partitioned between water (10 mL) and EtOAc (10 mL). The aqueous phase was extracted with EtOAc (2×30 mL). The combined organic phases were washed with water (20 mL) then concentrated. The brown residue was loaded on a silica gel column then eluted with EtOAc in heptane (5% to 50%) to afford 47A (0.138 g, 51% yield) as an off-white solid. $^1$H NMR (400 MHz, CHLOROFORM-d) δ ppm 9.26 (1H, s), 7.50 (2H, m), 7.37 (4H, m), 5.45 (2H, s), 1.55 (9H, s). m/z (ESI): 364.1 (M+H)$^+$.

Step 2. To a solution of benzyl 5-((tert-butoxycarbonyl)amino)-3-chloropyrazine-2-carboxylate (47A, 0.138 g, 0.379 mmol) and DMSO (1 mL) was added 6-azaspiro[2.5]octane (0.060 mL, 0.455 mmol) and N,N-diisopropylethylamine (0.165 mL, 0.948 mmol). The solution was stirred at 60° C. for 4 h then cooled to RT and partitioned between water (8 mL) and EtOAc (8 mL). The aqueous phase was extracted with EtOAc (8 mL). The combined organic phases were washed with water (2×8 mL) and concentrated. The crude product was purified by Biotage (SNAP25, Ultra, eluent: EtOAc in heptane 5% to 60%) to afford benzyl 5-((tert-butoxycarbonyl)amino)-3-(6-azaspiro[2.5]octan-6-yl)pyrazine-2-carboxylate (47B, 0.153 g) as a white foam. $^1$H NMR (400 MHz, CHLOROFORM-d) δ ppm 8.59 (1H, s), 7.47 (2H, d, J=6.8 Hz), 7.29-7.39 (3H, m), 6.97 (1H, s), 5.41 (2H, s), 3.33-3.43 (4H, m), 1.54 (9H, s), 1.32-1.40 (4H, m), 0.32 (4H, s).

Step 3. A 20 mL scintillation vial was charged with benzyl 5-((tert-butoxycarbonyl)amino)-3-(6-azaspiro[2.5]octan-6-yl)pyrazine-2-carboxylate (47B, 0.153 g, 0.349 mmol) and DCM (2 mL). TFA (1 mL, 12.98 mmol) was added and the mixture was stirred at RT for 45 min. The mixture was concentrated in vacuo and the resulting yellow paste was dissolved in 50 mL of DCM and washed with 3 mL of 1 N NaOH. The organic solution was concentrated to give benzyl 5-amino-3-(6-azaspiro[2.5]octan-6-yl)pyrazine-2-carboxylate (m/z (ESI): 339.1 (M+H)$^+$) as a sticky yellow oil which was used as crude. The sticky yellow oil was taken up in DCM (2 mL). Methanesulfonyl chloride (0.030 mL, 0.384 mmol) was added followed by DIPEA (0.305 mL, 1.745 mmol). The mixture was stirred at RT for 30 min then treated with methanesulfonyl chloride (0.030 mL, 0.384 mmol) and DIPEA (0.305 mL, 1.745 mmol). After 18 h, the reaction mixture was concentrated and the residue was purified via silica gel chromatography (5% to 70% EtOAc in heptane) to afford benzyl 5-(N-(methylsulfonyl)methylsulfonamido)-3-(6-azaspiro[2.5]octan-6-yl)pyrazine-2-carboxylate (47C, 0.112 g) an orange solid. $^1$H NMR (400 MHz, CHLOROFORM-d) δ ppm 7.89 (1H, s), 7.48 (2H, dd, J=7.8, 1.3 Hz), 7.34-7.41 (3H, m), 5.43 (2H, s), 3.56 (6H, s), 3.39-3.44 (4H, m), 1.35-1.40 (4H, m), 0.35 (4H, s). m/z (ESI): 495.3 (M+H)$^+$.

Step 4. A mixture of benzyl 5-(N-(methylsulfonyl)methylsulfonamido)-3-(6-azaspiro[2.5]octan-6-yl)pyrazine-2-carboxylate (47C, 0.112 g, 0.226 mmol) and P/C (10% wt., 10 mg) 3:1 EtOAc/EtOH (4.5 mL) was hydrogenated under 30 PSI of H$_2$ for 1 h. The mixture was filtered via a pad of Celite and solid was rinsed with 2×5 mL of EtOAc. Concentration of the filtrate gave 5-(N-(methylsulfonyl)methylsulfonamido)-3-(6-azaspiro[2.5]octan-6-yl)pyrazine-2-carboxylic acid (47, 0.088 g) as a yellow solid. $^1$H NMR (400 MHz, DMSO-d$_6$) δ ppm 8.17 (1H, s), 3.68 (6H, s), 3.48-3.54 (5H, m), 1.39-1.46 (4H, m), 0.36 (4H, s). m/z (ESI): 405.1 (M+H)$^+$.

Intermediate 48: 6-fluoro-2-(6-azaspiro[2.5]octan-6-yl)nicotinic acid

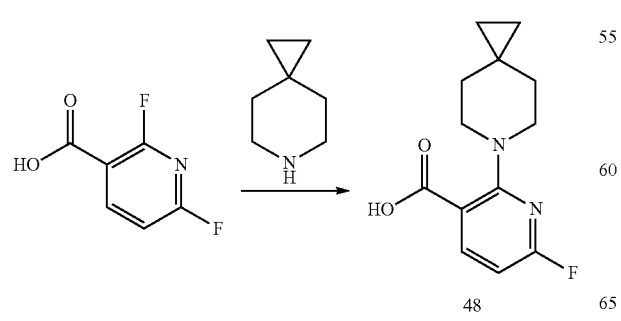

48

A 250-mL round-bottomed flask was charged with 2,6-difluoronicotinic acid (5.0 g, 31.5 mmol), 6-azaspiro[2.5]octane (3.8 g, 34.6 mmol) and 1,4-dioxane (60 mL). Hunig's base (6.6 mL, 37.9 mmol) was added and the light brown solution was stirred at RT for 18 h. The mixture was concentrated and the residue was diluted with EtOAc (80 mL) then washed with washed with water (2×10 mL) followed by brine (10 mL). The organic phase was reduced to ~ 50 mL and some solid started to come out. The suspension was let stand for 18 h. The solid was collected to afford the title compound (2.35 g) as a yellow solid. Mother liquor was concentrated and minimum amount of EtOAc was added to dissolve all the reside. The volume was reduced to ~ 20 mL and second crop was collected to afford the title compound (2.23 g) as a yellow solid. This procedure was repeated to afford the third crop of the title compound (1.10 g). All 3 batches were combined to give 6-fluoro-2-(6-azaspiro[2.5]octan-6-yl)nicotinic acid (48, 5.68 g, 72% yield). $^1$H NMR (400 MHz, CHLOROFORM-d) δ 10.50 (s, 1H), 8.68 (t, J=8.2 Hz, 1H), 7.00 (dd, J=3.1, 8.4 Hz, 1H), 3.19 (t, J=5.6 Hz, 4H), 1.69 (br. s., 4H), 0.47 (s, 4H). m/z (ESI): 251.0 (M+H)$^+$.

Intermediate 49: 6-(2,2-dimethyl-4-(trifluoromethyl)-1,3-dioxolan-4-yl)-2-(6-azaspiro[2.5]octan-6-yl)nicotinic acid

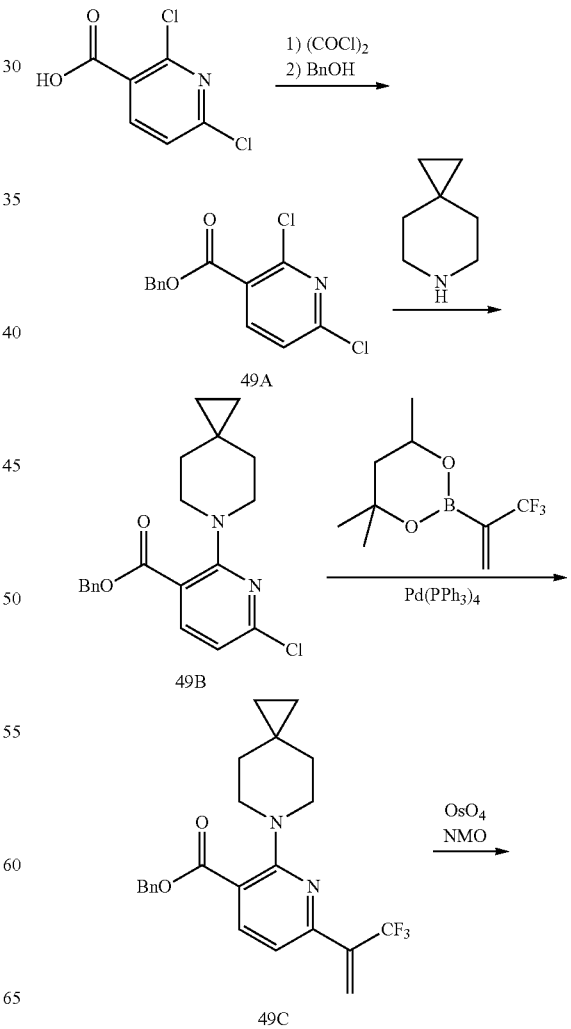

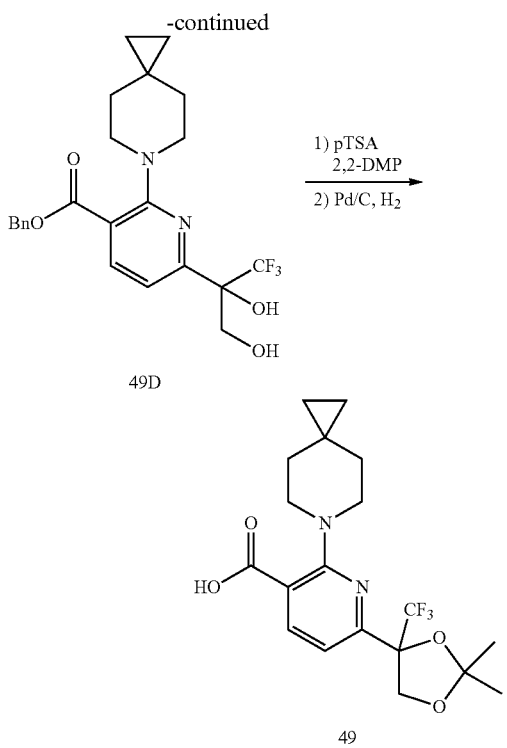

Step 1. Oxalyl chloride (2 M solution in DCM, 13.0 mL, 26.0 mmol) and 1 drop DMF were added to a mixture of 2,6-dichloropyridine-3-carboxylic acid (4.0 g, 20.8 mmol, Aldrich) in DCM (50 mL). The mixture was stirred for 2 h then the solvent was removed in vacuo to provide the acid chloride as a yellow oil. The oil was dissolved in THF (50 mL) and benzyl alcohol (2.2 mL, 20.8 mmol, Combi-Blocks, Inc.) and triethylamine (11.7 mL, 83.0 mmol) were added. This mixture was stirred for 1 h, then EtOAc and water were added. The resulting biphasic mixture was separated, and the organic layer was dried over anhydrous MgSO$_4$, filtered, and concentrated in vacuo to provide benzyl 2,6-dichloronicotinate (49A, 6.01 g, 21.3 mmol, 102% yield) as a brown oil. m/z (ESI): 282.0 (M+H)$^+$.

Step 2. A mixture of benzyl 2,6-dichloronicotinate (49A, 1.0 g, 3.54 mmol), 6-azaspiro[2.5]octane (0.43 g, 3.90 mmol, Wuxi AppTech), and DIPEA (0.74 mL, 4.25 mmol) in THF (10 mL) was stirred at RT for 16 h, then EtOAc and H$_2$O were added. The resulting biphasic mixture was separated, and the organic layer was dried over anhydrous MgSO$_4$, filtered, and concentrated in vacuo to give an oil. This oil was purified by silica gel chromatography, eluting with 0% to 20% EtOAc/heptane gradient, to provide benzyl 6-chloro-2-(6-azaspiro[2.5]octan-6-yl)nicotinate (49B, 0.63 g, 1.76 mmol, 49.6% yield) as a colorless oil. $^1$H NMR (400 MHz, CHLOROFORM-d) δ ppm 7.89 (d, J=7.82 Hz, 1H) 7.32-7.44 (m, 5H) 6.62 (d, J=7.82 Hz, 1H) 5.31 (s, 2H) 3.40-3.46 (m, 4H) 1.25-1.44 (m, 4H) 0.33 (s, 4H). m/z (ESI): 357.0 (M+H)$^+$.

Step 3. A mixture of benzyl 6-chloro-2-(6-azaspiro[2.5] octan-6-yl)nicotinate (49B, 0.55 g, 1.54 mmol), sodium carbonate (2 N aqueous, 2.31 mL, 4.62 mmol), tetrakistriphenylphosphine palladium(0) (89 mg, 0.077 mmol), and 4,4,6-trimethyl-2-(3,3,3-trifluoroprop-1-en-2-yl)-1,3,2-dioxaborinane (684 mg, 3.08 mmol, Frontier Scientific) was taken up in dioxane (6 mL) in a microwave tube, the solvent was sparged with argon for 5 min and then the tube was sealed. The mixture was then heated to 110° C. in a microwave for 90 min then cooled to RT. EtOAc and H$_2$O were added, and the resulting biphasic mixture was separated. The organic material was fused to silica gel and the material was purified by silica gel chromatography, eluting with 0% to 100% EtOAc/heptane gradient, to provide benzyl 2-(6-azaspiro[2.5]octan-6-yl)-6-(3,3,3-trifluoroprop-1-en-2-yl)nicotinate (49C, 0.47 g, 1.13 mmol, 73.2% yield) as a yellow oil. $^1$H NMR (400 MHz, CHLOROFORM-d) δ ppm 7.98 (d, J=7.82 Hz, 1H) 7.31-7.45 (m, 5H) 6.87 (d, J=7.43 Hz, 1H) 6.57 (s, 1H) 6.10 (s, 1H) 5.33 (s, 2H) 3.42-3.48 (m, 4H) 1.38-1.45 (m, 4H) 0.32 (s, 4H). $^{19}$F NMR (376 MHz, CHLOROFORM-d) 6 ppm −63.77 (s, 3 F). m/z (ESI): 417.2 (M+H)$^+$.

Step 4. A mixture of benzyl 2-(6-azaspiro[2.5]octan-6-yl)-6-(3,3,3-trifluoroprop-1-en-2-yl)nicotinate (49C, 0.47 g, 1.13 mmol), 4-methylmorpholine-N-oxide, (50 wt %. in water, 0.46 mL, 1.98 mmol) and osmium tetroxide solution (0.059 mL, 1.129 mmol) in acetone (5 mL) and water (2 mL) was stirred for 3 d at RT. EtOAc and H$_2$O were added, and the resulting biphasic mixture was separated. The organic layer was dried over anhydrous MgSO$_4$, filtered, and concentrated in vacuo to give an oil. The oil was purified by silica gel chromatography (0% to 100% EtOAc/heptane gradient) to provide benzyl 2-(6-azaspiro[2.5]octan-6-yl)-6-(1,1,1-trifluoro-2,3-dihydroxypropan-2-yl)nicotinate (49D, 0.43 g, 0.96 mmol, 85% yield) as an oil. $^1$H NMR (400 MHz, CHLOROFORM-d) δ ppm 8.08 (d, J=7.82 Hz, 1H) 7.33-7.45 (m, 5H) 6.89 (d, J=7.82 Hz, 1H) 6.15 (s, 1H) 5.34 (s, 2H) 4.11 (br d, J=4.69 Hz, 1H) 3.93-4.06 (m, 1H) 3.41-3.47 (m, 4H) 1.96-2.08 (m, 1H) 1.39-1.47 (m, 4H) 0.34 (s, 4H). $^{19}$F NMR (376 MHz, CHLOROFORM-d) 6 ppm −77.34 (s, 3 F). m/z (ESI): 451.1 (M+H)$^+$.

Step 5. A mixture of benzyl 2-(6-azaspiro[2.5]octan-6-yl)-6-(1,1,1-trifluoro-2,3-dihydroxypropan-2-yl)nicotinate (49D, 0.43 g, 0.96 mmol), 2,2-dimethoxypropane (0.35 mL, 2.88 mmol, Aldrich) and p-toluenesulfonic acid monohydrate (18 mg, 0.096 mmol) in THF (5 mL) was heated to 60° C. for 4 h, then cooled to RT. EtOAc and sat'd aqueous NaHCO$_3$ were added, the resulting biphasic mixture was separated, and the organic layer was dried over anhydrous MgSO$_4$, filtered, and concentrated in vacuo to give benzyl 6-(2,2-dimethyl-4-(trifluoromethyl)-1,3-dioxolan-4-yl)-2-(6-azaspiro[2.5]octan-6-yl)nicotinate (0.47 g, 0.96 mmol, 99% yield) as an oil. $^1$H NMR (400 MHz, CHLOROFORM-d) δ ppm 7.98 (d, J=7.83 Hz, 1H) 7.32-7.46 (m, 5H) 7.06 (d, J=7.83 Hz, 1H) 5.33 (s, 2H) 4.56 (s, 2H) 3.41 (dd, J=6.55, 3.62 Hz, 4H) 1.55 (s, 6H) 1.35-1.41 (m, 4H) 0.32 (s, 4H). $^{19}$F NMR (376 MHz, CHLOROFORM-d) 6 ppm −77.35 (s, 3 F). m/z (ESI): 491.1 (M+H)$^+$. A mixture of benzyl 6-(2,2-dimethyl-4-(trifluoromethyl)-1,3-dioxolan-4-yl)-2-(6-azaspiro[2.5]octan-6-yl)nicotinate (0.47 g, 0.96 mmol), palladium (10 wt. % on activated carbon, 477 mg, 3.76 mmol), and ammonium formate (0.60 g, 9.6 mmol) in EtOH (5 mL) was heated to 60° C. for 20 min, then cooled to RT. The mixture was filtered through celite and the filtrate was concentrated in vacuo. The resulting solid was partitioned between EtOAc and water, the resulting biphasic mixture was separated, and the organic layer was washed with water, dried over anhydrous MgSO$_4$, filtered, and concentrated in vacuo to give 6-(2,2-dimethyl-4-(trifluoromethyl)-1,3-dioxolan-4-yl)-2-(6-azaspiro[2.5]octan-6-yl)nicotinic acid (49, 0.36 g, 0.90 mmol, 94% yield) as a white solid. $^1$H NMR (400 MHz, CHLOROFORM-d) δ ppm 8.57-8.69 (m, 1H) 7.75-7.89 (m, 1H) 4.57-4.70 (m, 2H) 3.19 (br s, 4H)

1.32-1.38 (m, 4H) 0.45 (br s, 4H) 0.00 (s, 6H). $^{19}$F NMR (376 MHz, CHLOROFORM-d) δ ppm −77.25 (s, 3 F). m/z (ESI): 401.1 (M+H)$^+$.

Intermediate 50: 6-(4,4-dimethyl-2-oxooxazolidin-3-yl)-2-(6-azaspiro[2.5]octan-6-yl)nicotinic acid

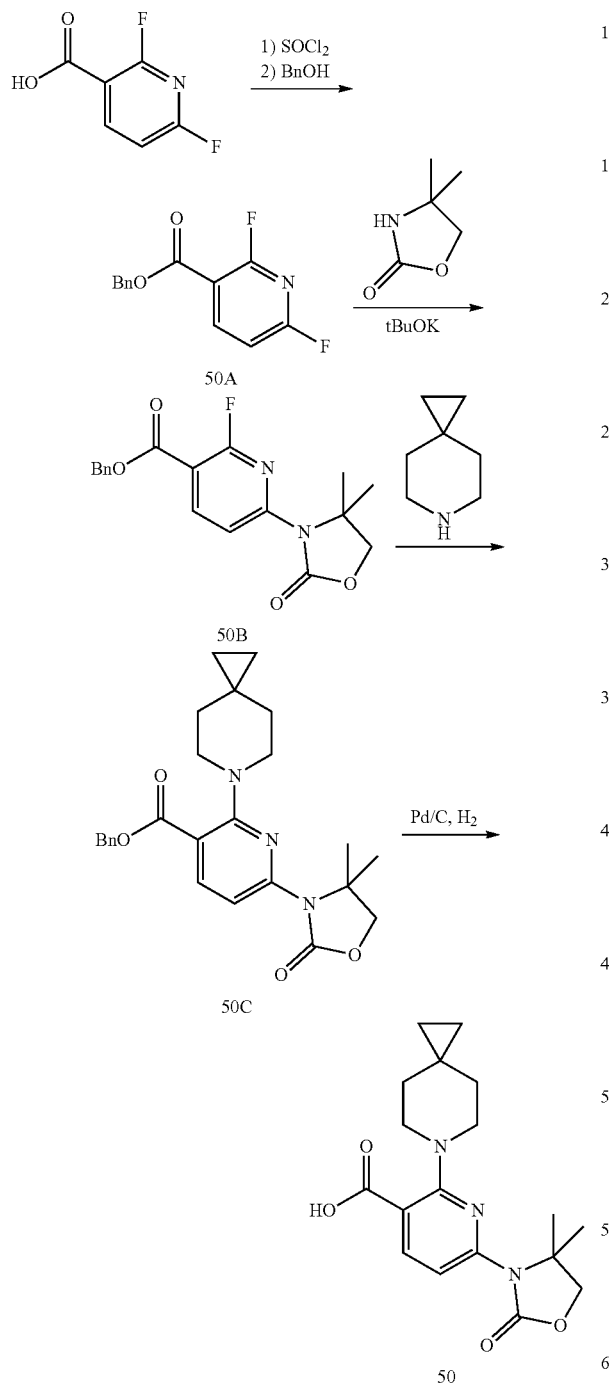

Step 1. 2,6-Difluoronicotinic acid (10.6 g, 66.6 mmol) and thionyl chloride (35 mL, 480 mmol) were combined under nitrogen and heated to gentle reflux for 2 h. The solution was concentrated to dryness under reduced pressure. Toluene (100 mL) was added to the crude and it was evaporated to dryness once more. The crude acid chloride was dissolved in DCM (50 mL) under nitrogen and cooled in an ice bath. A mixture of triethylamine (25 mL, 180 mmol) and benzyl alcohol (7.25 ml, 70.1 mmol) in DCM (50 mL) was added dropwise over 10 min. 0.1 N HCl (100 mL) was added and the phases mixed and separated. The organic was dried with magnesium sulfate and evaporated to dryness under reduced pressure to provide benzyl 2,6-difluoronicotinate (50A) which was used without purification. m/z (ESI): 250.0 (M+H)$^+$.

Step 2. 4,4-Dimethyloxazolidin-2-one (0.80 g, 6.95 mmol) was dissolved in THF (15 mL) under nitrogen. Potassium t-butoxide (0.750 g, 6.68 mmol) was added and the suspension stirred at RT for 5 min. The mixture became a thick gel. A solution of benzyl 2,6-difluoronicotinate (50A, 1.60 g, 6.42 mmol) in N,N-dimethylacetamide (40 mL) was added and the mixture was stirred at RT for 10 min when LC/MS found the starting material was essentially consumed and two peaks with the desired mass (m/z (ESI): 345.0 (M+H)$^+$) were found. Water (75 mL), ethyl acetate (150 mL), and sat'd ammonium chloride (25 mL) were added and the phases mixed and separated. The organic was washed with brine (50 mL) and evaporated to dryness under reduced pressure. Purification using the ISCO (heptane to ethyl acetate gradient) gave benzyl 6-(4,4-dimethyl-2-oxooxazolidin-3-yl)-2-fluoronicotinate (50B, 1.82 g, 5.29 mmol, 82% yield) as a white solid. This material was about 92% pure; the rest was benzyl 2-(4,4-dimethyl-2-oxooxazolidin-3-yl)-6-fluoronicotinate.

Step 3. Benzyl 6-(4,4-dimethyl-2-oxooxazolidin-3-yl)-2-fluoronicotinate (50B, 1.81 g, 5.23 mmol) was dissolved in NMP (20 mL). Cesium carbonate (2.00 g, 6.14 mmol) and 6-azaspiro[2.5]octane (0.60 g, 5.40 mmol) were added and the mixture stirred at RT for 18 h. Water (100 mL) and ethyl acetate (150 mL) were added and the phases mixed and separated. The organic was washed with brine and evaporated to dryness under reduced pressure. Purification using the ISCO (0% to 40% ethyl acetate in heptane) gave benzyl 6-(4,4-dimethyl-2-oxooxazolidin-3-yl)-2-(6-azaspiro[2.5]octan-6-yl)nicotinate (50C, 1.77 g, 4.06 mmol, 78% yield) as a milky oil. m/z (ESI): 436.1 (M+H)$^+$.

Step 4. Benzyl 6-(4,4-dimethyl-2-oxooxazolidin-3-yl)-2-(6-azaspiro[2.5]octan-6-yl)nicotinate (50C, 1.77 g, 4.06 mmol) was dissolved in ethyl acetate (30 mL) and transferred to a pressure vessel. Ethanol (60 mL) was added followed by 5% palladium on carbon (dry wt., 50% water, 0.250 g, 0.117 mmol). The suspension was stirred under 40 psi hydrogen for 15 min. The mixture was filtered through a pad of celite and the solid washed with ethyl acetate (50 mL). The combined filtrate was evaporated to dryness under reduced pressure to give 6-(4,4-dimethyl-2-oxooxazolidin-3-yl)-2-(6-azaspiro[2.5]octan-6-yl)nicotinic acid (Intermediate 50, 1.15 g, 3.33 mmol, 82% yield) as a white solid. m/z (ESI): 346.0 (M+H)$^+$.

Intermediate 51: 2-(6-azaspiro[2.5]octan-6-yl)-6-(2,2,4-trimethyl-1,3-dioxolan-4-yl)nicotinic acid

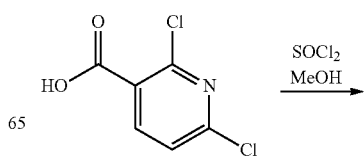

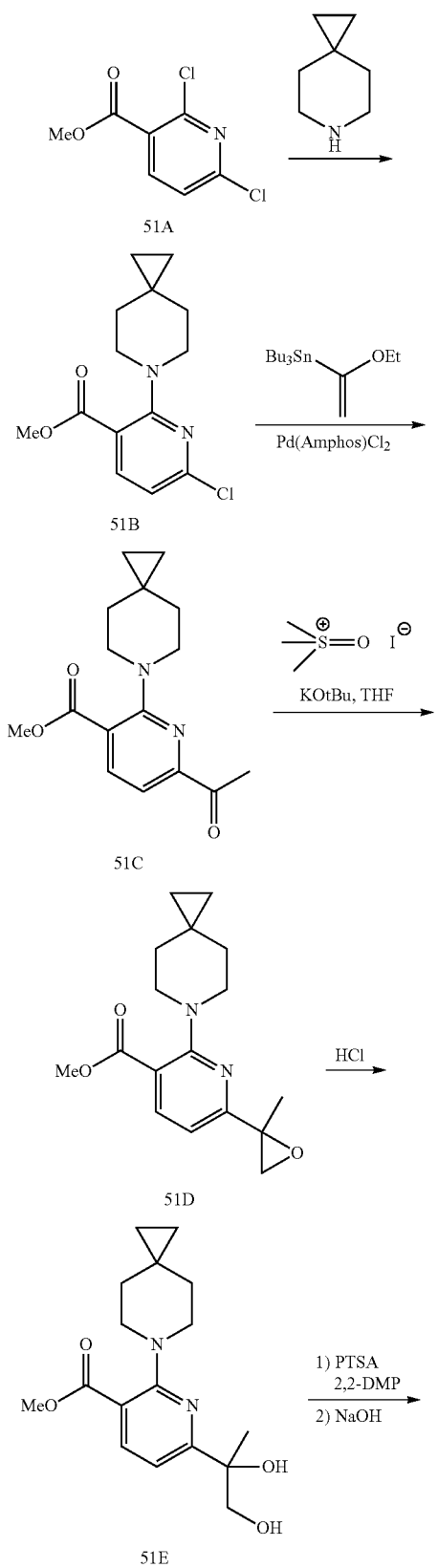

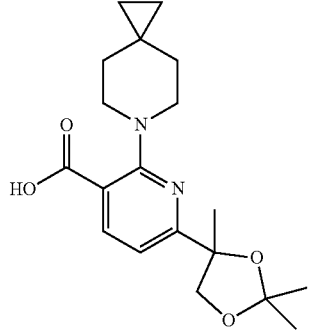

51

Steps 1-3. Methyl 6-acetyl-2-(6-azaspiro[2.5]octan-6-yl)nicotinate (Intermediate 51C) was prepared in a 3-step sequence analogous to that described for benzyl 5-acetyl-3-(6-azaspiro[2.5]octan-6-yl)pyrazine-2-carboxylate (Intermediate 46D). $^1$H NMR (400 MHz, Chloroform-d): δ 8.04 (d, J=7.8 Hz, 1H), 7.39 (d, J=7.8 Hz, 1H), 3.93 (s, 3H), 3.54 (t, J=5.2 Hz, 4H), 2.66 (s, 3H), 1.51 (t, J=5.2 Hz, 4H), 0.40 (s, 4H). m/z (ESI): 289.0 (M+H)$^+$.

Step 4. To a solution of trimethyl sulfoxonium iodide (4.62 g, 20.98 mmol) in DMSO (55.0 mL) was added potassium tert-butoxide (2.14 g, 19.07 mmol) and stirred at RT for 15 min. A solution of methyl 6-acetyl-2-(6-azaspiro[2.5]octan-6-yl)nicotinate (51C, 5.5 g, 19.07 mmol) in DMSO (55.0 mL) was added drop wise at RT and reaction mixture was stirred for 3 h. The reaction was quenched with cold water (50 mL) and extracted with ethyl acetate (2×75 mL). The organic layer was washed with water (50 mL) followed by brine (50 mL), dried over anhydrous Na$_2$SO$_4$, filtered and concentrated under reduced pressure. The crude product was purified by flash chromatography through Isolera-One (SNAP 100 g) using 6% ethyl acetate in hexanes to give methyl 6-(2-methyloxiran-2-yl)-2-(6-azaspiro[2.5]octan-6-yl)nicotinate (51D, 4.6 g, 15.2 mmol, 80% yield) as a yellow oil. $^1$H NMR (400 MHz, Chloroform-d) δ 7.94 (d, J=7.9 Hz, 1H), 6.72 (d, J=7.9 Hz, 1H), 3.89 (s, 3H), 3.49 (t, J=5.4 Hz, 4H), 3.00 (d, J=5.6 Hz, 1H), 2.93 (d, J=5.6 Hz, 1H), 1.76 (s, 3H), 1.50 (t, J=5.4 Hz, 4H), 0.37 (s, 4H). m/z (ESI): 303.0 (M+H)$^+$.

Step 5. To a solution of methyl 6-(2-methyloxiran-2-yl)-2-(6-azaspiro[2.5]octan-6-yl)nicotinate (51D, 4.60 g, 15.21 mmol) in 1,4-dioxane (30 mL) and water (30 mL) was added conc. HCl (3.0 mL) at RT and stirred for 4 h. The reaction mixture was diluted with water (50 mL) and extracted with ethyl acetate (4×100 mL). The organic layer was washed with brine (50 mL), dried over anhydrous Na$_2$SO$_4$, filtered and concentrated under reduced pressure to get a crude residue which was purified by flash chromatography through Isolera-One (SNAP 100 g) using a gradient of 25-30% ethyl acetate in hexanes to give methyl 6-(1,2-dihydroxypropan-2-yl)-2-(6-azaspiro[2.5]octan-6-yl)nicotinate (51E, 3.1 g, 9.68 mmol, 64% yield) as a yellow oil. m/z (ESI): 321.0 (M+H)$^+$.

Step 6. To a solution of methyl 6-(1,2-dihydroxypropan-2-yl)-2-(6-azaspiro[2.5]octan-6-yl)nicotinate (51E, 3.1 g, 9.68 mmol) in acetone (62.0 mL) was added 2,2-dimethoxypropane (3.02 g, 29.0 mmol) and p-toluenesulfonic acid monohydrate (0.184 g, 0.968 mmol) and stirred at RT for 16 h. The reaction mixture was concentrated, and the residue was diluted with 5% aqueous NaHCO$_3$ solution and extracted with ethyl acetate (2×75 mL). Combined organic extracts were washed with water (40 mL) and brine (40 mL). The organic layer was dried over Na₂SO₄ and concentrated under reduced pressure to afford methyl 2-(6-azaspiro[2.5]octan-6-yl)-6-(2,2,4-trimethyl-1,3-dioxolan-4-yl)nicotinate (3.0 g, 8.33 mmol, 86% yield) as a yellow oil. m/z (ESI): 361.2 (M+H)⁺. The yellow oil was taken up in methanol (30.0 mL) then treated with sodium hydroxide (2.5 M aqueous solution) (16.65 mL, 41.6 mmol) then stirred at RT for 24 h. The reaction mixture was concentrated to half of its volume then acidified to pH~5-6 with 10% citric acid solution. The mixture was extracted with ethyl acetate (2×100 mL) and combined organic layer was washed with water (40 mL) followed by brine (40 mL), dried over anhydrous Na₂SO₄ and concentrated under reduced pressure to afford 2-(6-azaspiro[2.5]octan-6-yl)-6-(2,2,4-trimethyl-1,3-dioxolan-4-yl)nicotinic acid (Intermediate 51, 2.6 g, 7.5 mmol, 90% yield) as a pale yellow gum which solidified upon standing to form a pale yellow solid. The crude material was used as without further purification. ¹H NMR (400 MHz, Chloroform-d) δ 10.5 (br., 1H), 8.58 (dd, J=8.0, 0.9 Hz, 1H), 7.76 (dd, J=8.0, 0.9 Hz, 1H), 4.48-4.40 (m, 1H), 4.12 (dd, J=8.6, 0.9 Hz, 1H), 3.22 (t, J=5.7 Hz, 4H), 1.63 (s, 3H), 1.56 (s, 3H), 1.42 (s, 3H), 1.40-1.20 (b s, 4H), 0.50 (s, 4H). m/z (ESI): 347.0 (M+H)⁺.

Intermediate 52: 6-(2-fluoro-1,3-dimethoxy-1,3-dioxopropan-2-yl)-2-(6-azaspiro[2.5]octan-6-yl)nicotinic acid

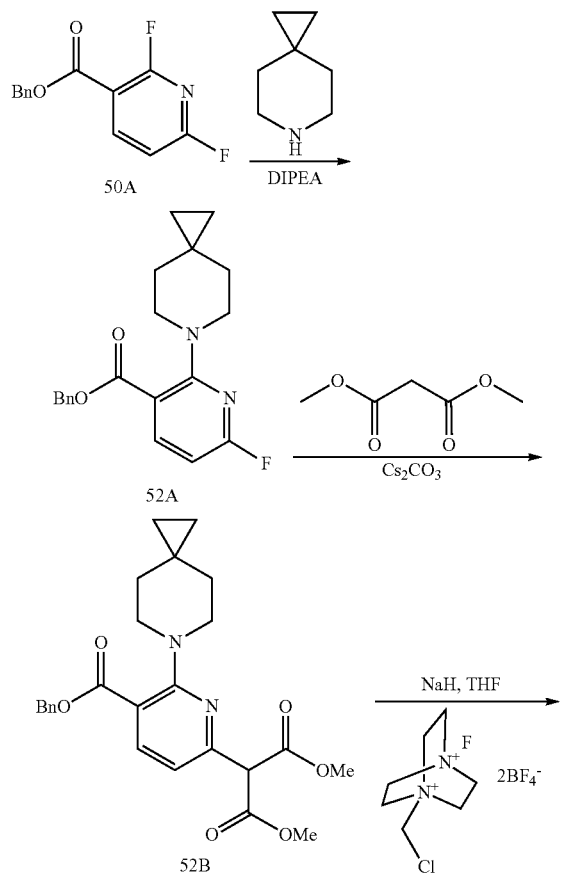

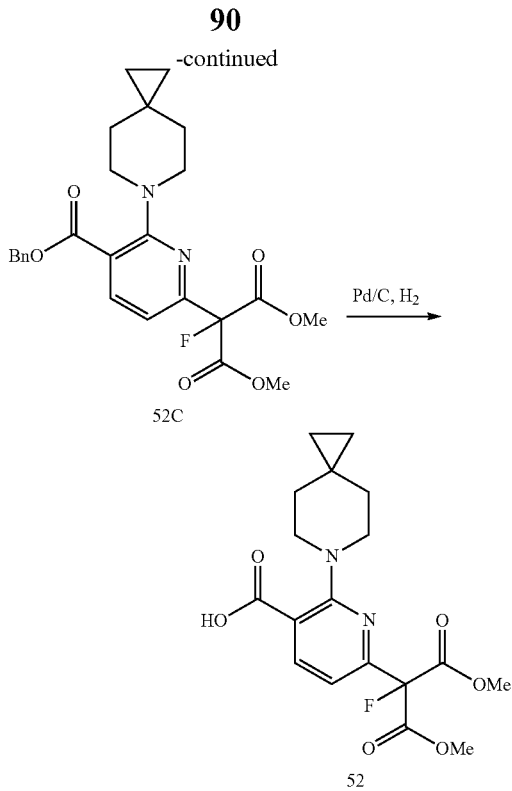

Step 1. To a 50-mL round-bottomed flask were added benzyl 2,6-difluoronicotinate (50A, 1.00 g, 4.01 mmol), 6-azaspiro[2.5]octane (0.47 g, 4.21 mmol) and DIPEA (1.40 mL, 8.03 mmol) in 1,4-dioxane (10 mL). The reaction mixture was stirred at RT for 16 h. The crude material was absorbed onto a plug of silica gel and purified by chromatography, eluting with 5% to 10% EtOAc in hexane, to provide benzyl 6-fluoro-2-(6-azaspiro[2.5]octan-6-yl)nicotinate (52A, 900 mg, 2.64 mmol, 66% yield) as a colourless gummy liquid. m/z (ESI): 341.0 (M+H)⁺.

Step 2. A mixture of benzyl 6-fluoro-2-(6-azaspiro[2.5]octan-6-yl)nicotinate (52A, 8.6 g, 25.3 mmol), dimethyl malonate (28.9 mL, 253 mmol), and cesium carbonate (20.58 g, 63.2 mmol) in NMP (50 mL) was stirred at 60° C. for 24 h. The reaction mixture was cooled to RT. Water and EtOAc were added. The layers were separated and the organic layer was concentrated. The residue was purified by ISCO (0% to 20% EtOAc/Heptane) to give dimethyl 2-(5-((benzyloxy)carbonyl)-6-(6-azaspiro[2.5]octan-6-yl)pyridin-2-yl)malonate (52B, 8.23 g, 18.19 mmol, 72% yield). ¹H NMR (CHLOROFORM-d) δ: 7.97 (d, J=7.8 Hz, 1H), 7.41-7.46 (m, 2H), 7.31-7.40 (m, 3H), 6.74 (d, J=7.8 Hz, 1H), 5.32 (s, 2H), 4.81 (s, 1H), 3.78 (s, 6H), 3.40-3.44 (m, 4H), 1.35-1.43 (m, 4H), 0.31 (s, 4H). m/z (ESI): 453.0 (M+H)⁺.

Step 3. Sodium hydride (0.318 g of 60% wt., 7.96 mmol) was added to a solution of dimethyl 2-(5-((benzyloxy)carbonyl)-6-(6-azaspiro[2.5]octan-6-yl)pyridin-2-yl)malonate (52B, 3.0 g, 6.63 mmol) in THF (15 mL). After stirring at RT for 20 min, selectfluor fluorinating reagent (3.05 g, 8.62 mmol, Aldrich) was added in and the mixture was at RT for 16 h. The reaction mixture was cooled in an ice bath and treated with 5% H₂SO₄ (30 mL), extracted with EtOAc (3×). The extracts were dried over MgSO₄ and concentrated to give dimethyl 2-(5-((benzyloxy)carbonyl)-6-(6-azaspiro[2.5]octan-6-yl)pyridin-2-yl)-2-fluoromalonate (52C, 3.5 g, 7.44 mmol, 112% yield) which was used as crude in the next step. m/z (ESI): 471.0 (M+H)⁺.

Step 4. A mixture of dimethyl 2-(5-((benzyloxy)carbonyl)-6-(6-azaspiro[2.5]octan-6-yl)pyridin-2-yl)-2-fluoromalonate (52C, 3.5 g, 7.44 mmol) and Pd/C (1.6 g of 10% wt., 1.48 mmol) in ethanol (40 mL) was hydrogenated under 50 psi hydrogen for 2 h. The catalyst was filtered off through a pad of Celite, rinse with EtOAc, the filtrate was concentrated to give 6-(2-fluoro-1,3-dimethoxy-1,3-dioxopropan-2-yl)-2-(6-azaspiro[2.5]octan-6-yl)nicotinic acid (Intermediate 52, 2.63 g, 93% yield). The crude material was used without further purification. $^1$H NMR (DMSO-$d_6$) δ: 7.74 (d, J=7.7 Hz, 1H), 6.65 (d, J=7.9 Hz, 1H), 3.59 (s, 6H), 3.12-3.15 (m, 4H), 1.11-1.17 (m, 4H), 0.09 (s, 4H). —CO$_2$H peak was not observed. m/z (ESI): 381.0 (M+H)$^+$.

Intermediate 53: 6-((1-methoxy-2-methylpropan-2-yl)amino)-2-(6-azaspiro[2.5]octan-6-yl)nicotinic acid

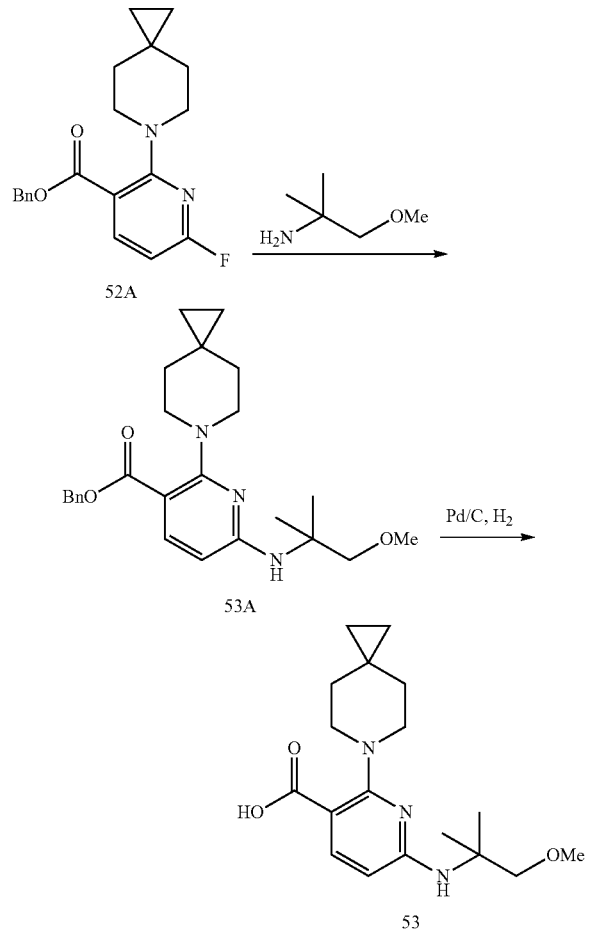

Step 1. A mixture of benzyl 6-fluoro-2-(6-azaspiro[2.5]octan-6-yl)nicotinate (52A, 1.20 g, 3.53 mmol), 1-methoxy-2-methylpropan-2-amine (0.54 g, 5.29 mmol), and DIPEA (1.84 mL, 10.58 mmol) in DMSO (5 mL) was stirred at 100° C. for 36 h. It was cooled to RT and partitioned between water (10 mL) and EtOAc (50 mL). The layers were separated and the organic layer was dried over MgSO$_4$ and concentrated. The residue was purified by ISCO (0% to 30% EtOAc in heptane) to give benzyl 6-((1-methoxy-2-methylpropan-2-yl)amino)-2-(6-azaspiro[2.5]octan-6-yl)nicotinate (53A, 0.42 g, 1.00 mmol, 28% yield). $^1$H NMR (CHLOROFORM-d) δ: 7.85 (d, J=8.5 Hz, 1H), 7.40-7.45 (m, 2H), 7.29-7.38 (m, 3H), 5.76 (d, J=8.7 Hz, 1H), 5.26 (s, 2H), 4.79 (s, 1H), 3.46 (s, 2H), 3.39-3.43 (m, 4H), 3.37 (s, 3H), 1.46 (br d, J=5.4 Hz, 4H), 1.44 (s, 6H), 0.32 (s, 4H). m/z (ESI): 424.1 (M+H)$^+$.

Step 2. Benzyl 6-((1-methoxy-2-methylpropan-2-yl)amino)-2-(6-azaspiro[2.5]octan-6-yl)nicotinate (53A, 0.42 g, 1.00 mmol) was hydrogenated using the procedures described for Intermediate 52 gave 6-((1-methoxy-2-methylpropan-2-yl)amino)-2-(6-azaspiro[2.5]octan-6-yl)nicotinic acid (Intermediate 53, 298 mg, 0.89 mmol, 89% yield). m/z (ESI): 334.0 (M+H)$^+$.

Intermediate 54: 6-chloro-2-(6-azaspiro[2.5]octan-6-yl)nicotinic acid

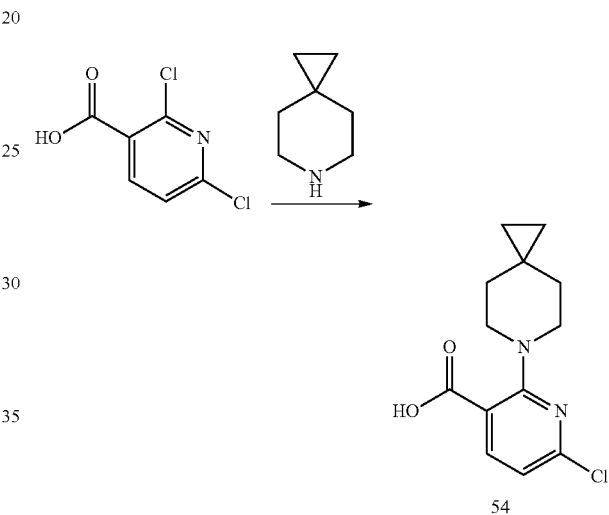

A mixture of 2,6-dichloronicotinic acid (4.2 g, 21.9 mmol), 6-azaspiro[2.5]octane (2.4 g, 21.9 mmol) and 1,4-dioxane (40 mL). Hunig's base (7.7 mL, 44.1 mmol) was added and the brown solution was stirred at 60° C. for 18 h. The mixture was diluted with EtOAc (80 mL) and washed with water (2×10 mL) followed by brine (5 mL). The organic phase was concentrated and the residue was purified on a silica gel column (0.25% AcOH mediated 50% to 100% EtOAc/hexanes) to title compound (54, 2.60 g, 44% yield) as a tan solid. $^1$H NMR (400 MHz, CHLOROFORM-d) δ=8.52 (d, J=8.2 Hz, 1H), 7.40 (d, J=8.0 Hz, 1H), 3.21 (t, J=5.4 Hz, 4H), 1.69 (br. s., 4H), 0.47 (s, 4H). —CO$_2$H was not observed. m/z (ESI): 267.0 (M+H)$^+$.

Intermediate 55: 6-((methylsulfonyl)methyl)-2-(6-azaspiro[2.5]octan-6-yl)nicotinic acid

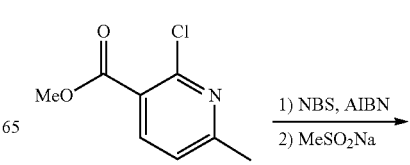

93

-continued

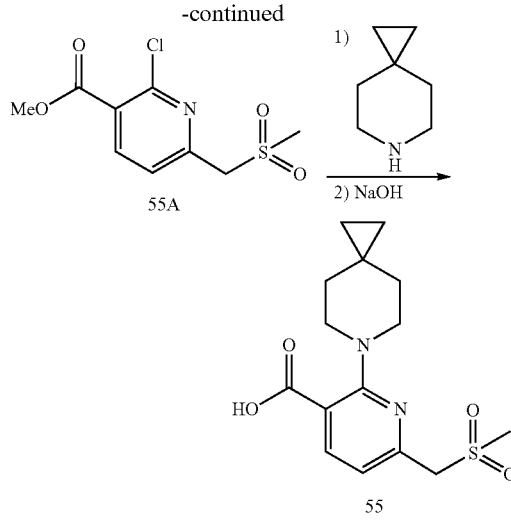

A mixture of methyl 2-chloro-6-methylnicotinate (5.0 g, 26.9 mmol), AIBN (4.4 g, 26.9 mmol) and 1-bromopyrrolidine-2,5-dione (4.78 g, 26.9 mmol) in carbon tetrachloride (50 mL) was heated at 70° C. for 4 h. The reaction mixture was diluted with water (50 mL) and extracted with EtOAc (2×100 mL). The organic extract was concentrated in vacuo. The resulting yellow oil [m/z (ESI): 264.0/266.0 (M+H)$^+$] was taken up in 50 mL of DMF and treated with sodium methanesulfinate (2.73 g, 26.8 mmol). The reaction mixture was stirred at RT for 1 h then diluted with water (10 mL) and extracted with EtOAc (3×50 mL). The organic extract was washed with brine (50 mL), dried over Na$_2$SO$_4$, and concentrated in vacuo. The crude material was absorbed onto a plug of silica gel and purified by chromatography through a Redi-Sep pre-packed silica gel column (120 g), eluting with a gradient of 1% to 50% EtOAc in hexanes, to provide methyl 2-chloro-6-((methylsulfonyl)methyl)nicotinate (55A, 4.0 g) as an off-white solid. m/z (ESI): 264.0 (M+H)$^+$.

A mixture of methyl 2-chloro-6-((methylsulfonyl)methyl) nicotinate (55A, 2.0 g, 7.58 mmol) and 6-azaspiro[2.5] octane (1.012 g, 9.10 mmol) in dimethyl sulfoxide (10 mL) was heated in a microwave at 140° C. for 60 min. The reaction mixture was loaded on a silica gel column (120 g), eluting with a gradient of 1% to 20% EtOAc in hexanes, to provide methyl 6-((methylsulfonyl)methyl)-2-(6-azaspiro [2.5]octan-6-yl)nicotinate (1.4 g, 4.14 mmol, 55% yield) as an off-white solid. m/z (ESI): 339.0 (M+H)$^+$. Methyl 6-((methylsulfonyl)methyl)-2-(6-azaspiro[2.5]octan-6-yl) nicotinate (55A, 1.4 g, 4.14 mmol) in ethanol (10 mL) and water (10 mL) was treated with sodium hydroxide (0.49 g, 12.41 mmol). After 3 h, the mixture was concentrated in vacuo to remove ethanol. Aqueous was neutralized to pH of 7 using 1.5 N HCl then extracted with ethyl acetate (3×100 mL). The organic extract was washed with brine (50 mL), dried over Na$_2$SO$_4$, and concentrated in vacuo to give the crude material as a light-yellow solid. The crude material was absorbed onto a plug of silica gel and purified by chromatography through a Redi-Sep pre-packed silica gel column (80 g), eluting with a gradient of 1% to 6% MeOH in DCM to give 6-((methylsulfonyl)methyl)-2-(6-azaspiro [2.5]octan-6-yl)nicotinic acid (Intermediate 55, 680 mg, 2.10 mmol, 51% yield) as an off-white solid. m/z (ESI): 325.0 (M+H)$^+$.

94

Preparation of Examples 100 to 248

Example 100: 5-((1-hydroxy-2-methylpropan-2-yl) amino)-N-(6-(piperidin-1-ylsulfonyl)pyridin-2-yl)-3-(6-azaspiro[2.5]octan-6-yl)pyrazine-2-carboxamide

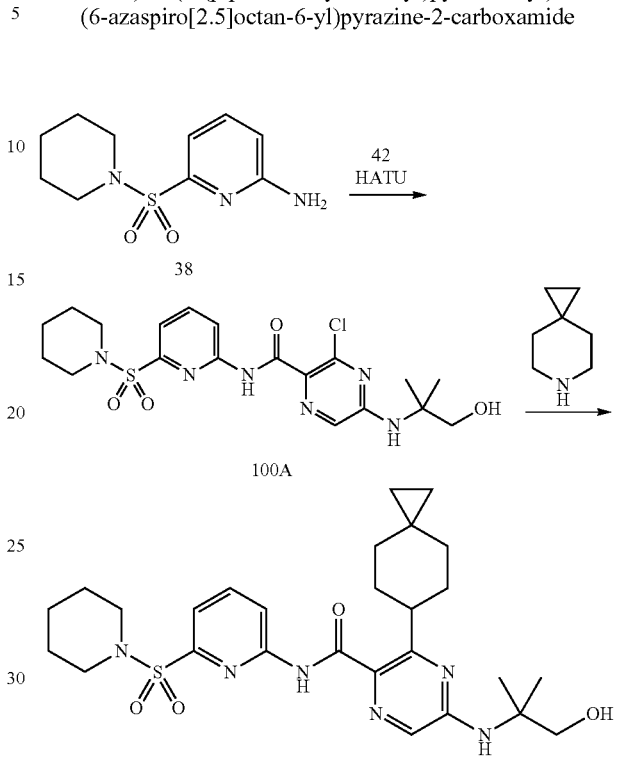

Example 100

Step 1. To a solution of 3-chloro-5-((1-hydroxy-2-methylpropan-2-yl)amino)pyrazine-2-carboxylic acid (Intermediate 42, 118 mg, 0.48 mmol) in DMF (3 mL) was added N,N-diisopropylethylamine (0.17 mL, 0.976 mmol) and 6-(piperidin-1-ylsulfonyl)pyridin-2-amine (Intermediate 38, 120 mg, 0.50 mmol). The solution was stirred at RT for 3 min, then treated with HATU (183 mg, 0.48 mmol, Aldrich). The reaction was heated to 50° C. for 4 d. Additional Intermediate 42 (50 mg) and HATU (100 mg) were added and the mixture was heated for another 2 d. The mixture was diluted with water (50 mL) and stirred for 30 min. The solid was filtered, washed with water (2×10 mL), loaded on a silica gel column and eluted with 10% to 100% EtOAc in heptane to provide 3-chloro-5-((1-hydroxy-2-methylpropan-2-yl)amino)-N-(6-(piperidin-1-ylsulfonyl)pyridin-2-yl) pyrazine-2-carboxamide (100A, 55 mg, 0.11 mmol, 24% yield) as a light yellow solid. $^1$H NMR (400 MHz, DMSO-d$_6$) δ ppm 10.42 (s, 1H), 8.42 (d, J=8.4 Hz, 1H), 8.13 (t, J=7.9 Hz, 1H), 8.01 (s, 1H), 7.90 (s, 1H), 7.63 (d, J=7.6 Hz, 1H), 4.88 (t, J=5.9 Hz, 1H), 3.58 (d, J=5.7 Hz, 2H), 3.10-3.19 (m, 4H), 1.47-1.56 (m, 4H), 1.43 (br d, J=6.8 Hz, 2H), 1.34 (s, 6H). m/z (ESI): 469.1 (M+H)$^+$.

Step 2. To a solution of 3-chloro-5-((1-hydroxy-2-methylpropan-2-yl)amino)-N-(6-(piperidin-1-ylsulfonyl)pyridin-2-yl)pyrazine-2-carboxamide (Intermediate 100A, 53 mg, 0.113 mmol) and 6-azaspiro[2.5]octane (19 mg, 0.170 mmol, AstaTech, Inc.) in DMSO (2 mL) was added N,N-diisopropylethylamine (0.04 mL, 0.230 mmol). The solution was stirred at RT for 16 h, then diluted with water (20 mL) and stirred for 20 min. The precipitated solid was filtered and washed with water (2×5 mL). The solid was purified via silica gel chromatography (0% to 80% EtOAc in heptane) to provide a mixture of starting material and product. The starting chloride eluted right on top of desired fractions and only 4 mg of desired product (m/z (ESI): 544.2 (M+H)$^+$) was obtained pure. The remaining mixed fractions were concentrated in vacuo and taken up in DMSO (1 mL) and treated with 6-azaspiro[2.5]octane (20 mg). After stirring for 3 d at RT, the reaction was diluted with water, stirred for 1 h, and filtered. The solid was taken up in EtOAc (15 mL) and washed with brine (2×40 mL), then concentrated in vacuo to give 5-((1-hydroxy-2-methylpropan-2-yl)amino)-N-(6-(piperidin-1-ylsulfonyl)pyridin-2-yl)-3-(6-azaspiro[2.5]octan-6-yl)pyrazine-2-carboxamide (Example 100, 40 mg, 0.074 mmol, 65% yield) as a light yellow solid. $^1$H NMR (400 MHz, CHLOROFORM-d) δ ppm 10.30 (s, 1H), 8.59 (d, J=8.4 Hz, 1H), 7.86 (t, J=8.0 Hz, 1H), 7.59 (d, J=7.4 Hz, 1H), 7.32 (s, 1H), 4.93 (s, 1H), 3.77 (d, J=5.7 Hz, 2H), 3.60-3.67 (m, 1H), 3.49-3.58 (m, 4H), 3.23-3.31 (m, 4H), 1.65 (quin, J=5.6 Hz, 4H), 1.57-1.59 (m, 2H, obscured by water peak), 1.48-1.53 (m, 2H), 1.46 (s, 6H), 0.79-0.88 (m, 2H), 0.38 (s, 4H). m/z (ESI): 544.2 (M+H)$^+$.

Example 101: 5-((1-(hydroxymethyl)cyclopropyl)amino)-N-(6-(piperidin-1-ylsulfonyl)pyridin-2-yl)-3-(6-azaspiro[2.5]octan-6-yl)pyrazine-2-carboxamide m/z (ESI): 542.2 (M+H)$^+$. This compound was prepared in a fashion similar to that described above for Example 100

Example 101

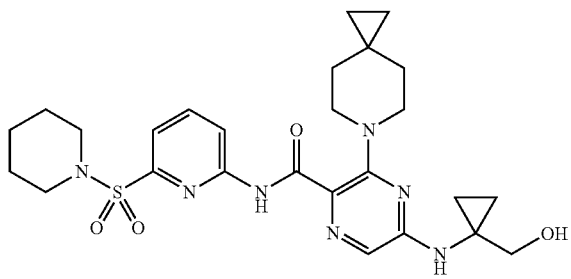

Examples 102 and 119

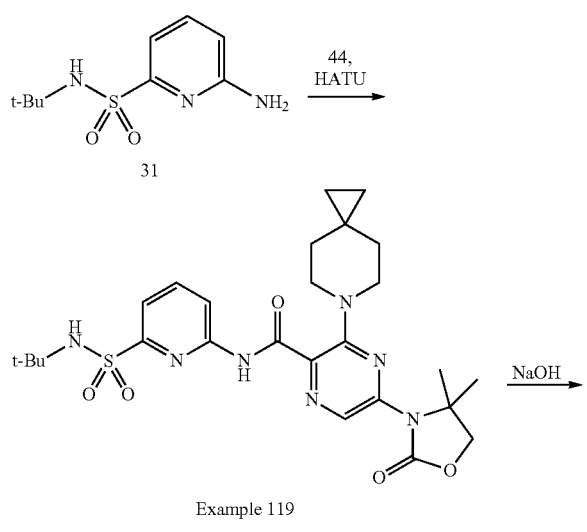

Example 119

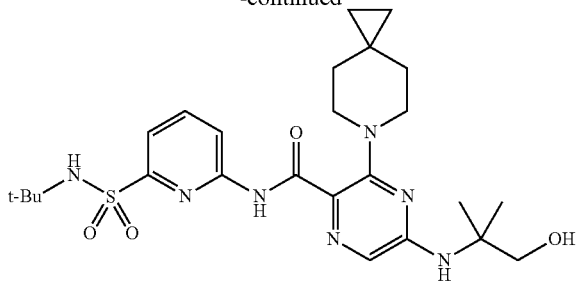

Example 102

Step 1. To a solution of 5-(4,4-dimethyl-2-oxooxazolidin-3-yl)-3-(6-azaspiro[2.5]octan-6-yl)pyrazine-2-carboxylic acid (44, 17.0 g, 49.1 mmol) in DMF (100 mL) was added 6-amino-N-(tert-butyl)pyridine-2-sulfonamide (31, 13.5 g, 58.9 mmol), HATU (28.0 g, 73.6 mmol) and DIPEA (16.14 mL, 98.2 mmol). The reaction mixture was heated at 70° C. for 16 h. The reaction mixture was cooled to RT and quenched with water (200 mL). The precipitated solid was filtered, washed with water (200 mL) followed by methanol (50 mL) and dried under vacuum to give N-(6-(N-(tert-butyl)sulfamoyl)pyridin-2-yl)-5-(4,4-dimethyl-2-oxooxazolidin-3-yl)-3-(6-azaspiro[2.5]octan-6-yl)pyrazine-2-carboxamide (Example 119, 13.5 g, 50% yield) as a white solid. $^1$H NMR (400 MHz, Chloroform-d): δ 10.36 (s, 1H), 8.68 (s, 1H), 8.56 (d, J=8.3 Hz, 1H), 7.90 (d, J=8.3, 8.0 Hz, 1H), 7.74 (d, J=8.0 Hz, 1H), 5.03 (s, 1H), 4.18 (s, 2H), 3.65-3.57 (m, 4H), 1.75 (s, 6H), 1.56 (bs, 4H), 1.26 (s, 9H), 0.41 (s, 4H). m/z (ESI): 558.2 (M+H)$^+$.

Step 2. To a solution of N-(6-(N-(tert-butyl)sulfamoyl)pyridin-2-yl)-5-(4,4-dimethyl-2-oxooxazolidin-3-yl)-3-(6-azaspiro[2.5]octan-6-yl)pyrazine-2-carboxamide (Example 119, 13.5 g, 24.17 mmol) in ethanol (250 mL) was added NaOH (24.17 mL of 2 N solution, 48.3 mmol) and the resulting mixture was stirred at RT for 4 h. The reaction mixture was acidified with 1.5 N aqueous HCl solution to pH ~ 6. The reaction mixture was extracted with ethyl acetate (3×1000 mL) and washed with water (1000 mL). The organic layer was dried over Na$_2$SO$_4$, filtered and concentrated under reduced pressure. The crude residue was purified by silica gel chromatography (0% to 40% ethyl acetate in hexanes) followed by recrystallization in acetonitrile (50 mL) and methanol (50 mL) to give N-(6-(N-(tert-butyl)sulfamoyl)pyridin-2-yl)-5-((1-hydroxy-2-methylpropan-2-yl)amino)-3-(6-azaspiro[2.5]octan-6-yl)pyrazine-2-carboxamide (Example 102, 8.4 g, 84% yield) as a white solid. $^1$H NMR (400 MHz, DMSO-d$_6$): δ 10.22 (s, 1H), 8.39 (d, J=8.4 Hz, 1H), 8.02 (dd, J=8.0, 7.5 Hz, 1H), 7.67 (s, 1H), 7.60 (d, J=7.5 Hz, 1H), 7.47 (s, 1H), 7.27 (s, 1H), 4.81 (t, J=5.7 Hz, 1H), 3.58 (d, J=5.7 Hz, 2H), 3.44 (td, J=6.7, 3.8 Hz, 4H), 1.46 (t, J=6.7, 3.9 Hz, 4H), 1.34 (s, 6H), 1.11 (s, 9H), 0.34 (s, 4H). m/z (ESI): 532.3 (M+H)$^+$.

TABLE 2

The following 17 Examples were prepared in a manner similar to Examples 119 and 102.

| Ex. # | Chemical Structure | Name | LRMS: (ESI + ve ion) m/z |
|---|---|---|---|
| 107 | | 3-(6-azaspiro[2.5]oct-6-yl)-N-(6-(4,4-dimethyl-2-oxo-1-pyrrolidinyl)-2-pyridinyl)-5-((1-hydroxy-2-methyl-2-propanyl)amino)-2-pyrazinecarboxamide | 508.3 |
| 120 | | 3-(6-azaspiro[2.5]octan-6-yl)-N-(6-((2S)-2-(hydroxymethyl)-4-morpholinyl)-2-pyridinyl)-5-((1-hydroxy-2-methyl-2-propanyl)amino)-2-pyrazinecarboxamide | 512.2 |
| 185 | | 2-methyl-2-propanyl 4-(6-(((2-(6-azaspiro[2.5]octan-6-yl)-6-((1-hydroxy-2-methyl-2-propanyl)amino)-3-pyridinyl)carbonyl)amino)-2-pyridinyl)-1-piperazinecarboxylate | 580.4 |
| 186 | | 6-((1-hydroxy-2-methylpropan-2-yl)amino)-N-(6-(2-(2-hydroxypropan-2-yl)morpholino)pyridin-2-yl)-2-(6-azaspiro[2.5]octan-6-yl)nicotinamide | 539.4 |
| 189 | | 2-(6-azaspiro[2.5]octan-6-yl)-N-(6-((2S)-2-(hydroxymethyl)-4-morpholinyl)-2-pyridinyl)-6-((1-hydroxy-2-methyl-2-propanyl)amino)-3-pyridinecarboxamide | 511.0 |

TABLE 2-continued

The following 17 Examples were prepared in a manner similar to Examples 119 and 102.

| Ex. # | Chemical Structure | Name | LRMS: (ESI + ve ion) m/z |
|---|---|---|---|
| 200 | | 2-(6-azaspiro[2.5]octan-6-yl)-6-((1-methoxy-2-methyl-2-propanyl)amino)-N-(6-((2R)-2-methyl-4-morpholinyl)-2-pyridinyl)-3-pyridinecarboxamide | 509.0 |
| 215 | | 2-(6-azaspiro[2.5]octan-6-yl)-6-((1-hydroxy-2-methyl-2-propanyl)amino)-N-(6-(4-hydroxy-1-piperidinyl)-2-pyridinyl)-3-pyridinecarboxamide | 495.1 |
| 216 | | 2-(6-azaspiro[2.5]octan-6-yl)-6-((1-hydroxy-2-methyl-2-propanyl)amino)-N-(6-((3R)-3-hydroxy-1-piperidinyl)-2-pyridinyl)-3-pyridinecarboxamide | 495.1 |
| 219 | | N-(6-(4-hydroxy-2,2-dimethylpyrrolidin-1-yl)pyridin-2-yl)-6-((1-hydroxy-2-methylpropan-2-yl)amino)-2-(6-azaspiro[2.5]octan-6-yl)nicotinamide | 509.3 |
| 220 | | 6-(4,4-dimethyl-2-oxooxazolidin-3-yl)-N-(6-(3-hydroxy-2,2-dimethylpyrrolidin-1-yl)pyridin-2-yl)-2-(6-azaspiro[2.5]octan-6-yl)nicotinamide | 535.3 |

TABLE 2-continued

The following 17 Examples were prepared in a manner similar to Examples 119 and 102.

| Ex. # | Chemical Structure | Name | LRMS: (ESI + ve ion) m/z |
|---|---|---|---|
| 221 | | N-(6-(3-hydroxy-2,2-dimethylpyrrolidin-1-yl)pyridin-2-yl)-6-((1-hydroxy-2-methylpropan-2-yl)amino)-2-(6-azaspiro[2.5]octan-6-yl)nicotinamide | 509.3 |
| 226 | | 2-(6-azaspiro[2.5]octan-6-yl)-6-((1-hydroxy-2-methyl-2-propanyl)amino)-N-(6-((3S)-3-hydroxy-1-piperidinyl)-2-pyridinyl)-3-pyridinecarboxamide | 455.1 |
| 227 | | 2-(6-azaspiro[2.5]octan-6-yl)-6-((1-hydroxy-2-methyl-2-propanyl)amino)-N-(6-((3S)-3-hydroxy-1-piperidinyl)-2-pyridinyl)-3-pyridinecarboxamide | 509.5 |
| 228 | | 2-(6-azaspiro[2.5]octan-6-yl)-6-((1-hydroxy-2-methyl-2-propanyl)amino)-N-(6-((3S)-3-hydroxy-1-piperidinyl)-2-pyridinyl)-3-pyridinecarboxamide | 495.3 |

TABLE 2-continued

The following 17 Examples were prepared in a manner similar to Examples 119 and 102.

| Ex. # | Chemical Structure | Name | LRMS: (ESI + ve ion) m/z |
|---|---|---|---|
| 229 | | 6-((1-hydroxy-2-methylpropan-2-yl)amino)-N-(6-(3-hydroxy-3-methylpiperidin-1-yl)pyridin-2-yl)-2-(6-azaspiro[2.5]octan-6-yl)nicotinamide | 509.4 |
| 230 | | 6-((1-hydroxy-2-methylpropan-2-yl)amino)-N-(6-(3-hydroxy-3-(hydroxymethyl)piperidin-1-yl)pyridin-2-yl)-2-(6-azaspiro[2.5]octan-6-yl)nicotinamide | 525.3 |
| 231 | | 6-((1-hydroxy-2-methylpropan-2-yl)amino)-N-(6-(2-(hydroxymethyl)-2-methylpyrrolidin-1-yl)pyridin-2-yl)-2-(6-azaspiro[2.5]octan-6-yl)nicotinamide | 509.4 |

Examples 103 and 104

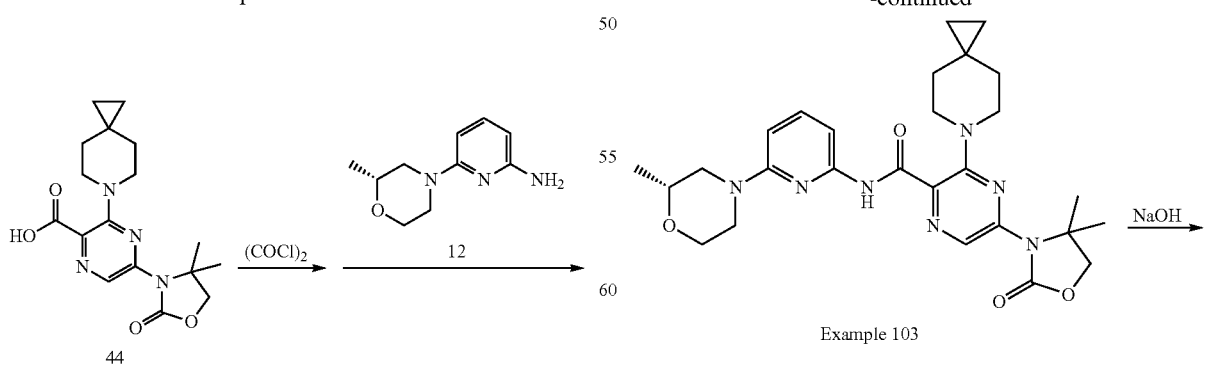

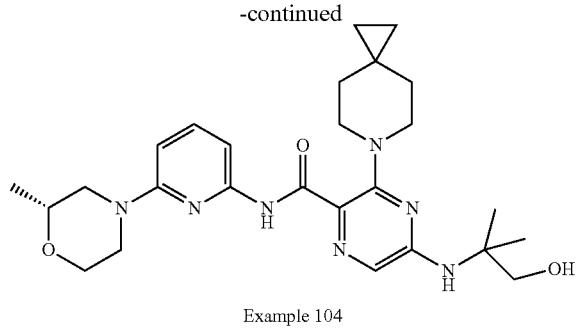

Example 104

Step 1. To a solution of 5-(4,4-dimethyl-2-oxooxazolidin-3-yl)-3-(6-azaspiro[2.5]octan-6-yl)pyrazine-2-carboxylic acid (Intermediate 44, 0.100 g, 0.289 mmol) in DCM (3.0 mL) was added oxalyl chloride solution (2.0 M in DCM, 0.217 mL, 0.433 mmol) followed by 2 drops of DMF. The reaction was stirred at RT for 20 min then concentrated. The residue was dissolved in DCM (3.0 mL) and cooled to 0° C. and treated with (R)-6-(2-methylmorpholino)pyridin-2-amine (56 mg, 0.289 mmol) followed by Hunig's base (0.151 mL, 0.866 mmol). The mixture was stirred at RT for 3 h then concentrated and purified by silica gel chromatography (0% to 35% EtOAc/heptane) to provide (R)-5-(4,4-dimethyl-2-oxooxazolidin-3-yl)-N-(6-(2-methylmorpholino)pyridin-2-yl)-3-(6-azaspiro[2.5]octan-6-yl) pyrazine-2-carboxamide (Example 103, 0.106 g, 0.203 mmol, 70% yield) as a yellow solid. $^1$H NMR (400 MHz, CHLOROFORM-d) δ ppm 0.38 (s, 4H) 1.27 (d, J=6.26 Hz, 3H) 1.50-1.54 (m, 4H) 1.71 (s, 6H) 2.57 (dd, J=12.52, 10.37 Hz, 1H) 2.93 (td, J=12.37, 3.62 Hz, 1H) 3.53-3.60 (m, 4H) 3.63-3.77 (m, 2H) 3.95-4.03 (m, 2H) 4.09 (br d, J=12.13 Hz, 1H) 4.14 (s, 2H) 6.37 (d, J=8.22 Hz, 1H) 7.53 (t, J=8.02 Hz, 1H) 7.68 (d, J=7.82 Hz, 1H) 8.67 (s, 1H) 9.87 (s, 1H). m/z (ESI): 522.2 (M+H)$^+$.

Step 2. To a suspension of (R)-5-(4,4-dimethyl-2-oxooxazolidin-3-yl)-N-(6-(2-methylmorpholino)pyridin-2-yl)-3-(6-azaspiro[2.5]octan-6-yl)pyrazine-2-carboxamide (Example 103, 0.097 g, 0.186 mmol) in methanol (5.0 mL) was added sodium hydroxide (5.0 N solution, 0.5 mL, 2.5 mmol). The mixture was heated at 70° C. for 2 h until the conversion completed. The mixture was neutralized with 2 N HCl and then concentrated to dryness. The residue was diluted with EtOAc and water. The separated organic layer was washed with brine, dried over Na$_2$SO$_4$ and filtered. The filtrate was concentrated and purified by silica gel chromatography (0% to 40% EtOAc:EtOH(3:1)/heptane) to afford (R)-5-((1-hydroxy-2-methylpropan-2-yl)amino)-N-(6-(2-methylmorpholino)pyridin-2-yl)-3-(6-azaspiro[2.5]octan-6-yl)pyrazine-2-carboxamide (Example 104, 0.070 g, 0.141 mmol, 76% yield) as a light yellow solid. $^1$H NMR (400 MHz, CHLOROFORM-d) δ ppm 0.37 (s, 4H) 1.27 (d, J=6.26 Hz, 3 H) 1.44 (s, 6H) 1.57-1.62 (m, 4H) 2.57 (dd, J=12.52, 10.37 Hz, 1H) 2.92 (td, J=12.32, 3.52 Hz, 1H) 3.45-3.52 (m, 4H) 3.62-3.73 (m, 2H) 3.76 (d, J=5.28 Hz, 2H) 3.84-3.92 (m, 1H) 3.96-4.04 (m, 2H) 4.08 (br d, J=12.72 Hz, 1H) 4.84 (s, 1H) 6.35 (d, J=8.22 Hz, 1H) 7.36 (s, 1H) 7.53 (t, J=8.02 Hz, 1H) 7.72 (d, J=8.02 Hz, 1H) 10.01 (s, 1H). m/z (ESI): 496.3 (M+H)$^+$.

TABLE 3

The following 41 Examples were prepared in a manner similar to Examples 103 and 104.

| Ex. # | Chemical Structure | Name | LRMS: (ESI + ve ion) m/z |
|---|---|---|---|
| 105 | | 3-(6-azaspiro[2.5]oct-6-yl)-5-((1-hydroxy-2-methyl-2-propanyl)amino)-N-(6-((3S)-3-methyl-1-pyrrolidinyl)-2-pyridinyl)-2-pyrazinecarboxamide | 480.3 |
| 106 | | 3-(6-azaspiro[2.5]oct-6-yl)-5-((2-hydroxy-1,1-dimethylethyl)amino)-N-(6-(4-morpholinyl)-2-pyridinyl)-2-pyrazinecarboxamide | 482.1 |

TABLE 3-continued

The following 41 Examples were prepared in a manner similar to Examples 103 and 104.

| Ex. # | Chemical Structure | Name | LRMS: (ESI + ve ion) m/z |
|---|---|---|---|
| 109 | | 3-(6-azaspiro[2.5]oct-6-yl)-5-((1-(hydroxymethyl)cyclopropyl)amino)-N-(6-((2-methyl-2-propanyl)sulfamoyl)-2-pyridinyl)-2-pyrazinecarboxamide | 530.2 |
| 111 | and enantiomer | N-(6-((2S,6S)-2,6-dimethylmorpholino)pyridin-2-yl)-5-((1-hydroxy-2-methylpropan-2-yl)amino)-3-(6-azaspiro[2.5]octan-6-yl)pyrazine-2-carboxamide and enantiomer | 510.2 |
| 112 | and enantiomer | N-(6-((1S,4S)-2-oxa-5-azabicyclo[2.2.1]heptan-5-yl)pyridin-2-yl)-5-((1-hydroxy-2-methylpropan-2-yl)amino)-3-(6-azaspiro[2.5]octan-6-yl)pyrazine-2-carboxamide and enantiomer | 494.2 |
| 114 | | 3-(6-azaspiro[2.5]octan-6-yl)-5-((1-hydroxy-2-methyl-2-propanyl)amino)-N-(4-methyl-6-(4-morpholinyl)-2-pyridinyl)-2-pyrazinecarboxamide | 496.2 |

TABLE 3-continued

The following 41 Examples were prepared in a manner similar to Examples 103 and 104.

| Ex. # | Chemical Structure | Name | LRMS: (ESI + ve ion) m/z |
|---|---|---|---|
| 123 | | 2-(6-azaspiro[2.5]oct-6-yl)-N-(6-(tert-butylsulfamoyl)-2-pyridinyl)-6-((2-hydroxy-1,1-dimethylethyl)amino)-3-pyridinecarboxamide | 531.2 |
| 124 | | 6-((1-hydroxy-2-methylpropan-2-yl)amino)-N-(6-(3-methoxypyrrolidin-1-yl)pyridin-2-yl)-2-(6-azaspiro[2.5]octan-6-yl)nicotinamide | 495.2 |
| 125 | | 2-(6-azaspiro[2.5]oct-6-yl)-6-((2-hydroxy-1,1-dimethylethyl)amino)-N-(6-(1-pyrrolidinyl)-2-pyridinyl)-3-pyridinecarboxamide | 465.2 |
| 126 | | 6-((1-hydroxy-2-methylpropan-2-yl)amino)-N-(6-(2-methylmorpholino)pyridin-2-yl)-2-(6-azaspiro[2.5]octan-6-yl)nicotinamide | 495.2 |
| 127 | | 2-(6-azaspiro[2.5]oct-6-yl)-6-((2-hydroxy-1,1-dimethylethyl)amino)-N-(6-(4-morpholinyl)-2-pyridinyl)-3-pyridinecarboxamide | 481.2 |

TABLE 3-continued

The following 41 Examples were prepared in a manner similar to Examples 103 and 104.

| Ex. # | Chemical Structure | Name | LRMS: (ESI + ve ion) m/z |
|---|---|---|---|
| 128 | | 2-(6-azaspiro[2.5]oct-6-yl)-N-(6-(3,3-dimethyl-1-pyrrolidinyl)-2-pyridinyl)-6-((2-hydroxy-1,1-dimethylethyl)amino)-3-pyridinecarboxamide | 493.3 |
| 129 | | 2-(6-azaspiro[2.5]oct-6-yl)-N-(6-(3,3-difluoro-1-pyrrolidinyl)-2-pyridinyl)-6-((2-hydroxy-1,1-dimethylethyl)amino)-3-pyridinecarboxamide | 501.2 |
| 130 | | 2-(6-azaspiro[2.5]oct-6-yl)-N-(6-(2,2-dimethyl-4-morpholinyl)-2-pyridinyl)-6-((2-hydroxy-1,1-dimethylethyl)amino)-3-pyridinecarboxamide | 509.3 |
| 131 | | 6-((1-hydroxy-2-methylpropan-2-yl)amino)-N-(6-(3-hydroxypyrrolidin-1-yl)pyridin-2-yl)-2-(6-azaspiro[2.5]octan-6-yl)nicotinamide | 481.2 |
| 132 | | 2-(6-azaspiro[2.5]oct-6-yl)-6-((2-hydroxy-1,1-dimethylethyl)amino)-N-(6-((2S)-2-methyl-4-morpholinyl)-2-pyridinyl)-3-pyridinecarboxamide | 495.2 |

TABLE 3-continued

The following 41 Examples were prepared in a manner similar to Examples 103 and 104.

| Ex. # | Chemical Structure | Name | LRMS: (ESI + ve ion) m/z |
|---|---|---|---|
| 133 | | 2-(6-azaspiro[2.5]oct-6-yl)-6-((2-hydroxy-1,1-dimethylethyl)amino)-N-(6-(4-methyl-1-piperazinyl)-2-pyridinyl)-3-pyridinecarboxamide | 494.3 |
| 136 | | N-(6-((1R,5S)-3-azabicyclo[3.1.0]hex-3-yl)-2-pyridinyl)-2-(6-azaspiro[2.5]oct-6-yl)-6-((2-hydroxy-1,1-dimethylethyl)amino)-3-pyridinecarboxamide | 477.2 |
| 137 | | 2-(6-azaspiro[2.5]oct-6-yl)-6-((2-hydroxy-1,1-dimethylethyl)amino)-N-(6-((2R)-2-methyl-4-morpholinyl)-2-pyridinyl)-3-pyridinecarboxamide | 495.2 |
| 138 | | 2-(6-azaspiro[2.5]oct-6-yl)-N-(6-(3,6-dihydro-2H-pyran-4-yl)-2-pyridinyl)-6-((1-hydroxy-2-methyl-2-propanyl)amino)-3-pyridinecarboxamide | 478.1 |
| 139 | | 2-(6-azaspiro[2.5]oct-6-yl)-6-((1-hydroxy-2-methyl-2-propanyl)amino)-N-(6-((3S)-3-methyl-1-pyrrolidinyl)-2-pyridinyl)-3-pyridinecarboxamide | 479.1 |

TABLE 3-continued

The following 41 Examples were prepared in a manner similar to Examples 103 and 104.

| Ex. # | Chemical Structure | Name | LRMS: (ESI + ve ion) m/z |
|---|---|---|---|
| 144 | | 2-(6-azaspiro[2.5]oct-6-yl)-N-(6-(3-fluoro-1-azetidinyl)-2-pyridinyl)-6-((1-hydroxy-2-methyl-2-propanyl)amino)-3-pyridinecarboxamide | 469.2 |
| 145 | | 2-(6-azaspiro[2.5]oct-6-yl)-6-((1-hydroxy-2-methyl-2-propanyl)amino)-N-(6-(3-methoxy-1-azetidinyl)-2-pyridinyl)-3-pyridinecarboxamide | 481.3 |
| 150 | and enantiomer | N-(6-((2S,6S)-2,6-dimethylmorpholino)pyridin-2-yl)-6-((1-hydroxy-2-methylpropan-2-yl)amino)-2-(6-azaspiro[2.5]octan-6-yl)nicotinamide and enantiomer | 509.7 |
| 151 | and enantiomer | N-(6-((1S,4S)-2-oxa-5-azabicyclo[2.2.1]heptan-5-yl)pyridin-2-yl)-6-((1-hydroxy-2-methylpropan-2-yl)amino)-2-(6-azaspiro[2.5]octan-6-yl)nicotinamide and enantiomer | 493.3 |

TABLE 3-continued

The following 41 Examples were prepared in a manner similar to Examples 103 and 104.

| Ex. # | Chemical Structure | Name | LRMS: (ESI + ve ion) m/z |
|---|---|---|---|
| 152 | | 2-(6-azaspiro[2.5]oct-6-yl)-N-(4-chloro-6-(4-morpholinyl)-2-pyridinyl)-6-((1-hydroxy-2-methyl-2-propanyl)amino)-3-pyridinecarboxamide | 515.7 |
| 155 | | 2-(6-azaspiro[2.5]octan-6-yl)-6-((1-hydroxy-2-methyl-2-propanyl)amino)-N-(4-methyl-6-(4-morpholinyl)-2-pyridinyl)-3-pyridinecarboxamide | 495.2 |
| 157 | | 2-(6-azaspiro[2.5]octan-6-yl)-6-((1-hydroxy-2-methyl-2-propanyl)amino)-N-(4-methyl-6-((2-methyl-2-propanyl)sulfamoyl)-2-pyridinyl)-3-pyridinecarboxamide | 545.4 |
| 163 | | 2-(6-azaspiro[2.5]octan-6-yl)-6-((1-hydroxy-2-methyl-2-propanyl)amino)-N-(6-(2-oxa-6-azaspiro[3.3]heptan-6-yl)-2-pyridinyl)-3-pyridinecarboxamide | 493.1 |

TABLE 3-continued

The following 41 Examples were prepared in a manner similar to Examples 103 and 104.

| Ex. # | Chemical Structure | Name | LRMS: (ESI + ve ion) m/z |
|---|---|---|---|
| 165 | | 2-(6-azaspiro[2.5]octan-6-yl)-6-(4,4-dimethyl-2-oxo-1,3-oxazolidin-3-yl)-N-(6-((2R)-2-methyl-4-morpholinyl)-2-pyridinyl)-3-pyridinecarboxamide | 521.2 |
| 179 | | 2-(6-azaspiro[2.5]octan-6-yl)-6-((1-hydroxy-2-methyl-2-propanyl)amino)-N-(6-((3R)-3-methyl-4-morpholinyl)-2-pyridinyl)-3-pyridinecarboxamide | 495.2 |
| 183 | | 2-(6-azaspiro[2.5]octan-6-yl)-6-((1-hydroxy-2-methyl-2-propanyl)amino)-N-(6-((3S)-3-methyl-4-morpholinyl)-2-pyridinyl)-3-pyridinecarboxamide | 495.2 |
| 187 | | N-(6-((2S,5R)-2,5-dimethylmorpholino)pyridin-2-yl)-6-((1-hydroxy-2-methylpropan-2-yl)amino)-2-(6-azaspiro[2.5]octan-6-yl)nicotinamide and enantiomer | 509.1 |

TABLE 3-continued

The following 41 Examples were prepared in a manner similar to Examples 103 and 104.

| Ex. # | Chemical Structure | Name | LRMS: (ESI + ve ion) m/z |
|---|---|---|---|
| 188 | | 2-(6-azaspiro[2.5]octan-6-yl)-6-((1-hydroxy-2-methyl-2-propanyl)amino)-N-(6-(4-(2-propanyl)-1-piperazinyl)-2-pyridinyl)-3-pyridinecarboxamide | 522.3 |
| 190 | | 2-(6-azaspiro[2.5]octan-6-yl)-N-(6-(4-cyclopropyl-1-piperazinyl)-2-pyridinyl)-6-((1-hydroxy-2-methyl-2-propanyl)amino)-3-pyridinecarboxamide | 520.3 |
| 191 | | 2-(6-azaspiro[2.5]octan-6-yl)-N-(6-(4-cyclobutyl-1-piperazinyl)-2-pyridinyl)-6-((1-hydroxy-2-methyl-2-propanyl)amino)-3-pyridinecarboxamide | 534.3 |
| 192 | | 2-(6-azaspiro[2.5]octan-6-yl)-N-(6-(4-ethyl-1-piperazinyl)-2-pyridinyl)-6-((1-hydroxy-2-methyl-2-propanyl)amino)-3-pyridinecarboxamide | 508.3 |

TABLE 3-continued

The following 41 Examples were prepared in a manner similar to Examples 103 and 104.

| Ex. # | Chemical Structure | Name | LRMS: (ESI + ve ion) m/z |
|---|---|---|---|
| 199 | and enantiomer | N-(6-((2S,5S)-2,5-dimethylmorpholino)pyridin-2-yl)-6-((1-hydroxy-2-methylpropan-2-yl)amino)-2-(6-azaspiro[2.5]octan-6-yl)nicotinamide and enantiomer | 509.3 |
| 203 | | 6-((1-hydroxy-2-methylpropan-2-yl)amino)-N-(6-(2-isopropylmorpholino)pyridin-2-yl)-2-(6-azaspiro[2.5]octan-6-yl)nicotinamide | 523.3 |
| 204 | | N-(6-(2-ethylmorpholino)pyridin-2-yl)-6-((1-hydroxy-2-methylpropan-2-yl)amino)-2-(6-azaspiro[2.5]octan-6-yl)nicotinamide | 509.3 |
| 205 | | 6-((1-hydroxy-2-methylpropan-2-yl)amino)-2-(6-azaspiro[2.5]octan-6-yl)-N-(6-(2-(trifluoromethyl)morpholino)pyridin-2-yl)nicotinamide | 549.2 |

Example 108: N-(6-(N-(tert-butyl)sulfamoyl)pyridin-2-yl)-5-((1,3-dihydroxy-2-methylpropan-2-yl)amino-3-(6-azaspiro[2.5]octan-6-yl)pyrazine-2-carboxamide

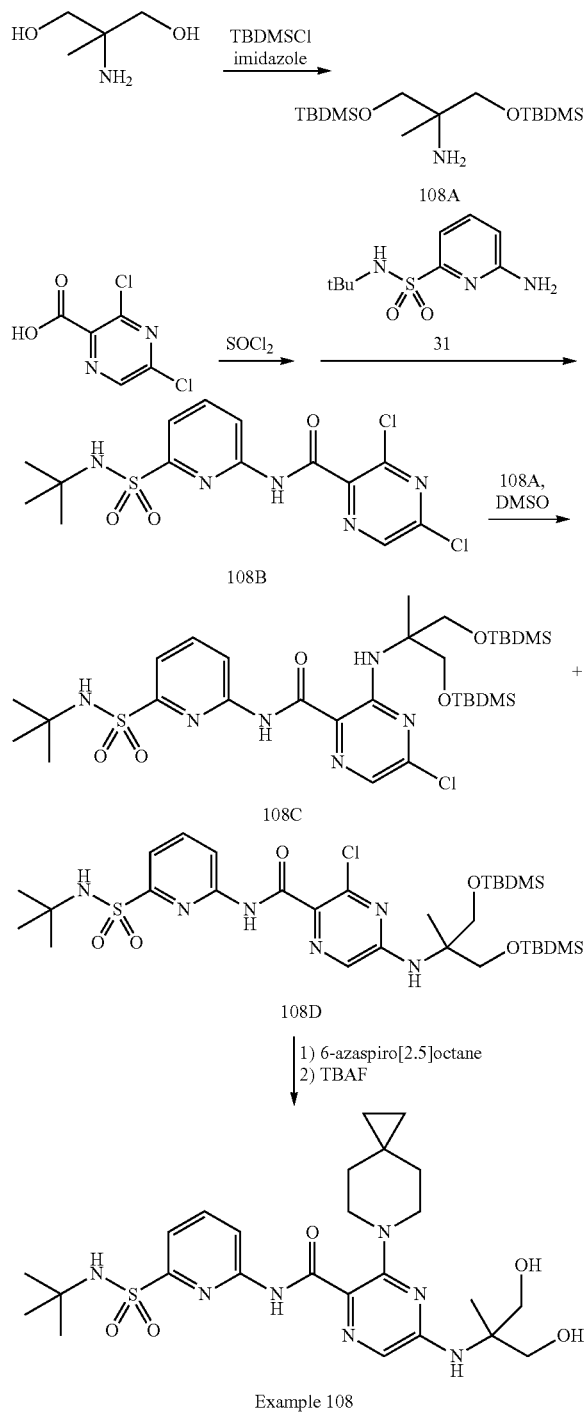

Step 1. A 250-mL round-bottomed flask was charged with 2-amino-2-methyl-1,3-propanediol (1.00 g, 9.56 mmol) and DMF (30 mL). tert-Butyldimethylsilane chloride (7.11 mL, 38.2 mmol) was added followed by imidazole (3.52 mL, 57.4 mmol). The mixture was stirred at RT for 21 h then diluted with sat'd NaHCO$_3$ and extracted with EtOAc (3×50 mL). The combined organic phase was washed with water (150 mL), dried over Na$_2$SO$_4$ and concentrated to give 5.24 g of clear oil. The crude product was purified by Biotage (SNAP50, Ultra, eluent: EtOAc in heptane 10% to 90%) to give 2,2,3,3,6,9,9,10,10-nonamethyl-4,8-dioxa-3,9-disilaundecan-6-amine (108A, 2.86 g, 90% yield). $^1$H NMR (400 MHz, CHLOROFORM-d) δ 3.35-3.45 (m, 4H), 0.99 (s, 3H), 0.90 (s, 18H), 0.05 (s, 12H).

Step 2. To a solution of 3,5-dichloropyrazine-2-carboxylic acid (1.01 g, 5.23 mmol) and toluene (10 mL) was added thionyl chloride (0.57 mL, 7.81 mmol). The solution was stirred at reflux for 1.5 h, the reaction was allowed to cool to RT and concentrated in vacuo, then azeotroped with toluene (3×10 mL). The residue was taken up in DCM (10 mL) and treated with 6-amino-N-(tert-butyl)pyridine-2-sulfonamide (31, 1.08 g, 4.71 mmol) and N,N-diisopropylethylamine (1.82 mL, 10.47 mmol). After 4 h, the reaction was diluted with DCM (20 mL) and washed with water (30 mL). The aqueous layer was back extracted with DCM (20 mL). The combined DCM layers were concentrated to ½ volume and the solids filtered and rinsed with additional DCM to give N-(6-(N-(tert-butyl)sulfamoyl)pyridin-2-yl)-3,5-dichloropyrazine-2-carboxamide (108B, 1.61 g, 3.99 mmol, 76% yield) as a white solid.

Step 3. To a solution of 2,2,3,3,6,9,9,10,10-nonamethyl-4,8-dioxa-3,9-disilaundecan-6-amine (108A, 1.00 g, 3.00 mmol) and DMSO (8 mL) was added N-(6-(N-(tert-butyl)sulfamoyl)pyridin-2-yl)-3,5-dichloropyrazine-2-carboxamide (108B, 1.01 g, 2.49 mmol) and N,N-diisopropylethylamine (1.30 mL, 7.49 mmol). The solution was stirred at 60° C. for 23 h then cooled to RT and diluted with water (60 mL) and stirred for 5 min. The mixture was extracted with EtOAc (3×50 mL). The combined EtOAc layers were washed with water (2×50 mL) and concentrated. The crude product was purified by Biotage (SNAP50, Ultra, eluent: EtOAc in heptane 0%-30%) to obtain 2 compounds that had m/z (ESI): 702.0 (M+H)$^+$. The 1$^{st}$ eluent was 108C (0.457 g of pale yellow solid): $^1$H NMR (400 MHz, DMSO-d$_6$) δ 10.22 (s, 1H), 8.98 (s, 1H), 8.28 (d, J=8.41 Hz, 1H), 8.15 (t, J=8.12 Hz, 1H), 8.00 (s, 1H), 7.70-7.81 (m, 2H), 3.85 (d, J=9.59 Hz, 2H), 3.74 (d, J=9.59 Hz, 2H), 1.39 (s, 3H), 1.11 (s, 9H), 0.86-0.89 (m, 18H), 0.04 (d, J=8.22 Hz, 12H). The 2$^{nd}$ eluent was 108D (0.5451 g of yellow solid): $^1$H NMR (400 MHz, DMSO-d$_6$) δ 10.27 (s, 1H), 8.37 (d, J=8.22 Hz, 1H), 8.11 (d, J=8.02 Hz, 1H), 8.03 (s, 1H), 7.80 (s, 1H), 7.64-7.73 (m, 2H), 3.88 (d, J=9.59 Hz, 2H), 3.77 (d, J=9.59 Hz, 2H), 1.32 (s, 3H), 1.12 (s, 9H), 0.84 (s, 18H), −0.02 (d, J=3.52 Hz, 12H).

Step 4. To a solution of 6-azaspiro[2.5]octane (91 mg, 0.82 mmol) and DMSO (4 mL) was added N-(6-(N-(tert-butyl)sulfamoyl)pyridin-2-yl)-3-chloro-5-((2,2,3,3,6,9,9,10,10-nonamethyl-4,8-dioxa-3,9-disilaundecan-6-yl)amino)pyrazine-2-carboxamide (108D, 540 mg, 0.77 mmol) and N,N-diisopropylethylamine (0.33 mL, 1.92 mmol). The solution was stirred at 60° C. for 4 h. The reaction was allowed to cool to RT and diluted with water (50 mL) and extracted with EtOAc (2×30 mL). The combined organic layers were concentrated in vacuo to give crude N-(6-(N-(tert-butyl)sulfamoyl)pyridin-2-yl)-5-((2,2,3,3,6,9,9,10,10-nonamethyl-4,8-dioxa-3,9-disilaundecan-6-yl)amino)-3-(6-azaspiro[2.5]octan-6-yl)pyrazine-2-carboxamide (0.61 g) as a dark yellow oil. Assuming 100% conversion, this material was used in the next reaction without further purification.

Step 5. A 250-mL round-bottomed flask was charged with N-(6-(N-(tert-butyl)sulfamoyl)pyridin-2-yl)-5-((2,2,3,3,6,9,9,10,10-nonamethyl-4,8-dioxa-3,9-disilaundecan-6-yl)amino)-3-(6-azaspiro[2.5]octan-6-yl)pyrazine-2-carboxamide (0.60 g, 0.77 mmol) and THF (10 mL). Tetrabutylammonium fluoride (2.31 mL of 1 M in THF, 2.31 mmol) was added and the mixture was stirred at RT for 30 min. The reaction mixture was partitioned between water (30 mL) and EtOAc (20 mL). The aqueous phase was extracted with EtOAc (2×20 mL); the organics were dried and concentrated. The crude product was purified via silica gel chromatography (EtOAc in heptane 30%-100%) to afford N-(6-(N-(tert-butyl)sulfamoyl)pyridin-2-yl)-5-((1,3-dihydroxy-2-methylpropan-2-yl)amino)-3-(6-azaspiro[2.5]octan-6-yl)pyrazine-2-carboxamide (Example 108, 0.19 g) as a light yellow solid. $^1$H NMR (400 MHz, DMSO-d$_6$) δ 10.23 (s, 1H), 8.39 (d, J=8.41 Hz, 1H), 8.02 (t, J=8.02 Hz, 1H), 7.66 (s, 1H), 7.60 (d, J=7.43 Hz, 1H), 7.51 (s, 1H), 7.06 (s, 1H), 4.68 (t, J=5.67 Hz, 2H), 3.59-3.71 (m, 4H), 3.39-3.48 (m, 4H), 1.47 (br d, J=4.50 Hz, 4H), 1.30 (s, 3H), 1.11 (s, 9H), 0.35 (s, 4H). m/z (ESI): 548.5 (M+H)$^+$.

Example 110: N-(6-(N-(tert-butyl)sulfamoyl)pyridin-2-yl)-3-(6-azaspiro[2.5]octan-6-yl)-5-(1,1,1-trifluoro-2-hydroxypropan-2-yl)pyrazine-2-carboxamide

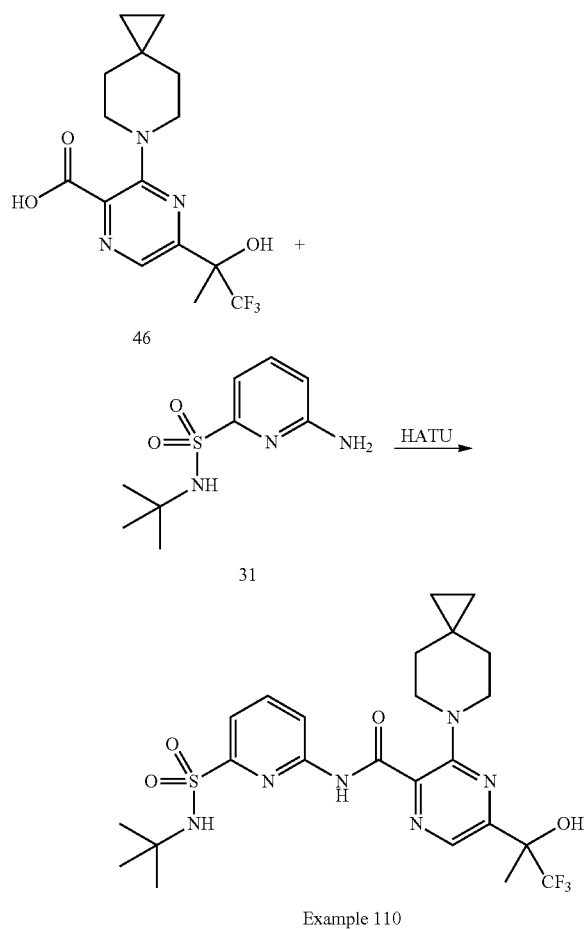

Example 110

To a stirred mixture of 3-(6-azaspiro[2.5]octan-6-yl)-5-(1,1,1-trifluoro-2-hydroxypropan-2-yl)pyrazine-2-carboxylic acid (Intermediate 46, 200 mg, 0.58 mmol), 6-amino-N-(tert-butyl)pyridine-2-sulfonamide (Intermediate 31, 159 mg, 0.69 mmol), and DIPEA (0.15 mL, 0.86 mmol) in DMF (3 mL) was added HATU (286 mg, 0.75 mmol). The reaction mixture was heated to 65° C. for 6 h. It was cooled to RT and treated with water (3 mL). The solid was filtered and purified on a silica gel column (0% to 30% EtOAc/EtOH (3/1) in heptane) to give N-(6-(N-(tert-butyl)sulfamoyl)pyridin-2-yl)-3-(6-azaspiro[2.5]octan-6-yl)-5-(1,1,1-trifluoro-2-hydroxypropan-2-yl)pyrazine-2-carboxamide (Example 110, 123 mg, 0.22 mmol, 38% yield).
$^1$H NMR (DMSO-d$_6$) δ: 10.89 (s, 1H), 8.33 (br d, J=8.0 Hz, 1H), 8.27 (s, 1H), 8.11 (t, J=8.0 Hz, 1H), 7.72 (d, J=7.4 Hz, 1H), 7.60 (s, 1H), 6.96 (s, 1H), 3.50-3.59 (m, 4H), 1.69 (s, 3H), 1.36-1.44 (m, 4H), 1.14 (s, 9H), 0.33 (s, 4H). m/z (ESI): 557.2 (M+H)$^+$.

Example 113: N-(4-Chloro-6-morpholinopyridin-2-yl)-5-((1-hydroxy-2-methylpropan-2-yl)amino)-3-(6-azaspiro[2.5]octan-6-yl)pyrazine-2-carboxamide

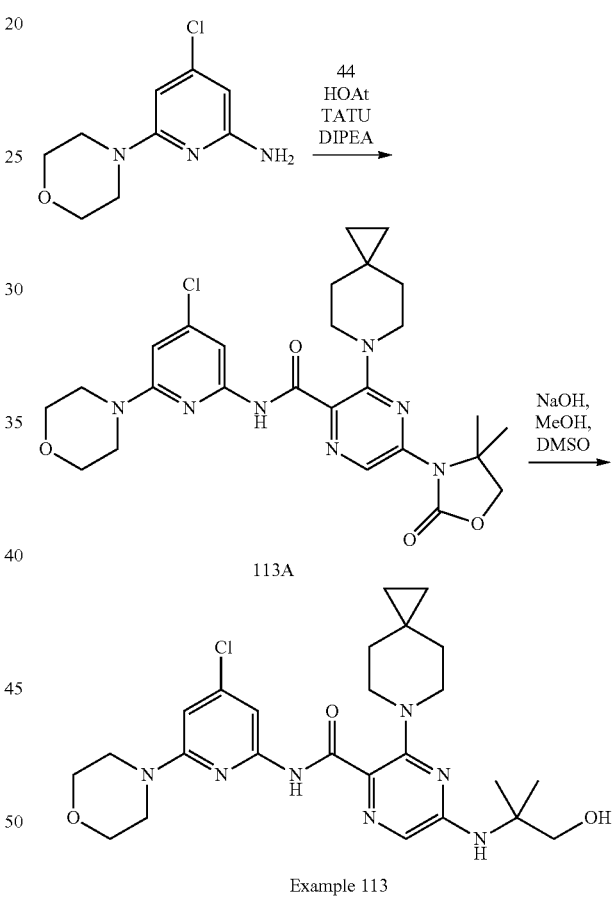

Example 113

Step 1. To a solution of 5-(4,4-dimethyl-2-oxooxazolidin-3-yl)-3-(6-azaspiro[2.5]octan-6-yl)pyrazine-2-carboxylic acid (Intermediate 44, 0.10 g, 0.29 mmol) in DMF (3 mL) was added 2-(3H-[1,2,3]triazolo[4,5-b]pyridin-3-yl)-1,1,3,3-tetramethylisouronium tetrafluoroborate (TATU, 0.12 g, 0.38 mmol, FSSI), 3H-[1,2,3]triazolo[4,5-b]pyridin-3-ol (HOAt, 0.05 g, 0.38 mmol, Chempep), 4-chloro-6-morpholinopyridin-2-amine (0.07 g, 0.34 mmol, Aurum) and diisopropylethylamine (0.23 mL, 1.33 mmol). The mixture was stirred at RT for 45 min and at 80° C. for 2.5 h. The reaction was quenched with methanol and the crude mixture was purified by chromatography on silica gel (24 g) eluting with 0% to 80% EA in heptane to give N-(4-chloro-6- morpholinopyridin-2-yl)-5-(4,4-dimethyl-2-oxooxazolidin-3-yl)-3-(6-azaspiro[2.5]octan-6-yl)pyrazine-2-carboxamide (113A, 0.166 g, not pure). m/z ESI 542.2 (M+H)$^+$.

Step 2. N-(4-Chloro-6-morpholinopyridin-2-yl)-5-(4,4-dimethyl-2-oxooxazolidin-3-yl)-3-(6-azaspiro[2.5]octan-6-yl)pyrazine-2-carboxamide (113A, 0.040 g, 0.074 mmol) was treated with 2 mL of a methanol/NaOH solution (5 mL methanol, 33 uL 1 N NaOH) for 2.5 h at 70° C. DMSO (0.5 mL) was added and heating continued for 2 h. The mixture was filtered into an Agilent autosampler vial and purified by prep HPLC 5-95% ACN in water (0.1% TFA) over 14 min, 40 mL/min, X-Bridge C18 10 um 18×100 mm. Pure fractions were combined and lyophilized to provide N-(4-chloro-6-morpholinopyridin-2-yl)-5-((1-hydroxy-2-methylpropan-2-yl)amino)-3-(6-azaspiro[2.5]octan-6-yl)pyrazine-2-carboxamide (Example 113, 0.0226 g, 0.044 mmol, 59% yield) as a yellow powder. $^1$H NMR (400 MHz, DMSO-d$_6$) δ ppm 0.34 (s, 4H) 1.34 (s, 6H) 1.42-1.51 (m, 5H) 3.36-3.40 (m, 4H) 3.43-3.49 (m, 4H) 3.58 (s, 2H) 3.64-3.70 (m, 4H) 6.60 (s, 1H) 7.22 (brs, 1H) 7.45-7.48 (m, 1H) 7.57 (s, 1H) 10.05-10.09 (m, 1H). m/z (ESI): 516.2 (M+H).

Example 116: 5-((1-Hydroxy-2-methylpropan-2-yl)amino)-N-(4-methoxy-6-morpholinopyridin-2-yl)-3-(6-azaspiro[2.5]octan-6-yl)pyrazine-2-carboxamide

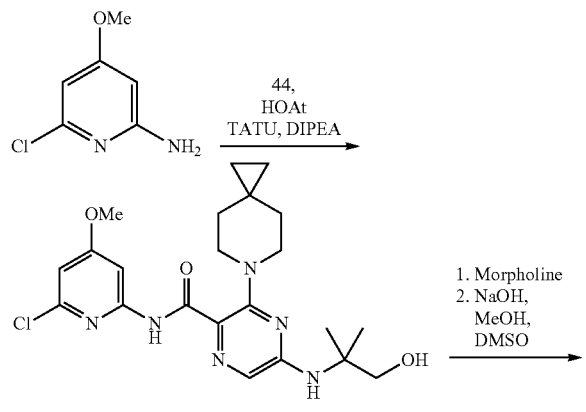

Step 1. To a solution of 5-(4,4-dimethyl-2-oxooxazolidin-3-yl)-3-(6-azaspiro[2.5]octan-6-yl)pyrazine-2-carboxylic acid (Intermediate 44, 0.10 g, 0.29 mmol) in DMF (3 mL) was added 2-(3H-[1,2,3]triazolo[4,5-b]pyridin-3-yl)-1,1,3,3-tetramethylisouronium tetrafluoroborate (TATU, 0.124 g, 0.384 mmol, FSSI), 3H-[1,2,3]triazolo[4,5-b]pyridin-3-ol (HOAt, 0.052 g, 0.384 mmol, Chempep), 2-amino-6-chloro-4-methoxypyridine (0.055 mL, 0.346 mmol, Oxchem) and diisopropylethylamine (0.231 mL, 1.33 mmol). The mixture was stirred 15 min then heated to 80° C. for 3 h. The mixture was purified by chromatography on silica gel (40 g, 0% to 100% EA in heptane) to provide N-(6-chloro-4-methoxy-pyridin-2-yl)-5-(4,4-dimethyl-2-oxooxazolidin-3-yl)-3-(6-azaspiro[2.5]octan-6-yl)pyrazine-2-carboxamide (116A, 0.068 g) as a yellow oil. m/z ESI 487.1 (M+H)$^+$.

Step 2. N-(6-Chloro-4-methoxypyridin-2-yl)-5-(4,4-dimethyl-2-oxooxazolidin-3-yl)-3-(6-azaspiro[2.5]octan-6-yl)pyrazine-2-carboxamide (116A, 0.034 g, 0.070 mmol) was dissolved in morpholine (1.08 mL, 12.2 mmol) in a sealed tube and heated to 160° C. in a microwave for 1 h, then to 180° C. for 1 h and then to 200° C. for 1 h. The mixture was evaporated and the residue was treated with 5 mL methanol and 0.13 mL of 1 N NaOH and heated at 70° C. for 1 h. The pH was neutralized with 0.13 mL of 1 N HCl and the mixture was evaporated. The crude was purified by HPLC (Kinetex EVO 100 C18 150×21.1 mm×5 m, 30 mL/min, 5-95% ACN in water (with 0.1% TFA) over 13 min). Pure fractions were combined and lyophilized to provide 5-((1-hydroxy-2-methylpropan-2-yl)amino)-N-(4-methoxy-6-morpholinopyridin-2-yl)-3-(6-azaspiro[2.5]octan-6-yl)pyrazine-2-carboxamide (Example 116, 0.003 g, 5.86 μmol, 9% yield). $^1$H NMR (400 MHz, METHANOL-d$_4$) δ ppm 0.24 (s, 4H) 1.22-1.30 (m, 6H) 1.32-1.40 (m, 4H) 3.34-3.44 (m, 8H) 3.63 (s, 2H) 3.66-3.74 (m, 4H) 3.80 (s, 3H) 6.08 (d, J=1.76 Hz, 1H) 6.54 (br s, 1H) 7.26-7.40 (m, 1H), 2 protons hidden, 1 proton exchanged. m/z ESI 512.1 (M+H)$^+$.

Example 117: N-(4-cyano-6-morpholinopyridin-2-yl)-5-((1-hydroxy-2-methylpropan-2-yl)amino)-3-(6-azaspiro[2.5]octan-6-yl)pyrazine-2-carboxamide This compound was prepared using the procedure described for Example 113.

$^1$H NMR (400 MHz, METHANOL-d$_4$) δ ppm 0.52 (s, 4H) 1.47 (s, 6H) 1.67-1.86 (m, 4H) 3.50-3.63 (m, 8H) 3.73-3.88 (m, 6H) 6.89 (s, 1H) 7.81 (s, 2H). 2 protons were hidden, 1 proton was exchanged. m/z ESI 507.2 (M+H)$^+$.

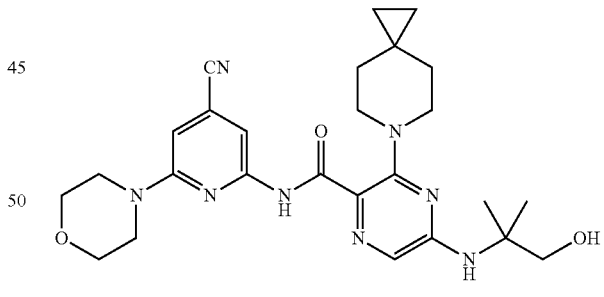

Example 117

Example 118: 3-(6-azaspiro[2.5]octan-6-yl)-N-(4-cyclopropyl-6-(4-morpholinyl)-2-pyridinyl)-5-((1-hydroxy-2-methyl-2-propanyl)amino)-2-pyrazinecarboxamide $^1$H NMR (400 MHz, METHANOL-d$_4$) δ ppm 0.39 (s, 4H) 0.89-0.97 (m, 2H) 1.14-1.20 (m, 2H) 1.41 (s, 6H) 1.43-1.52 (m, 1H) 1.55 (br s, 4H) 1.94-2.01 (m, 1H) 3.46 (s, 1H) 3.53 (t, J=4.99 Hz, 8H) 3.74-3.87 (m, 4H) 6.50 (s, 1H) 6.71 (br s, 1H) 7.50 (s, 1H). m/z ESI 522.3 (M+H)$^+$.

This compound was prepared using the procedure described for Example 113.

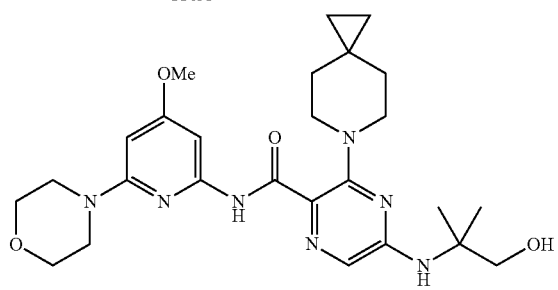 [SMILES: CC(C)(CO)Nc1ccc(C(=O)Nc2cc(Cl)cc(N3CCOCC3)n2)c(N2CCC3(CC2)CC3)n1]

Example 116

Example 118

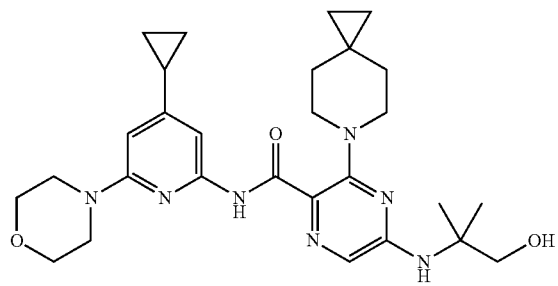

Example 121: (R)—N-(6-(2-methylmorpholino)
pyridin-2-yl)-5-(methylsulfonamido)-3-(6-azaspiro
[2.5]octan-6-yl)pyrazine-2-carboxamide

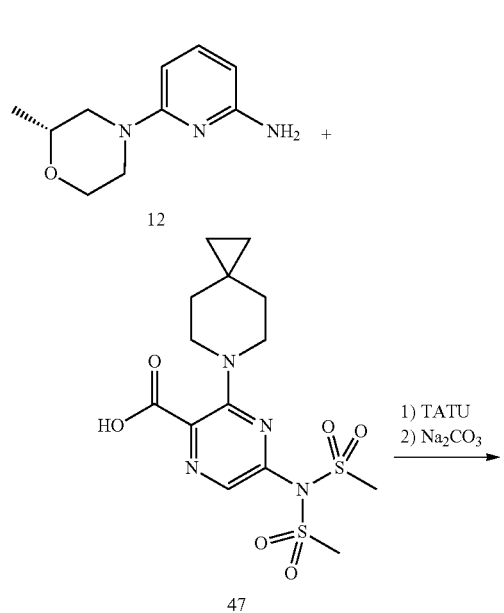

Example 121

A 20 mL scintillation vial was charged with 5-(N-(methylsulfonyl)methylsulfonamido)-3-(6-azaspiro[2.5]octan-6-yl)pyrazine-2-carboxylic acid (47, 85 mg, 0.21 mmol), (R)-6-(2-methylmorpholino)pyridin-2-amine (12, 44 mg, 0.228 mmol) and DMF (1 mL). DIPEA (0.073 mL, 0.420 mmol) was added followed by TATU (81 mg, 0.252 mmol). The brown mixture was stirred at RT for 4 h. Sodium carbonate (23 mg, 0.218 mmol) was added and the mixture was stirred at RT for 4 h. The reaction mixture was diluted with EtOAc (5 mL) and washed with water (3×5 mL). The aqueous phase was saturated with NaCl and further extracted with EtOAc (2×20 mL). The combined organic phases were dried over sodium sulfate, filtered and concentrated in vacuo. The residue was purified by Biotage (SNAP25, Ultra, eluent: EtOAc in heptane 20%-100%) to afford the title compound (Example 121, 10 mg, 10% yield) as a light yellow solid. $^1$H NMR (400 MHz, CHLOROFORM-d) δ ppm 9.67 (1H, s), 7.74 (1H, s), 7.67 (1H, d, J=7.9 Hz), 7.55 (1H, t, J=8.0 Hz), 6.39 (1H, d, J=8.3 Hz), 4.08 (1H, br d, J=12.2 Hz), 3.95-4.05 (2H, m), 3.65-3.78 (2H, m), 3.58-3.65 (5H, m), 3.33 (3H, s), 2.94 (1H, td, J=12.3, 3.5 Hz), 2.54-2.66 (1H, m), 1.51-1.54 (4H, m), 1.28 (3H, d, J=6.2 Hz), 0.39 (4H, s). m/z (ESI): 502.3 (M+H)$^+$.

Example 122: (R)—N-(6-(2-methylmorpholino)
pyridin-2-yl)-5-(methylsulfonamido)-3-(6-azaspiro
[2.5]octan-6-yl)pyrazine-2-carboxamide

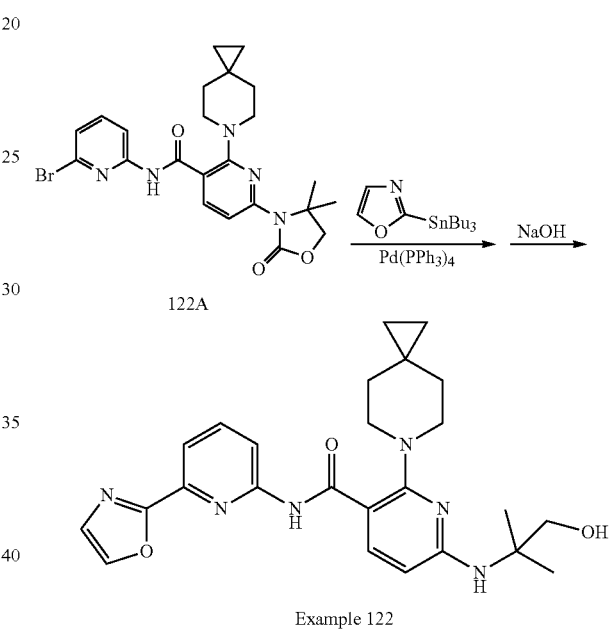

Example 122

N-(6-Bromopyridin-2-yl)-6-(4,4-dimethyl-2-oxooxazolidin-3-yl)-2-(6-azaspiro[2.5]octan-6-yl)nicotinamide (122A) was prepared in a fashion similar to that described for Example 103. m/z (ESI): 500/502 (M+H)$^+$.

A mixture of N-(6-bromopyridin-2-yl)-6-(4,4-dimethyl-2-oxooxazolidin-3-yl)-2-(6-azaspiro[2.5]octan-6-yl)nicotinamide (122A, 0.085 g, 0.170 mmol), Pd(PPh$_3$)$_4$(0.020 g, 0.017 mmol) and 2-(tri-n-butylstannyl)oxazole (0.053 mL, 0.255 mmol) in 1,4-dioxane (2.0 mL) heated in an oil bath at 120° C. for 24 h. The mixture was filtered through a pad of celite and the solid rinsed with 2×5 mL of EtOAc. The filtrate was concentrated and then purified by Shimadzu HPLC to afford 6-(4,4-dimethyl-2-oxooxazolidin-3-yl)-N-(6-(oxazol-2-yl)pyridin-2-yl)-2-(6-azaspiro[2.5]octan-6-yl)nicotinamide (0.043 g, 0.088 mmol, 52% yield) as an off-white solid. m/z (ESI): 489.2 (M+H)$^+$. Purity was about 83%. To a solution of 6-(4,4-dimethyl-2-oxooxazolidin-3-yl)-N-(6-(oxazol-2-yl)pyridin-2-yl)-2-(6-azaspiro[2.5]octan-6-yl)nicotinamide (0.043 g, 0.073 mmol) in methanol (2.0 mL) was added sodium hydroxide (0.073 mL of 5 N solution, 0.365 mmol). The mixture was heated at 70° C. for 2.5 h. The reaction mixture was concentrated and then purified by silica gel chromatography (0% to 50% EtOAc:

EtOH(3:1)/heptane) to afford 6-((1-hydroxy-2-methylpropan-2-yl)amino)-N-(6-(oxazol-2-yl)pyridin-2-yl)-2-(6-azaspiro[2.5]octan-6-yl)nicotinamide (Example 122, 0.021 g, 0.045 mmol, 62% yield) as a white solid. $^1$H NMR (400 MHz, CHLOROFORM-d) δ ppm 0.41 (s, 4H) 1.45 (s, 6H) 1.82 (br. s., 4H) 3.24 (t, J=5.38 Hz, 4H) 3.76 (d, J=5.48 Hz, 2H) 4.74 (s, 1H) 5.27 (t, J=5.77 Hz, 1H) 6.26 (d, J=8.61 Hz, 1H) 7.31 (s, 1H) 7.79 (s, 1H) 7.81-7.90 (m, 2H) 8.21 (d, J=8.61 Hz, 1H) 8.42 (dd, J=7.83, 1.37 Hz, 1H) 12.53 (s, 1H). m/z (ESI): 463.3 (M+H)$^+$.

Example 134: 6-((1-hydroxy-2-methylpropan-2-yl)amino)-N-(6-(2-oxopyrrolidin-1-yl)pyridin-2-yl)-2-(6-azaspiro[2.5]octan-6-yl)nicotinamide

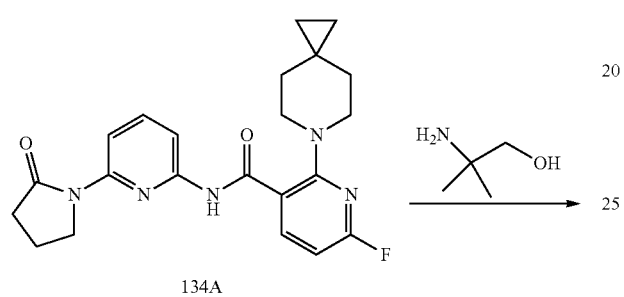

134A

Example 134

6-Fluoro-N-(6-(2-oxopyrrolidin-1-yl)pyridin-2-yl)-2-(6-azaspiro[2.5]octan-6-yl)nicotinamide (134A) was prepared in a fashion similar to that described for Example 103. m/z (ESI): 438.1 (M+H)$^+$.

To a 15-mL reaction vial was added N-(6-(4,4-dimethyl-2-oxopyrrolidin-1-yl)pyridin-2-yl)-6-fluoro-2-(6-azaspiro[2.5]octan-6-yl)nicotinamide (134A, 49 mg, 0.11 mmol), DIPEA (0.06 mL, 0.33 mmol), 2-amino-2-methyl-1-propanol (20 mg, 0.22 mmol), and DMSO (2 mL). The vial was closed and the reaction mixture was stirred at 120° C. for 12 h. The reaction mixture was allowed to cool to RT then diluted with water (4 mL) and extracted with EtOAc (5 mL). The organic extract was washed with water (3 mL), dried over Na$_2$SO, filtered and concentrated in vacuo to give the crude material as a white solid. The white solid was stirred in 2 mL of heptane, filtered and dried to give N-(6-(4,4-dimethyl-2-oxopyrrolidin-1-yl)pyridin-2-yl)-6-((1-hydroxy-2-methylpropan-2-yl)amino)-2-(6-azaspiro[2.5]octan-6-yl)nicotinamide (Example 134, 51 mg, 0.101 mmol, 90% yield). $^1$H NMR (400 MHz, DMSO-d$_6$) δ 12.80 (s, 1H), 7.96-8.02 (m, 3H), 7.80 (t, J=8.02 Hz, 1H), 6.85 (s, 1H), 6.47 (d, J=8.80 Hz, 1H), 4.82 (t, J=5.67 Hz, 1H), 3.81 (s, 2H), 3.62 (d, J=5.67 Hz, 2H), 3.08 (br t, J=5.28 Hz, 4H), 2.49 (s, 2H), 1.76 (br s, 4H), 1.38 (s, 6H), 1.20 (m, 2H), 0.40 (s, 4H). m/z (ESI): 479.2 (M+H)$^+$.

Example 135: N-(6-(4,4-dimethyl-2-oxopyrrolidin-1-yl)pyridin-2-yl)-6-((1-hydroxy-2-methylpropan-2-yl)amino)-2-(6-azaspiro[2.5]octan-6-yl)nicotinamide. m/z (ESI): 507.0 (M+H)$^+$ This compound was prepared according to the method described above for Example 134.

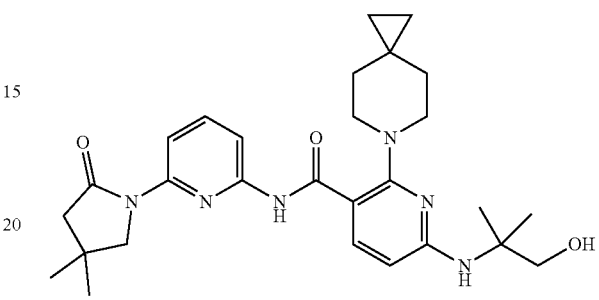

Example 135

Examples 140, 141 and 142

These compounds were prepared in a fashion similar to that described below for Examples 143, 153 and 154. m/z (ESI): 506.1 (M+H)$^+$.

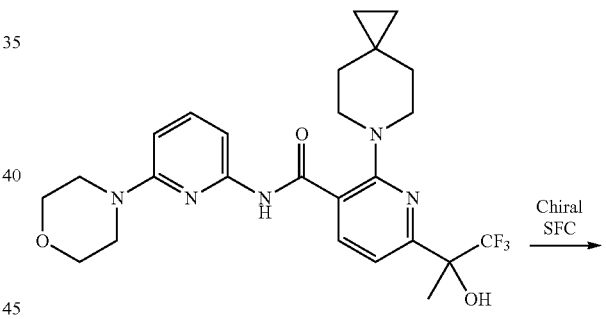

Example 140

Example 141

-continued

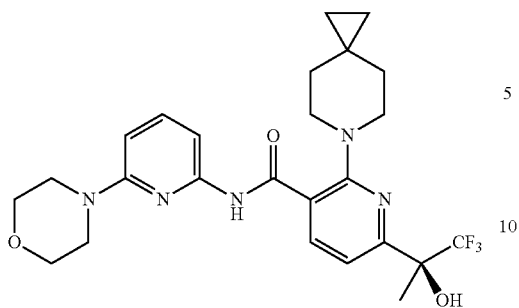

Example 142

Examples 143, 153 and 154

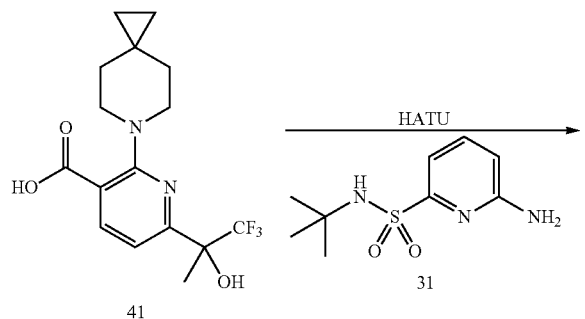

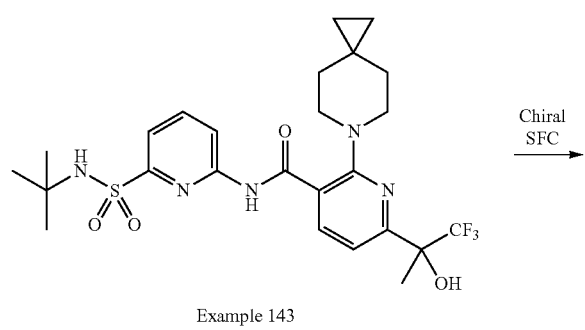

Example 143

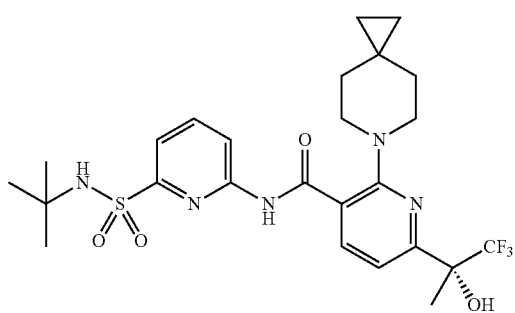

Example 153

+

-continued

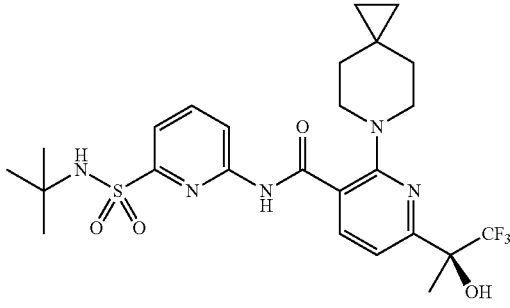

Example 154

To a stirred mixture of 2-(6-azaspiro[2.5]octan-6-yl)-6-(1,1,1-trifluoro-2-hydroxypropan-2-yl)nicotinic acid (Intermediate 41, 350 mg, 1.01 mmol), 6-amino-N-(tert-butyl)pyridine-2-sulfonamide (Intermediate 31, 256 mg, 1.11 mmol), N-ethyl-N-isopropylpropan-2-amine (0.23 mL, 1.32 mmol) in N, N-dimethylformamide (5 mL) was added 2-(3H-[1,2,3]triazolo[4,5-b]pyridin-3-yl)-1,1,3,3-tetramethylisouronium hexafluorophosphate(V) (464 mg, 1.22 mmol). The mixture was stirred at RT for 2 h then 60° C. for 24 h. The reaction mixture was cooled to RT then partitioned between water (5 mL) and EtOAc (50 mL). The organic layer was concentrated, and the residue was purified on ISCO (0% to 40% EtOAc/EtOH (3/1) in heptane) to give N-(6-(N-(tert-butyl)sulfamoyl)pyridin-2-yl)-2-(6-azaspiro[2.5]octan-6-yl)-6-(1,1,1-trifluoro-2-hydroxypropan-2-yl)nicotinamide (Example 143, 402 mg, 0.723 mmol, 71% yield) as a yellow solid. $^1$H NMR (DMSO-$d_6$) δ: 11.36 (s, 1H), 8.37 (d, J=8.4 Hz, 1H), 8.00-8.18 (m, 2H), 7.71 (d, J=7.4 Hz, 1H), 7.48 (s, 1H), 7.39 (d, J=7.8 Hz, 1H), 6.72 (s, 1H), 3.30 (m, 4H), 1.70 (s, 3H), 1.42-1.49 (m, 4H), 1.18 (s, 9H), 0.29 (s, 4H). m/z (ESI): 556.2 (M+H)$^+$. The racemic sample was subjected to chiral SFC to give pure enantiomers. Peak 1 was arbitrarily assigned as (R)—N-(6-(N-(tert-butyl)sulfamoyl)pyridin-2-yl)-2-(6-azaspiro[2.5]octan-6-yl)-6-(1,1,1-trifluoro-2-hydroxypropan-2-yl)nicotinamide (Example 153, 42 mg, >99% ee) as a yellow solid. m/z (ESI): 556.2 (M+H)$^+$. Peak 2 was arbitrarily assigned as (S)—N-(6-(N-(tert-butyl)sulfamoyl)pyridin-2-yl)-2-(6-azaspiro[2.5]octan-6-yl)-6-(1,1,1-trifluoro-2-hydroxypropan-2-yl)nicotinamide (Example 154, 42 mg, >99% ee) as a yellow solid. m/z (ESI): 556.2 (M+H)$^+$.

Example 146: 6-((1-hydroxy-2-methylpropan-2-yl)amino)-2-(6-azaspiro[2.5]octan-6-yl)-N-(6-(tetrahydro-2H-pyran-4-yl)pyridin-2-yl)nicotinamide

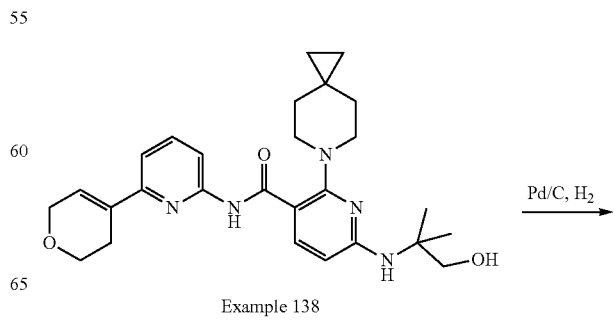

Example 138

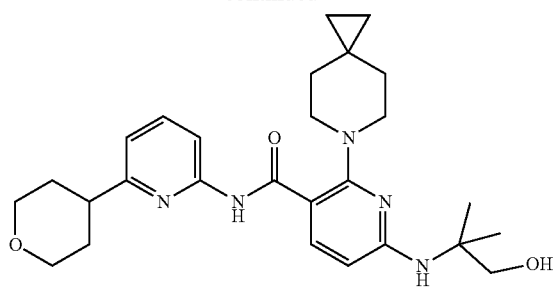

Example 146

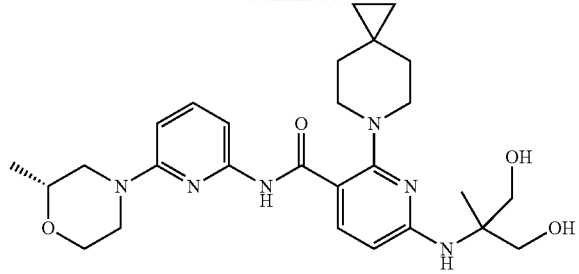

Example 147

A mixture of N-(6-(3,6-dihydro-2H-pyran-4-yl)pyridin-2-yl)-6-((1-hydroxy-2-methylpropan-2-yl)amino)-2-(6-azaspiro[2.5]octan-6-yl)nicotinamide (Example 138, 0.023 g, 0.048 mmol) and palladium (23 mg, 10 wt. % on activated carbon, 0.022 mmol) in EtOAc (4 mL) and EtOH (2 mL) was hydrogenated at 50 psi for 4 h. The filtrate was concentrated and dried to afford the title compound (Example 146, 22 mg, 95% yield) as a light yellow solid. $^1$H NMR (400 MHz, CHLOROFORM-d) δ ppm 0.39 (s, 4H) 1.44 (s, 6H) 1.72-2.07 (m, 8H) 2.86 (tt, J=11.52, 3.84 Hz, 1H) 3.21 (br t, J=4.79 Hz, 4H) 3.55 (td, J=11.79, 2.05 Hz, 2H) 3.74 (br s, 2H) 4.05-4.14 (m, 2H) 4.70 (br s, 1H) 5.43 (br s, 1H) 6.25 (d, J=8.41 Hz, 1H) 6.87 (d, J=7.43 Hz, 1H) 7.63 (t, J=7.82 Hz, 1H) 8.18 (d, J=8.22 Hz, 1H) 8.23 (d, J=8.61 Hz, 1H) 12.42 (br s, 1H). m/z (ESI): 480.3 (M+H)$^+$.

Example 147: (R)-6-((1,3-dihydroxy-2-methylpropan-2-yl)amino)-N-(6-(2-methylmorpholino)pyridin-2-yl)-2-(6-azaspiro[2.5]octan-6-yl)nicotinamide

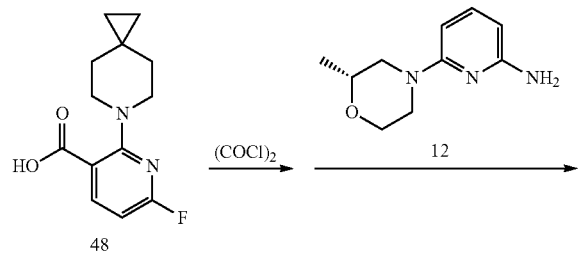

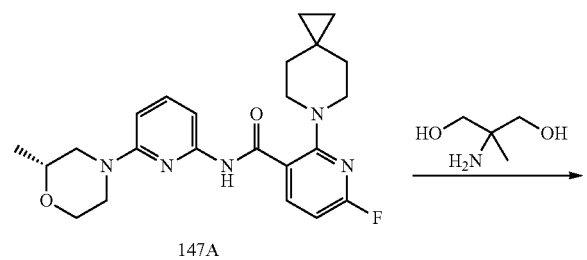

Step 1. To a solution of 6-fluoro-2-(6-azaspiro[2.5]octan-6-yl)nicotinic acid (Intermediate 48, 26.0 g, 104.1 mmol) in DCM (650 mL) was added oxalyl chloride (13.64 mL, 156.2 mmol) followed by DMF (2 drops). The reaction mixture was stirred at RT for 30 min then concentrated under reduced pressure. The residue was dissolved in DCM (500 mL) and treated with (R)-6-(2-methylmorpholino)pyridin-2-amine (Intermediate 12, 20.08 g, 104 mmol) followed by DIPEA (54.40 mL, 312 mmol). The reaction mixture was stirred at RT for 16 h then concentrated under reduced pressure and the residue was purified by column chromatography over silica gel (60-120 mesh) using 0% to 15% ethyl acetate in hexanes as an eluent to give (R)-6-fluoro-N-(6-(2-methylmorpholino)pyridin-2-yl)-2-(6-azaspiro[2.5] octan-6-yl)nicotinamide (147A, 26 g, 59% yield) as an off-white solid. $^1$H NMR (400 MHz, DMSO-d$_6$) δ 11.22 (s, 1H), 8.38-8.10 (m, 1H), 7.60 (t, J=8.0 Hz, 1H), 7.50 (d, J=7.7 Hz, 1H), 6.89-6.79 (m, 1H), 6.60 (d, J=8.2 Hz, 1H), 4.19 (d, J=12.7 Hz, 1H), 4.01 (d, J=12.7 Hz, 1H) 3.91 (d, J=11.2 Hz, 1H), 3.55 (t, J=11.3 Hz, 3H), 3.22 (bs, 4H), 2.82 (t, J=11.9 Hz, 1H), 1.58 (bs, 4H), 1.16 (d, J=6.2 Hz, 3H), 0.34 (s, 4H). m/z (ESI): 426.2 (M+H)$^+$.

Step 2. A mixture of 147A (20.0 g, 47.0 mmol), 2-amino-2-methylpropane-1,3-diol (9.88 g, 94 mmol), and potassium phosphate (19.95 g, 94 mmol) in DMSO (400 mL) was heated at 135° C. for 15 h. The reaction mixture was cooled to RT, quenched by pouring into water (1500 mL), and extracted with ethyl acetate (1500 mL). The organic layer was washed with water (1000 mL) followed by brine (1000 mL), dried over Na$_2$SO$_4$, filtered and concentrated under reduced pressure. The crude residue was purified by column chromatography over silica gel (60-120 mesh) using ethyl acetate in hexanes (40% to 65%) as eluent to give (R)-6-((1,3-dihydroxy-2-methylpropan-2-yl)amino)-N-(6-(2-methylmorpholino)pyridin-2-yl)-2-(6-azaspiro[2.5]octan-6-yl)nicotinamide (Example 147, 15 g, 63% yield) as an off-white solid. $^1$H NMR (400 MHz, Chloroform-d) δ 12.05 (s, 1H), 8.23 (d, J=8.6 Hz, 1H), 7.72 (d, J=7.8 Hz, 1H), 7.55 (t, J=8.0 Hz, 1H), 6.39 (d, J=8.2 Hz, 1H), 6.33 (d, J=8.6 Hz, 1H), 5.24 (s, 1H), 3.84-3.63 (m, 6H), 3.18 (t, J=5.3 Hz, 4H), 2.95 (td, J=12.2, 3.6 Hz, 1H), 2.69-2.54 (m, 1H), 1.90-1.63 (m, 4H), 1.38 (s, 3H), 1.28 (d, J=6.2 Hz, 3H), 0.39 (s, 4H). m/z (ESI): 511.3 (M+H)$^+$.

TABLE 4

Examples 148, 149, 164, 174, and 184 were prepared in a manner similar to that described above for Example 147.

| Ex. # | Chemical Structure | Name | LRMS: (ESI + ve ion) m/z |
|---|---|---|---|
| 148 | | 2-(6-azaspiro[2.5]oct-6-yl)-6-((1,3-dihydroxy-2-methyl-2-propanyl)amino)-N-(6-(4-morpholinyl)-2-pyridinyl)-3-pyridinecarboxamide | 497.3 |
| 149 | | 2-(6-azaspiro[2.5]oct-6-yl)-N-(6-(3,3-difluoro-1-pyrrolidinyl)-2-pyridinyl)-6-((1,3-dihydroxy-2-methyl-2-propanyl)amino)-3-pyridinecarboxamide | 517.3 |
| 164 | | 2-(6-azaspiro[2.5]octan-6-yl)-N-(6-bromo-2-pyridinyl)-6-((1,3-dihydroxy-2-methyl-2-propanyl)amino)-3-pyridinecarboxamide | 490/492 |
| 174 | | 2-(6-azaspiro[2.5]octan-6-yl)-6-((1,3-dihydroxy-2-methyl-2-propanyl)amino)-N-(6-((2-methyl-2-propanyl)sulfamoyl)-2-pyridinyl)-3-pyridinecarboxamide | 547.3 |
| 184 | | 2-(6-azaspiro[2.5]octan-6-yl)-6-((1,3-dihydroxy-2-methyl-2-propanyl)amino)-N-(4-methyl-6-(4-morpholinyl)-2-pyridinyl)-3-pyridinecarboxamide | 511.2 |

Example 156: N-(4-cyano-6-morpholinopyridin-2-yl)-6-((1-hydroxy-2-methylpropan-2-yl)amino)-2-(6-azaspiro[2.5]octan-6-yl)nicotinamide

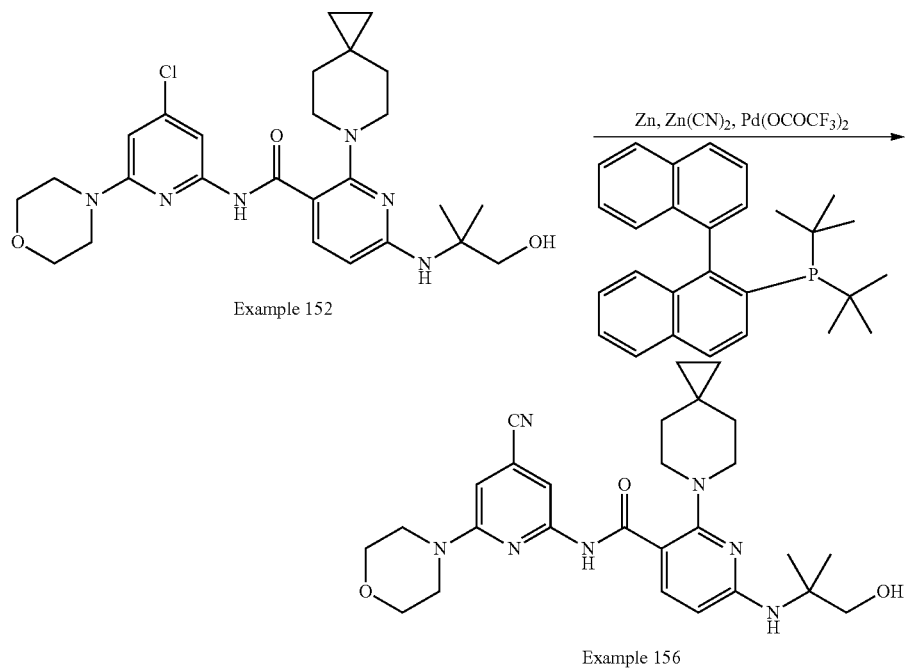

A mixture of N-(4-chloro-6-morpholinopyridin-2-yl)-6-((1-hydroxy-2-methylpropan-2-yl)amino)-2-(6-azaspiro[2.5]octan-6-yl)nicotinamide (Example 152, 18.6 mg, 0.036 mmol), zinc dust (1.1 mg, 0.014 mmol, Aldrich), racemic 2-(di-t-butylphosphino)-1,1'-binaphthyl (2.9 mg, 0.007 mmol, Strem), zinc cyanide (5.1 mg, 0.043 mmol, Aldrich), palladium(II) trifluoroacetate (2.2 mg, 0.004 mmol, Aldrich) in DMF (1.0 mL) was heated at 120° C. for 15 h. The reaction mixture was loaded directly onto a 12 g RediSep gold column and eluted with 0% to 50% (3:1=EtOAc:EtOH) in heptane to provide a material that contained m/z (ESI): 506.3 (M+H)$^+$ but was not pure. The material was taken up in 1 mL of DMSO and purified on reverse phase HPLC to afford N-(4-cyano-6-morpholinopyridin-2-yl)-6-((1-hydroxy-2-methylpropan-2-yl)amino)-2-(6-azaspiro[2.5]octan-6-yl)nicotinamide (Example 156, 4.8 mg, 9.49 μmol, 26% yield) as a white solid. $^1$H NMR (400 MHz, METHANOL-d$_4$) δ ppm 0.37-0.52 (m, 4H) 0.91 (br d, J=6.06 Hz, 1H) 1.14-1.40 (m, 2H) 1.44 (s, 6H) 1.50-1.55 (m, 1H) 1.57-1.83 (m, 4H) 1.94 (s, 1H) 2.03 (s, 1H) 3.48 (br dd, J=6.26, 4.70 Hz, 1H) 3.54-3.64 (m, 4H) 3.74-3.83 (m, 6H) 6.54 (br d, J=8.22 Hz, 1H) 6.85 (s, 1H) 7.75 (s, 1H) 8.08 (d, J=8.80 Hz, 1H). m/z (ESI): 506.3 (M+H)$^+$.

Example 158: 2-(6-azaspiro[2.5]octan-6-yl)-6-((1-hydroxy-2-methyl-2-propanyl)amino)-N-(4-methoxy-6-(4-morpholinyl)-2-pyridinyl)-3-pyridinecarboxamide. $^1$H NMR (400 MHz, METHANOL-d$_4$) δ ppm 0.33 (s, 4H) 1.34 (s, 6H) 1.56-1.80 (m, 4H) 3.16 (br s, 4H) 3.43-3.47 (m, 4H) 3.66-3.77 (m, 6H) 3.82 (s, 3H) 6.09 (s, 1H) 6.34 (br. d, J=9.00 Hz, 1H) 6.70 (br. s, 1H) 7.90 (d, J=8.80 Hz, 1H). m/z (ESI): 511.3 (M+H)$^+$. This compound was prepared in a manner analogous to that described for Example 116.

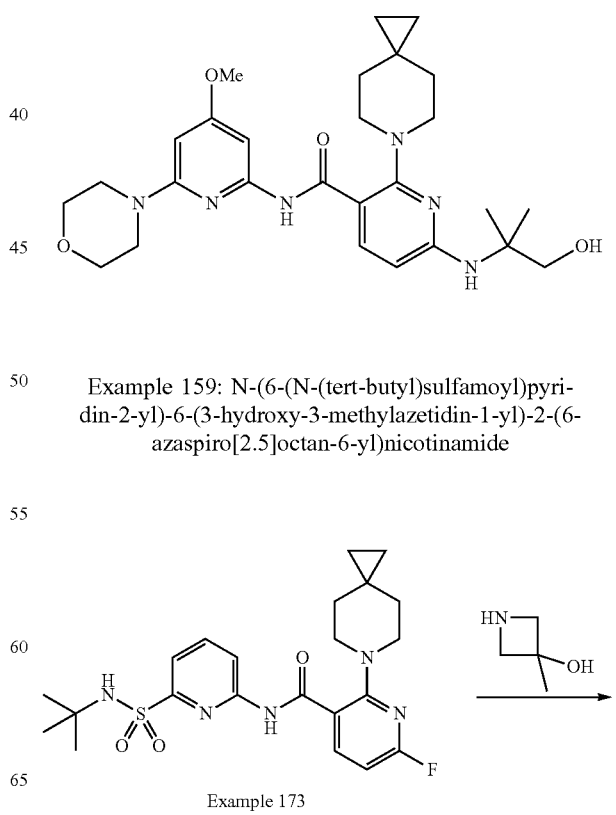

Example 159: N-(6-(N-(tert-butyl)sulfamoyl)pyridin-2-yl)-6-(3-hydroxy-3-methylazetidin-1-yl)-2-(6-azaspiro[2.5]octan-6-yl)nicotinamide

143
-continued

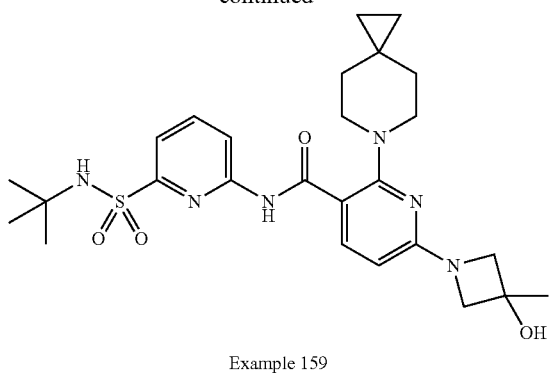

Example 159

A mixture of N-(6-(N-(tert-butyl)sulfamoyl)pyridin-2-yl)-6-fluoro-2-(6-azaspiro[2.5]octan-6-yl)nicotinamide (Example 173, 0.040 g, 0.087 mmol), 3-methylazetidin-3-ol (0.017 g, 0.200 mmol), and DIPEA (0.061 mL, 0.347 mmol) in DMSO (0.8 mL). The mixture was stirred at 90° C. for 24 h. The mixture was cooled to RT and treated with water (3 mL). The solid was collected and purified on a silica gel column (30% to 100% EtOAc in heptane) to afford N-(6-(N-(tert-butyl)sulfamoyl)pyridin-2-yl)-6-(3-hydroxy-3-methylazetidin-1-yl)-2-(6-azaspiro[2.5]octan-6-yl)nicotinamide (Example 159, 43 mg, 93% yield) as an off-white solid. $^1$H NMR (400 MHz, CHLOROFORM-d) δ 12.63 (s, 1H), 8.55 (d, J=8.41 Hz, 1H), 8.24 (d, J=8.61 Hz, 1H), 7.86 (t, J=8.02 Hz, 1H), 7.70 (d, J=7.43 Hz, 1H), 6.11 (d, J=8.61 Hz, 1H), 4.79 (s, 1H), 4.00-4.08 (m, 4H), 3.20 (t, J=5.38 Hz, 4H), 2.33 (br s, 1H), 1.71 (br s, 4H), 1.63 (s, 3H), 1.27 (s, 9H), 0.40 (s, 4H). m/z (ESI): 529.2 (M+H)$^+$.

Example 160: 2-(6-azaspiro[2.5]octan-6-yl)-N-(4-cyclopropyl-6-(4-morpholinyl)-2-pyridinyl)-6-((1-hydroxy-2-methyl-2-propanyl)amino)-3-pyridinecarboxamide. $^1$H NMR (400 MHz, METHANOL-d$_4$) δ ppm 0.43 (s, 4H) 0.84-0.95 (m, 2H) 1.08-1.20 (m, 2H) 1.42 (s, 6H) 1.69 (s, 4H) 1.94-2.05 (m, 1H) 3.27 (m, 4H) 3.50-3.54 (m, 4H) 3.75-3.85 (m, 6H) 6.38-6.54 (m, 2H) 6.73 (br s, 1H) 7.99 (d, J=9.00 Hz, 1H). m/z (ESI): 521.3 (M+H)$^+$.

This compound was prepared in a manner analogous to that described for Example 113.

Example 160

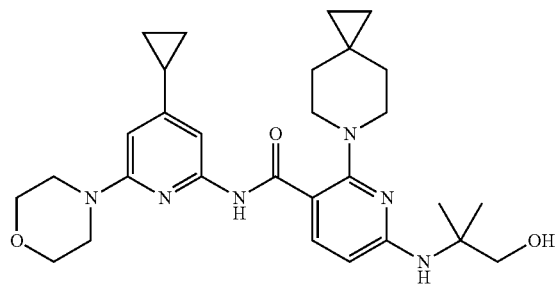

144
Examples 161 and 162

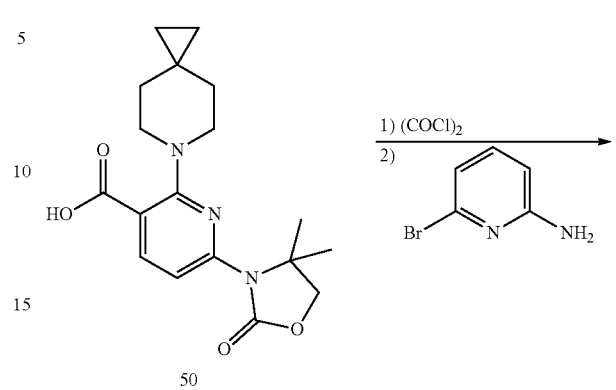

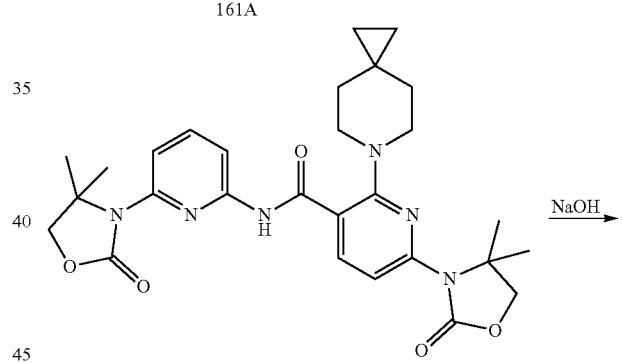

Example 161

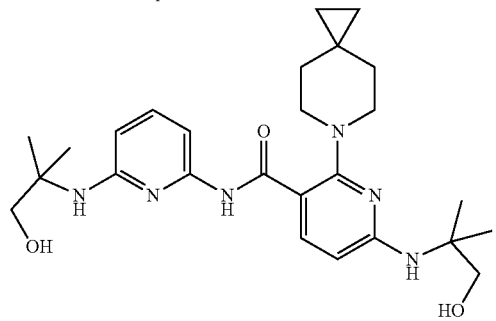

Example 162

Step 1. To a solution of 6-(4,4-dimethyl-2-oxooxazolidin-3-yl)-2-(6-azaspiro[2.5]octan-6-yl)nicotinic acid (50, 1.92 g, 5.56 mmol) in DCM (50 mL) was added oxalyl chloride solution (2.0 M in DCM, 4.17 mL, 8.34 mmol) followed by 3 drops of DMF. The mixture was stirred at RT for 2 h then concentrated. The resulting yellow solid was dissolved in DCM (50 mL) and treated with 6-bromopyridin-2-amine (0.96 g, 5.56 mmol) followed by Hunig's base (2.91 mL, 16.68 mmol). The mixture was stirred at RT for 15 h then concentrated and the residue was purified by silica gel chromatography (0% to 35% EtOAc/heptane) to provide N-(6-bromopyridin-2-yl)-6-(4,4-dimethyl-2-oxooxazolidin-3-yl)-2-(6-azaspiro[2.5]octan-6-yl)nicotinamide (161A, 2.75 g, 5.50 mmol, 99% yield) as a yellow solid. m/z (ESI): 500/502 (M+H)+.

Step 2. To a pressure vial was charged with N-(6-bromopyridin-2-yl)-6-(4,4-dimethyl-2-oxooxazolidin-3-yl)-2-(6-azaspiro[2.5]octan-6-yl)nicotinamide (161A, 0.184 g, 0.368 mmol), 4,4-dimethyloxazolidin-2-one (0.085 g, 0.735 mmol), copper(i) iodide (0.035 g, 0.184 mmol), potassium carbonate (0.102 g, 0.735 mmol) and (1r,2r)-(−)-n,n"-dimethylcyclohexane-1,2-diamine (0.052 g, 0.368 mmol). The vial was purged with $N_2$ for 5 min. Dioxane (1.5 mL) was added. The vial was sealed and heated at 120° C. for 2 h. The mixture was concentrated, and the residue was partitioned between DCM and sat'd $NH_4Cl$. The separated organic layer was washed with sat'd $NH_4Cl$ followed by brine and concentrated. Purification by silica gel chromatography (0% to 45% EtOAc/heptane) afford 6-(4,4-dimethyl-2-oxooxazolidin-3-yl)-N-(6-(4,4-dimethyl-2-oxooxazolidin-3-yl)pyridin-2-yl)-2-(6-azaspiro[2.5]octan-6-yl)nicotinamide (Example 161, 0.098 g, 0.183 mmol, 50% yield) as a white solid. H NMR (400 MHz, CHLOROFORM-d) δ ppm 0.38 (s, 4H) 1.64-1.72 (m, 4H) 1.75 (s, 6H) 1.77 (s, 6H) 3.23 (t, J=5.48 Hz, 4H) 4.12 (d, J=6.46 Hz, 4H) 7.57 (d, J=8.22 Hz, 1H) 7.76 (t, J=8.12 Hz, 1H) 7.82 (d, J=8.61 Hz, 1H) 8.25 (d, J=7.82 Hz, 1H) 8.46 (d, J=8.61 Hz, 1H) 11.26 (s, 1H). m/z (ESI): 535.2 (M+H)+.

Step 3. To a solution of 6-(4,4-dimethyl-2-oxooxazolidin-3-yl)-N-(6-(4,4-dimethyl-2-oxooxazolidin-3-yl)pyridin-2-yl)-2-(6-azaspiro[2.5]octan-6-yl)nicotinamide (Example 161, 0.090 g, 0.168 mmol) in MeOH (5 mL) was added sodium hydroxide (0.7 mL of 5 N solution, 3.50 mmol). The mixture was heated at 70° C. for 6. The mixture was cooled to RT and neutralized with 2 N HCl. The resulted mixture was concentrated to remove MeOH. The aqueous residue was extracted with DCM. The organic extracts were washed with brine, dried over $Na_2SO_4$ and filtered. The filtrate was concentrated and purified by silica gel chromatography (0% to 50% EtOAc:EtOH (3:1)/heptane) to afford 6-((1-hydroxy-2-methylpropan-2-yl)amino)-N-(6-((1-hydroxy-2-methylpropan-2-yl)amino)pyridin-2-yl)-2-(6-azaspiro[2.5]octan-6-yl)nicotinamide (Example 162, 0.073 g, 0.151 mmol, 90% yield) as a white solid. ¹H NMR (400 MHz, CHLOROFORM-d) δ ppm 0.34 (s, 4H) 1.41 (s, 6H) 1.43 (s, 6H) 1.65-1.76 (m, 4H) 3.23 (t, J=5.38 Hz, 4H) 3.73 (br d, J=2.93 Hz, 4H) 4.31 (br s, 1H) 4.71 (s, 1H) 4.99-5.06 (m, 1H) 5.20 (br t, J=4.89 Hz, 1H) 6.14 (d, J=8.02 Hz, 1H) 6.17 (d, J=8.41 Hz, 1H) 7.40 (t, J=8.02 Hz, 1H) 7.69 (d, J=7.83 Hz, 1H) 8.09 (d, J=8.61 Hz, 1H) 10.86 (s, 1H). m/z (ESI): 483.2 (M+H)+.

Examples 166, 167 and 168 were prepared in a manner analogous to that described for Examples 169, 177 and 178. m/z (ESI): 482.2 (M+H)+.

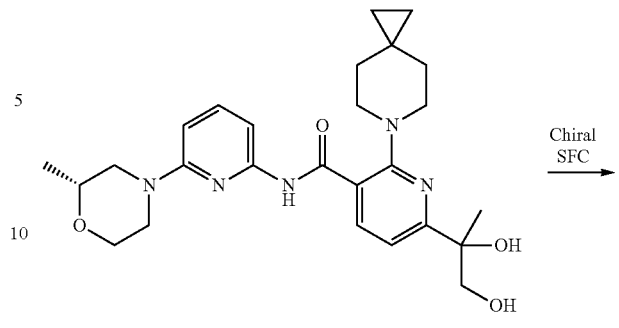

Example 166

Chiral SFC →

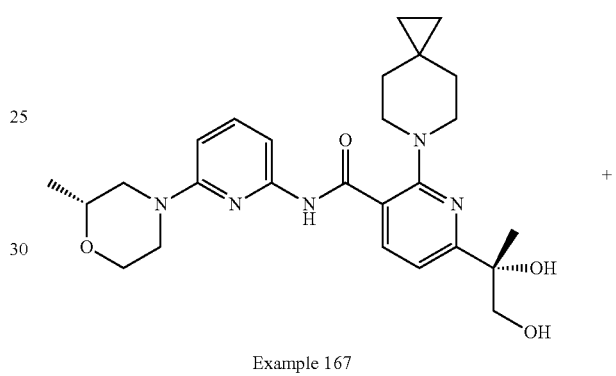

Example 167

+

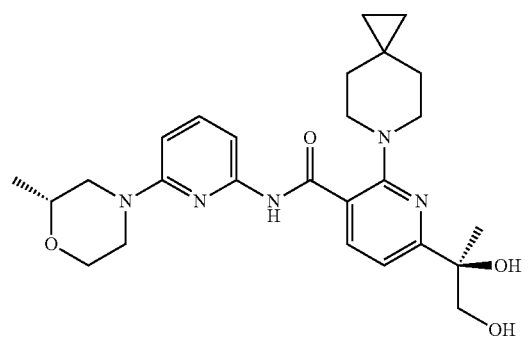

Example 168

Examples 170: 2-(6-azaspiro[2.5]octan-6-yl)-6-((1-hydroxy-2-methyl-2-propanyl)amino)-N-(6-((1-hydroxy-2-methyl-2-propanyl)amino)-4-methyl-2-pyridinyl)-3-pyridinecarboxamide. m/z (ESI): 497.3 (M+H)+

This compound was prepared in a manner analogous to that described for Example 162.

Example 170

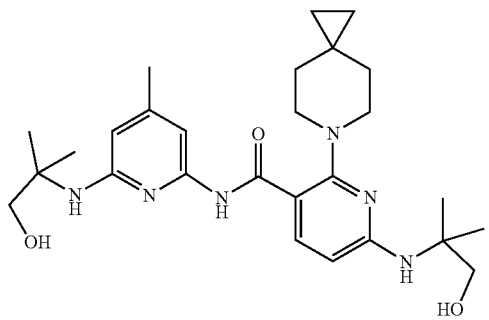

Examples 171, 172, 175 and 176

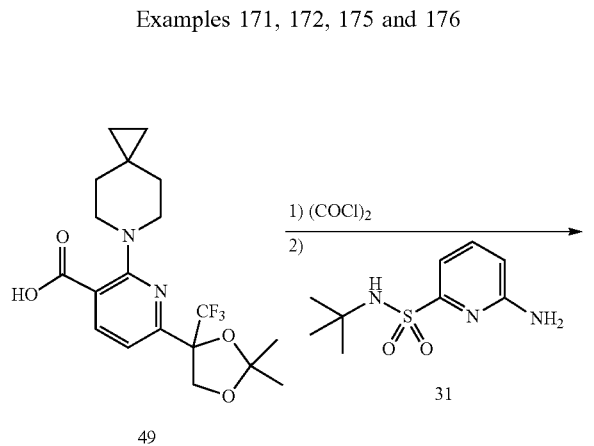

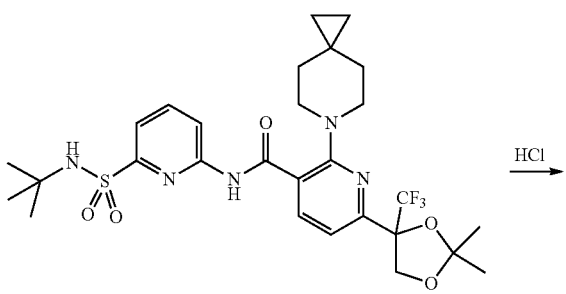

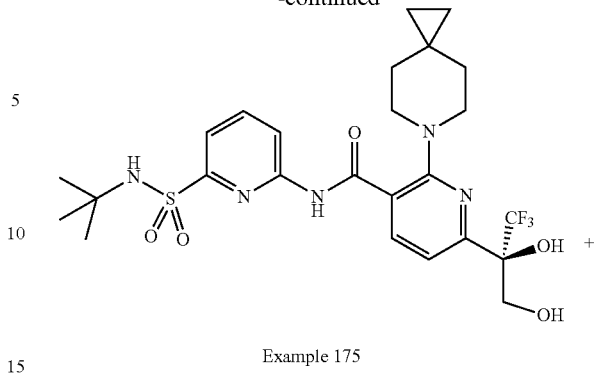

Example 175

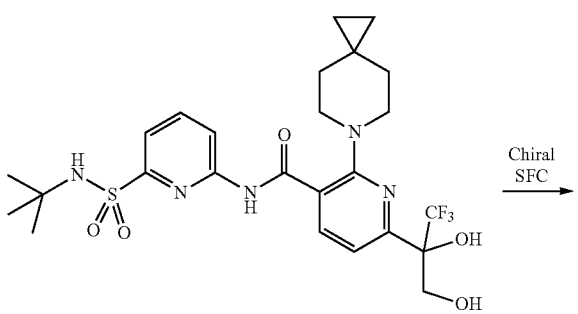

Example 176

Step 1. Oxalyl chloride (2.0 M solution in DCM, 0.62 mL, 1.24 mmol) and 1 drop of DMF were added to a solution of 6-(2,2-dimethyl-4-(trifluoromethyl)-1,3-dioxolan-4-yl)-2-(6-azaspiro[2.5]octan-6-yl)nicotinic acid (Intermediate 49, 0.33 g, 0.82 mmol) in DCM (4 mL). This mixture was stirred for 2 h, then the volatiles were removed in vacuo to give a yellow solid. 6-amino-N-(tert-butyl)pyridine-2-sulfonamide (Intermediate 31, 0.18 g, 0.79 mmol) and DIPEA (0.14 mL, 0.80 mmol), and THF (3 mL) were added to the above prepared solid and the mixture was stirred for 1 h at RT, at which time another portion of DIPEA (0.10 mL) was added. The mixture was stirred for 1 h then another portion of Intermediate 31 (0.18 g) was added and the mixture was stirred overnight at RT. EtOAc and H$_2$O were added, the resulting biphasic mixture was separated, and the organic layer was dried over anhydrous MgSO$_4$, filtered, and concentrated in vacuo to give an oil. The oil was purified by silica gel chromatography, eluting with 0% to 60% EtOAc/heptane gradient, to give N-(6-(N-(tert-butyl)sulfamoyl)pyridin-2-yl)-6-(2,2-dimethyl-4-(trifluoromethyl)-1,3-dioxolan-4-yl)-2-(6-azaspiro[2.5]octan-6-yl)nicotinamide (Example 171, 0.49 g, 0.33 mmol, 41% yield) as a white solid. H NMR (400 MHz, CHLOROFORM-d) δ ppm 12.03 (s, 1H) 8.55 (d, J=8.08 Hz, 1H) 8.48 (d, J=8.02 Hz, 1H) 7.92 (t, J=7.92 Hz, 1H) 7.77 (d, J=7.33 Hz, 1H) 7.60 (d, J=7.82 Hz, 1H) 4.72 (s, 1H) 4.66 (s, 2H) 3.29 (t, J=5.48 Hz, 4H) 1.70 (br d, J=5.09 Hz, 4H) 1.56 (s, 3H) 1.33-1.40 (m, 3H) 1.27 (s, 9H) 0.41 (s, 4H). m/z (ESI): 612.2 (M+H)$^+$.

Step 2. A mixture of N-(6-(N-(tert-butyl)sulfamoyl)pyridin-2-yl)-6-(2,2-dimethyl-4-(trifluoromethyl)-1,3-dioxolan-4-yl)-2-(6-azaspiro[2.5]octan-6-yl)nicotinamide (Example 171, 195 mg, 0.32 mmol) and hydrochloric acid (1 N aqueous, 2.5 mL, 2.5 mmol) in dioxane (5 mL) was heated to 80° C. for 3 h, then cooled to RT. EtOAc and sat'd NaHCO$_3$ were added, the resulting biphasic mixture was separated, and the organic extracts were dried over anhydrous MgSO$_4$, filtered, and concentrated in vacuo to give an oil. The oil was purified by silica gel chromatography, eluting with 000 to 10000 EtOAc/heptane gradient, to give N-(6-(N-(tert-butyl)sulfamoyl)pyridin-2-yl)-2-(6-azaspiro[2.5]octan-6-yl)-6-(1,1,1-trifluoro-2,3-dihydroxypropan-2-yl)nicotinamide (Example 172, 114 mg) as a white solid. m/z (ESI): 572.3 (M+H)$^+$.

Step 3. The enantiomers were separated from each other by preparative SFC using a Whelk-01 (SS) column (250×21 mm, 5 Qin) with a mobile phase of 80% Liquid $CO_2$ and 20% MeOH with ammonia using a flowrate of 80 m/z min. Peak 1 was arbitrarily assigned as (R)—N-(6-(N-(tert-butyl)sulfamoyl)pyridin-2-yl)-2-(6-azaspiro a[2.5]octan-6-yl)-6-(1,1,1-trifluoro-2,3-dihydroxypropan-2-yl)nicotinamide (Example 175, 40 mg, >992 ee). 2H NMR (400 MHz, CHLOROFORM-d) δ ppm 11.59 (s, 1H) 8.53 (dd, J=8.02, 4.50 Hz, 2H) 7.93 (t, J=7.92 Hz, 1H) 7.79 (d, J=7.43 Hz, 1H) 7.43 (d, J=7.82 Hz, 1H) 5.96 (s, 1H) 4.79 (s, 1H) 4.09-4.23 (m, 2H) 3.32-3.39 (m, 4H) 2.18 (dd, J=9.19, 4.89 Hz, 1H) 1.66-1.77 (m, 4H) 1.27 (s, 9H) 0.42 (s, 4H). $^{19}$F NMR (376 MHz, CHLOROFORM-d) δ ppm −77.39 (s, 3 F). m/z (ESI): 572.3 (M+H)$^+$. Peak 2 was arbitrarily assigned as (S)—N-(6-(N-(tert-butyl)sulfamoyl)pyridin-2-yl)-2-(6-azaspiro[2.5]octan-6-yl)-6-(1,1,1-trifluoro-2,3-dihydroxypropan-2-yl)nicotinamide (Example 176, 41 mg, >99% ee). $^1$H NMR (400 MHz, CHLOROFORM-d) δ ppm 11.56 (s, 1H) 8.52 (t, J=7.19 Hz, 2H) 7.93 (t, J=7.92 Hz, 1H) 7.78 (d, J=7.43 Hz, 1H) 7.43 (d, J=8.02 Hz, 1H) 5.96 (br s, 1H) 4.83 (s, 1H) 4.16-4.23 (m, 1H) 4.14 (br s, 1H) 3.32-3.39 (m, 4H) 2.13-2.30 (m, 1H) 1.66-1.75 (m, 4H) 1.27 (s, 9H) 0.42 (s, 4H). $^{19}$F NMR (376 MHz, CHLOROFORM-d) δ ppm −77.38 (s, 3 F). m/z (ESI): 572.3 (M+H)$^+$.

TABLE 5

Examples 180, 181, 182, 201, 202, 206, 207, and 242 were prepared in a manner similar to that described above for racemic 171 and 172, and enantiomers 175 and 176.

| Ex. # | Chemical Structure | Name | LRMS: (ESI + ve ion) m/z |
|---|---|---|---|
| 180 | | 6-(2,2-dimethyl-4-(trifluoromethyl)-1,3-dioxolan-4-yl)-N-(6-morpholinopyridin-2-yl)-2-(6-azaspiro[2.5]octan-6-yl)nicotinamide | 562.3 |
| 181 | | N-(6-morpholinopyridin-2-yl)-2-(6-azaspiro[2.5]octan-6-yl)-6-(1,1,1-trifluoro-2,3-dihydroxypropan-2-yl)nicotinamide | 522.1 |
| 182 | | N-(6-((R)-2-methylmorpholino)pyridin-2-yl)-2-(6-azaspiro[2.5]octan-6-yl)-6-(1,1,1-trifluoro-2,3-dihydroxypropan-2-yl)nicotinamide | 536.3 |

TABLE 5-continued

Examples 180, 181, 182, 201, 202, 206, 207, and 242 were prepared in a manner similar to that described above for racemic 171 and 172, and enantiomers 175 and 176.

| Ex. # | Chemical Structure | Name | LRMS: (ESI + ve ion) m/z |
|---|---|---|---|
| 201 | | 2-(6-azaspiro[2.5]octan-6-yl)-N-(6-(4-morpholinyl)-2-pyridinyl)-6-((2R)-1,1,1-trifluoro-2,3-dihydroxy-2-propanyl)-3-pyridinecarboxamide | 522.1 |
| 202 | | 2-(6-azaspiro[2.5]octan-6-yl)-N-(6-(4-morpholinyl)-2-pyridinyl)-6-((2S)-1,1,1-trifluoro-2,3-dihydroxy-2-propanyl)-3-pyridinecarboxamide | 522.1 |
| 206 | | 2-(6-azaspiro[2.5]octan-6-yl)-N-(6-((2R)-2-methyl-4-morpholinyl)-2-pyridinyl)-6-((2R)-1,1,1-trifluoro-2,3-dihydroxy-2-propanyl)-3-pyridinecarboxamide | 536.2 |
| 207 | | 2-(6-azaspiro[2.5]octan-6-yl)-N-(6-((2R)-2-methyl-4-morpholinyl)-2-pyridinyl)-6-((2S)-1,1,1-trifluoro-2,3-dihydroxy-2-propanyl)-3-pyridinecarboxamide | 536.2 |

TABLE 5-continued

Examples 180, 181, 182, 201, 202, 206, 207, and 242 were prepared in a manner similar to that described above for racemic 171 and 172, and enantiomers 175 and 176.

| Ex. # | Chemical Structure | Name | LRMS: (ESI + ve ion) m/z |
|---|---|---|---|
| 242 | | N-(6-((R)-3-hydroxypiperidin-1-yl)pyridin-2-yl)-2-(6-azaspiro[2.5]octan-6-yl)-6-(1,1,1-trifluoro-2,3-dihydroxypropan-2-yl)nicotinamide | 536.2 |

Example 173: N-(6-(N-(tert-butyl)sulfamoyl)pyridin-2-yl)-6-fluoro-2-(6-azaspiro[2.5]octan-6-yl)nicotinamide

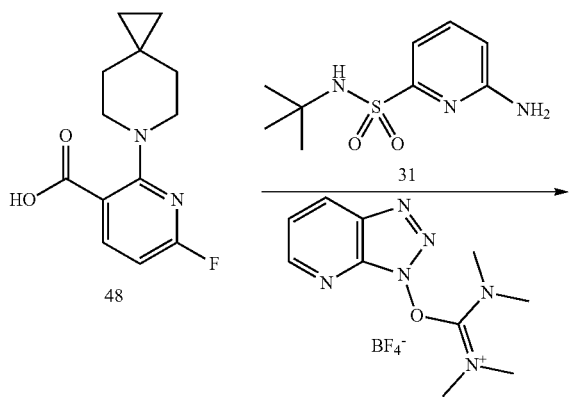

To a stirred mixture of 6-amino-N-(tert-butyl)pyridine-2-sulfonamide (Intermediate 31, 1.28 g, 5.59 mmol), 6-fluoro-2-(6-azaspiro[2.5]octan-6-yl)nicotinic acid (Intermediate 48, 1.40 g, 5.59 mmol), and N-ethyl-N-isopropylpropan-2-amine (1.29 mL, 7.27 mmol) in DMF (15 mL) was added 2-(3H-[1,2,3]triazolo[4,5-b]pyridin-3-yl)-1,1,3,3-tetramethylisouronium tetrafluoroborate (2.16 g, 6.71 mmol, Aldrich). The reaction mixture was stirred at 60° C. for 16 h, then cooled to RT and treated with 20 mL of water. The mixture was extracted with 3×25 mL of EtOAc. The combined EtOAc solution was concentrated. The residue was purified by ISCO (0% to 50% EtOAc in heptane) to give N-(6-(N-(tert-butyl)sulfamoyl)pyridin-2-yl)-6-fluoro-2-(6-azaspiro[2.5]octan-6-yl)nicotinamide (Example 173, 0.54 g, 1.17 mmol, 21% yield) as a yellow solid: m/z (ESI): 462.2 (M+H)$^+$. Also isolated was 3H-[1,2,3]triazolo[4,5-b]pyridin-3-yl 6-fluoro-2-(6-azaspiro[2.5]octan-6-yl)nicotinate (173A, 0.89 g, 2.41 mmol, 43% yield) as a yellow solid: m/z (ESI): 369.1 (M+H)$^+$.

Examples 169, 177, and 178

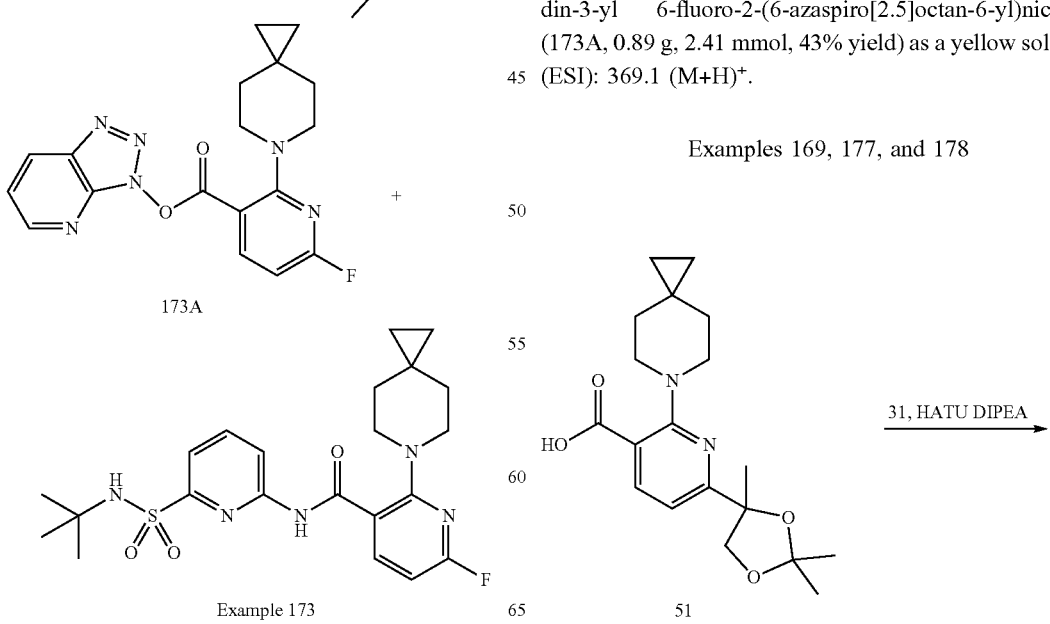

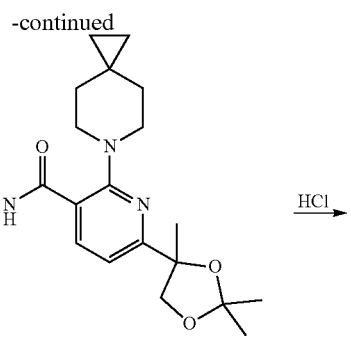

Example 169A

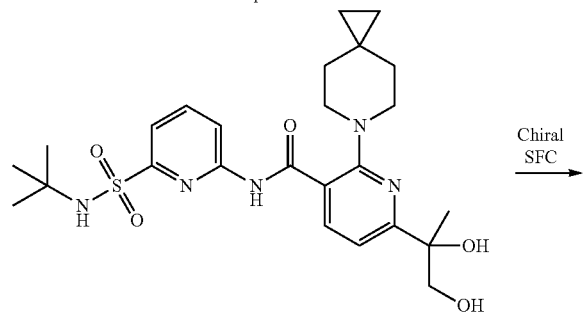

Example 169

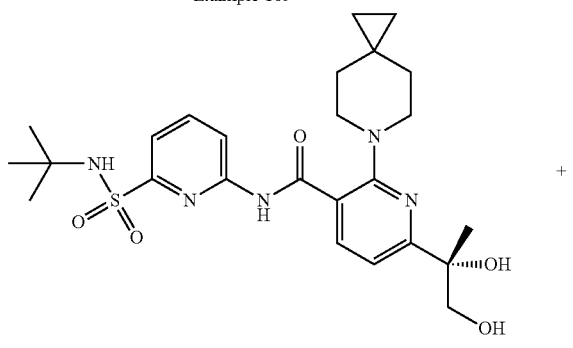

Example 177

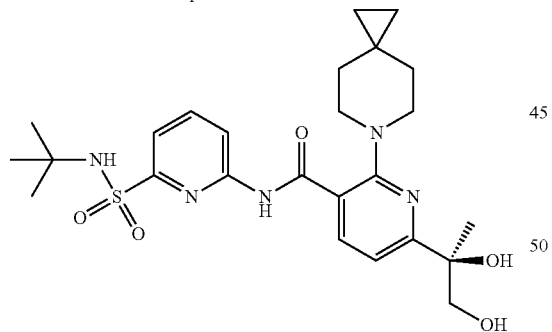

Example 178

Step 1. To a solution of 2-(6-azaspiro[2.5]octan-6-yl)-6-(2,2,4-trimethyl-1,3-dioxolan-4-yl)nicotinic acid (Intermediate 51, 1.95 g, 5.63 mmol) in DMF (27.0 mL) was added diisopropylethylamine (2.95 mL, 16.89 mmol), HATU (3.21 g, 8.44 mmol) and 6-amino-N-(tert-butyl)pyridine-2-sulfonamide (Intermediate 31, 1.42 g, 6.19 mmol). The reaction mixture was heated at 70° C. for 24 h. It was cooled to RT and quenched with water (10 mL) and extracted with ethyl acetate (2×75 mL). The combined organic layer was washed with brine (30 mL), dried over anhydrous $Na_2SO_4$ and concentrated under reduced pressure. The crude product was purified by Isolera-One (SNAP 25 g) using a gradient of 10% to 15% ethyl acetate in petroleum ether to afford Intermediate 169A (0.7 g, 22% yield) as a clear gum. $^1$H NMR (400 MHz, Chloroform-d) δ 12.35 (s, 1H), 8.58 (dd, J=8.4, 0.8 Hz, 1H), 8.49 (d, J=8.0 Hz, 1H), 7.94 (dd, J=8.4, 7.5 Hz, 1H), 7.79 (dd, J=7.5, 0.8 Hz, 1H), 7.60 (d, J=8.0 Hz, 1H), 4.85 (s, 1H), 4.48 (d, J=8.6 Hz, 1H), 4.11 (d, J=8.6 Hz, 1H), 3.34 (t, J=5.5 Hz, 4H), 1.77 (br. s, 4H), 1.64 (s, 3H), 1.56 (s, 3H), 1.43 (s, 3H), 1.29 (s, 9H), 0.45 (s, 4H). m/z (ESI): 558.2 (M+H)$^+$.

Step 2. To a solution of Intermediate 169A (1.3 g, 2.331 mmol) in 1,4-dioxane (10.0 mL) was added 1.5 N HCl aqueous solution (15.54 mL, 23.31 mmol). The reaction mixture was stirred at RT for 3 h then basified with 10% aqueous $NaHCO_3$ solution, extracted with ethyl acetate (2×100 mL). The organic layer was washed with brine (50 mL), dried over anhydrous $Na_2SO_4$ and concentrated under reduced pressure to afford N-(6-(N-(tert-butyl)sulfamoyl)pyridin-2-yl)-6-(1,2-dihydroxypropan-2-yl)-2-(6-azaspiro[2.5]octan-6-yl)nicotinamide (Example 169, 1.20 g, 2.32 mmol, 99% yield) as a colourless gum. $^1$H NMR (400 MHz, DMSO-$d_6$) δ 11.55 (s, 1H), 8.41 (d, J=8.3 Hz, 1H), 8.17-8.03 (m, 2H), 7.72 (dd, J=7.6, 1.4 Hz, 1H), 7.60-7.47 (m, 1H), 7.39 (dd, J=7.9, 1.6 Hz, 1H), 5.14 (d, J=1.5 Hz, 1H), 4.62 (td, J=6.1, 1.6 Hz, 1H), 3.58 (qd, J=6.4, 5.9, 4.4 Hz, 2H), 3.24 (s, 4H), 1.52 (t, J=5.3 Hz, 4H), 1.39 (d, J=1.6 Hz, 3H), 1.19 (d, J=1.5 Hz, 9H), 0.31 (d, J=1.5 Hz, 4H). m/z (ESI): 518.2 (M+H)$^+$.

Step 3. The enantiomers were separated from each other by preparative SFC using a Chiralpak IC (250×30 mm, 5 μm) column with a mobile phase of 65% Liquid $CO_2$ and 35% EtOH using a flowrate of 100 mL/min. Peak 1 was arbitrarily assigned as (S)—N-(6-(N-(tert-butyl)sulfamoyl)pyridin-2-yl)-6-(1,2-dihydroxypropan-2-yl)-2-(6-azaspiro[2.5]octan-6-yl)nicotinamide (Example 177, 460 mg, >99% ee): m/z (ESI): 518.2 (M+H)$^+$. Peak 2 was arbitrarily assigned as (R)—N-(6-(N-(tert-butyl)sulfamoyl)pyridin-2-yl)-6-(1,2-dihydroxypropan-2-yl)-2-(6-azaspiro[2.5]octan-6-yl)nicotinamide (Example 178, 450 mg, >99% ee): m/z (ESI): 518.2 (M+H)$^+$.

Examples 193, 194 and 195

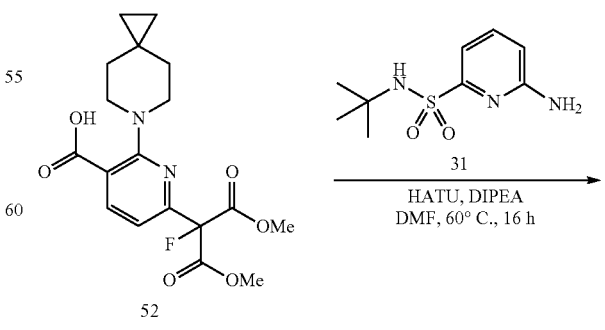

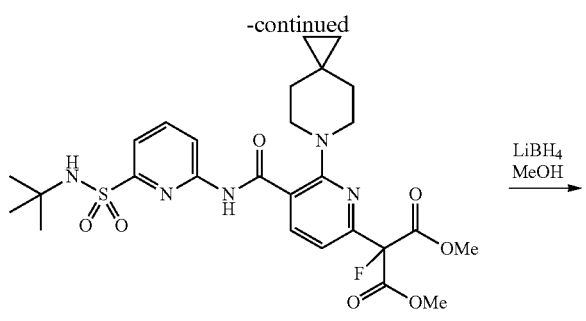

Example 193

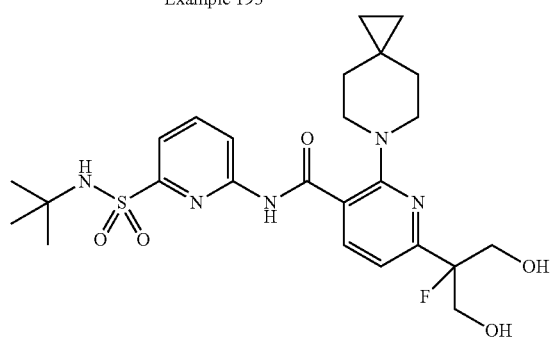

Example 194

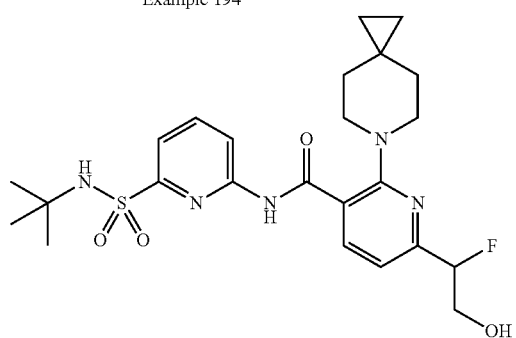

Example 195

Step 1. A mixture of 6-(2-fluoro-1,3-dimethoxy-1,3-dioxopropan-2-yl)-2-(6-azaspiro[2.5]octan-6-yl)nicotinic acid (Intermediate 52, 513 mg, 1.35 mmol), 6-amino-N-(tert-butyl)pyridine-2-sulfonamide (Intermediate 31, 371 mg, 1.62 mmol), DIPEA (0.35 mL, 2.02 mmol), and HATU (667 mg, 1.753 mmol) in DMF (5 mL) was stirred at 60° C. for 16 h. The reaction mixture was cooled to RT and partitioned between water (10 mL) and EtOAc. (75 mL). The layers were separated and the organic solution was concentrated. The residue was purified by ISCO (40% EtOAc/Heptane) to give dimethyl 2-(5-((6-(N-(tert-butyl)sulfamoyl)pyridin-2-yl)carbamoyl)-6-(6-azaspiro[2.5]octan-6-yl)pyridin-2-yl)-2-fluoromalonate (Example 193, 183 mg, 0.31 mmol, 23% yield). $^1$H NMR (DMSO-d$_6$) δ: 11.05 (s, 1H), 8.09 (d, J=8.3 Hz, 1H), 7.85 (t, J=8.0 Hz, 1H), 7.72 (d, J=7.9 Hz, 1H), 7.48 (d, J=7.7 Hz, 1H), 7.23 (s, 1H), 6.82 (d, J=7.9 Hz, 1H), 3.61 (s, 6H), 3.10 (br s, 4H), 1.11-1.16 (m, 4H), 0.93 (s, 9H), 0.04 (s, 4H). m/z (ESI): 592.3 (M+H)$^+$.

Step 2. To a stirred solution of dimethyl 2-(5-((6-(N-(tert-butyl)sulfamoyl)pyridin-2-yl)carbamoyl)-6-(6-azaspiro[2.5]octan-6-yl)pyridin-2-yl)-2-fluoromalonate (Example 193, 175 mg, 0.30 mmol) at 0° C. in THF (5 mL) and methanol (0.12 mL, 2.96 mmol) was added lithium borohydride (1.48 mL of 2 M in THF, 2.96 mmol) dropwise. The reaction mixture was stirred for 2 h (LC-MS indicated the formation of 2 products: m/z (ESI): 536.0 (M+H)$^+$ and m/z (ESI): 506.0 (M+H)$^+$) then quenched with sat'd NH$_4$Cl and extracted with DCM (3×). The organic extracts were dried over Na$_2$SO$_4$ and concentrated. The residue was purified by reverse phase HPLC (10-90% of 0.1% TFA in MeCN in 0.1% TFA in water). Pure fractions were neutralized with sat'd NaHCO$_3$ and extracted with EtOAc. Two compounds were obtained. The 1$^{st}$ eluent was N-(6-(N-(tert-butyl)sulfamoyl)pyridin-2-yl)-6-(2-fluoro-1,3-dihydroxypropan-2-yl)-2-(6-azaspiro[2.5]octan-6-yl)nicotinamide (Example 194, 8.5 mg, 0.016 mmol, 5% yield). $^1$H NMR (DMSO-d$_6$) δ: 11.39 (s, 1H), 8.40 (br d, J=8.3 Hz, 1H), 8.04-8.17 (m, 2H), 7.72 (d, J=7.3 Hz, 1H), 7.51 (s, 1H), 7.20 (br d, J=6.6 Hz, 1H), 4.87-4.97 (m, 2H), 3.81-3.96 (m, 4H), 3.42-3.53 (m, 4H), 1.49 (br s, 4H), 1.19 (s, 9H), 0.31 (s, 4H). m/z (ESI): 536.0 (M+H)$^+$. The 2$^{nd}$ eluent was N-(6-(N-(tert-butyl)sulfamoyl)pyridin-2-yl)-6-(1-fluoro-2-hydroxyethyl)-2-(6-azaspiro[2.5]octan-6-yl)nicotinamide (Example 195, 33 mg, 0.065 mmol, 22% yield). $^1$H NMR (DMSO-d$_6$, 400 MHz) δ 11.41 (br. s, 1H), 8.39 (d, 1H, J=7.0 Hz), 8.0-8.2 (m, 2H), 7.72 (d, 1H, J=7.0 Hz), 7.51 (br. s, 1H), 7.14 (d, 1H, J=6.6 Hz), 5.40-5.53 (m, 1H), 3.8-4.1 (m, 4H), 3.24 (m, 3H), 1.47 (s, 4H), 1.18 (s, 9H), 0.30 (s, 4H). m/z (ESI): 506.0 (M+H)$^+$.

Examples 196 and 197

These compounds were synthesized in a fashion similar to that described above for Examples 194 and 195.

(R)-6-(2-Fluoro-1,3-dihydroxypropan-2-yl)-N-(6-(2-methylmorpholino)pyridin-2-yl)-2-(6-azaspiro[2.5]octan-6-yl)nicotinamide (196): m/z (ESI): 500.0 (M+H)$^+$.

6-(1-Fluoro-2-hydroxyethyl)-N-(6-((R)-2-methylmorpholino)pyridin-2-yl)-2-(6-azaspiro[2.5]octan-6-yl)nicotinamide (197): m/z (ESI): 470.0 (M+H)$^+$.

Example 196

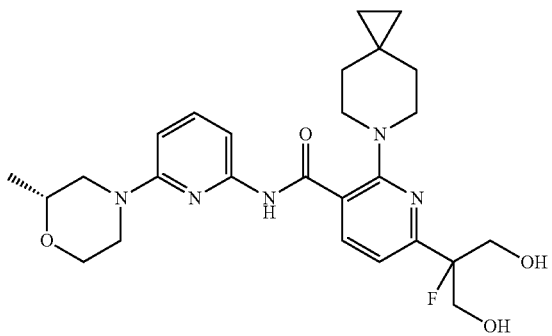

Example 197

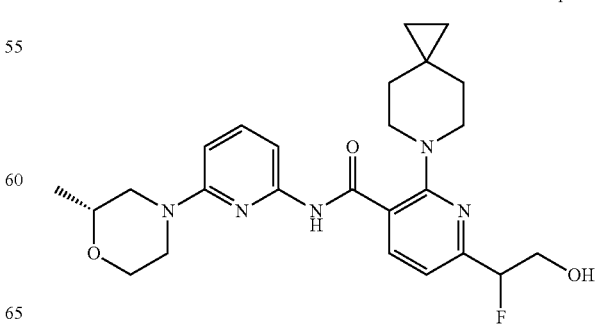

Example 198: dimethyl (6-(6-azaspiro[2.5]octan-6-yl)-5-((6-((2R)-2-methyl-4-morpholinyl)-2-pyridinyl)carbamoyl)-2-pyridinyl)(fluoro)propanedioate This compound was synthesized in a fashion similar to that described for Examples 193. m/z (ESI): 556.2 (M+H)+.

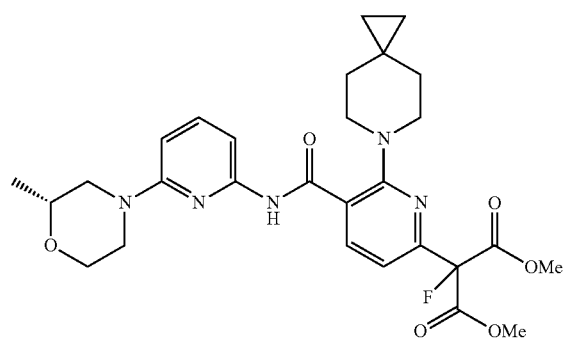

Example 198

Example 208: 6-(2-amino-3,3,3-trifluoro-2-(hydroxymethyl)propoxy)-N-(4-methyl-6-morpholinopyridin-2-yl)-2-(6-azaspiro[2.5]octan-6-yl)nicotinamide

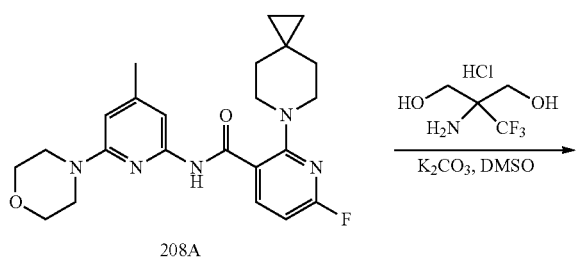

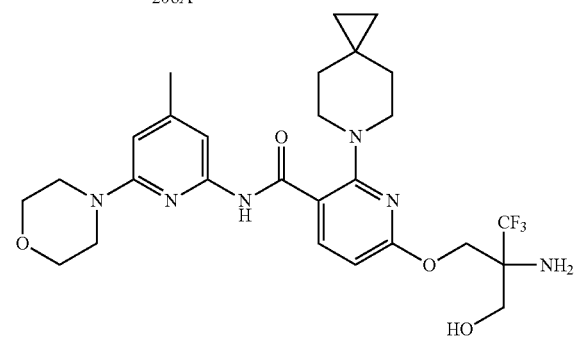

Example 208A

A mixture of 6-fluoro-N-(4-methyl-6-morpholinopyridin-2-yl)-2-(6-azaspiro[2.5]octan-6-yl)nicotinamide (208A, 0.030 g, 0.071 mmol) (prepared in a fashion similar to that described for Intermediate 147A), 2-amino-2-(trifluoromethyl)propane-1,3-diol hydrochloride (0.028 g, 0.141 mmol, FCH Group), potassium phosphate (0.045 g, 0.212 mmol) in DMSO (1 mL) was heated at 135° C. for 18 h. The mixture was cooled to RT and then filtered. The solid was rinsed with 2×1 mL of MeOH. The filtrate was concentrated and purified by reverse phase HPLC to afford 6-(2-amino-3,3,3-trifluoro-2-(hydroxymethyl)propoxy)-N-(4-methyl-6-morpholino-pyridin-2-yl)-2-(6-azaspiro[2.5]octan-6-yl)nicotinamide (208, 17.6 mg, 0.031 mmol, 44% yield) as a tan solid. $^1$H NMR (400 MHz, CHLOROFORM-d) δ ppm 0.37 (s, 4H) 1.76 (br s, 4H) 2.32 (s, 3H) 3.21 (t, J=5.39 Hz, 4H) 3.47-3.56 (m, 4H) 3.73-3.81 (m, 2H) 3.81-3.87 (m, 4H) 4.48-4.72 (m, 2H) 6.24 (s, 1H) 6.63 (d, J=8.50 Hz, 1H) 7.61 (s, 1H) 8.42 (d, J=8.50 Hz, 1H) 11.88 (s, 1H). m/z (ESI): 565.2 (M+H)+.

Example 209: 6-(2-amino-3,3,3-trifluoro-2-(hydroxymethyl)propoxy)-N-(4-methyl-6-morpholinopyridin-2-yl)-2-(6-azaspiro[2.5]octan-6-yl)nicotinamide

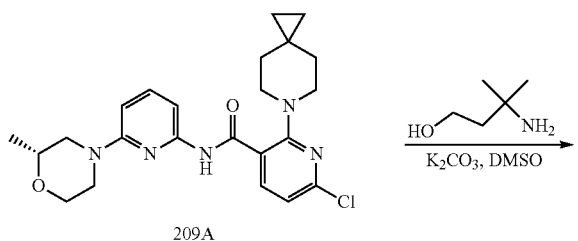

209A

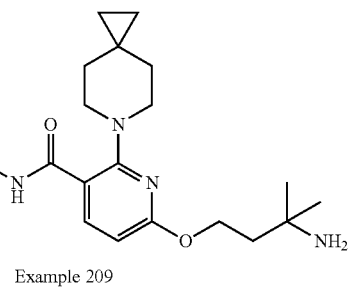

Example 209

A mixture of (R)-6-chloro-N-(6-(2-methylmorpholino)pyridin-2-yl)-2-(6-azaspiro[2.5]octan-6-yl)nicotinamide (209A, 0.100 g, 0.226 mmol), 3-amino-3-methyl-butan-1-ol (0.047 g, 0.453 mmol) (prepared in a fashion similar to that described for Intermediate 147A), potassium phosphate (0.144 g, 0.679 mmol) and DMSO (1 mL) was heated at 135° C. for 18 h.

The mixture was cooled to RT and then filtered. The solid was rinsed with 2×1 mL of MeOH. The filtrate was concentrated and purified by reverse phase HPLC to afford (R)-6-(3-amino-3-methylbutoxy)-N-(6-(2-methylmorpholino)pyridin-2-yl)-2-(6-azaspiro[2.5]octan-6-yl)nicotinamide (Example 209, 9 mg, 7% yield) as a tan solid. $^1$H NMR (400 MHz, CHLOROFORM-d) δ ppm 0.37 (s, 4H) 1.27 (d, J=6.22 Hz, 3H) 1.45 (s, 6H) 1.73 (br s, 4H) 2.13 (brt, J=6.32 Hz, 2H) 2.60 (dd, J=12.54, 10.26 Hz, 1H) 2.90-3.00 (m, 1H) 3.21 (t, J=5.39 Hz, 4H) 3.63-3.77 (m, 2H) 4.01 (dd, J=11.20, 2.28 Hz, 2H) 4.11 (br d, J=12.02 Hz, 1H) 4.54 (t, J=6.32 Hz, 2H) 6.38 (d, J=8.09 Hz, 1H) 6.65 (d, J=8.50 Hz, 1H) 7.54 (t, J=8.09 Hz, 1H) 7.71 (d, J=7.88 Hz, 1H) 8.37 (d, J=8.50 Hz, 1H) 11.90 (s, 1H). m/z (ESI): 509.3 (M+H)+.

Example 210: (S)-6-((4-hydroxy-2-methylbutan-2-yl)amino)-N-(6-(2-(hydroxymethyl)morpholino)pyridin-2-yl)-2-(6-azaspiro[2.5]octan-6-yl)nicotinamide

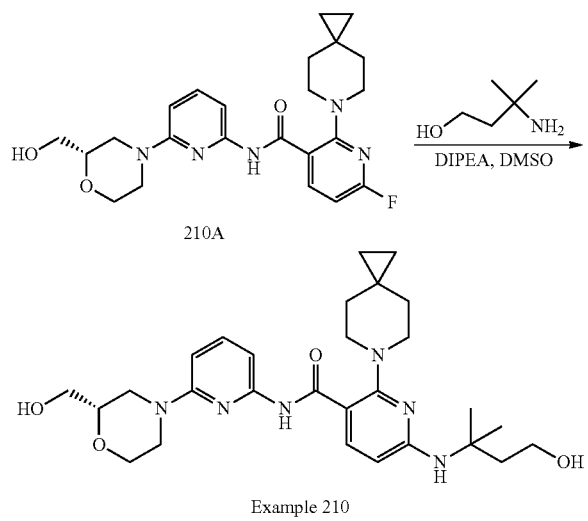

A solution of (S)-6-fluoro-N-(6-(2-(hydroxymethyl)morpholino)pyridin-2-yl)-2-(6-azaspiro[2.5]octan-6-yl)nicotinamide (210A, 100 mg) (prepared in a fashion similar to that described for Example 173), 3-amino-3-methylbutan-1-ol (40 mg, Tyger Scientific) and Hunig's base (0.100 mL, 0.571 mmol) in DMSO (1 mL) was heated at 145° C. for 6 h. The mixture was cooled to RT and then purified by reverse phase HPLC to afford (S)-6-((4-hydroxy-2-methylbutan-2-yl)amino)-N-(6-(2-(hydroxymethyl)morpholino)pyridin-2-yl)-2-(6-azaspiro[2.5]octan-6-yl)nicotinamide (Example 210, 0.037 g, 0.071 mmol, 37% yield) as an off-white solid. $^1$H NMR (400 MHz, CHLOROFORM-d) δ ppm 0.38 (s, 4H) 1.51 (s, 6H) 1.67-1.81 (m, 4H) 2.10 (t, J=6.22 Hz, 2H) 2.77 (br dd, J=12.34, 10.06 Hz, 1H) 2.98 (td, J=12.23, 3.32 Hz, 1H) 3.17 (brt, J=4.98 Hz, 4H) 3.66-3.80 (m, 4H) 3.84 (t, J=6.22 Hz, 2H) 4.01-4.14 (m, 3H) 6.18 (d, J=8.50 Hz, 1H) 6.37 (d, J=8.29 Hz, 1H) 7.53 (t, J=8.09 Hz, 1H) 7.75 (d, J=7.88 Hz, 1H) 8.16 (d, J=8.71 Hz, 1H) 12.15 (br s, 1H). m/z (ESI): 525.2 (M+H)$^+$.

TABLE 6

Examples 211-214, 217, and 222 were prepared in a manner analogous to that described above for Example 210.

| Ex. # | Chemical Structure | Name | LRMS: (ESI +ve ion) m/z |
|---|---|---|---|
| 211 | | 2-(6-azaspiro[2.5]octan-6-yl)-6-((4-hydroxy-2-methyl-2-butanyl)amino)-N-(4-methyl-6-(4-morpholinyl)-2-pyridinyl)-3-pyridinecarboxamide | 509.1 |
| 212 | | 6-(4-hydroxy-2,2-dimethylpyrrolidin-1-yl)-N-(4-methyl-6-morpholinopyridin-2-yl)-2-(6-azaspiro[2.5]octan-6-yl)nicotinamide | 521.1 |

TABLE 6-continued

Examples 211-214, 217, and 222 were prepared in a manner analogous to that described above for Example 210.

| Ex. # | Chemical Structure | Name | LRMS: (ESI + ve ion) m/z |
|---|---|---|---|
| 213 | | 6-(4-hydroxy-2,2-dimethylpyrrolidin-1-yl)-N-(6-((R)-2-methylmorpholino)pyridin-2-yl)-2-(6-azaspiro[2.5]octan-6-yl)nicotinamide | 521.1 |
| 214 | | 2-(6-azaspiro[2.5]octan-6-yl)-6-((4-hydroxy-2-methyl-2-butanyl)amino)-N-(6-((2R)-2-methyl-4-morpholinyl)-2-pyridinyl)-3-pyridinecarboxamide | 509.1 |
| 217 | | 6-((1-hydroxy-3-methoxy-2-methylpropan-2-yl)amino)-N-(6-((R)-2-methylmorpholino)pyridin-2-yl)-2-(6-azaspiro[2.5]octan-6-yl)nicotinamide | 525.0 |
| 222 | | 2-(6-azaspiro[2.5]octan-6-yl)-6-((1,3-dihydroxy-2-(hydroxymethyl)-2-propanyl)amino)-N-(6-((2R)-2-methyl-4-morpholinyl)-2-pyridinyl)-3-pyridinecarboxamide | 527.1 |

Example 218: (R)—N-(6-(2-methylmorpholino)pyridin-2-yl)-6-(methylsulfonamido)-2-(6-azaspiro[2.5]octan-6-yl)nicotinamide

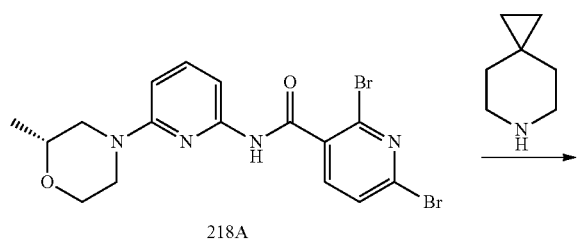

218A

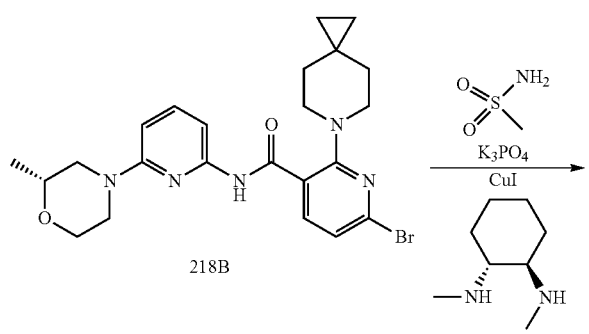

218B

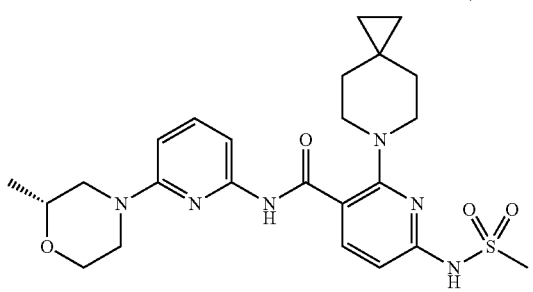

Example 218

Step 1. A mixture of (R)-2,6-dibromo-N-(6-(2-methylmorpholino)pyridin-2-yl)nicotinamide (218A, 0.300 g, 0.658 mmol) (prepared in a fashion similar to that described for Example 173), 6-azaspiro[2.5]octane (0.090 mL, 0.688 mmol), DIPEA (0.138 mL, 0.789 mmol) and DMSO (2 mL) was heated at 60° C. for 18 h. The reaction mixture was partitioned between water (10 mL) and EtOAc (50 mL). The organic phase was concentrated and the crude product was purified by Biotage (SNAP25, Ultra, eluent: EtOAc in heptane 10%-60%) to afford (R)-6-bromo-N-(6-(2-methylmorpholino)pyridin-2-yl)-2-(6-azaspiro[2.5]octan-6-yl)nicotinamide (218B, 0.123 g, 39% yield) as a white solid. $^1$H NMR (400 MHz, CHLOROFORM-d) δ ppm 0.39 (s, 4H) 1.28 (d, J=6.22 Hz, 3H) 1.74 (br s, 4H) 2.62 (dd, J=12.44, 10.57 Hz, 1H) 2.97 (td, J=12.28, 3.63 Hz, 1H) 3.28 (t, J=5.39 Hz, 4H) 3.65-3.78 (m, 2H) 3.97-4.06 (m, 2H) 4.13 (br d, J=12.44 Hz, 1H) 6.43 (d, J=8.09 Hz, 1H) 7.34 (d, J=8.09 Hz, 1H) 7.53-7.61 (m, 1H) 7.69 (d, J=7.88 Hz, 1H) 8.29 (d, J=8.09 Hz, 1H) 11.58 (s, 1H). m/z (ESI): 486/488 (M+H)$^+$.

Step 2. A mixture of (R)-6-bromo-N-(6-(2-methylmorpholino)pyridin-2-yl)-2-(6-azaspiro[2.5]octan-6-yl)nicotinamide (218B, 0.120 g, 0.247 mmol), methanesulfonamide (0.029 g, 0.306 mmol), copper(i) iodide (0.016 g, 0.086 mmol) and potassium phosphate (0.141 g, 0.667 mmol) in a glass vial was purged with argon for 3 min. DMF (1 mL) was added followed by (1R,2R)-(−)-N,N"-dimethylcyclohexane-1,2-diamine (0.027 mL, 0.173 mmol). The vial was capped and the mixture was stirred at 100° C. for 3 h. The mixture was diluted with EtOAc (4 mL) and filtered through a pad of celite and rinsed with 10 mL of EtOAc. The filtrate was washed with water (2×5 mL) and concentrated. The crude product was purified by Biotage (SNAP25, Ultra, eluent: EtOAc in heptane 10%-80%) to afford (R)—N-(6-(2-methylmorpholino)pyridin-2-yl)-6-(methylsulfonamido)-2-(6-azaspiro[2.5]octan-6-yl)nicotinamide (Example 218, 59 mg, 96% yield) as a white solid. $^1$H NMR (400 MHz, DMSO-d$_6$) δ=11.66 (br s, 1H), 10.96 (br s, 1H), 8.21 (d, J=8.3 Hz, 1H), 7.63-7.49 (m, 2H), 6.70 (d, J=8.3 Hz, 1H), 6.58 (d, J=8.1 Hz, 1H), 4.18 (br d, J=12.2 Hz, 1H), 4.03 (br d, J=12.6 Hz, 1H), 3.91 (br dd, J=2.2, 11.5 Hz, 1H), 3.63-3.52 (m, 2H), 3.42 (s, 3H), 3.16 (br t, J=5.1 Hz, 4H), 2.83 (dt, J=2.9, 12.1 Hz, 1H), 2.54-2.51 (m, 1H), 1.67 (br d, J=2.7 Hz, 4H), 1.17 (d, J=6.2 Hz, 3H), 0.35 (s, 4H). m/z (ESI): 501.1 (M+H)$^+$.

Examples 223-225

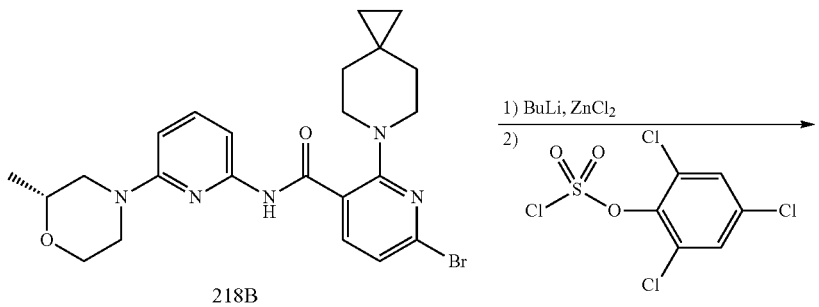

218B

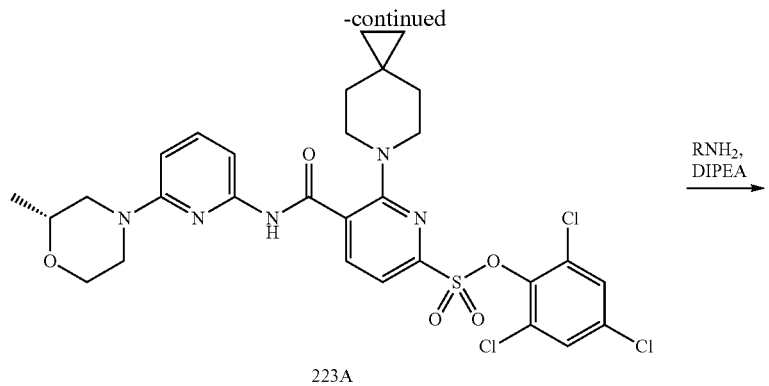

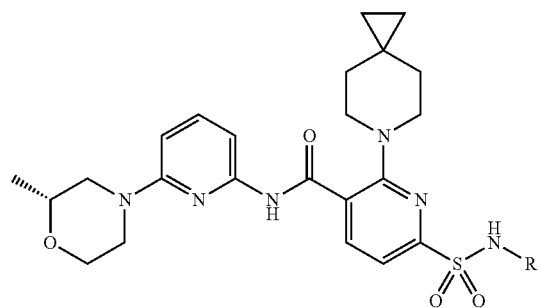

R = Me, Example 223
R = H, Example 224
R = tBu, Example 225

To a solution of (R)-6-bromo-N-(6-(2-methylmorpholino)pyridin-2-yl)-2-(6-azaspiro[2.5]octan-6-yl)nicotinamide (218B, 0.245 g, 0.503 mmol) in THF (1 mL) at −78° C. was added n-BuLi (2.5 M in hexanes, 0.423 mL, 1.057 mmol) over 5 min and the mixture was stirred for 15 min. Zinc chloride (1.9 M in 2-methyltetrahydrofuran, 0.265 mL, 0.503 mmol) was added over 5 min. The cold bath was removed and the mixture was stirred at RT for 1 h then cooled with an ice bath. 2,4,6-Trichlorophenyl sulfochloridate (0.149 g, 0.503 mmol) was added over 5 min. The mixture was stirred at 0° C. for 30 min then RT for 1.5 h. It was diluted with EtOAc (50 mL) and washed with water (5 mL) followed by brine (5 mL). The organic layer was concentrated and the residue was purified on a silica gel column (25-75% EtOAc in heptane) to give Intermediate 223A (76 mg, 22% yield) as a brown solid. m/z (ESI): 667.1 (M+H)$^+$.

A solution of 223A (70 mg, 0.11 mmol) and DIPEA (0.10 mL, 0.12 mmol) in 3 mL of THF was divided into 3 equal portions and laced in 3 glass vials. Each vial was treated with either 0.1 mL of MeNH$_2$ or NH$_4$OH or tBuNH$_2$, sealed, and heated at 60° C. for 18 h. The vials were cooled to RT and the contents were purified via silica gel chromatography to give Examples 223 (2 mg), 224 (2 mg), and 225 (3 mg).

2-(6-Azaspiro[2.5]octan-6-yl)-N-(6-((2R)-2-methyl-4-morpholinyl)-2-pyridinyl)-6-(methylsulfamoyl)-3-pyridinecarboxamide (223): $^1$H NMR (400 MHz, CHLOROFORM-d) δ ppm 11.16 (1H, s), 8.59 (1H, d, J=7.9 Hz), 7.78 (1H, d, J=7.9 Hz), 7.66-7.71 (1H, m), 7.55-7.62 (1H, m), 6.45 (1H, d, J=8.1 Hz), 4.70 (1H, q, J=5.4 Hz), 4.12 (1H, br d, J=12.4 Hz), 3.97-4.07 (2H, m), 3.65-3.77 (2H, m), 3.34 (4H, t, J=5.5 Hz), 2.98 (1H, td, J=12.3, 3.5 Hz), 2.86 (3H, d, J=5.4 Hz), 2.62 (1H, dd, J=12.5, 10.5 Hz), 1.74 (4H, br d, J=2.1 Hz), 1.28 (3H, d, J=6.2 Hz), 0.40 (4H, s). m/z (ESI): 501.1 (M+H)$^+$.

2-(6-Azaspiro[2.5]octan-6-yl)-N-(6-((2R)-2-methyl-4-morpholinyl)-2-pyridinyl)-6-sulfamoyl-3-pyridinecarboxamide (224): m/z (ESI): $^1$H NMR (400 MHz, CHLOROFORM-d) δ ppm 11.11 (1H, s), 8.59 (1H, d, J=7.9 Hz), 7.79 (1H, d, J=7.9 Hz), 7.65-7.70 (1H, m), 7.55-7.62 (1H, m), 6.45 (1H, d, J=8.1 Hz), 4.98 (2H, br s), 4.12 (1H, br d, J=12.9 Hz), 3.96-4.06 (2H, m), 3.66-3.78 (2H, m), 3.35 (4H, t, J=5.5 Hz), 2.98 (1H, td, J=12.3, 3.6 Hz), 2.62 (1H, dd, J=12.6, 10.6 Hz), 1.74 (4H, br d, J=2.3 Hz), 1.29 (3H, d, J=6.2 Hz), 0.40 (4H, s). 487.1 (M+H)$^+$.

2-(6-Azaspiro[2.5]octan-6-yl)-N-(6-((2R)-2-methyl-4-morpholinyl)-2-pyridinyl)-6-((2-methyl-2-propanyl)sulfamoyl)-3-pyridinecarboxamide (225): $^1$H NMR (400 MHz, CHLOROFORM-d) δ ppm 11.35 (1H, s), 8.60 (1H, d, J=7.9 Hz), 7.82 (1H, d, J=7.9 Hz), 7.69 (1H, d, J=7.9 Hz), 7.55-7.62 (1H, m), 6.45 (1H, d, J=8.3 Hz), 4.82 (1H, s), 4.13 (1H, br d, J=12.4 Hz), 3.97-4.06 (2H, m), 3.65-3.78 (2H, m), 3.33 (4H, t, J=5.4 Hz), 2.98 (1H, td, J=12.3, 3.7 Hz), 2.63 (1H, dd, J=12.5, 10.5 Hz), 1.75 (4H, br d, J=1.9 Hz), 1.29 (3H, s), 1.27 (9H, s), 0.41 (4H, s). m/z (ESI): 543.1 (M+H)$^+$.

Example 232 and 233

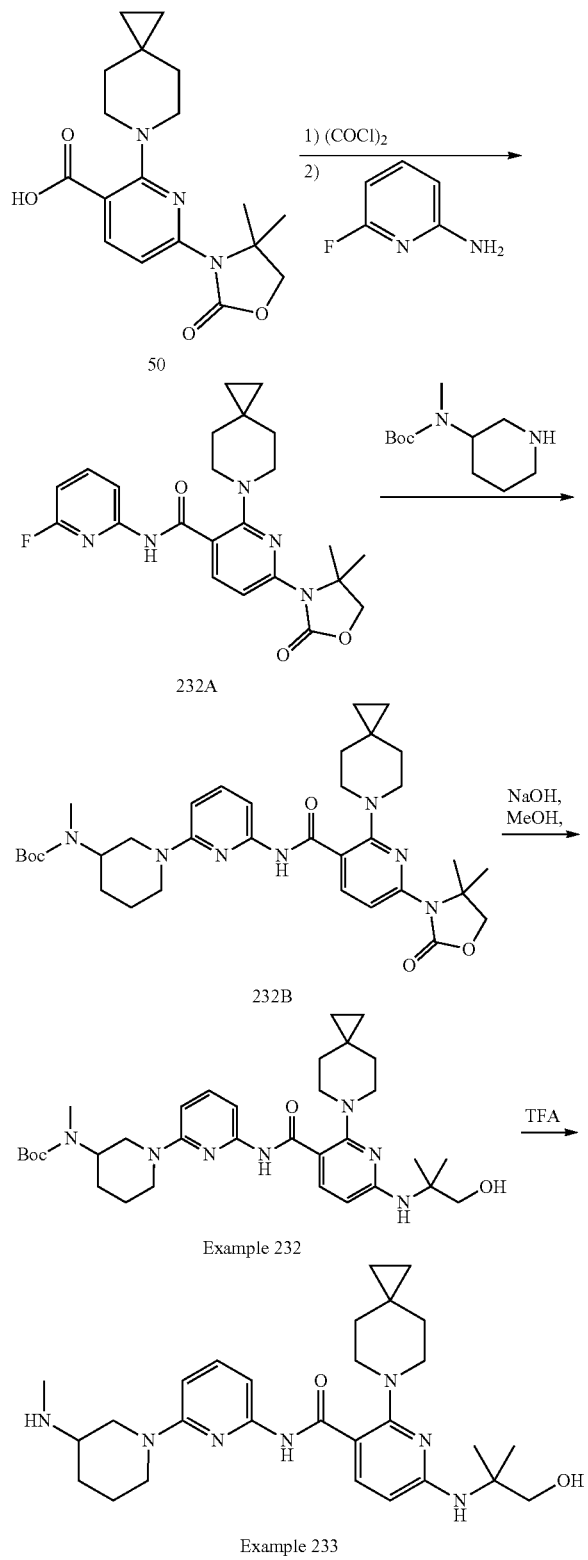

Step 1. To a solution of 6-(4,4-dimethyl-2-oxooxazolidin-3-yl)-2-(6-azaspiro[2.5]octan-6-yl)nicotinic acid (Intermediate 50, 1.00 g, 2.90 mmol) in DCM (10 mL) at 0° C. was added oxalyl chloride (2.17 mL of 2 M in DCM, 4.34 mmol) followed by 2 drops of DMF. The mixture was stirred at RT for 1 h then concentrated. The residue was dissolved in DCM (10 mL), cooled to 0° C., and then treated with 6-fluoro-pyridin-2-ylamine (0.422 g, 3.76 mmol) followed by diisopropylethylamine (1.52 mL, 8.69 mmol). The mixture was stirred 3.75 h at RT then quenched with methanol and evaporated. The residue was taken up in ethyl acetate (40 mL), washed with brine (10 mL), dried over sodium sulfate and evaporated onto silica gel. The residue was purified by chromatography on silica gel (40 g, 0% to 70% ethyl acetate in heptane) to provide 6-(4,4-dimethyl-2-oxooxazolidin-3-yl)-N-(6-fluoropyridin-2-yl)-2-(6-azaspiro[2.5]octan-6-yl)nicotinamide (232A, 0.753 g, 1.71 mmol, 59% yield). m/z ESI 440.1.

Step 2. 6-(4,4-Dimethyl-2-oxooxazolidin-3-yl)-N-(6-fluoropyridin-2-yl)-2-(6-azaspiro[2.5]octan-6-yl)nicotinamide (232A, 0.100 g, 0.228 mmol) was dissolved in DMSO (1 mL) and diisopropylethylamine (0.200 ml, 1.14 mmol) and tert-butyl N-(3-piperidinyl)carbamate (0.092 g, 0.456 mmol) was added. The mixture was heated at 200° C. for 60 min in a microwave. The mixture was cooled, diluted with ethyl acetate (40 mL), washed with brine (2×40 mL), dried over sodium sulfate and evaporated to give 232B which was taken forward without purification. m/z ESI 634.2 (M+H)$^+$.

Step 3. tert-Butyl (1-(6-(6-(4,4-dimethyl-2-oxooxazolidin-3-yl)-2-(6-azaspiro[2.5]octan-6-yl)nicotinamido)pyridin-2-yl)piperidin-3-yl)(methyl)carbamate (232B) was dissolved in methanol (0.6 mL). 2 mL 5 N NaOH was added and the mixture was evaporated under a stream of nitrogen. The residue was taken up in methanol (4 mL) and the mixture was heated at 70° C. for 8 h. The mixture was cooled and purified by HPLC 0.1% NH$_4$OH in H$_2$O (A) and ACN (B) as mobile phase, XBridge column (19×100 mm, 10 um) to provide tert-Butyl (1-(6-(6-((1-hydroxy-2-methylpropan-2-yl)amino)-2-(6-azaspiro[2.5]octan-6-yl)nicotinamido)pyridin-2-yl)piperidin-3-yl)(methyl)carbamate (Example 232, 17 mg, 0.027 mmol, 25%). $^1$H NMR (500 MHz, DMSO-d$_6$) δ ppm 0.30-0.37 (m, 4H) 1.33-1.41 (m, 16H) 1.59-1.79 (m, 5H) 2.69-2.79 (m, 4H) 2.89-3.09 (m, 5H) 3.16 (d, J=5.32 Hz, 1H) 3.59 (d, J=5.71 Hz, 3H) 4.09-4.20 (m, 2H) 4.31 (br s, 1H) 4.83 (t, J=5.77 Hz, 1H) 6.41 (d, J=8.69 Hz, 1H) 6.50-6.55 (m, 1H) 6.80 (s, 1H) 7.51 (d, J=4.15 Hz, 2H) 7.93 (d, J=8.69 Hz, 1H) 12.23 (s, 1H). m/z ESI 608.2 (M+H)$^+$.

Step 4. tert-Butyl (1-(6-(6-((1-hydroxy-2-methylpropan-2-yl)amino)-2-(6-azaspiro[2.5]octan-6-yl)nicotinamido)pyridin-2-yl)piperidin-3-yl)(methyl)carbamate (Example 232, 10.5 mg, 0.017 mmol) was dissolved in 1 mL DCM and 0.1 mL TFA was added and the mixture was stirred for 30 min. The mixture was evaporated and purified via silica gel chromatography (1% to 5% 2 M NH$_3$ in MeOH in DCM) to provide tert-butyl (1-(6-(6-((1-hydroxy-2-methylpropan-2-yl)amino)-2-(6-azaspiro[2.5]octan-6-yl)nicotinamido)pyridin-2-yl)piperidin-3-yl)(methyl)carbamate (Example 233, 8.4 mg, 16.5 mmol, 96%). $^1$H NMR (400 MHz, CHLOROFORM-d) δ ppm 0.38 (s, 4H) 1.37-1.49 (m, 8H) 1.52-1.71 (m, 3H) 1.71-1.88 (m, 4H) 1.90-2.10 (m, 1H) 2.51 (s, 3H) 2.58-2.67 (m, 1H) 2.95 (dd, J=12.65, 8.71 Hz, 1H) 3.07 (ddd, J=13.06, 10.06, 3.21 Hz, 1H) 3.20 (t, J=5.39 Hz, 4H) 3.73 (s, 2H) 4.00-4.12 (m, 2H) 4.68 (s, 1H) 6.23 (m, J=8.71 Hz, 1H) 6.42 (d, J=8.29 Hz, 1H) 7.49 (t, J=7.98 Hz, 1H) 7.65 (d, J=7.88 Hz, 1H) 8.22 (m, J=8.71 Hz, 1H) 11.94 (s, 1H). m/z ESI 508.1 (M+H)$^+$.

TABLE 7

Examples 234 to 236 were prepared in a manner analogous to that described above for Example 233.

| Ex. # | Chemical Structure | Name | LRMS: (ESI + ve ion) m/z |
|---|---|---|---|
| 234 | | tert-butyl (1-(6-(6-((1-hydroxy-2-methylpropan-2-yl)amino)-2-(6-azaspiro[2.5]octan-6-yl)nicotinamido)pyridin-2-yl)piperidin-3-yl)carbamate | 594.2 |
| 235 | | N-(6-(2-(aminomethyl)morpholino)pyridin-2-yl)-6-((1-hydroxy-2-methylpropan-2-yl)amino)-2-(6-azaspiro[2.5]octan-6-yl)nicotinamide | 510 |
| 236 | | N-(6-(3-aminopiperidin-1-yl)pyridin-2-yl)-6-((1-hydroxy-2-methylpropan-2-yl)amino)-2-(6-azaspiro[2.5]octan-6-yl)nicotinamide | 494 |

Example 237: (R)-6-((2-hydroxyethyl)sulfonamido)-N-(6-(2-methylmorpholino)pyridin-2-yl)-4-(6-azaspiro[2.5]octan-6-yl)nicotinamide

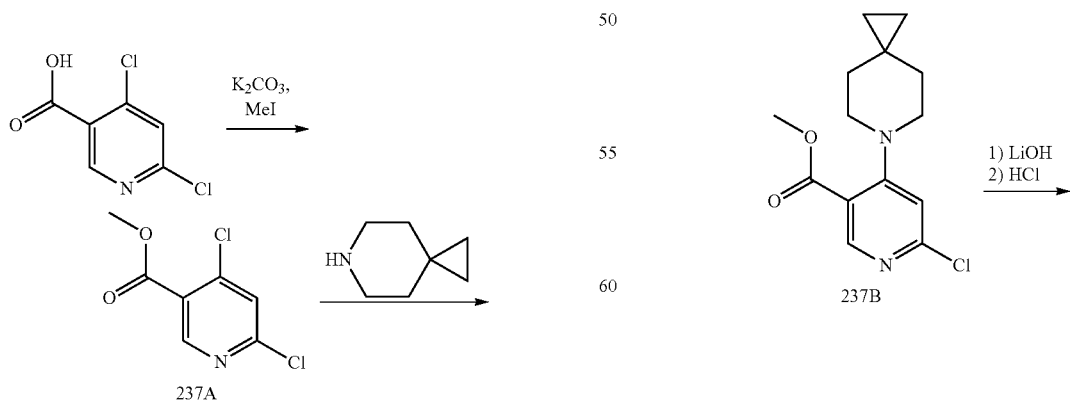

-continued

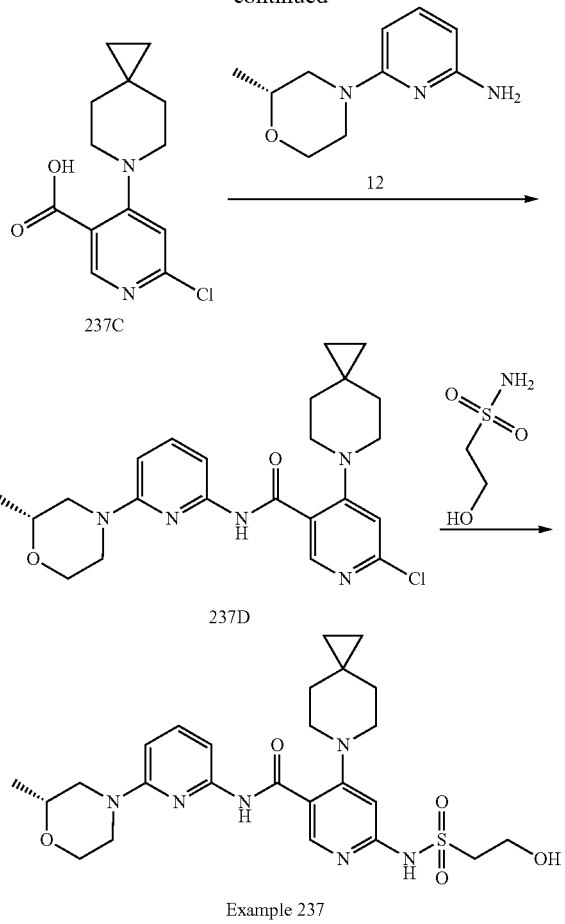

dried to afford 6-chloro-4-(6-azaspiro[2.5]octan-6-yl)nicotinic acid (237C, 5.0 g, 105%) as a white solid which was directly used in the next step. ¹H NMR (400 MHz, DMSO-d6): δ ppm 13.19 (s, 1H), 8.29 (s, 1H), 6.99 (s, 1H), 3.23-3.30 (m, 4H), 1.40-1.47 (m, 4H), 0.35 (s, 4H). m/z (ESI): 267.1 (M+H)⁺.

Step 4. To a solution of 6-chloro-4-(6-azaspiro[2.5]octan-6-yl)nicotinic acid (237C, 1.5 g, 5.6 mmol) in dichloromethane (15 mL) were added DIPEA (4.9 mL 28.1 mmol), (R)-6-(2-methylmorpholino)pyridin-2-amine (12, 1.3 g, 6.7 mmol) and T3P (14.31 g of 50% wt. in ethyl acetate, 22.5 mmol) and the reaction mixture was stirred at RT for 16 h. Then the reaction mixture was diluted with water (30 mL) and was extracted with DCM (3×25 mL). The combined organic extracts were washed with brine (30 mL), dried over Na₂SO₄, filtered and concentrated. The residue was purified by flash column chromatography using a gradient of 1% to 30% EtOAc in petroleum ether to provide (R)-6-chloro-N-(6-(2-methylmorpholino)pyridin-2-yl)-4-(6-azaspiro[2.5]octan-6-yl)nicotinamide (237D, 0.65 g, 1.47 mmol, 26% yield) as a light yellow solid. m/z (ESI): 442.1 (M+H)⁺.

Step 5. A mixture of (R)-6-chloro-N-(6-(2-methylmorpholino)pyridin-2-yl)-4-(6-azaspiro[2.5]octan-6-yl)nicotinamide (237D, 650 mg, 1.47 mmol), 2-hydroxyethane-1-sulfonamide (221 mg, 1.76 mmol) K₃PO₄ (905 mg, 4.27 mmol), (1R,2R)—N1,N2-dimethylcyclohexane-1,2-diamine (105 mg, 0.73 mmol) and copper(I) iodide (280 mg, 1.47 mmol) in DMF (8 mL) was heated at 105° C. for 16 h. Then the reaction mixture was filtered through a plug of celite and the filter cake was rinsed with 2×50 mL of EtOAc. The filtrate was washed with water followed by brine, dried over Na₂SO₄, filtered and concentrated. The concentrate was purified by reverse phase preparative HPLC to provide (R)-6-((2-hydroxyethyl)sulfonamido)-N-(6-(2-methylmorpholino)pyridin-2-yl)-4-(6-azaspiro[2.5]octan-6-yl)nicotinamide (Example 237, 20 mg, 0.38 mmol, 26% yield) as a white solid.

¹H NMR (400 MHz, DMSO-d₆) δ ppm 10.90 (s, 1H), 8.37 (s, 1H), 7.59 (t, J=8.0 Hz, 1H), 7.49 (d, J=8.1 Hz, 1H), 6.75 (s, 1H), 6.60 (d, J=8.2 Hz, 1H), 4.87 (br s, 1H), 4.19 (d, J=13.2 Hz, 1H), 4.02 (d, J=12.7 Hz, 2H), 3.83-3.99 (m, 2H), 3.26-3.58 (m, 6H), 3.09 (m, 4H) 2.82 (dd, J=14.2, 10.5 Hz, 1H), 1.63 (s, 4H), 1.17 (d, J=6.1 Hz, 3H), 0.35 (s, 4H). m/z (ESI): 531.2 (M+H)⁺.

Example 238: (R)—N-(6-(2-methylmorpholino)pyridin-2-yl)-6-(methylsulfonyl)-2-(6-azaspiro[2.5]octan-6-yl)nicotinamide

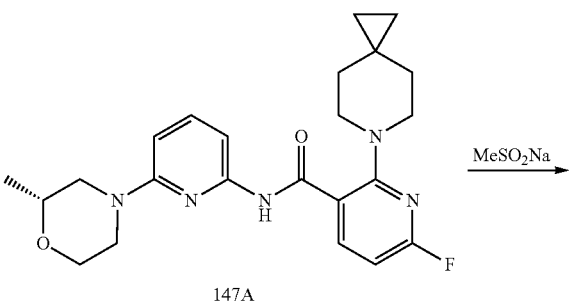

Step 1. To a solution of 4,6-dichloronicotinic acid (10.0 g, 52.1 mmol) in DMF (100 mL) were added potassium carbonate (14.4 g, 104 mmol) and iodomethane (7.4 g, 52.1 mmol) at 0° C. The reaction mixture was stirred at RT for 16 h before it was quenched with water. The solid obtained was filtered and dried to afford methyl 4,6-dichloronicotinate (237A, 7.0 g, 34.0 mmol, 65% yield) as a white solid. m/z (ESI): 206.1 (M+H)⁺.

Step 2. To a solution of methyl 4,6-dichloronicotinate (237A, 7.0 g, 34.0 mmol) in DMF (70 mL) was added K₂CO₃ (4.7 g, 34.0 mmol) and 6-azaspiro[2.5]octane (3.8 g, 34.0 mmol) and the reaction mixture was stirred at 55° C. for 16 h. Then the reaction mixture was quenched with water and extracted with EtOAc. The organic layer was washed with brine, dried over Na₂SO₄, filtered and concentrated. The residue was purified by flash column chromatography using a gradient of 1% to 35% EtOAc in petroleum ether to provide methyl 6-chloro-4-(6-azaspiro[2.5]octan-6-yl)nicotinate (237B, 6.1 g, 21.7 mmol, 64% yield) as a white solid. ¹H NMR (300 MHz, DMSO-d6): δ ppm 8.29 (d, J=1.4 Hz, 1H), 7.02 (d, J=1.4 Hz, 1H), 3.82 (d, J=1.3 Hz, 3H), 3.18-3.28 (m, 4H), 1.37-1.47 (m, 4H), 0.32-0.38 (m, 4H). m/z (ESI): 281.1 (M+H)⁺.

Step 3. To a solution of methyl 6-chloro-4-(6-azaspiro[2.5]octan-6-yl)nicotinate (237B, 5.0 g, 17.8 mmol) in water (35 mL) and tetrahydrofuran (15 mL) was added LiOH (1.3 g, 53.4 mmol) and the reaction mixture was stirred at 70° C. for 5 h. Then the reaction mixture was quenched with 3 N HCl at 0° C. and the solid thus obtained was filtered and -continued

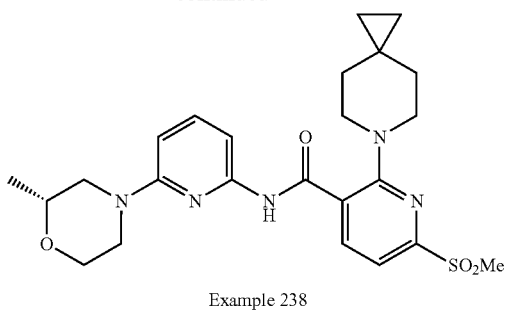

Example 238

A mixture of (R)-6-fluoro-N-(6-(2-methylmorpholino) pyridin-2-yl)-2-(6-azaspiro[2.5]octan-6-yl)nicotinamide (147A, 100 mg, 0.23 mmol) and sodium methanesulfinate (48 mg, 0.47 mmol) in DMF (2 mL) was heated in a microwave at 150° C. for 30 min. The reaction mixture was diluted with water (20 mL) and extracted with EtOAc (2×20 mL). The organic extract was washed with brine (10 mL), dried over $Na_2SO_4$, and concentrated in vacuo. The crude material was absorbed onto a plug of silica gel and purified by chromatography through a Redi-Sep pre-packed silica gel column (12 g), eluting with a gradient of 1% to 40% EtOAc in hexane, to provide (R)—N-(6-(2-methylmorpholino)pyridin-2-yl)-6-(methylsulfonyl)-2-(6-azaspiro[2.5]octan-6-yl) nicotinamide (Example 238, 70 mg, 0.14 mmol, 61% yield) as light yellow solid. m/z ESI 486.3 (M+H).

TABLE 8

Examples 239-241 were prepared in a manner analogous to that described for Example 110.

| Ex. # | Chemical Structure | Name | LRMS: (ESI + ve ion) m/z |
|---|---|---|---|
| 239 | | 2-(6-azaspiro[2.5]octan-6-yl)-N-(6-((2R)-2-methyl-4-morpholinyl)-2-pyridinyl)-6-((methylsulfonyl)methyl)-3-pyridinecarboxamide | 500.3 |
| 240 | | 2-(6-azaspiro[2.5]octan-6-yl)-N-(4-methyl-6-(4-morpholinyl)-2-pyridinyl)-6-((methylsulfonyl)methyl)-3-pyridinecarboxamide | 500.3 |
| 241 | | 2-(6-azaspiro[2.5]octan-6-yl)-N-(6-((3R)-3-hydroxy-1-piperidinyl)-2-pyridinyl)-6-((methylsulfonyl)methyl)-3-pyridinecarboxamide | 500.3 |

Example 243: (R)-6-((1-hydroxy-2-methylpropan-2-yl)amino)-N-(6-(2-methylmorpholino)pyridin-2-yl)-4-(6-azaspiro[2.5]octan-6-yl)nicotinamide

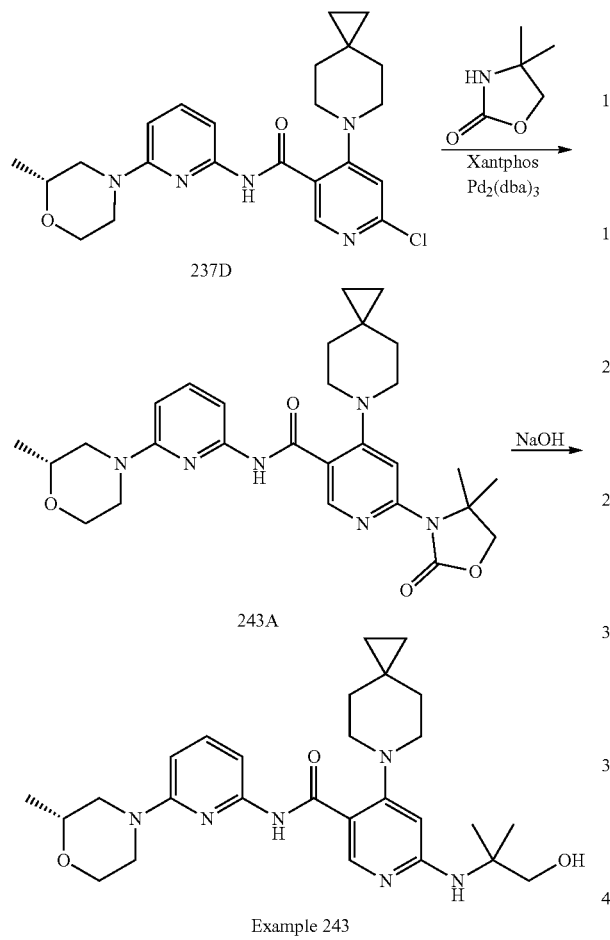

Example 243

Step 1. A mixture of (R)-6-chloro-N-(6-(2-methylmorpholino)pyridin-2-yl)-4-(6-azaspiro[2.5]octan-6-yl)nicotinamide (237D, 100 mg, 0.22 mmol), 4,4-dimethyloxazolidin-2-one (26 mg, 0.22 mmol) in 1,4-dioxane (1 mL), $Cs_2CO_3$ (74 mg, 0.22 mmol), Xantphos (131 mg, 0.22 mmol) and $Pd_2(dba)_3$ (207 mg, 0.22 mmol) was heated at 100° C. for 16 h. Then the reaction mixture was filtered through a plug of celite and the filter cake was rinsed with 2×25 mL of EtOAc. The filtrate was washed with water followed by brine, dried over $Na_2SO_4$, filtered and concentrated. The concentrate was purified by flash column chromatography eluting with a gradient of 15% to 40% EtOAc in Petroleum ether to provide (R)-6-(4,4-dimethyl-2-oxooxazolidin-3-yl)-N-(6-(2-methylmorpholino)pyridin-2-yl)-4-(6-azaspiro[2.5]octan-6-yl)nicotinamide (243A, 35 mg, 0.067 mmol, 30% yield) as a white solid. m/z (ESI): 521.2 $(M+H)^+$.

Step 2. To a solution of (R)-6-(4,4-dimethyl-2-oxooxazolidin-3-yl)-N-(6-(2-methylmorpholino)pyridin-2-yl)-4-(6-azaspiro[2.5]octan-6-yl)nicotinamide (243A, 35 mg, 0.067 mmol) in methanol (0.3 mL) and water (0.3 mL) was added 10% NaOH solution (0.3 mL, 0.13 mmol) in one portion and the reaction mixture was heated at 60° C. for 4 h. Then the reaction mixture was diluted with water (10 mL) and extracted with EtOAc (3×10 mL). The combined organic extracts were washed with brine (10 mL), dried over $Na_2SO_4$, filtered and concentrated. The concentrate was purified by flash column chromatography eluting with a gradient of 0% to 40% EtOAc in petroleum ether to provide (R)-6-((1-hydroxy-2-methylpropan-2-yl)amino)-N-(6-(2-methylmorpholino)pyridin-2-yl)-4-(6-azaspiro[2.5]octan-6-yl)nicotinamide (Example 243, 25 mg, 0.051 mmol, 75% yield) as a white solid. $^1$H NMR (400 MHz, DMSO-$d_6$) δ ppm 11.60 (s, 1H), 8.50 (s, 1H), 7.45-7.64 (m, 2H), 6.73 (s, 1H), 6.51-6.59 (m, 1H), 6.43 (s, 1H), 5.22 (t, J=5.6 Hz, 1H), 4.11-4.22 (m, 1H), 4.01 (d, J=12.8 Hz, 1H), 3.90 (dt, J=11.0, 2.0 Hz, 1H), 3.45-3.71 (m, 5H), 2.93 (t, J=5.4 Hz, 4H), 2.80 (td, J=12.4, 3.5 Hz, 1H), 1.67 (s, 4H), 1.27 (s, 6H), 1.16 (d, J=6.2 Hz, 3H), 0.34 (s, 4H). m/z (ESI): 495.3 $(M+H)^+$.

Example 244: N-(6-((R)-2-methylmorpholino)pyridin-2-yl)-6-(1-(methylsulfonyl)ethyl)-2-(6-azaspiro[2.5]octan-6-yl)nicotinamide

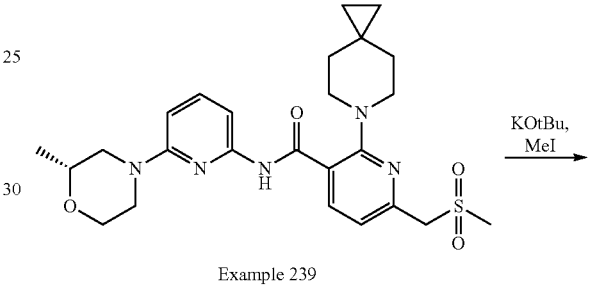

Example 239

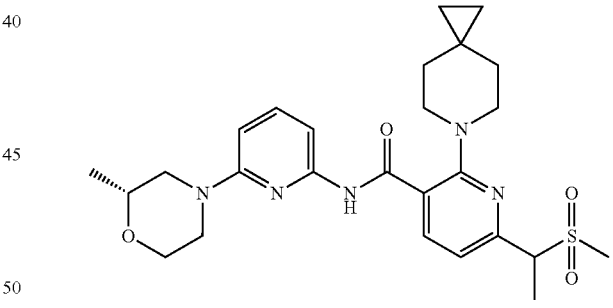

Example 244

To a mixture of (R)—N-(6-(2-methylmorpholino)pyridin-2-yl)-6-((methylsulfonyl)methyl)-2-(6-azaspiro[2.5]octan-6-yl)nicotinamide (Example 239, 0.55 g, 1.10 mmol) and potassium tert-butoxide (0.18 g, 1.65 mmol) in THF (10 mL) at 0° C. was added methyl iodide (0.10 mL, 1.65 mmol). After stirring at 0° C. for 1 h, the reaction was quenched with ice water (10 mL) and extracted with EtOAc (2×20 mL). The organic solution was concentrated under reduced pressure. The crude material was absorbed onto a plug of 60-120 mesh silica gel and purified by silica gel chromatography (0% to 10% EtOAc in DCM) to provide N-(6-((R)-2-methylmorpholino)pyridin-2-yl)-6-(1-(methylsulfonyl)ethyl)-2-(6-azaspiro[2.5]octan-6-yl)nicotinamide (Example 244, 50 mg, 9% yield) as a white fluffy solid. m/z ESI 514.3.

Example 245: N-(2-(6-azaspiro[2.5]oct-6-yl)-3-pyridinyl)-6-(4-morpholinyl)-2-_pyridinecarboxamide

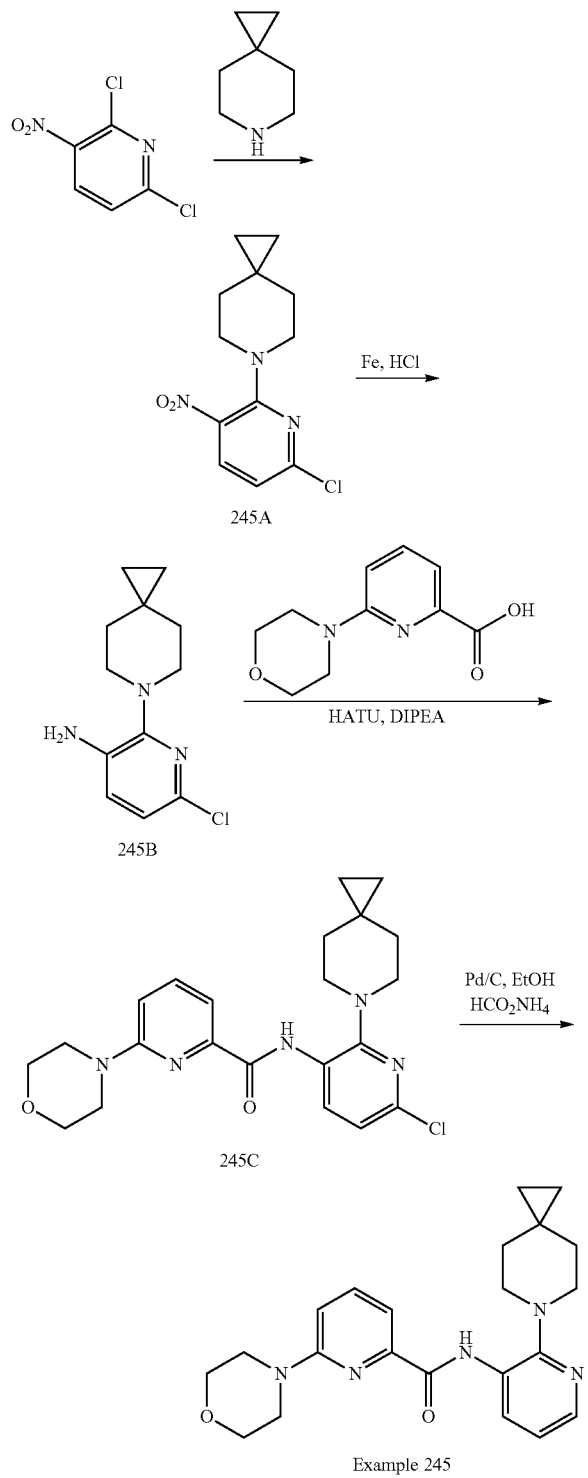

245A

245B

245C

Example 245

Step 1. 6-Azaspiro[2.5]octane (0.58 g, 5.18 mmol, Wuxi AppTech) was added to a solution of 2,6-dichloro-3-nitropyridine (1.0 g, 5.18 mmol, Aldrich) and DIPEA (1.00 mL, 5.70 mmol) in THF (15 mL) at 0° C. This mixture was stirred for 2 h, then EtOAc and water were added. The resulting biphasic mixture was separated and the organic layer was dried over anhydrous MgSO₄, filtered, and concentrated in vacuo to give an oil. The oil was fused to silica gel and purified by silica gel chromatography, eluting with 0% to 20% EtOAc/heptane gradient, to provide 6-(6-chloro-3-nitropyridin-2-yl)-6-azaspiro[2.5]octane (245A, 1.16 g, 4.33 mmol, 84% yield) as a yellow solid. $^1$H NMR (400 MHz, DMSO-d6) δ ppm 8.27 (d, J=8.41 Hz, 1H) 6.87 (d, J=8.22 Hz, 1H) 3.36-3.43 (m, 4H) 1.41-1.47 (m, 4H) 0.38 (s, 4H). m/z (ESI): 268.1 (M+H)⁺.

Step 2. Concentrated HCl (2 mL) was added dropwise to a mixture of 6-(6-chloro-3-nitropyridin-2-yl)-6-azaspiro[2.5]octane (245A, 1.16 g, 4.33 mmol) and iron (0.97 g, 17.3 mmol) in EtOH (15 mL) and water (3 mL). The mixture was heated to 80° C. for 4 h, then cooled to RT. The resulting suspension was filtered through celite and the filtrate was partitioned between EtOAc and sat'd aqueous NaHCO₃. The layers were separated and the organic layer was washed with saturated aqueous NaHCO₃ (2×), dried over anhydrous MgSO₄, filtered, and concentrated to give a red oil. The oil was purified by silica gel chromatography, eluting with 0% to 50% EtOAc/heptane gradient, to provide 6-chloro-2-(6-azaspiro[2.5]octan-6-yl)pyridin-3-amine (245B, 0.76 g, 3.21 mmol, 74% yield) as a red solid. $^1$H NMR (400 MHz, CHLOROFORM-d) δ ppm 6.90 (d, J=8.02 Hz, 1H) 6.81 (d, J=8.02 Hz, 1H) 3.76 (br s, 2H) 3.11 (t, J=5.48 Hz, 4H) 1.51 (br s, 4H) 0.34 (s, 4H). m/z (ESI): 238.1 (M+H)⁺.

Step 3. A mixture of 6-chloro-2-(6-azaspiro[2.5]octan-6-yl)pyridin-3-amine (245B, 0.89 g, 3.75 mmol), 6-morpholinopicolinic acid (0.78 g, 3.75 mmol, Apollo Scientific), DIPEA (1.96 mL, 11.2 mmol), and HATU (4.27 g, 11.2 mmol) in DMA (10 mL) was heated to 60° C. for 16 h, then cooled to RT. EtOAc was added and the mixture was washed with water twice then concentrated in vacuo to give an oil. The oil was purified by silica gel chromatography, eluting with 50% EtOAc/heptane, to provide N-(6-chloro-2-(6-azaspiro[2.5]octan-6-yl)pyridin-3-yl)-6-morpholinopicolinamide (245C, 0.58 g, 1.35 mmol, 35.9% yield) as an off white solid. m/z (ESI): 428.1 (M+H)⁺.

Step 4. A mixture of N-(6-chloro-2-(6-azaspiro[2.5]octan-6-yl)pyridin-3-yl)-6-morpholinopicolinamide (245C, 50 mg, 0.12 mmol), palladium (10 wt. % on activated carbon, 50 mg, 0.047 mmol), and ammonium formate (74 mg, 1.17 mmol) in EtOH (2 mL) under argon was heated to 60° C. for 30 min, then cooled to RT. The mixture was filtered through celite and then the filtrate was diluted with EtOAc and water. The resulting biphasic mixture was separated, the organic layer was washed with water (1×), dried over anhydrous MgSO₄, filtered, and concentrated to provide N-(6-chloro-2-(6-azaspiro[2.5]octan-6-yl)pyridin-3-yl)-6-morpholinopicolinamide (Example 245, 45 mg, 0.11 mmol, 98% yield) as an off-white solid. $^1$H NMR (400 MHz, CHLOROFORM-d) δ ppm 10.57 (br s, 1H) 8.82 (dd, J=8.12, 1.66 Hz, 1H) 8.12 (dd, J=4.79, 1.66 Hz, 1H) 7.68-7.75 (m, 2H) 7.09 (dd, J=8.02, 4.89 Hz, 1H) 6.84 (d, J=7.63 Hz, 1H) 3.88-3.94 (m, 4H) 3.67-3.74 (m, 4H) 3.10 (t, J=5.38 Hz, 4H) 1.57 (s, 4H) 0.39 (s, 4H). m/z (ESI): 394.1 (M+H)⁺.

Example 246: N-(2-(6-Azaspiro[2.5]octan-6-yl)-6-(1,1,1-trifluoro-2-hydroxypropan-2-yl)pyridin-3-yl)-6-morpholinopicolinamide

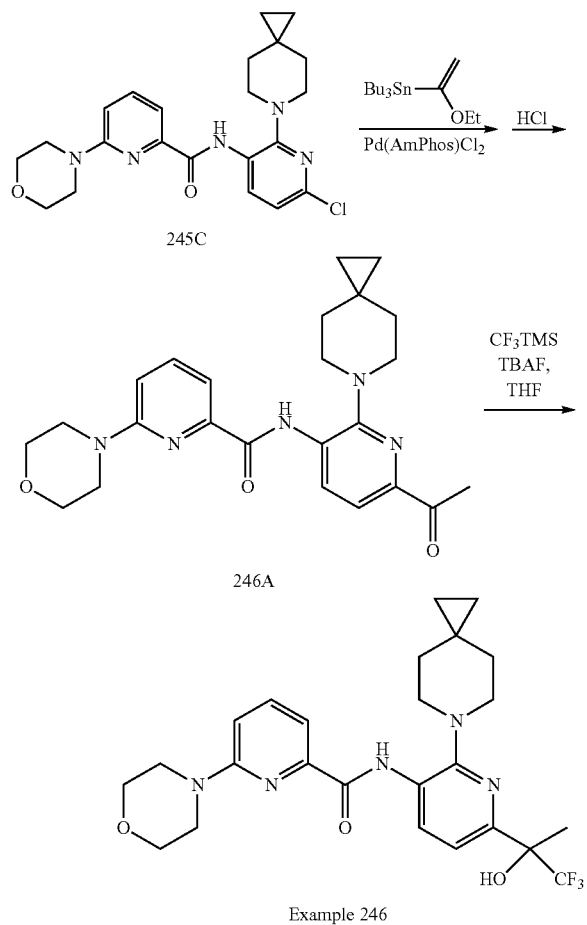

Step 1. A mixture of N-(6-chloro-2-(6-azaspiro[2.5]octan-6-yl)pyridin-3-yl)-6-morpholinopicolinamide (245C, 0.28 g, 0.65 mmol), bis(di-tert-butyl(4-dimethylaminophenyl)phosphine)dichloropalladium(II) (92 mg, 0.130 mmol), and tributyl(1-ethoxyvinyl)stannane (0.35 g, 0.98 mmol) in toluene (3 mL) was heated under argon at 90° C. for 16 h, then cooled to RT. 4 N HCl in dioxane (0.75 mL) was added and the mixture was stirred for 2 h. EtOAc and saturated aqueous NaHCO$_3$ were added and the resulting biphasic mixture was separated. The organic layer was dried over anhydrous MgSO$_4$, filtered, and concentrated in vacuo to give an oil. The oil was purified by silica gel chromatography (0% to 100% EtOAc/heptane) to provide N-(6-acetyl-2-(6-azaspiro[2.5]octan-6-yl)pyridin-3-yl)-6-morpholinopicolinamide (246A, 103 mg, 0.24 mmol, 36% yield) as an orange solid. $^1$H NMR (400 MHz, CHLOROFORM-d) δ ppm 10.70 (s, 1H) 8.92 (m, J=8.41 Hz, 1H) 7.87 (m, J=8.22 Hz, 1H) 7.67-7.76 (m, 2H) 6.86 (dd, J=8.22, 0.98 Hz, 1H) 3.88-3.95 (m, 4H) 3.64-3.77 (m, 4H) 3.14 (t, J=5.48 Hz, 4H) 2.68 (s, 3H) 1.49-1.70 (m, 4H) 0.42 (s, 4H). m/z (ESI): 436.2 (M+H)$^+$.

Step 2. A mixture of N-(6-acetyl-2-(6-azaspiro[2.5]octan-6-yl)pyridin-3-yl)-6-morpholinopicolinamide (246A, 103 mg, 0.24 mmol), tetramethylammonium fluoride (33 mg, 0.36 mmol), and trimethyl(trifluoromethyl)silane (0.052 mL, 0.355 mmol) in THF (1.5 mL) was stirred for 16 h at RT. The solvent was removed in vacuo and the resulting oil was purified by silica gel chromatography (40% EtOAc/heptane), to provide N-(2-(6-azaspiro[2.5]octan-6-yl)-6-(1,1,1-trifluoro-2-hydroxypropan-2-yl)pyridin-3-yl)-6-morpholinopicolinamide (246A, 8.5 mg, 0.017 mmol, 7% yield) as a light yellow oil. $^1$H NMR (400 MHz, CHLOROFORM-d) δ ppm 10.49 (s, 1H) 8.90 (d, J=8.22 Hz, 1H) 7.64-7.76 (m, 2H) 7.24-7.26 (m, 1H) 6.79-6.89 (m, 1H) 6.08 (s, 1H) 3.82-3.96 (m, 4H) 3.58-3.74 (m, 4H) 3.05-3.22 (m, 4H) 1.73 (s, 3H) 1.58 (s, 4H) 0.36-0.45 (m, 4H) m/z (ESI): 506.3 (M+H)$^+$.

Example 247: 2-(6-azaspiro[2.5]octan-6-yl)-N-(5-fluoro-6-((2R)-2-methyl-4-morpholinyl)-2-pyridinyl)-6-((1-hydroxy-2-methyl-2-propanyl)amino)-3-pyridinecarboxamide This compound was prepared in a fashion similar to that described above for Example 104.

$^1$H NMR (400 MHz, DMSO-d6): δ ppm 12.51 (s, 1H), 7.95 (d, J=8.7 Hz, 1H), 7.72 (dd, J=8.5, 2.4 Hz, 1H), 7.53 (dd, J=12.8, 8.5 Hz, 1H), 6.82 (s, 1H), 6.44 (d, J=8.7 Hz, 1H), 4.82 (t, J=5.7 Hz, 1H), 3.79-3.94 (m, 3H), 3.62-3.73 (m, 2H), 3.60 (d, J=5.7 Hz, 2H), 3.05 (t, J=5.5 Hz, 4H), 2.91-2.99 (m, 1H), 2.60-2.70 (m, 1H), 1.70 (s, 4H), 1.36 (s, 6H), 1.16 (d, J=6.2 Hz, 3H), 0.37 (s, 4H). m/z (ESI): 513.3 (M+H)$^+$.

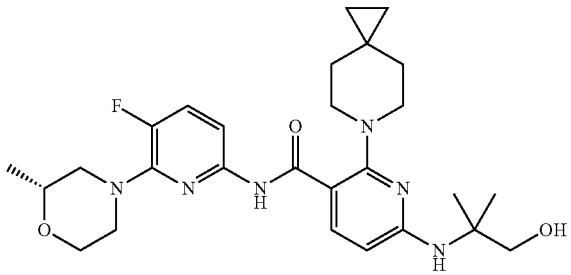

Example 247

Example 248: 6-(4,4-difluoropiperidin-1-yl)-N-(4-((2-hydroxyethyl)sulfonamido)-2-(6-azaspiro[2.5]octan-6-yl)phenyl)picolinamide

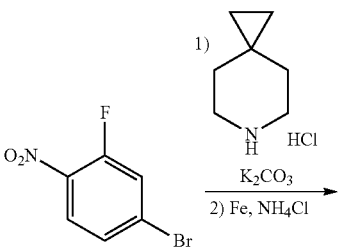

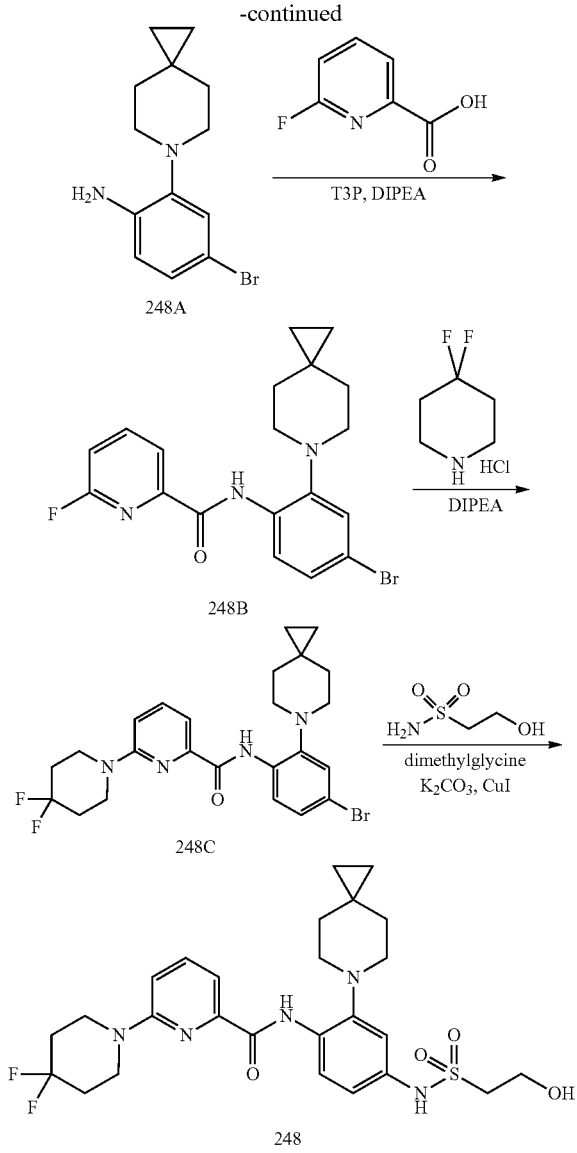

Step 1. A mixture of 4-bromo-2-fluoro-1-nitrobenzene (3.17 g, 14.41 mmol, Combi-blocks), 6-azaspiro[2.5]octane hydrochloride (2.447 g, 16.57 mmol, AstaTech) and potassium carbonate (5.97 g, 43.2 mmol, Aldrich) in 12 mL of DMSO was heated in an oil bath at 60° C. for 10 min then 90° C. for 1 h. The mixture was cooled to RT, treated with 20 mL of water and extracted with 2×50 mL of EtOAc. The combined organic extracts were washed with 2×5 mL of water and concentrated. The residue was purified on a silica gel column (15% to 45% EtOAc in heptane) to give 6-(5-bromo-2-nitrophenyl)-6-azaspiro[2.5]octane (4.26 g, 13.69 mmol, 95% yield) as an orange solid. m/z (ESI): 311.0/313.0 (M+H)$^+$.

Step 2. To a mixture of 6-(5-bromo-2-nitrophenyl)-6-azaspiro[2.5]octane (2.91 g, 9.35 mmol) and ammonium chloride (1.50 g, 28.1 mmol, Aldrich) in EtOH (16 mL) and water (4.00 mL) was added iron powder (3.13 g, 56.1 mmol, Aldrich). The heterogeneous mixture was heated in an oil bath at 85° C. for 2 h. The dark mixture was diluted with 50 mL of MeOH and filtered through a pad of celite. The filter cake was rinsed with 2×5 mL of MeOH. The filtrate was concentrated. The residue was partitioned between 10 mL of water and 75 mL of water. The organic layer was dried over $Na_2SO_4$ and concentrated to afford 4-bromo-2-(6-azaspiro[2.5]octan-6-yl)aniline (248A, 2.23 g, 7.95 mmol, 85% yield) as a brown oil. The material was used in the next step without further purification. $^1$H NMR (400 MHz, METHANOL-$d_4$) δ 6.87 (d, J=2.28 Hz, 1H), 6.77 (dd, J=2.18, 8.40 Hz, 1H), 6.48 (d, J=8.50 Hz, 1H), 4.65 (s, 4H), 1.23-1.50 (br. s, 4H), 0.18 (s, 4H). m/z (ESI): 281.0/283.0 (M+H)$^+$.

Step 3. To a solution of 6-fluoropicolinic acid (242 mg, 1.71 mmol, Aldrich), 4-bromo-2-(6-azaspiro[2.5]octan-6-yl)aniline (248A, 455 mg, 1.61 mmol) and DIPEA (565 μL, 3.24 mmol) in 12 mL of DCM at 0° C. was added T3P (50% wt. in ethyl acetate, 1.44 mL, 2.43 mmol). The mixture was stirred at RT for 1 h then diluted with 50 mL of DCM and washed with 10 mL of water followed by 10 mL of 0.5 N NaOH. The organic solution was concentrated, and the residue was purified on a silica gel column (10% to 25% EtOAc in heptane) to give N-(4-bromo-2-(6-azaspiro[2.5]octan-6-yl)phenyl)-6-fluoropicolinamide (248B, 539 mg, 1.33 mmol, 82% yield) as a brown solid. m/z (ESI): 404/406 (M+H)$^+$.

Step 4. A solution of 4,4-difluoropiperidine hydrochloride (136 mg, 0.86 mmol, Matrix Scientific), N-(4-bromo-2-(6-azaspiro[2.5]octan-6-yl)phenyl)-6-fluoropicolinamide (248B, 290 mg, 0.72 mmol) and DIPEA (0.37 mL, 2.15) in 3 mL of DMSO was heated in a microwave at 185° C. for 2.5 h then 200° C. for 0.5 h. The mixture was cooled to RT and partitioned between water (10 mL) and EtOAc (50 mL). The layers were separated, and the organic layer was dried over $MgSO_4$ and concentrated. The residue was purified by ISCO (0% to 30% EtOAc in heptane) to give 310 mg of brown solid as a mixture of N-(4-bromo-2-(6-azaspiro[2.5]octan-6-yl)phenyl)-6-(4,4-difluoropiperidin-1-yl)picolinamide (248C, about 65%, m/z (ESI): 505/507 (M+H)$^+$) and N-(4-bromo-2-(6-azaspiro[2.5]octan-6-yl)phenyl)-6-fluoropicolinamide (248B, about 35%, m/z (ESI): 404/406 (M+H)$^+$). The mixture was used without further purification.

Step 5. A mixture of N-(4-bromo-2-(6-azaspiro[2.5]octan-6-yl)phenyl)-6-(4,4-difluoropiperidin-1-yl)picolinamide (248C, 155 mg, about 65% pure), 2-hydroxyethane-1-sulfonamide (89 mg, 0.71 mmol, Enamine), potassium phosphate (377 mg, 1.77 mmol, Aldrich), dimethylglycine (36.6 mg, 0.355 mmol, Oakwood), copper(I) iodide (34 mg, 0.18 mmol, Strem) in 4 mL DMF was degassed for 3 min. The mixture was heated at 130° C. for 6 h then cooled to RT and partitioned between 5 mL of water and 50 mL of EtOAc. The layers were separated, and the organic layer was washed with 3 mL of brine and concentrated. The residue was purified on a reverse phase HPLC (10% to 90% of (0.1% TFA in $CH^3CN$) in (0.1% TFA in water) to give 6-(4,4-difluoropiperidin-1-yl)-N-(4-((2-hydroxyethyl)sulfonamido)-2-(6-azaspiro[2.5]octan-6-yl)phenyl)picolinamide bis(2,2,2-trifluoroacetate) (248, 25 mg) as a brown solid. $^1$H NMR (400 MHz, METHANOL-$d_4$) δ 8.14-8.27 (m, 1H), 7.68 (t, J=7.93 Hz, 1H), 7.48 (d, J=7.26 Hz, 1H), 7.11-7.24 (m, 1H), 6.95-7.09 (m, 2H), 4.74 (s, 14H), 4.65 (br t, J=5.70 Hz, 1H), 3.84 (m, 6H), 3.18 (m, 2H), 2.90 (s, 4H), 1.93-2.12 (m, 4H), 1.42-1.69 (m, 4H), 0.33 (s, 4H). $^{19}$F NMR (376 MHz, METHANOL-$d_4$) δ-77.72 (s, 6F), −99.15 (s, 2F). m/z (ESI): 550.2 (M+H)$^+$.

Example 249

The following compounds having the following formulae:

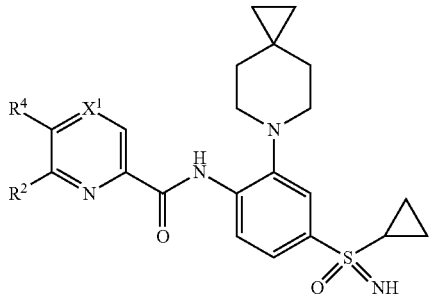

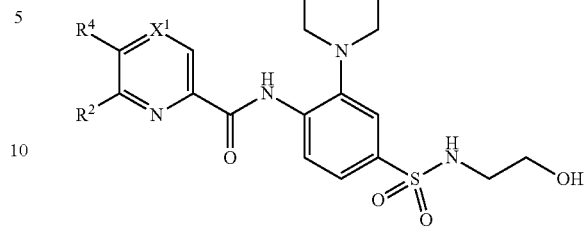

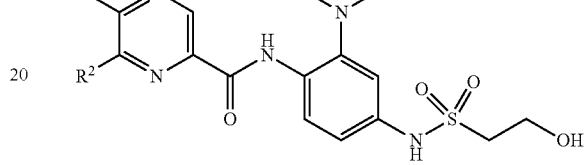

can be prepared according to the methods described in examples above:

| Ex. # | Chemical Structure | Name |
|---|---|---|
| 249-1 | | 6-(4,4-difluoropiperidin-1-yl)-N-(4-((2-hydroxyethyl)sulfonamido)-2-(6-azaspiro[2.5]octan-6-yl)phenyl)-4-methylpicolinamide |
| 249-2 | | 6-(4,4-difluoropiperidin-1-yl)-4-fluoro-N-(4-((2-hydroxyethyl)sulfonamido)-2-(6-azaspiro[2.5]octan-6-yl)phenyl)picolinamide |
| 249-3 | | N-(4-((2-hydroxyethyl)sulfonamido)-2-(6-azaspiro[2.5]octan-6-yl)phenyl)-4-methyl-6-(3,3,3-trifluoropropoxy)picolinamide |

| Ex. # | Chemical Structure | Name |
|---|---|---|
| 249-4 | | N-(4-((2-hydroxyethyl)sulfonamido)-2-(6-azaspiro[2.5]octan-6-yl)phenyl)-6-(3,3,3-trifluoropropoxy)picolinamide |
| 249-5 | | 6-(4,4-difluoropiperidin-1-yl)-N-(4-((2-hydroxyethyl)sulfonamido)-2-(6-azaspiro[2.5]octan-6-yl)phenyl)pyrazine-2-carboxamide |
| 249-6 | | 6-(4,4-difluoropiperidin-1-yl)-N-(4-((2-hydroxyethyl)sulfonamido)-2-(6-azaspiro[2.5]octan-6-yl)phenyl)-5-methylpyrazine-2-carboxamide |
| 249-7 | | 6-(4,4-difluorocyclohexyl)-N-(4-((2-hydroxyethyl)sulfonamido)-2-(6-azaspiro[2.5]octan-6-yl)phenyl)-4-methylpicolinamide |
| 249-8 | | 6-(4,4-difluorocyclohexyl)-4-fluoro-N-(4-((2-hydroxyethyl)sulfonamido)-2-(6-azaspiro[2.5]octan-6-yl)phenyl)picolinamide |

-continued

| Ex. # | Chemical Structure | Name |
|---|---|---|
| 249-9 | | 6-(4,4-difluorocyclohexyl)-N-(4-((2-hydroxyethyl)sulfonamido)-2-(6-azaspiro[2.5]octan-6-yl)phenyl)pyrazine-2-carboxamide |
| 249-10 | | 6-(4,4-difluorocyclohexyl)-N-(4-((2-hydroxyethyl)sulfonamido)-2-(6-azaspiro[2.5]octan-6-yl)phenyl)-5-methylpyrazine-2-carboxamide |
| 249-11 | | 6-(4,4-difluoropiperidin-1-yl)-N-(4-(N-(2-hydroxyethyl)sulfamoyl)-2-(6-azaspiro[2.5]octan-6-yl)phenyl)-4-methylpicolinamide |
| 249-12 | | 6-(4,4-difluoropiperidin-1-yl)-N-(4-(N-(2-hydroxyethyl)sulfamoyl)-2-(6-azaspiro[2.5]octan-6-yl)phenyl)picolinamide |
| 249-13 | | N-(4-(cyclopropanesulfonimidoyl)-2-(6-azaspiro[2.5]octan-6-yl)phenyl)-6-(4,4-difluoropiperidin-1-yl)-4-methylpicolinamide |

-continued

| Ex. # | Chemical Structure | Name |
|---|---|---|
| 249-14 | | N-(4-(cyclopropanesulfonimidoyl)-2-(6-azaspiro[2.5]octan-6-yl)phenyl)-6-(4,4-difluoropiperidin-1-yl)picolinamide |
| 249-15 | | 4-chloro-N-(4-(cyclopropanesulfonimidoyl)-2-(6-azaspiro[2.5]octan-6-yl)phenyl)-6-(4,4-difluoropiperidin-1-yl)picolinamide |
| 249-16 | | N-(4-(cyclopropanesulfonimidoyl)-2-(6-azaspiro[2.5]octan-6-yl)phenyl)-6-(4,4-difluoropiperidin-1-yl)-4-fluoropicolinamide |
| 249-17 | | N-(4-(cyclopropanesulfonimidoyl)-2-(6-azaspiro[2.5]octan-6-yl)phenyl)-4-methyl-6-(3,3,3-trifluoropropoxy)picolinamide |
| 249-18 | | N-(4-(cyclopropanesulfonimidoyl)-2-(6-azaspiro[2.5]octan-6-yl)phenyl)-6-(3,3,3-trifluoropropoxy)picolinamide |

| Ex. # | Chemical Structure | Name |
|---|---|---|
| 249-19 | | N-(4-(cyclopropanesulfonimidoyl)-2-(6-azaspiro[2.5]octan-6-yl)phenyl)-6-(4,4-difluoropiperidin-1-yl)pyrazine-2-carboxamide |
| 249-20 | | N-(4-(cyclopropanesulfonimidoyl)-2-(6-azaspiro[2.5]octan-6-yl)phenyl)-6-(4,4-difluoropiperidin-1-yl)-5-methylpyrazine-2-carboxamide |

Biological Examples

The following assays were used in testing the exemplary compounds of the invention. Data for those examples tested in accordance with the procedures described below are presented in Table A below.

KIF18A Enzyme Assay: Microtubule-stimulated ATPase activity assay is used to measure KIF18A enzyme activity after treatment with compound. Compounds were 2-fold serially diluted in DMSO (Sigma Inc) over 22-point concentration range. Recombinant human KIF18A (1-467 His-tagged) protein was expressed using a baculovirus system and purified by affinity chromatography by Amgen Inc. Concentrations of KIF18A protein, microtubules (MT), and ATP in the reaction were optimized for standardized homogenous enzyme assay using ADP-Glo™ Kinase/ATPase Assay Kit (Promega Inc). The assay measures ADP formed from the ATPase reaction. Prepare reaction buffer [(15 mM Tris, pH 7.5 (Teknova Inc), 10 mM MgCl2 (IT Baker Inc), 0.01% Pluronic F-68 (Life Technologies Inc), 1 μM Taxol (Cytoskeleton Inc), and 30 μg/mL pig microtubules (Cytoskeleton Inc)]. Add compound and KIF18A protein (30 nM) to prepared reaction buffer and incubated for 15 minutes at room temperature, next add ATP (at Kin, 75 μM) to the reaction mixture and incubated for an additional 15 minutes at room temperature. Mix 5 μl of ADP-Glo™ Reagent and 2.5 μl of the reaction mixture and incubate for 40 minutes at room temperature. Add 10 μl ADP-Glo™ Detection Reagent and incubate for 40 minutes at room temperature. Read luminescence using EnVision microplate reader with ultra-luminescence module (Perkin Elmer Inc). Concentration-response curve-fitting and $IC_{50}$ determination was performed using Genedata Screener Software (Standard 15.0.1, Genedata Inc) with a four-parameter logistic regression fit model.

Table A provides data for compounds exemplified in the present application and priority document thereof, as representative compounds of the present invention, as follows: chemical name (as named by either ACD software or ChemDraw (Professional 15.0)) and biological data ($IC_{50}$ in μM). Ex. # refers to Example No.

TABLE A

Enzymatic activity of Compounds

| Ex. # | Chemical Name | KIF18A ATPase $IC_{50}$ (μM) |
|---|---|---|
| 100 | 3-(6-azaspiro[2.5]oct-6-yl)-5-((2-hydroxy-1,1-dimethylethyl)amino)-N-(6-(1-piperidinylsulfonyl)-2-pyridinyl)-2-pyrazinecarboxamide | 0.0705 |
| 101 | 3-(6-azaspiro[2.5]oct-6-yl)-5-((1-(hydroxymethyl)cyclopropyl)amino)-N-(6-(1-piperidinylsulfonyl)-2-pyridinyl)-2-pyrazinecarboxamide | 0.1060 |
| 102 | 3-(6-azaspiro[2.5]oct-6-yl)-N-(6-(tert-butylsulfamoyl)-2-pyridinyl)-5-((2-hydroxy-1,1-dimethylethyl)amino)-2-pyrazinecarboxamide | 0.0753 |
| 103 | 3-(6-azaspiro[2.5]oct-6-yl)-5-(4,4-dimethyl-2-oxo-1,3-oxazolidin-3-yl)-N-(6-((2R)-2-methyl-4-morpholinyl)-2-pyridinyl)-2-pyrazinecarboxamide | 1.9400 |
| 104 | 3-(6-azaspiro[2.5]oct-6-yl)-5-((1-hydroxy-2-methyl-2-propanyl)amino)-N-(6-((2R)-2-methyl-4-morpholinyl)-2-pyridinyl)-2-pyrazinecarboxamide | 0.0834 |

TABLE A-continued

Enzymatic activity of Compounds

| Ex. # | Chemical Name | KIF18A ATPase IC$_{50}$ (μM) |
|---|---|---|
| 105 | 3-(6-azaspiro[2.5]oct-6-yl)-5-((1-hydroxy-2-methyl-2-propanyl)amino)-N-(6-((3S)-3-methyl-1-pyrrolidinyl)-2-pyridinyl)-2-pyrazinecarboxamide | 0.1220 |
| 106 | 3-(6-azaspiro[2.5]oct-6-yl)-5-((2-hydroxy-1,1-dimethylethyl)amino)-N-(6-(4-morpholinyl)-2-pyridinyl)-2-pyrazinecarboxamide | 0.0844 |
| 107 | 3-(6-azaspiro[2.5]oct-6-yl)-N-(6-(4,4-dimethyl-2-oxo-1-pyrrolidinyl)-2-pyridinyl)-5-((1-hydroxy-2-methyl-2-propanyl)amino)-2-pyrazinecarboxamide | 0.1110 |
| 108 | 3-(6-azaspiro[2.5]oct-6-yl)-5-((1,3-dihydroxy-2-methyl-2-propanyl)amino)-N-(6-((2-methyl-2-propanyl)sulfamoyl)-2-pyridinyl)-2-pyrazinecarboxamide | 0.0878 |
| 109 | 3-(6-azaspiro[2.5]oct-6-yl)-5-((1-(hydroxymethyl)cyclopropyl)amino)-N-(6-((2-methyl-2-propanyl)sulfamoyl)-2-pyridinyl)-2-pyrazinecarboxamide | 0.0793 |
| 110 | N-(6-(N-(tert-butyl)sulfamoyl)pyridin-2-yl)-3-(6-azaspiro[2.5]octan-6-yl)-5-(1,1,1-trifluoro-2-hydroxypropan-2-yl)pyrazine-2-carboxamide | 0.2600 |
| 111 | N-(6-((2S,6S)-2,6-dimethylmorpholino)pyridin-2-yl)-5-((1-hydroxy-2-methylpropan-2-yl)amino)-3-(6-azaspiro[2.5]octan-6-yl)pyrazine-2-carboxamide and enantiomer | 0.1095 |
| 112 | N-(6-((1S,4S)-2-oxa-5-azabicyclo[2.2.1]heptan-5-yl)pyridin-2-yl)-5-((1-hydroxy-2-methylpropan-2-yl)amino)-3-(6-azaspiro[2.5]octan-6-yl)pyrazine-2-carboxamide and enantiomer | 0.1820 |
| 113 | 3-(6-azaspiro[2.5]oct-6-yl)-N-(4-chloro-6-(4-morpholinyl)-2-pyridinyl)-5-((1-hydroxy-2-methyl-2-propanyl)amino)-2-pyrazinecarboxamide | 0.1115 |
| 114 | 3-(6-azaspiro[2.5]octan-6-yl)-5-((1-hydroxy-2-methyl-2-propanyl)amino)-N-(4-methyl-6-(4-morpholinyl)-2-pyridinyl)-2-pyrazinecarboxamide | 0.1782 |
| 115 | 3-(6-azaspiro[2.5]octan-6-yl)-5-((1,3-dihydroxy-2-methyl-2-propanyl)amino)-N-(6-(4-morpholinyl)-2-pyridinyl)-2-pyrazinecarboxamide | 0.1056 |
| 116 | 3-(6-azaspiro[2.5]octan-6-yl)-5-((1-hydroxy-2-methyl-2-propanyl)amino)-N-(4-methoxy-6-(4-morpholinyl)-2-pyridinyl)-2-pyrazinecarboxamide | 1.1635 |
| 117 | 3-(6-azaspiro[2.5]octan-6-yl)-N-(4-cyano-6-(4-morpholinyl)-2-pyridinyl)-5-((1-hydroxy-2-methyl-2-propanyl)amino)-2-pyrazinecarboxamide | 0.1380 |
| 118 | 3-(6-azaspiro[2.5]octan-6-yl)-N-(4-cyclopropyl-6-(4-morpholinyl)-2-pyridinyl)-5-((1-hydroxy-2-methyl-2-propanyl)amino)-2-pyrazinecarboxamide | 0.5400 |
| 119 | 3-(6-azaspiro[2.5]octan-6-yl)-5-(4,4-dimethyl-2-oxo-1,3-oxazolidin-3-yl)-N-(6-((2-methyl-2-propanyl)sulfamoyl)-2-pyridinyl)-2-pyrazinecarboxamide | 0.8170 |
| 120 | 3-(6-azaspiro[2.5]octan-6-yl)-N-(6-((2S)-2-(hydroxymethyl)-4-morpholinyl)-2-pyridinyl)-5-((1-hydroxy-2-methyl-2-propanyl)amino)-2-pyrazinecarboxamide | 0.1760 |
| 121 | 3-(6-azaspiro[2.5]octan-6-yl)-N-(6-((2R)-2-methyl-4-morpholinyl)-2-pyridinyl)-5-((methylsulfonyl)amino)-2-pyrazinecarboxamide | 0.6420 |
| 122 | 2-(6-azaspiro[2.5]oct-6-yl)-6-((2-hydroxy-1,1-dimethylethyl)amino)-N-(6-(1,3-oxazol-2-yl)-2-pyridinyl)-3-pyridinecarboxamide | 0.3157 |
| 123 | 2-(6-azaspiro[2.5]oct-6-yl)-N-(6-(tert-butylsulfamoyl)-2-pyridinyl)-6-((2-hydroxy-1,1-dimethyl-ethyl)amino)-3-pyridinecarboxamide | 0.0640 |
| 124 | 6-((1-hydroxy-2-methylpropan-2-yl)amino)-N-(6-(3-methoxypyrrolidin-l-yl)pyridin-2-yl)-2-(6-azaspiro[2.5]octan-6-yl)nicotinamide | 0.4070 |
| 125 | 2-(6-azaspiro[2.5]oct-6-yl)-6-((2-hydroxy-1,1-dimethylethyl)amino)-N-(6-(1-pyrrolidinyl)-2-pyridinyl)-3-pyridinecarboxamide | 0.1360 |
| 126 | 6-((1-hydroxy-2-methylpropan-2-yl)amino)-N-(6-(2-methylmorpholino)pyridin-2-yl)-2-(6-azaspiro[2.5]octan-6-yl)nicotinamide | 0.0602 |
| 127 | 2-(6-azaspiro[2.5]oct-6-yl)-6-((2-hydroxy-1,1-dimethylethyl)amino)-N-(6-(4-morpholinyl)-2-pyridinyl)-3-pyridinecarboxamide | 0.0525 |
| 128 | 2-(6-azaspiro[2.5]oct-6-yl)-N-(6-(3,3-dimethyl-l-pyrrolidinyl)-2-pyridinyl)-6-((2-hydroxy-1,1-dimethylethyl)amino)-3-pyridinecarboxamide | 0.0953 |
| 129 | 2-(6-azaspiro[2.5]oct-6-yl)-N-(6-(3,3-difluoro-l-pyrrolidinyl)-2-pyridinyl)-6-((2-hydroxy-1,1-dimethylethyl)amino)-3-pyridinecarboxamide | 0.0834 |
| 130 | 2-(6-azaspiro[2.5]oct-6-yl)-N-(6-(2,2-dimethyl-4-morpholinyl)-2-pyridinyl)-6-((2-hydroxy-1,1-dimethylethyl)amino)-3-pyridinecarboxamide | 0.1720 |
| 131 | 6-((1-hydroxy-2-methylpropan-2-yl)amino)-N-(6-(3-hydroxypyrrolidin-1-yl)pyridin-2-yl)-2-(6-azaspiro[2.5]octan-6-yl)nicotinamide | 0.2945 |
| 132 | 2-(6-azaspiro[2.5]oct-6-yl)-6-((2-hydroxy-1,1-dimethylethyl)amino)-N-(6-((2S)-2-methyl-4-morpholinyl)-2-pyridinyl)-3-pyridinecarboxamide | 0.0821 |
| 133 | 2-(6-azaspiro[2.5]oct-6-yl)-6-((2-hydroxy-1,1-dimethylethyl)amino)-N-(6-(4-methyl-1-piperazinyl)-2-pyridinyl)-3-pyridinecarboxamide | 0.6040 |
| 134 | 2-(6-azaspiro[2.5]oct-6-yl)-6-((2-hydroxy-1,1-dimethylethyl)amino)-N-(6-(2-oxo-1-pyrrolidinyl)-2-pyridinyl)-3-pyridinecarboxamide | 0.2040 |
| 135 | 2-(6-azaspiro[2.5]oct-6-yl)-N-(6-(4,4-dimethyl-2-oxo-1-pyrrolidinyl)-2-pyridinyl)-6-((2-hydroxy-1,1-dimethylethyl)amino)-3-pyridinecarboxamide | 0.1100 |
| 136 | N-(6-((1R,5S)-3-azabicyclo[3.1.0]hex-3-yl)-2-pyridinyl)-2-(6-azaspiro[2.5]oct-6-yl)-6-((2-hydroxy-1,1-dimethylethyl)amino)-3-pyridinecarboxamide | 0.0719 |
| 137 | 2-(6-azaspiro[2.5]oct-6-yl)-6-((2-hydroxy-1,1-dimethylethyl)amino)-N-(6-((2R)-2-methyl-4-morpholinyl)-2-pyridinyl)-3-pyridinecarboxamide | 0.0669 |
| 138 | 2-(6-azaspiro[2.5]oct-6-yl)-N-(6-(3,6-dihydro-2H-pyran-4-yl)-2-pyridinyl)-6-((1-hydroxy-2-methyl-2-propanyl)amino)-3-pyridinecarboxamide | 0.0829 |
| 139 | 2-(6-azaspiro[2.5]oct-6-yl)-6-((1-hydroxy-2-methyl-2-propanyl)amino)-N-(6-((3S)-3-methyl-1-pyrrolidinyl)-2-pyridinyl)-3-pyridinecarboxamide | 0.0893 |
| 140 | N-(6-morpholinopyridin-2-yl)-2-(6-azaspiro[2.5]octan-6-yl)-6-(1,1,1-trifluoro-2-hydroxypropan-2-yl)nicotinamide | 0.0712 |
| 141 | 2-(6-azaspiro[2.5]oct-6-yl)-N-(6-(4-morpholinyl)-2-pyridinyl)-6-((2R)-1,1,1-trifluoro-2-hydroxy-2-propanyl)-3-pyridinecarboxamide | 0.0880 |
| 142 | 2-(6-azaspiro[2.5]oct-6-yl)-N-(6-(4-morpholinyl)-2-pyridinyl)-6-((2S)-1,1,1-trifluoro-2-hydroxy-2-propanyl)-3-pyridinecarboxamide | 0.0575 |

TABLE A-continued

Enzymatic activity of Compounds

| Ex. # | Chemical Name | KIF18A ATPase IC$_{50}$ (μM) |
|---|---|---|
| 143 | N-(6-(N-(tert-butyl)sulfamoyl)pyridin-2-yl)-2-(6-azaspiro[2.5]octan-6-yl)-6-(1,1,1-trifluoro-2-hydroxypropan-2-yl)nicotinamide | 0.0904 |
| 144 | 2-(6-azaspiro[2.5]oct-6-yl)-N-(6-(3-fluoro-1-azetidinyl)-2-pyridinyl)-6-((1-hydroxy-2-methyl-2-propanyl)amino)-3-pyridinecarboxamide | 0.0765 |
| 145 | 2-(6-azaspiro[2.5]oct-6-yl)-6-((1-hydroxy-2-methyl-2-propanyl)amino)-N-(6-(3-methoxy-1-azetidinyl)-2-pyridinyl)-3-pyridinecarboxamide | 0.1680 |
| 146 | 2-(6-azaspiro[2.5]oct-6-yl)-6-((1-hydroxy-2-methyl-2-propanyl)amino)-N-(6-(tetrahydro-2H-pyran-4-yl)-2-pyridinyl)-3-pyridinecarboxamide | 0.2470 |
| 147 | 2-(6-azaspiro[2.5]oct-6-yl)-6-((1,3-dihydroxy-2-methyl-2-propanyl)amino)-N-(6-((2R)-2-methyl-4-morpholinyl)-2-pyridinyl)-3-pyridinecarboxamide | 0.0534 |
| 148 | 2-(6-azaspiro[2.5]oct-6-yl)-6-((1,3-dihydroxy-2-methyl-2-propanyl)amino)-N-(6-(4-morpholinyl)-2-pyridinyl)-3-pyridinecarboxamide | 0.0604 |
| 149 | 2-(6-azaspiro[2.5]oct-6-yl)-N-(6-(3,3-difluoro-1-pyrrolidinyl)-2-pyridinyl)-6-((1,3-dihydroxy-2-methyl-2-propanyl)amino)-3-pyridinecarboxamide | 0.0591 |
| 150 | N-(6-((2S,6S)-2,6-dimethylmorpholino)pyridin-2-yl)-6-((1-hydroxy-2-methylpropan-2-yl)amino)-2-(6-azaspiro[2.5]octan-6-yl)nicotinamide and enantiomer | 0.0997 |
| 151 | N-(6-((1S,4S)-2-oxa-5-azabicyclo[2.2.1]heptan-5-yl)pyridin-2-yl)-6-((1-hydroxy-2-methylpropan-2-yl)amino)-2-(6-azaspiro[2.5]octan-6-yl)nicotinamide and enantiomer | 0.0905 |
| 152 | 2-(6-azaspiro[2.5]oct-6-yl)-N-(4-chloro-6-(4-morpholinyl)-2-pyridinyl)-6-((1-hydroxy-2-methyl-2-propanyl)amino)-3-pyridinecarboxamide | 0.0743 |
| 153 | 2-(6-azaspiro[2.5]oct-6-yl)-N-(6-((2-methyl-2-propanyl)sulfamoyl)-2-pyridinyl)-6-((2R)-1,1,1-trifluoro-2-hydroxy-2-propanyl)-3-pyridinecarboxamide | 0.0534 |
| 154 | 2-(6-azaspiro[2.5]oct-6-yl)-N-(6-((2-methyl-2-propanyl)sulfamoyl)-2-pyridinyl)-6-((2S)-1,1,1-trifluoro-2-hydroxy-2-propanyl)-3-pyridinecarboxamide | 0.1049 |
| 155 | 2-(6-azaspiro[2.5]octan-6-yl)-6-((1-hydroxy-2-methyl-2-propanyl)amino)-N-(4-methyl-6-(4-morpholinyl)-2-pyridinyl)-3-pyridinecarboxamide | 0.0710 |
| 156 | 2-(6-azaspiro[2.5]octan-6-yl)-N-(4-cyano-6-(4-morpholinyl)-2-pyridinyl)-6-((1-hydroxy-2-methyl-2-propanyl)amino)-3-pyridinecarboxamide | 0.1162 |
| 157 | 2-(6-azaspiro[2.5]octan-6-yl)-6-((1-hydroxy-2-methyl-2-propanyl)amino)-N-(4-methyl-6-((2-methyl-2-propanyl)sulfamoyl)-2-pyridinyl)-3-pyridinecarboxamide | 0.2060 |
| 158 | 2-(6-azaspiro[2.5]octan-6-yl)-6-((1-hydroxy-2-methyl-2-propanyl)amino)-N-(4-methoxy-6-(4-morpholinyl)-2-pyridinyl)-3-pyridinecarboxamide | 0.4015 |
| 159 | 2-(6-azaspiro[2.5]octan-6-yl)-6-(3-hydroxy-3-methyl-1-azetidinyl)-N-(6-((2-methyl-2-propanyl)sulfamoyl)-2-pyridinyl)-3-pyridinecarboxamide | 0.1690 |
| 160 | 2-(6-azaspiro[2.5]octan-6-yl)-N-(4-cyclopropyl-6-(4-morpholinyl)-2-pyridinyl)-6-((1-hydroxy-2-methyl-2-propanyl)amino)-3-pyridinecarboxamide | 0.2780 |
| 161 | 2-(6-azaspiro[2.5]octan-6-yl)-6-(4,4-dimethyl-2-oxo-1,3-oxazolidin-3-yl)-N-(6-(4,4-dimethyl-2-oxo-1,3-oxazolidin-3-yl)-2-pyridinyl)-3-pyridinecarboxamide | 2.1900 |
| 162 | 2-(6-azaspiro[2.5]octan-6-yl)-6-((1-hydroxy-2-methyl-2-propanyl)amino)-N-(6-((1-hydroxy-2-methyl-2-propanyl)amino)-2-pyridinyl)-3-pyridinecarboxamide | 0.0707 |
| 163 | 2-(6-azaspiro[2.5]octan-6-yl)-6-((1-hydroxy-2-methyl-2-propanyl)amino)-N-(6-(2-oxa-6-azaspiro[3.3]heptan-6-yl)-2-pyridinyl)-3-pyridinecarboxamide | 0.1592 |
| 164 | 2-(6-azaspiro[2.5]octan-6-yl)-N-(6-bromo-2-pyridinyl)-6-((1,3-dihydroxy-2-methyl-2-propanyl)amino)-3-pyridinecarboxamide | 2.7500 |
| 165 | 2-(6-azaspiro[2.5]octan-6-yl)-6-(4,4-dimethyl-2-oxo-1,3-oxazolidin-3-yl)-N-(6-((2R)-2-methyl-4-morpholinyl)-2-pyridinyl)-3-pyridinecarboxamide | 0.6630 |
| 166 | 6-(1,2-dihydroxypropan-2-yl)-N-(6-((R)-2-methylmorpholino)pyridin-2-yl)-2-(6-azaspiro[2.5]octan-6-yl)nicotinamide | 0.0625 |
| 167 | 2-(6-azaspiro[2.5]octan-6-yl)-6-((2S)-1,2-dihydroxy-2-propanyl)-N-(6-((2R)-2-methyl-4-morpholinyl)-2-pyridinyl)-3-pyridinecarboxamide | 0.0822 |
| 168 | 2-(6-azaspiro[2.5]octan-6-yl)-6-((2R)-1,2-dihydroxy-2-propanyl)-N-(6-((2R)-2-methyl-4-morpholinyl)-2-pyridinyl)-3-pyridinecarboxamide | 0.0887 |
| 169 | N-(6-(N-(tert-butyl)sulfamoyl)pyridin-2-yl)-6-(1,2-dihydroxypropan-2-yl)-2-(6-azaspiro[2.5]octan-6-yl)nicotinamide | 0.0893 |
| 170 | 2-(6-azaspiro[2.5]octan-6-yl)-6-((1-hydroxy-2-methyl-2-propanyl)amino)-N-(6-((1-hydroxy-2-methyl-2-propanyl)amino)-4-methyl-2-pyridinyl)-3-pyridinecarboxamide | 0.1570 |
| 171 | N-(6-(N-(tert-butyl)sulfamoyl)pyridin-2-yl)-6-(2,2-dimethyl-4-(trifluoromethyl)-1,3-dioxolan-4-yl)-2-(6-azaspiro[2.5]octan-6-yl)nicotinamide | 0.2860 |
| 172 | N-(6-(N-(tert-butyl)sulfamoyl)pyridin-2-yl)-2-(6-azaspiro[2.5]octan-6-yl)-6-(1,1,1-trifluoro-2,3-dihydroxypropan-2-yl)nicotinamide | 0.1200 |
| 173 | 2-(6-azaspiro[2.5]octan-6-yl)-6-fluoro-N-(6-((2-methyl-2-propanyl)sulfamoyl)-2-pyridinyl)-3-pyridinecarboxamide | 0.6430 |
| 174 | 2-(6-azaspiro[2.5]octan-6-yl)-6-((1,3-dihydroxy-2-methyl-2-propanyl)amino)-N-(6-((2-methyl-2-propanyl)sulfamoyl)-2-pyridinyl)-3-pyridinecarboxamide | 0.0622 |
| 175 | 2-(6-azaspiro[2.5]octan-6-yl)-N-(6-((2-methyl-2-propanyl)sulfamoyl)-2-pyridinyl)-6-((2R)-1,1,1-trifluoro-2,3-dihydroxy-2-propanyl)-3-pyridinecarboxamide | 0.1155 |
| 176 | 2-(6-azaspiro[2.5]octan-6-yl)-N-(6-((2-methyl-2-propanyl)sulfamoyl)-2-pyridinyl)-6-((2S)-1,1,1-trifluoro-2,3-dihydroxy-2-propanyl)-3-pyridinecarboxamide | 0.1009 |
| 177 | 2-(6-azaspiro[2.5]octan-6-yl)-6-((2S)-1,2-dihydroxy-2-propanyl)-N-(6-((2-methyl-2-propanyl)sulfamoyl)-2-pyridinyl)-3-pyridinecarboxamide | 0.0873 |
| 178 | 2-(6-azaspiro[2.5]octan-6-yl)-6-((2R)-1,2-dihydroxy-2-propanyl)-N-(6-((2-methyl-2-propanyl)sulfamoyl)-2-pyridinyl)-3-pyridinecarboxamide | 0.1089 |
| 179 | 2-(6-azaspiro[2.5]octan-6-yl)-6-((1-hydroxy-2-methyl-2-propanyl)amino)-N-(6-((3R)-3-methyl-4-morpholinyl)-2-pyridinyl)-3-pyridinecarboxamide | 0.0980 |

TABLE A-continued

Enzymatic activity of Compounds

| Ex. # | Chemical Name | KIF18A ATPase IC$_{50}$ (μM) |
|---|---|---|
| 180 | 6-(2,2-dimethyl-4-(trifluoromethyl)-1,3-dioxolan-4-yl)-N-(6-morpholinopyridin-2-yl)-2-(6-azaspiro[2.5]octan-6-yl)nicotinamide | 0.7580 |
| 181 | N-(6-morpholinopyridin-2-yl)-2-(6-azaspiro[2.5]octan-6-yl)-6-(1,1,1-trifluoro-2,3-dihydroxypropan-2-yl)nicotinamide | 0.0699 |
| 182 | N-(6-((R)-2-methylmorpholino)pyridin-2-yl)-2-(6-azaspiro[2.5]octan-6-yl)-6-(1,1,1-trifluoro-2,3-dihydroxypropan-2-yl)nicotinamide | 0.0795 |
| 183 | 2-(6-azaspiro[2.5]octan-6-yl)-6-((1-hydroxy-2-methyl-2-propanyl)amino)-N-(6-((3S)-3-methyl-4-morpholinyl)-2-pyridinyl)-3-pyridinecarboxamide | 0.2050 |
| 184 | 2-(6-azaspiro[2.5]octan-6-yl)-6-((1,3-dihydroxy-2-methyl-2-propanyl)amino)-N-(4-methyl-6-(4-morpholinyl)-2-pyridinyl)-3-pyridinecarboxamide | 0.0620 |
| 185 | 2-methyl-2-propanyl 4-(((2-(6-azaspiro[2.5]octan-6-yl)-6-((1-hydroxy-2-methyl-2-propanyl)amino)-3-pyridinyl)carbonyl)amino)-2-pyridinyl)-1-piperazinecarboxylate | 0.5920 |
| 186 | 6-((1-hydroxy-2-methylpropan-2-yl)amino)-N-(6-(2-(2-hydroxypropan-2-yl)morpholino)pyridin-2-yl)-2-(6-azaspiro[2.5]octan-6-yl)nicotinamide | 0.3650 |
| 187 | N-(6-((2S,5R)-2,5-dimethylmorpholino)pyridin-2-yl)-6-((1-hydroxy-2-methylpropan-2-yl)amino)-2-(6-azaspiro[2.5]octan-6-yl)nicotinamide and enantiomer | 0.2520 |
| 188 | 2-(6-azaspiro[2.5]octan-6-yl)-6-((1-hydroxy-2-methyl-2-propanyl)amino)-N-(6-(4-(2-propanyl)-1-piperazinyl)-2-pyridinyl)-3-pyridinecarboxamide | 2.2600 |
| 189 | 2-(6-azaspiro[2.5]octan-6-yl)-N-(6-((2S)-2-(hydroxymethyl)-4-morpholinyl)-2-pyridinyl)-6-((1-hydroxy-2-methyl-2-propanyl)amino)-3-pyridinecarboxamide | 0.1105 |
| 190 | 2-(6-azaspiro[2.5]octan-6-yl)-N-(6-(4-cyclopropyl-1-piperazinyl)-2-pyridinyl)-6-((1-hydroxy-2-methyl-2-propanyl)amino)-3-pyridinecarboxamide | 0.6930 |
| 191 | 2-(6-azaspiro[2.5]octan-6-yl)-N-(6-(4-cyclobutyl-1-piperazinyl)-2-pyridinyl)-6-((1-hydroxy-2-methyl-2-propanyl)amino)-3-pyridinecarboxamide | 1.2400 |
| 192 | 2-(6-azaspiro[2.5]octan-6-yl)-N-(6-(4-ethyl-1-piperazinyl)-2-pyridinyl)-6-((1-hydroxy-2-methyl-2-propanyl)amino)-3-pyridinecarboxamide | 1.0867 |
| 193 | dimethyl (6-(6-azaspiro[2.5]octan-6-yl)-5-((6-((2-methyl-2-propanyl)sulfamoyl)-2-pyridinyl)carbamoyl)-2-pyridinyl)(fluoro)propanedioate | 0.2390 |
| 194 | 2-(6-azaspiro[2.5]octan-6-yl)-6-(2-fluoro-1,3-dihydroxy-2-propanyl)-N-(6-((2-methyl-2-propanyl)sulfamoyl)-2-pyridinyl)-3-pyridinecarboxamide | 0.2830 |
| 195 | N-(6-(N-(tert-butyl)sulfamoyl)pyridin-2-yl)-6-(1-fluoro-2-hydroxyethyl)-2-(6-azaspiro[2.5]octan-6-yl)nicotinamide | 0.1960 |
| 196 | 2-(6-azaspiro[2.5]octan-6-yl)-6-(2-fluoro-1,3-dihydroxy-2-propanyl)-N-(6-((2R)-2-methyl-4-morpholinyl)-2-pyridinyl)-3-pyridinecarboxamide | 0.1585 |
| 197 | 6-(1-Fluoro-2-hydroxyethyl)-N-(6-((R)-2-methylmorpholino)pyridin-2-yl)-2-(6-azaspiro[2.5]octan-6-yl)nicotinamide | 0.1800 |
| 198 | dimethyl (6-(6-azaspiro[2.5]octan-6-yl)-5-((6-((2R)-2-methyl-4-morpholinyl)-2-pyridinyl)carbamoyl)-2-pyridinyl)(fluoro)propanedioate | 0.1560 |
| 199 | N-(6-((2S,5S)-2,5-dimethylmorpholino)pyridin-2-yl)-6-((1-hydroxy-2-methylpropan-2-yl)amino)-2-(6-azaspiro[2.5]octan-6-yl)nicotinamide and enantiomer | 0.2430 |
| 200 | 2-(6-azaspiro[2.5]octan-6-yl)-6-((1-methoxy-2-methyl-2-propanyl)amino)-N-(6-((2R)-2-methyl-4-morpholinyl)-2-pyridinyl)-3-pyridinecarboxamide | 0.6363 |
| 201 | 2-(6-azaspiro[2.5]octan-6-yl)-N-(6-(4-morpholinyl)-2-pyridinyl)-6-((2R)-1,1,1-trifluoro-2,3-dihydroxy-2-propanyl)-3-pyridinecarboxamide | 0.0769 |
| 202 | 2-(6-azaspiro[2.5]octan-6-yl)-N-(6-(4-morpholinyl)-2-pyridinyl)-6-((2S)-1,1,1-trifluoro-2,3-dihydroxy-2-propanyl)-3-pyridinecarboxamide | 0.0684 |
| 203 | 6-((1-hydroxy-2-methylpropan-2-yl)amino)-N-(6-(2-isopropylmorpholino)pyridin-2-yl)-2-(6-azaspiro[2.5]octan-6-yl)nicotinamide | 0.2420 |
| 204 | N-(6-(2-ethylmorpholino)pyridin-2-yl)-6-((1-hydroxy-2-methylpropan-2-yl)amino)-2-(6-azaspiro[2.5]octan-6-yl)nicotinamide | 0.1605 |
| 205 | 6-((1-hydroxy-2-methylpropan-2-yl)amino)-2-(6-azaspiro[2.5]octan-6-yl)-N-(6-(2-(trifluoromethyl)morpholino)pyridin-2-yl)nicotinamide | 0.1229 |
| 206 | 2-(6-azaspiro[2.5]octan-6-yl)-N-(6-((2R)-2-methyl-4-morpholinyl)-2-pyridinyl)-6-((2R)-1,1,1-trifluoro-2,3-dihydroxy-2-propanyl)-3-pyridinecarboxamide | 0.1155 |
| 207 | 2-(6-azaspiro[2.5]octan-6-yl)-N-(6-((2R)-2-methyl-4-morpholinyl)-2-pyridinyl)-6-((2S)-1,1,1-trifluoro-2,3-dihydroxy-2-propanyl)-3-pyridinecarboxamide | 0.1050 |
| 208 | 6-(2-amino-3,3,3-trifluoro-2-(hydroxymethyl)propoxy)-N-(4-methyl-6-morpholinopyridin-2-yl)-2-(6-azaspiro[2.5]octan-6-yl)nicotinamide | 0.6920 |
| 209 | 6-(3-amino-3-methylbutoxy)-2-(6-azaspiro[2.5]octan-6-yl)-N-(6-((2R)-2-methyl-4-morpholinyl)-2-pyridinyl)-3-pyridinecarboxamide | 0.4110 |
| 210 | 2-(6-azaspiro[2.5]octan-6-yl)-6-((4-hydroxy-2-methyl-2-butanyl)amino)-N-(6-((2S)-2-(hydroxymethyl)-4-morpholinyl)-2-pyridinyl)-3-pyridinecarboxamide | 0.2390 |
| 211 | 2-(6-azaspiro[2.5]octan-6-yl)-6-((4-hydroxy-2-methyl-2-butanyl)amino)-N-(4-methyl-6-(4-morpholinyl)-2-pyridinyl)-3-pyridinecarboxamide | 0.1423 |
| 212 | 6-(4-hydroxy-2,2-dimethylpyrrolidin-1-yl)-N-(4-methyl-6-morpholinopyridin-2-yl)-2-(6-azaspiro[2.5]octan-6-yl)nicotinamide | 0.5403 |
| 213 | 6-(4-hydroxy-2,2-dimethylpyrrolidin-1-yl)-N-(6-((R)-2-methylmorpholino)pyridin-2-yl)-2-(6-azaspiro[2.5]octan-6-yl)nicotinamide | 0.5230 |
| 214 | 2-(6-azaspiro[2.5]octan-6-yl)-6-((4-hydroxy-2-methyl-2-butanyl)amino)-N-(6-((2R)-2-methyl-4-morpholinyl)-2-pyridinyl)-3-pyridinecarboxamide | 0.1695 |
| 215 | 2-(6-azaspiro[2.5]octan-6-yl)-6-((1-hydroxy-2-methyl-2-propanyl)amino)-N-(6-(4-hydroxy-1-piperidinyl)-2-pyridinyl)-3-pyridinecarboxamide | 0.3300 |
| 216 | 2-(6-azaspiro[2.5]octan-6-yl)-6-((1-hydroxy-2-methyl-2-propanyl)amino)-N-(6-((3R)-3-hydroxy-1-piperidinyl)-2-pyridinyl)-3-pyridinecarboxamide | 0.0804 |
| 217 | 6-((1-hydroxy-3-methoxy-2-methylpropan-2-yl)amino)-N-(6-((R)-2-methylmorpholino)pyridin-2-yl)-2-(6-azaspiro[2.5]octan-6-yl)nicotinamide | 0.2220 |
| 218 | 2-(6-azaspiro[2.5]octan-6-yl)-N-(6-((2R)-2-methyl-4-morpholinyl)-2-pyridinyl)-6-((methylsulfonyl)amino)-3-pyridinecarboxamide | 0.1495 |

TABLE A-continued

Enzymatic activity of Compounds

| Ex. # | Chemical Name | KIF18A ATPase IC$_{50}$ (µM) |
|---|---|---|
| 219 | N-(6-(4-hydroxy-2,2-dimethylpyrrolidin-1-yl)pyridin-2-yl)-6-((1-hydroxy-2-methylpropan-2-yl)amino)-2-(6-azaspiro[2.5]octan-6-yl)nicotinamide | 0.2170 |
| 220 | 6-(4,4-dimethyl-2-oxooxazolidin-3-yl)-N-(6-(3-hydroxy-2,2-dimethylpyrrolidin-1-yl)pyridin-2-yl)-2-(6-azaspiro[2.5]octan-6-yl)nicotinamide | 2.2500 |
| 221 | N-(6-(3-hydroxy-2,2-dimethylpyrrolidin-1-yl)pyridin-2-yl)-6-((1-hydroxy-2-methylpropan-2-yl)amino)-2-(6-azaspiro[2.5]octan-6-yl)nicotinamide | 0.3570 |
| 222 | 2-(6-azaspiro[2.5]octan-6-yl)-6-((1,3-dihydroxy-2-(hydroxymethyl)-2-propanyl)amino)-N-(6-(((2R)-2-methyl-4-morpholinyl)-2-pyridinyl)-3-pyridinecarboxamide | 0.0880 |
| 223 | 2-(6-azaspiro[2.5]octan-6-yl)-N-(6-((2R)-2-methyl-4-morpholinyl)-2-pyridinyl)-6-(methylsulfamoyl)-3-pyridinecarboxamide | 0.0794 |
| 224 | 2-(6-azaspiro[2.5]octan-6-yl)-N-(6-((2R)-2-methyl-4-morpholinyl)-2-pyridinyl)-6-sulfamoyl-3-pyridinecarboxamide | 0.0688 |
| 225 | 2-(6-azaspiro[2.5]octan-6-yl)-N-(6-((2R)-2-methyl-4-morpholinyl)-2-pyridinyl)-6-((2-methyl-2-propanyl)sulfamoyl)-3-pyridinecarboxamide | 0.1020 |
| 226 | 2-(6-azaspiro[2.5]octan-6-yl)-N-(6-((2-hydroxyethyl)amino)-2-pyridinyl)-6-((1-hydroxy-2-methyl-2-propanyl)amino)-3-pyridinecarboxamide | 0.3920 |
| 227 | 2-(6-azaspiro[2.5]octan-6-yl)-6-((1-hydroxy-2-methyl-2-propanyl)amino)-N-(6-((3R)-3-hydroxy-1-piperidinyl)-4-methyl-2-pyridinyl)-3-pyridinecarboxamide | 0.1425 |
| 228 | 2-(6-azaspiro[2.5]octan-6-yl)-6-((1-hydroxy-2-methyl-2-propanyl)amino)-N-(6-((3S)-3-hydroxy-1-piperidinyl)-2-pyridinyl)-3-pyridinecarboxamide | 0.0697 |
| 229 | 6-((1-hydroxy-2-methylpropan-2-yl)amino)-N-(6-(3-hydroxy-3-methylpiperidin-1-yl)pyridin-2-yl)-2-(6-azaspiro[2.5]octan-6-yl)nicotinamide | 0.1365 |
| 230 | 6-((1-hydroxy-2-methylpropan-2-yl)amino)-N-(6-(3-hydroxy-3-(hydroxymethyl)piperidin-1-yl)pyridin-2-yl)-2-(6-azaspiro[2.5]octan-6-yl)nicotinamide | 0.1144 |
| 231 | 6-((1-hydroxy-2-methylpropan-2-yl)amino)-N-(6-(2-(hydroxymethyl)-2-methylpyrrolidin-1-yl)pyridin-2-yl)-2-(6-azaspiro[2.5]octan-6-yl)nicotinamide | 0.1340 |
| 232 | tert-butyl (1-(6-(6-((1-hydroxy-2-methylpropan-2-yl)amino)-2-(6-azaspiro[2.5]octan-6-yl)nicotinamido)pyridin-2-yl)piperidin-3-yl)(methyl)carbamate | 0.9480 |
| 233 | 6-((1-hydroxy-2-methylpropan-2-yl)amino)-N-(6-(3-(methylamino)piperidin-1-yl)pyridin-2-yl)-2-(6-azaspiro[2.5]octan-6-yl)nicotinamide | 0.9990 |
| 234 | tert-butyl (1-(6-(6-((1-hydroxy-2-methylpropan-2-yl)amino)-2-(6-azaspiro[2.5]octan-6-yl)nicotinamido)pyridin-2-yl)piperidin-3-yl)carbamate | 1.5200 |
| 235 | N-(6-(2-(aminomethyl)morpholino)pyridin-2-yl)-6-((1-hydroxy-2-methylpropan-2-yl)amino)-2-(6-azaspiro[2.5]octan-6-yl)nicotinamide | 0.3570 |
| 236 | N-(6-(3-aminopiperidin-1-yl)pyridin-2-yl)-6-((1-hydroxy-2-methylpropan-2-yl)amino)-2-(6-azaspiro[2.5]octan-6-yl)nicotinamide | 0.3880 |
| 237 | 4-(6-azaspiro[2.5]octan-6-yl)-6-(((2-hydroxyethyl)sulfonyl)amino)-N-(6-((2R)-2-methyl-4-morpholinyl)-2-pyridinyl)-3-pyridinecarboxamide | 0.0667 |
| 238 | 2-(6-azaspiro[2.5]octan-6-yl)-N-(6-((2R)-2-methyl-4-morpholinyl)-2-pyridinyl)-6-(methylsulfonyl)-3-pyridinecarboxamide | 0.2840 |
| 239 | 2-(6-azaspiro[2.5]octan-6-yl)-N-(6-((2R)-2-methyl-4-morpholinyl)-2-pyridinyl)-6-((methylsulfonyl)methyl)-3-pyridinecarboxamide | 0.0681 |
| 240 | 2-(6-azaspiro[2.5]octan-6-yl)-N-(4-methyl-6-(4-morpholinyl)-2-pyridinyl)-6-((methylsulfonyl)methyl)-3-pyridinecarboxamide | 0.1068 |
| 241 | 2-(6-azaspiro[2.5]octan-6-yl)-N-(6-((3R)-3-hydroxy-1-piperidinyl)-2-pyridinyl)-6-((methylsulfonyl)methyl)-3-pyridinecarboxamide | 0.1006 |
| 242 | N-(6-((R)-3-hydroxypiperidin-1-yl)pyridin-2-yl)-2-(6-azaspiro[2.5]octan-6-yl)-6-(1,1,1-trifluoro-2,3-dihydroxypropan-2-yl)nicotinamide | 0.0781 |
| 243 | 4-(6-azaspiro[2.5]octan-6-yl)-6-((1-hydroxy-2-methyl-2-propanyl)amino)-N-(6-((2R)-2-methyl-4-morpholinyl)-2-pyridinyl)-3-pyridinecarboxamide | 0.4400 |
| 244 | N-(6-((R)-2-methylmorpholino)pyridin-2-yl)-6-(1-(methylsulfonyl)ethyl)-2-(6-azaspiro[2.5]octan-6-yl)nicotinamide | 0.0512 |
| 245 | N-(2-(6-azaspiro[2.5]oct-6-yl)-3-pyridinyl)-6-(4-morpholinyl)-2-pyridinecarboxamide | 0.8605 |
| 246 | N-(2-(6-azaspiro[2.5]octan-6-yl)-6-(1,1,1-trifluoro-2-hydroxypropan-2-yl)pyridin-3-yl)-6-morpholinopicolinamide | 0.2925 |
| 247 | 2-(6-azaspiro[2.5]octan-6-yl)-N-(5-fluoro-6-((2R)-2-methyl-4-morpholinyl)-2-pyridinyl)-6-((1-hydroxy-2-methyl-2-propanyl)amino)-3-pyridinecarboxamide | 0.0891 |
| 248 | 6-(4,4-difluoropiperidin-1-yl)-N-(4-((2-hydroxyethyl)sulfonamido)-2-(6-azaspiro[2.5]octan-6-yl)phenyl)picolinamide | 0.016 |

The foregoing invention has been described in some detail by way of illustration and example, for purposes of clarity and understanding. Those skilled in the art understand that changes and modifications may be practiced within the scope of the appended claims. Therefore, it is to be understood that the above description is intended to be illustrative and not restrictive. The scope of the invention should, therefore, be determined not with reference to the above description, but should instead be determined with reference to the following appended claims, along with the full scope of equivalents to which such claims are entitled.

All patents, patent applications and publications cited herein are hereby incorporated by reference in their entirety for all purposes to the same extent as if each individual patent, patent application or publication were so individually denoted.

What is claimed is:

1. A compound of formula I:

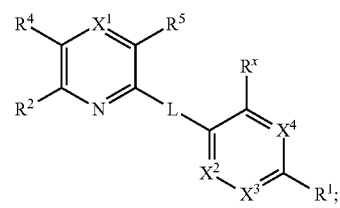

or any pharmaceutically-acceptable salt thereof, wherein:
$X^1$ is N or $CR^6$;
$X^2$ is N or $CR^7$;

wherein L is —NR³—(C=O); X³ is N; and X⁴ is CR⁹; having the formula (Ia):

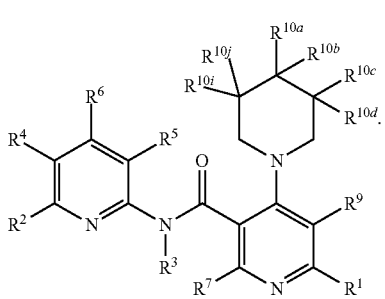

(Ia)

or
wherein L is —NR³—(C=O)—; X³ is CR⁸; and X⁴ is N; having the formula (Ib):

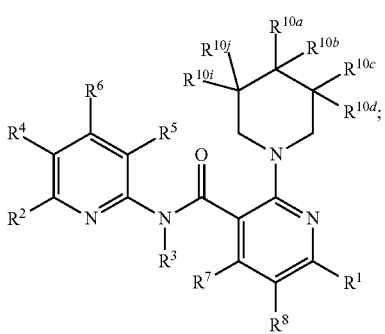

(Ib)

$R^1$ is a group —Z—$R^{12}$;
wherein Z is —$C_{0-4}$alk-, —$NR^{11}$—, —$NR^{11}SO_2$—$C_{0-4}$alk-, —$SO_2NR^{11}$—$C_{0-4}$alk-, —$NR^{11}SO_2NR^{11}$—, —$NR^{11}SO_2NR^{11}$—C(=O)—O—, —$C_{0-4}$alk-S(=O)(=NH)—, $C_{0-4}$alk-$NR^{11}$—S(=O)(=NH), —$C_{0-4}$alk-S—, —$C_{0-4}$alk-S(=O)—, —$C_{0-4}$alk-SO₂—, —O—, —P—, —P(=O), —P(=O)₂, —(C=O)—, —(C=O)$NR^{11}$—, or —$NR^{11}$(C=O); or
the group —Z—$R^{12}$ is —N=S(=O)—($R^{12}$)₂, wherein the two $R^{12}$ pair can alternatively combine with the sulfur atom attached to each of them to form a saturated or partially-saturated 3-, 4-, 5-, or 6-membered monocyclic ring containing 0, 1, 2 or 3 N atoms and 0, 1, or 2 atoms selected from O and S;
$R^2$ is halo or a group —Y—$R^{13}$, wherein Y is —$C_{0-4}$alk-, —N($C_{0-1}$alk)-$C_{0-4}$alk-, —C(=O)$NR^aR^a$($C_{1-4}$alk)-, —O—$C_{0-4}$alk-, —S—, —S=O, —S(=O)₂—, —$SO_2N(C_{0-1}alk)$-$C_{0-4}$alk-, —N($C_{0-1}$alk)-$SO_2$—$C_{0-4}$alk-, —$C_{0-4}$alk-S(=O)(=NH)—, —(C=O)—, —$C_{0-4}$alk-(C=O)—O—; or
the group —Y—$R^{13}$ is —N=S(=O)—($R^{13}$)₂, wherein the two $R^{13}$ pair can alternatively combine with the sulfur atom attached to each of them to form a saturated or partially-saturated 3-, 4-, 5-, or 6-membered monocyclic ring containing 0, 1, 2 or 3 N atoms and 0, 1, or 2 atoms selected from O and S;
$R^3$ is H, methyl, or ethyl;
$R^4$ is H, halo, $C_{1-4}$alk, or $C_{1-4}$haloalk;
$R^5$ is H, halo, $C_{1-8}$alk, or $C_{1-4}$haloalk;
$R^6$ is H, halo, CN, —O—$C_{0-6}$alk-, $R^{6a}$ or $R^{6b}$;
$R^7$ is H, halo, $C_{1-4}$alk, or $C_{1-4}$haloalk;
$R^8$ is H, halo, $C_{1-8}$alk, or $C_{1-4}$haloalk;
$R^9$ is H, halo, $C_{1-4}$alk, or $C_{1-4}$haloalk;
Each of $R^{10c}$, $R^{10d}$, $R^{10i}$, and $R^{10j}$ is H,
each of $R^{10a}$ and $R^{10b}$ pair combine with the carbon atom attached to each of them to form a saturated 3-, 4-, 5-, 6-membered monocyclic ring spiro to the $R^x$ ring; wherein said 3-, 4-, 5-, 6-membered monocyclic ring contains 0, 1, 2 or 3 N atoms and 0, 1, or 2 atoms selected from O and S, and further wherein said 3-, 4-, 5-, 6-membered monocyclic ring is substituted by 0, 1, 2 or 3 group(s) selected from F, Cl, Br, $C_{1-6}$alk, $C_{1-4}$haloalk, —$OR^a$, —$OC_{1-4}$haloalk, CN, —$NR^aR^a$, or oxo;
$R^{11}$ is H or $C_{1-8}$alk;
$R^{12}$ is H, halo, $R^{12a}$, or $R^{12b}$;
$R^{13}$ is $R^{13a}$ or $R^{13b}$;
$R^{6a}$, $R^{12a}$, and $R^{13a}$ is independently, at each instance, selected from the group consisting of a saturated, partially-saturated or unsaturated 3-, 4-, 5-, 6-, or 7-membered monocyclic or 4-, 5-, 6-, 7-, 8-, 9-, 10-, 11-, or 12-membered bicyclic ring containing 0, 1, 2 or 3 N atoms and 0, 1, or 2 atoms selected from O and S, which is substituted by 0, 1, 2 or 3 group(s) selected from F, Cl, Br, $C_{1-6}$alk, $C_{1-4}$haloalk, —$OR^a$, —$OC_{1-4}$haloalk, CN, —C(=O)$R^b$, —C(=O)$OR^a$, —C(=O)$NR^aR^a$, —C(=$NR^a$)$NR^aR^a$, —OC(=O)$R^b$, —OC(=O)$NR^aR^a$, —$OC_{2-6}$alk$NR^aR^a$, —$OC_{2-6}$alk$OR^a$, —$SR^a$, —S(=O)$R^b$, —S(=O)₂$R^b$, —S(=O)₂$NR^aR^a$, —$NR^aR^a$, —N($R^a$)C(=O)$R^b$, —N($R^a$)C(=O)$OR^b$, —N($R^a$)C(=O)$NR^aR^a$, —N($R^a$)C(=$NR^a$)$NR^aR^a$, —N($R^a$)S(=O)₂$R^b$, —N($R^a$)S(=O)₂$NR^aR^a$, —$NR^aC_{2-6}$alk$NR^aR^a$, —$NR^aC_{2-6}$alk$OR^a$, —$C_{1-6}$alk$NR^aR^a$, —$C_{1-6}$alk$OR^a$, —$C_{1-6}$alkN($R^a$)C(=O)$R^b$, —$C_{1-6}$alkOC(=O)$R^b$, —$C_{1-6}$alkC(=O)$NR^aR^a$, —$C_{1-6}$alkC(=O)$OR^a$, $R^{14}$, and oxo;
$R^{6b}$, $R^{12b}$, and $R^{13b}$ is independently, at each instance, selected from the group consisting of $C_{1-6}$alk substituted by 0, 1, 2, 3, 4, or 5 group(s) selected from F, Cl, Br, —C(=O)$OR^a$, —$OR^a$, —$C_{1-2}$haloalk, —$OC_{1-4}$haloalk, CN, $NH_2$, NH($CH_3$), or N($CH_3$)₂;
$R^{14}$ is selected from the group consisting of a saturated, partially-saturated or unsaturated 3-, 4-, 5-, 6-, or 7-membered monocyclic or 4-, 5-, 6-, 7-, 8-, 9-, 10-, 11-, or 12-membered bicyclic ring containing 0, 1, 2 or 3 N atoms and 0, 1, or 2 atoms selected from O and S, which is substituted by 0, 1, 2 or 3 group(s) selected from F, Cl, Br, $C_{1-6}$alk, $C_{1-4}$haloalk, —$OR^a$, —$OC_{1-4}$haloalk, CN, —C(=O)$R^b$, —C(=O)$OR^a$, —C(=O)$NR^aR^a$, —C(=$NR^a$)$NR^aR^a$, —OC(=O)$R^b$, —OC(=O)$NR^aR^a$, —$OC_{2-6}$alk$NR^aR^a$, —$OC_{2-6}$alk$OR^a$, —$SR^a$, —S(=O)$R^b$, —S(=O)₂$R^b$, —S(=O)₂$NR^aR^a$, —$NR^aR^a$, —N($R^a$)C(=O)$R^b$, —N($R^a$)C(=O)$OR^b$, —N($R^a$)C(=O)$NR^aR^a$, —N($R^a$)C(=$NR^a$)$NR^aR^a$, —N($R^a$)S(=O)₂$R^b$, —N($R^a$)S(=O)₂$NR^aR^a$, —$NR^aC_{2-6}$alk$NR^aR^a$, —$NR^aC_{2-6}$alk$OR^a$, —$C_{1-6}$alk$NR^aR^a$, —$C_{1-6}$alk$OR^a$, —$C_{1-6}$alkN($R^a$)C(=O)$R^b$, —$C_{1-6}$alkOC(=O)$R^b$, —$C_{1-6}$alkC(=O)$NR^aR^a$, —$C_{1-6}$alkC(=O)$OR^a$, and oxo;
$R^a$ is independently, at each instance, H or $R^b$; and
$R^b$ is independently, at each instance, $C_{1-6}$alk, phenyl, or benzyl, wherein the $C_{1-6}$alk is being substituted by 0, 1, 2 or 3 substituents selected from halo, —OH, —$OC_{1-4}$alk, —$NH_2$, —$NHC_{1-4}$alk, —OC(=O)$C_{1-4}$alk, or —N($C_{1-4}$alk) $C_{1-4}$alk; and the phenyl or benzyl is being substituted by 0, 1, 2 or 3 substituents selected from halo, $C_{1-4}$alk, $C_{1-3}$haloalk, —OH, —OC$_{1-4}$alk, —NH$_2$, —NHC$_{1-4}$alk, —OC(=O)C$_{1-4}$alk, or —N(C$_{1-4}$alk) C$_{1-4}$alk.

2. The compound according to claim 1 wherein L is —NR$^3$—(C=O); and X$^1$ is CR$^6$, X$^2$ is CR$^7$, X$^3$ is N; and X$^4$ is CR$^9$; having the formula (Ia):

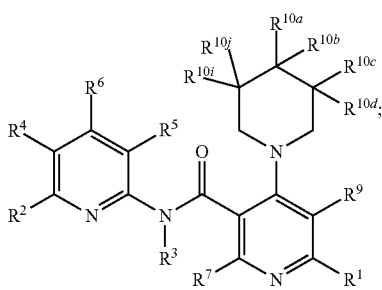
(Ia)

wherein

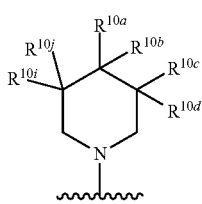

is

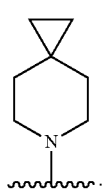

3. The compound according to claim 1 wherein L is —NR$^3$—(C=O)—; and X$^1$ is CR$^6$, X$^2$ is CR$^7$, X$^3$ is CR$^8$; and X$^4$ is N; having the formula (Ib):

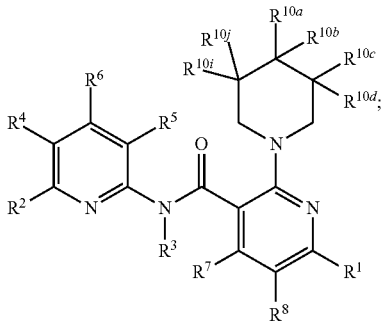
(Ib)

wherein

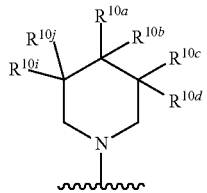

is

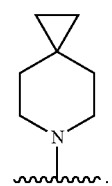 [SMILES: *N1CCC2(CC1)CC2]

4. The compound according to claim 1 wherein R$^3$ is H or methyl.

5. The compound according to claim 1 wherein each of R$^{10c}$, R$^{10d}$, R$^{10i}$, and R$^{10j}$ is H; and each of R$^{10a}$ and R$^{10b}$ pair combine with the carbon atom attached to each of them form a saturated 3-membered monocyclic ring spiro to the R$^x$ ring; wherein said ring contains 0, 1, 2 or 3 N atoms and 0 or 1 atoms selected from O and S.

6. The compound according to claim 1 wherein each of R$^{10c}$, R$^{10d}$, R$^{10i}$, and R$^{10j}$ is H; and each of R$^{10a}$ and R$^{10b}$ pair combine with the carbon atom attached to each of them form a cyclopropyl ring spiro to the R$^x$ ring.

7. The compound according to claim 1 wherein R$^x$ is

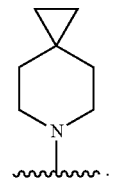

8. The compound according to claim 1 wherein Z is absent, —NH—, —NHSO$_2$—, —O—, —SO$_2$NH—, —S(=O)(=NH)—, —CH$_2$—S(=O)(=NH)—, —SO$_2$—, —CH$_2$—SO$_2$, or CH$_3$(CH)—SO$_2$.

9. The compound according to claim 1 wherein R$^{12}$ is selected from:
a) H;
(b) F;
(c) C$_{1-6}$alk substituted by 0, 1, 2 or 3 group(s) selected from F, Cl, Br, —CF$_3$, —C(=O) CH$_3$, —OH, —OCH$_3$, —NH$_2$, cyclopropyl, cyclopropylmethanol, or 3-(trifluoromethyl)-3H-diazirinyl; or
(d) a saturated, partially-saturated or unsaturated 3-, 4-, 5-, 6-, or 7-membered monocyclic ring containing 0, 1, 2 or 3 N atoms and 0 or 1 atoms selected from O and S, which is substituted by 0, 1, 2 or 3 group(s) selected from F, Cl, Br, methyl, ethyl, —CF$_3$, —C$_{1-6}$alkOH, —OH, —OCH$_3$, —NH$_2$, or OXO.

10. The compound according to claim 1 wherein R$^{12}$ is selected from cyclopropyl, cyclobutyl, cyclopentyl, oxetanyl, azetidinyl, oxazolidinyl, 1,3-dioxolanyl, or pyrrolidinyl.

11. The compound according to claim 1 wherein $R^1$ is a group —Z—$R^{12}$, wherein Z is —NHSO$_2$— or —SO$_2$NH—; and $R^{12}$ is cyclopropyl, or $R^{12}$ is $C_{1-6}$alk substituted by 0, 1, 2 or 3 OH group(s).

12. The compound according to claim 1 wherein $R^1$ is a group —Z—$R^{12}$, wherein Z is —NHSO$_2$— and $R^{12}$ is —CH$_2$—CH$_2$—OH.

13. The compound according to claim 1 wherein $R^2$ is a group —Y—$R^{13}$, wherein Y is absent, —NH—, or —NHSO$_2$—; and
    $R^{13}$ is a saturated, partially-saturated or unsaturated 3-, 4-, 5-, 6-, or 7-membered monocyclic or 8-, 9-, 10-, 11-, or 12-membered bicyclic ring containing 0, 1, 2 or 3 N atoms and 0 or 1 atoms selected from O and S, which is substituted by 0, 1, 2 or 3 group(s) selected from F, Cl, Br, methyl, ethyl, CF$_3$, CH$_2$OH, —OH, —OCH$_3$, —NH$_2$, —NH (CH$_3$), and oxo; or;
    $R^{13}$ is $C_{1-6}$alk substituted by 0, 1, 2, 3, 4, or 5 group(s) selected from F, Cl, Br, —OH, —OC$_{1-4}$haloalk, or CN.

14. The compound according to claim 1 wherein $R^2$ is a saturated 5- or 6-membered monocyclic ring wherein each said ring contains 1, or 2 N atoms and 0 or 1 O atom, and wherein each said ring is substituted by 0, 1, 2 or 3 group(s) selected from F, Cl, Br, C$_{1-6}$alk, C$_{1-4}$haloalk, —OH, —OC$_{1-4}$haloalk, CN, $R^{14}$, and oxo.

15. The compound according to claim 1 wherein $R^2$ is:
    (a) F, Br;
    (b) a group —Y—$R^{13}$, wherein Y is absent or SO$_2$; and $R^{13}$ is morpholinyl, oxazolidinyl, oxazolyl, pyrrolidinyl, piperidinyl, azetidinyl, dihydropyranyl, dihydropyridinyl, piperazinyl, tetrahydropyranyl,

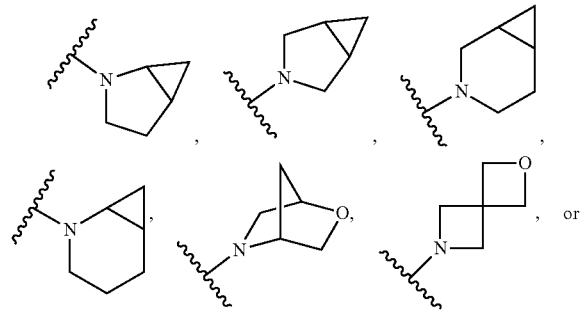

, or

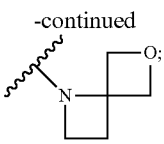

wherein each said ring is substituted by 0, 1, 2 or 3 group(s) selected from F, Cl, Br, methyl, ethyl, —OH, —OCH$_3$, CH$_2$OH, NH$_2$, NH (CH$_3$), or oxo; or
    (c) a group —Y—$R^{13}$, wherein Y is NH or —SO$_2$NH—; and wherein $R^{13}$ is $C_{1-6}$alk substituted by 0, 1, 2, 3, 4, or 5 group(s) selected from F, Cl, Br, methyl, CF$_3$, or —OH.

16. The compound according to claim 1 wherein $R^2$ is morpholinyl or piperidinyl substituted by 0, 1, 2 or 3 group(s) selected from F, Cl, Br, methyl, CF$_3$, —OH, —OCHF$_2$, CN, or oxo.

17. The compound according to claim 1 wherein $R^2$ is morpholinyl substituted by 1, 2 or 3 methyl group(s).

18. The compound according to claim 1 wherein $R^2$ is piperidinyl substituted by 1, 2 or 3 fluoro group(s).

19. The compound according to claim 1 wherein $R^4$ is H or halo.

20. The compound according to claim 1 wherein $R^5$ is H.

21. The compound according to claim 1 wherein $R^6$ is H or F.

22. The compound according to claim 1 wherein $R^7$ is selected from (a) H; (b) $C_{1-6}$alk substituted by 0, 1, 2 or 3 group(s) selected from F, Cl, Br, —OH, —OCH$_3$, or cyclopropyl; or (c) a saturated, partially-saturated or unsaturated 3-, 4-, 5-, 6-, or 7-membered monocyclic ring containing 0, 1, 2 or 3 N atoms and 0 or 1 atoms selected from O and S, which is substituted by 0, 1, 2 or 3 group(s) selected from F, Cl, Br, C$_{1-6}$alk, C$_{1-4}$haloalk, —C$_{1-6}$alkOH, —OH, —OCH$_3$, —NH$_2$, or oxo.

23. The compound according to claim 1 wherein $R^6$ is H.

24. The compound according to claim 1 wherein $R^7$ is H.

25. The compound according to claim 1 wherein $R^8$ is H.

26. A compound, selected from the group consisting of:

| Ex. # | Chemical Structure | Name |
| --- | --- | --- |
| 100 |  | 5-((1-hydroxy-2-methylpropan-2-yl)amino)-N-(6-(piperidin-1-ylsulfonyl)pyridin-2-yl)-3-(6-azaspiro[2.5]octan-6-yl)pyrazine-2-carboxamide |

-continued

| Ex. # | Chemical Structure | Name |
|---|---|---|
| 102 | | N-(6-(N-(tert-butyl)sulfamoyl)pyridin-2-yl)-5-((1-hydroxy-2-methylpropan-2-yl)amino)-3-(6-azaspiro[2.5]octan-6-yl)pyrazine-2-carboxamide |
| 104 | | (R)-5-((1-hydroxy-2-methylpropan-2-yl)amino)-N-(6-(2-methylmorpholino)pyridin-2-yl)-3-(6-azaspiro[2.5]octan-6-yl)pyrazine-2-carboxamide |
| 108 | | N-(6-(N-(tert-butyl)sulfamoyl)pyridin-2-yl)-5-((1,3-dihydroxy-2-methylpropan-2-yl)amino)-3-(6-azaspiro[2.5]octan-6-yl)pyrazine-2-carboxamide |
| 147 | | (R)-6-((1,3-dihydroxy-2-methylpropan-2-yl)amino)-N-(6-(2-methylmorpholino)pyridin-2-yl)-2-(6-azaspiro[2.5]octan-6-yl)nicotinamide |
| 154 | | (S)-N-(6-(N-(tert-butyl)sulfamoyl)pyridin-2-yl)-2-(6-azaspiro[2.5]octan-6-yl)-6-(1,1,1-trifluoro-2-hydroxypropan-2-yl)nicotinamide |

-continued

| Ex. # | Chemical Structure | Name |
|---|---|---|
| 176 | | (S)-N-(6-(N-(tert-butyl)sulfamoyl)pyridin-2-yl)-2-(6-azaspiro[2.5]octan-6-yl)-6-(1,1,1-trifluoro-2,3-dihydroxypropan-2-yl)nicotinamide |
| 178 | | (R)-N-(6-(N-(tert-butyl)sulfamoyl)pyridin-2-yl)-6-(1,2-dihydroxypropan-2-yl)-2-(6-azaspiro[2.5]octan-6-yl)nicotinamide |
| 223 | | (R)-N-(6-(2-methylmorpholino)pyridin-2-yl)-6-(N-methylsulfamoyl)-2-(6-azaspiro[2.5]octan-6-yl)nicotinamide |
| 237 | | ((R)-6-((2-hydroxyethyl)sulfonamido)-N-(6-(2-methylmorpholino)pyridin-2-yl)-4-(6-azaspiro[2.5]octan-6-yl)nicotinamide |
| 238 | | (R)-N-(6-(2-methylmorpholino)pyridin-2-yl)-6-(methylsulfonyl)-2-(6-azaspiro[2.5]octan-6-yl)nicotinamide; | or any pharmaceutically-acceptable salt thereof.

27. A pharmaceutical composition comprising the compound according to claim 1 or the pharmaceutically acceptable salt thereof, and a pharmaceutically-acceptable diluent or carrier.

28. A method of treating a condition that may be treated with KIF18A inhibitors, the method comprising administering to a patient in need thereof a therapeutically effective amount of the compound according to claim 1, or the pharmaceutically acceptable salt thereof, wherein said condition is cancer selected from the group consisting of (a) a solid or hematologically derived tumor selected from cancer of the cancer of the bladder, endometrial, lung squamous cell, breast, colon, kidney, liver, lung, small cell lung cancer, esophagus, gall-bladder, brain, head and neck, ovary, pancreas, stomach, cervix, thyroid, prostate and skin, (b) a hematopoietic tumor of lymphoid lineage selected from leukemia, acute lymphocitic leukemia, acute lymphoblastic leukemia, B-cell lymphoma, T-cell-lymphoma, Hodgkin's lymphoma, non-Hodgkin's lymphoma, hairy cell lymphoma and Burkett's lymphoma, (c) a hematopoietic tumor of myeloid lineage selected from acute and chronic myelogenous leukemias, myelodysplastic syndrome and promyelocytic leukemia (d) a tumor of mesenchymal origin selected from fibrosarcoma and rhabdomyosarcoma, (e) a tumor of the central and peripheral nervous system selected from astrocytoma, neuroblastoma, glioma and schwannoma, or (f) a melanoma, seminoma, teratocarcinoma, osteosarcoma, xenoderoma pigmentosum, keratoctanthoma, thyroid follicular cancer or Kaposi's sarcoma.

29. A method of reducing the size of a solid tumor in a subject, the method comprising administering to the subject in need thereof a therapeutically effective amount of the compound according to claim 1, or the pharmaceutically-acceptable salt thereof.

30. A method of treating a cell proliferation disorder in a subject, the method comprising administering to the subject in need thereof a therapeutically effective amount of the compound according to claim 1, or the pharmaceutically-acceptable salt thereof.

31. The compound according to claim 1 wherein $R^9$ is H.

* * * * *